(12) United States Patent
Goino

(10) Patent No.: US 8,315,910 B2
(45) Date of Patent: Nov. 20, 2012

(54) AUCTION METHODS, AUCTION SYSTEMS AND SERVERS

(75) Inventor: Tadashi Goino, Nagano-ken (JP)

(73) Assignee: Tadashi Goino, Nagano-ken (JP)

( * ) Notice: Subject to any disclaimer, the term of this patent is extended or adjusted under 35 U.S.C. 154(b) by 615 days.

(21) Appl. No.: 12/349,131

(22) Filed: Jan. 6, 2009

(65) Prior Publication Data

US 2009/0119187 A1    May 7, 2009

Related U.S. Application Data

(62) Division of application No. 09/864,525, filed on May 23, 2001, now Pat. No. 7,478,055.

(30) Foreign Application Priority Data

| | | |
|---|---|---|
| Jun. 27, 2000 | (JP) | 2000-193457 |
| Oct. 2, 2000 | (JP) | 2000-302727 |
| Nov. 22, 2000 | (JP) | 2000-356812 |

(51) Int. Cl.
*G06Q 30/00* (2012.01)

(52) U.S. Cl. ..................... 705/26.1; 705/27.1

(58) Field of Classification Search .................. 705/26, 705/27
See application file for complete search history.

(56) References Cited

U.S. PATENT DOCUMENTS

| | | |
|---|---|---|
| 5,724,045 A | 3/1998 | Kawakami |
| 5,794,207 A | 8/1998 | Walker et al. |
| 5,897,620 A | 4/1999 | Walker et al. |
| 5,966,699 A | 10/1999 | Zandi |
| 6,023,685 A | 2/2000 | Brett et al. |
| 6,028,537 A | 2/2000 | Suman et al. |
| 6,035,289 A * | 3/2000 | Chou et al. ............. 705/36 R |

(Continued)

FOREIGN PATENT DOCUMENTS

JP    64-62799    3/1989

(Continued)

OTHER PUBLICATIONS

Firm sells sense of place Satellite-based location-finder fueling growth; [North Sports Final, C Edition], Merrill Goozner, Chicago Tribune.. Chicago Tribune (pre-1997 Fulltext). Chicago, Ill.: Jan. 30, 1991. p. 1, downloaded from ProQuestDirect on Jul. 11, 2012, 5 pages.*

(Continued)

*Primary Examiner* — James Zurita
(74) *Attorney, Agent, or Firm* — Patterson Thuente Christensen Pedersen, P.A.

(57) ABSTRACT

Auction methods, auction systems and servers which can satisfy requirements other than the price for a client are provided. An auction client selects a desired one from time slide schemes from a terminal, and enters a due date in an associated entry field. For example, a due date advance scheme is a scheme in which a person who offers the soonest possible trading date from a due date is determined as a successful bidder. Also, specific details (paying-in, delivery and so on) on the trading date for a payment or delivery of an article, requested to a partner, are specified. These bid condition data are transmitted to the server through a network, and the server collects participants in a bid on a home page. The server receives trading dates offered from terminals of participants, and determines a participant who offers the trading date that most satisfies the trade due date condition offered by the client as a successful bidder.

20 Claims, 73 Drawing Sheets

U.S. PATENT DOCUMENTS

| | | | |
|---|---|---|---|
| 6,085,169 | A | 7/2000 | Walker et al. |
| 6,134,534 | A | 10/2000 | Walker et al. |
| 6,240,396 | B1 | 5/2001 | Walker et al. |
| 6,260,024 | B1 * | 7/2001 | Shkedy .......... 705/37 |
| 6,269,361 | B1 | 7/2001 | Davis et al. |
| 6,345,090 | B1 | 2/2002 | Walker et al. |
| 6,356,878 | B1 | 3/2002 | Walker et al. |
| 6,466,914 | B2 | 10/2002 | Mitsuoka et al. |
| 6,756,913 | B1 | 6/2004 | Ayed |
| 6,952,682 | B1 | 10/2005 | Wellman |
| 7,099,835 | B2 | 8/2006 | Williams, III |
| 7,478,055 | B2 | 1/2009 | Goino |
| 2001/0042041 | A1 | 11/2001 | Moshal et al. |
| 2001/0049658 | A1 | 12/2001 | Hays |

FOREIGN PATENT DOCUMENTS

| | | |
|---|---|---|
| JP | 3-268625 | 11/1991 |
| JP | 5-233999 | 9/1993 |
| JP | 06-180797 | 6/1994 |
| JP | 6-325300 | 11/1994 |
| JP | 8-087699 | 4/1996 |
| JP | 8-096296 | 4/1996 |
| JP | 8-146129 | 6/1996 |
| JP | 8-166939 | 6/1996 |
| JP | 9034720 | 2/1997 |
| JP | 9114907 | 5/1997 |
| JP | 9115012 | 5/1997 |
| JP | 09-128690 | 6/1997 |
| JP | 09-282597 | 10/1997 |
| JP | 09-304506 | 11/1997 |
| JP | 10-078992 | 3/1998 |
| JP | 10063741 | 3/1998 |
| JP | 10078992 | 3/1998 |
| JP | 10097533 | 4/1998 |
| JP | 10105889 | 4/1998 |
| JP | 10-162297 | 6/1998 |
| JP | 10208195 | 8/1998 |
| JP | 10-254913 | 9/1998 |
| JP | 10254911 | 9/1998 |
| JP | 10320470 | 12/1998 |
| JP | 11025158 | 1/1999 |
| JP | 11053587 | 2/1999 |
| JP | 11-504455 | 4/1999 |
| JP | 11195069 | 7/1999 |
| JP | 11-212624 | 8/1999 |
| JP | 11-259566 | 9/1999 |
| JP | 11-283191 | 10/1999 |
| JP | 11-298853 | 10/1999 |
| JP | 11-328271 | 11/1999 |
| JP | 11353361 | 12/1999 |
| JP | 2000-020890 | 1/2000 |
| JP | 200078289 | 3/2000 |
| JP | 2000-112978 | 4/2000 |
| JP | 2000099572 | 4/2000 |
| WO | WO 96/34357 | 10/1996 |

OTHER PUBLICATIONS

"Intensive Use of e-Business—Tide over revolutionary times in business by taking advantage of horizontal ties, e-commerce," *Kohgaku-Sha Co., Ltd.*, vol. 2, pp. 3-15 (Jun. 20, 2000).

Kono, Osami, "Enabling Safe Transaction in Virtual Marketplace—Escrow, Nikkei Net Business," Japan, *Nikkei Business Publications*, Inc., pp. 204-205 (Jun. 15, 2000).

Merrill Goozner, Chicago Tribune (pre-1997 Fulltext). Chicago, Ill.: Jan. 30, 1991, Firm sells sense of place Satellite-based location-finder fueling growth; [North Sports Final, C Edition], downloaded from ProQuest on the Internet on May 11, 2008.

* cited by examiner

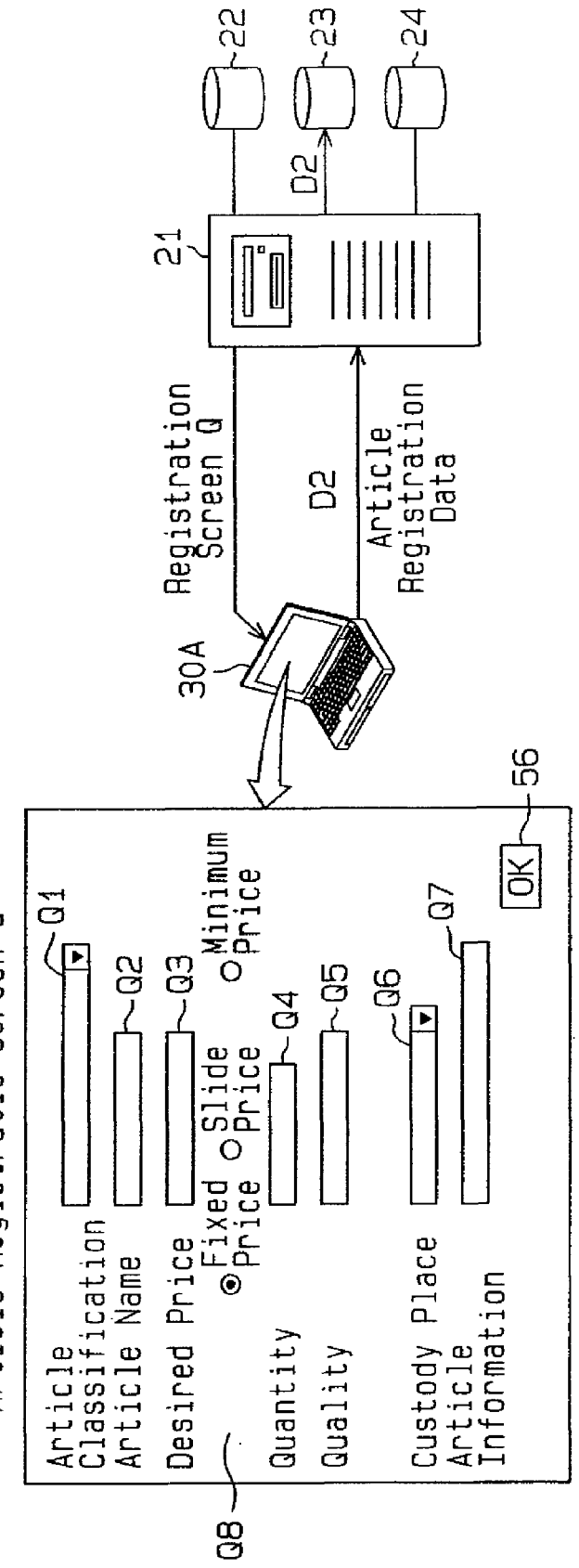

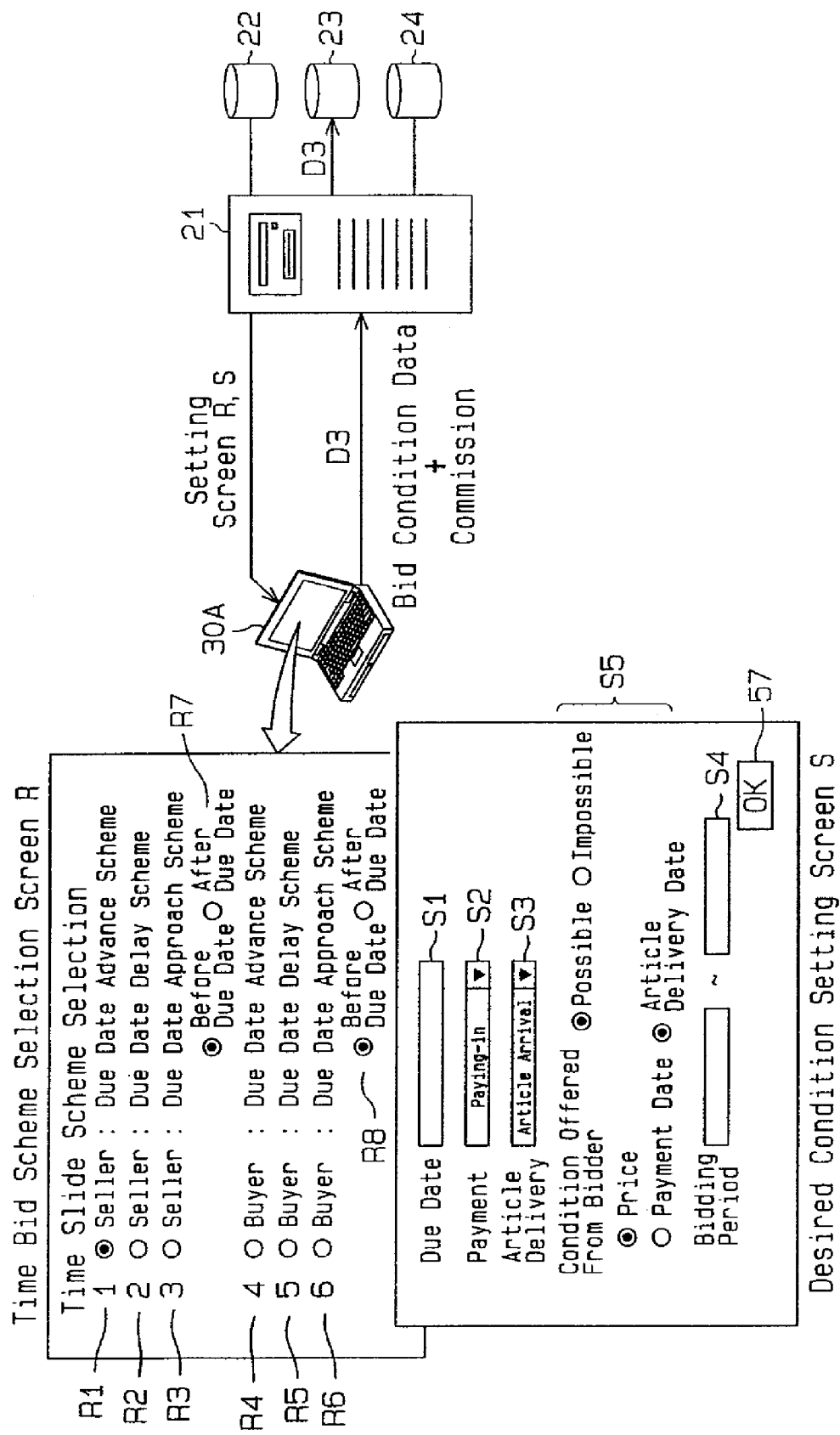

Due Date Advance Scheme

Due Date Delay Scheme

Closest Pre-Due Date Scheme

Closest Post-Due Date Scheme

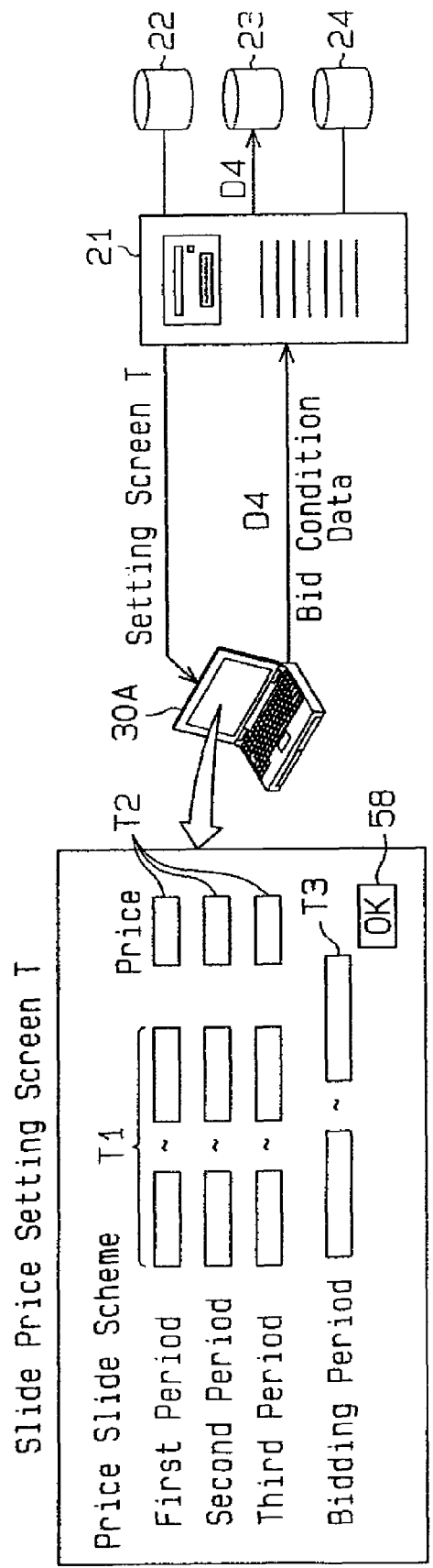

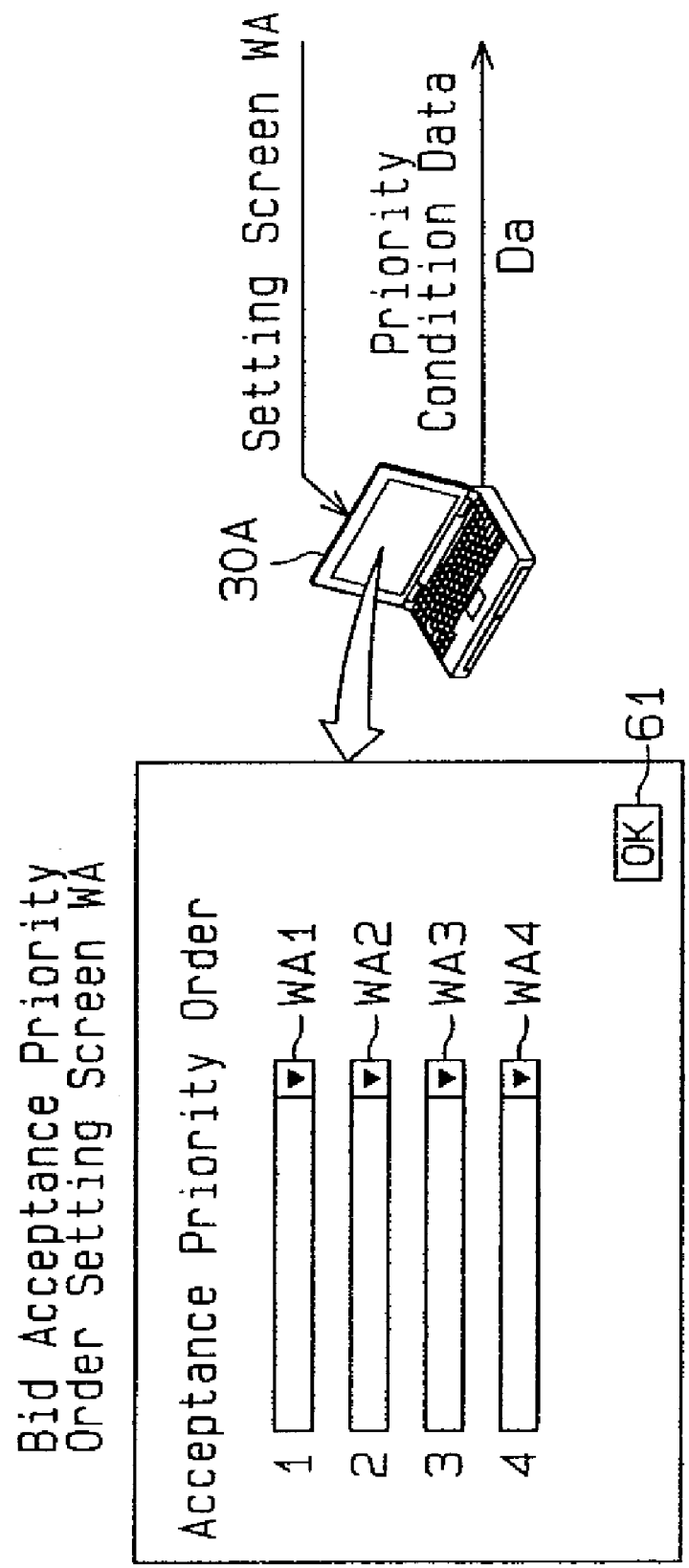

Fig.14

List Screen XA

| NO | List XA1 | | Condition offerd by bidder | |
|----|----------|----------|----------|----------|
| | Code Number | Trading Data | Price | Article delivery date |
| 1 | 00080 | 20 June | xxxxx Paying-in | 20 June Shipment |
| 2 | 00079 | 20 June | xxxxx Paying-in | 20 June Shipment |
| 3 | 00078 | 20 June | xxxxx Paying-in | 20 June Delivery |
| 4 | 00077 | 20 June | xxxxx Paying-in | 25 June Delivery |
| 5 | 00076 | 20 June | xxxxx Paying-in | 20 June Delivery |
| 6 | 00075 | 20 June | xxxxx Paying-in | 1 July Shipment |
| 7 | 00074 | 19 June | xxxxx Paying-in | 19 June Shipment |
| · | · | · | · | · |

Select successful bidder — XA2

NO [ ]   OK — 62

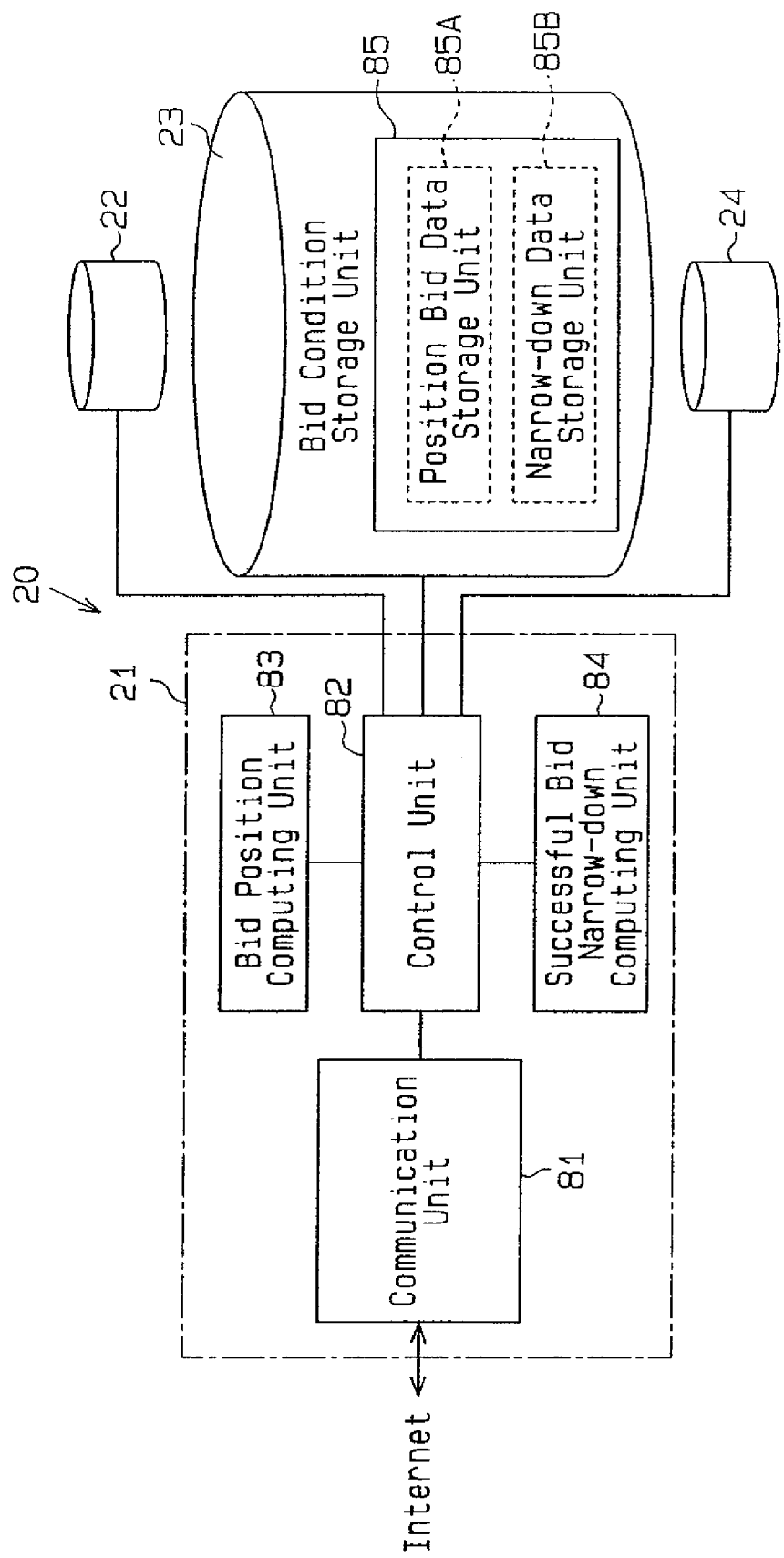

Fig.29

List Screen XB

List XB1

| NO | Code Number | Position (Distance) | Reference Information | |
|---|---|---|---|---|
| | | | Rate System | Service |
| 1 | 00080 | 100m | xxxxx | xxxxx |
| 2 | 00079 | 150m | xxxxx | xxxxx |
| 3 | 00078 | 250m | xxxxx | xxxxx |
| 4 | 00077 | 300m | xxxxx | xxxxx |
| 5 | 00076 | 400m | xxxxx | xxxxx |
| 6 | 00075 | 550m | xxxxx | xxxxx |
| 7 | 00074 | 700m | xxxxx | xxxxx |
| • | • | • | • | • |
| • | • | • | • | • |
| • | • | • | • | • |

Select Successful Bidder NO. ——XB2

Decide —113

Fig. 43

List Screen XC

List XC1

| NO | Code Number | Numerical Value Price | Price | Supplementary Items |
|----|-------------|----------------------|-------|---------------------|
| 1 | 00080 | 1000 | xxxxx | Nothing |
| 2 | 00079 | 950 | xxxxx | xxxxx |
| 3 | 00078 | 900 | xxxxx | xxxxx |
| 4 | 00077 | 880 | xxxxx | Nothing |
| 5 | 00076 | 860 | xxxxx | Nothing |
| 6 | 00075 | 700 | xxxxx | xxxxx |
| 7 | 00074 | 600 | xxxxx | Nothing |
| ・・・ | ・・・ | ・・・ | ・・・ | ・・・ |

Select Successful Bidder NO. ──XC2

Decide ──142

Fig.54

| Order | Article | Evaluation Item 1 | Evaluation Item 2 | ... | Evaluation Item n | Total Evaluation |
|---|---|---|---|---|---|---|
| 1 | B | ...Point | ...Point | ... | ...Point | 92Point |
| 2 | C | ...Point | ...Point | ... | ...Point | 85Point |
| 3 | A | ...Point | ...Point | ... | ...Point | 73Point |
| 4 | D | ...Point | ...Point | ... | ...Point | 6Point |

175 — Bid Off
176 — OK
177 — Correct

Fig. 55

| Article | Evaluation Item a | Evaluation Item b | Evaluation Item c | Evaluation Item x |
|---|---|---|---|---|
| A | 90 | 70 | 65 | 80 |
| B | 85 | 72 | 55 | 64 |
| C | 75 | 82 | 70 | 71 |
| D | 65 | 85 | 60 | 65 |
| ...... | ...... | ...... | ...... | ...... |

| Key Word | Equation |
|---|---|
| Safety | $\Sigma k_n$ |
| Health | $(xk_1 + yk_2)/Z + k_3$ |
| Disease | $ak_1 + bk_2 + \cdots + nk_n$ |
| ...... | ...... |

D22

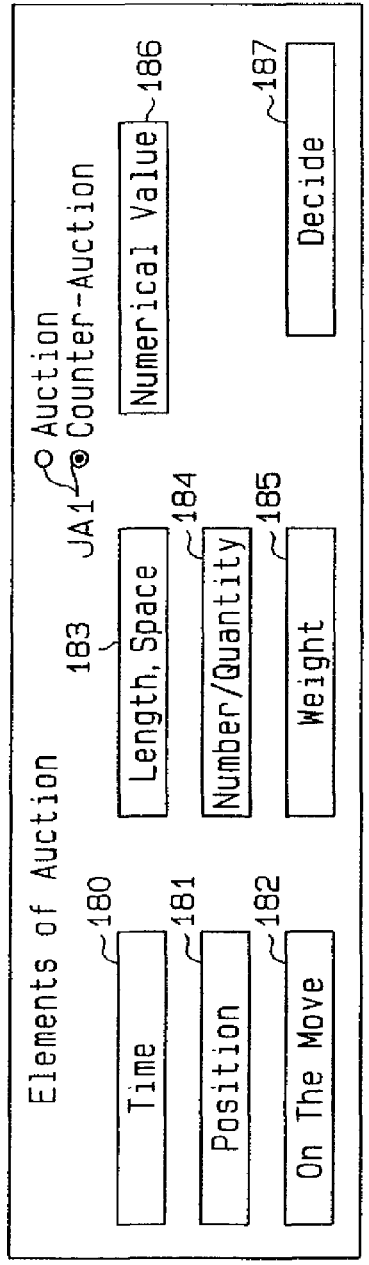
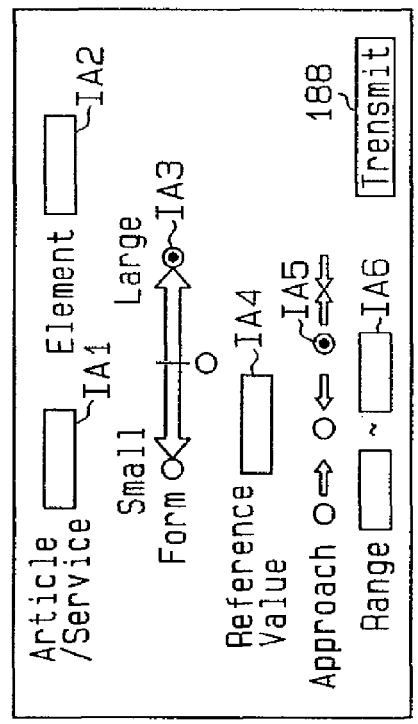

Fig.63

Elemant Priority
Order Setting Screen WB

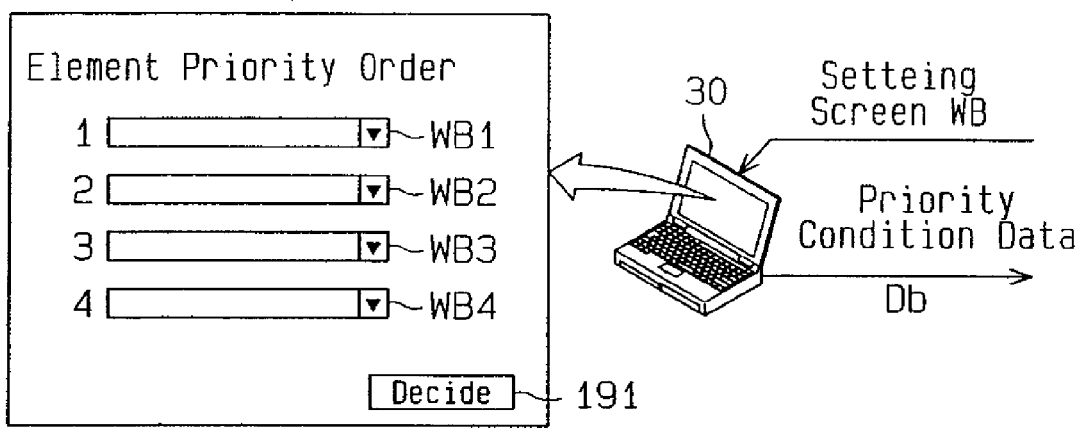

Element Priority Order

1 ▽ ~WB1
2 ▽ ~WB2
3 ▽ ~WB3
4 ▽ ~WB4

Decide ~ 191

Setteing Screen WB

Priority Condition Data Db

Fig.64

List Screen XD

| List XD1 | | | | |
|---|---|---|---|---|
| NO | Code Number | Bid Information | | |
| | | Element 1 | Element 2 | |
| 1 | 00080 | xxxxx | xxxxx | xx xxxx xx |
| 2 | 00079 | xxxxx | xxxxx | xx xxxx xx |
| 3 | 00078 | xxxxx | xxxxx | xx xxxx xx |
| 4 | 00077 | xxxxx | xxxxx | xx xxxx xx |
| 5 | 00076 | xxxxx | xxxxx | xx xxxx xx |
| 6 | 00075 | xxxxx | xxxxx | xx xxxx xx |
| 7 | 00074 | xxxxx | xxxxx | xx xxxx xx |
| · | · | · | · | · · · |

Select Successfurl Bidder
NO. ~XD2

Decide ~ 192

Fig.73(a)

| | Available Time (minutes) | Size of Ship (t) | Number Of Persons To Be Saved (persons) | Required Rescue Technical Level |
|---|---|---|---|---|
| SOS Ship | 60 | 3000 | 50 | 70 |

Fig.73(b)

| Participant Ship | Arrival Time (minutes) | Size of Ship (t) | Number of Persons Who Can Be Saved (persons) | Rescue Technical Level |
|---|---|---|---|---|
| X | 10 | 500 | 4 | 20 |
| Y | 15 | 5000 | 200 | 80 |
| Z | 30 | 4000 | 100 | 60 |
| ... | ... | ... | ... | ... |

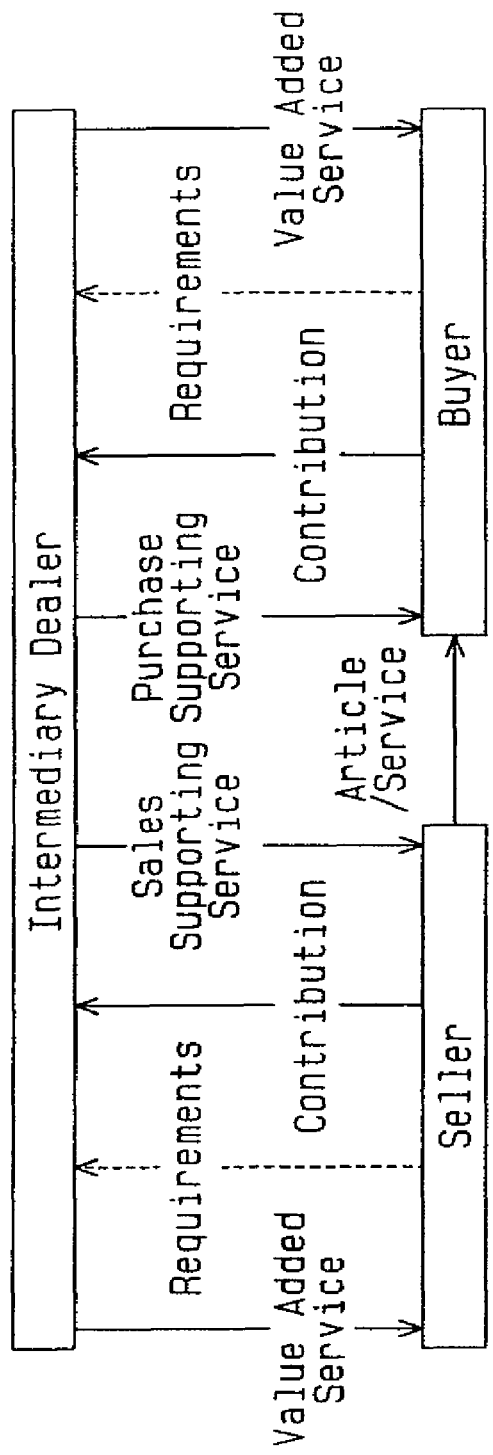
Fig.76(c) (Sales/Purchase Supporting Type)

AUCTION METHODS, AUCTION SYSTEMS AND SERVERS

CROSS-REFERENCES TO RELATED APPLICATIONS

This application is a Division of application Ser. No. 09/864,525, filed May 23, 2001, now U.S. Pat. No. 7,478,055, issued Jan. 13, 2009.

BACKGROUND OF THE INVENTION

The present invention relates to auction methods, auction systems and servers for conducting an auction on a network.

Conventionally, auction methods of the type mentioned above are disclosed, for example, in U.S. Pat. No. 5,794,207, Japanese Unexamined Patent Publications Nos. Hei 10-78992 and Hei 11-328271, among others. These auction methods are such that an auction participant that offers the best price condition, i.e., a participant (buyer) that offers the highest price to a seller in a normal auction and a participant (seller) that offers the lowest price for a buyer in a counter-auction, is a successful bidder. Generally, a successful bidder should complete the transaction, i.e., by delivery of the article or the payment of the price, by a due date previously stipulated by rules.

However, some clients (requesters) who wish to sell or buy articles in an auction have desired to set a date convenient to them for the article delivery date or for the payment date due for a variety of reasons. For example, a client who urgently wishes to sell an art object or an antique object for funds wants to obtain funds as soon as possible only if such an object can be sold at a desired price, irrespective of whether it is sold at a high price. Also, a person who wants to acquire a desired article may give the highest priority to the earliness of the trade rather than the price. Further, if there is no place to store supplied articles until the articles are shipped, a warehouse must be rented. Then, it is desired to set an article delivery date immediately before the articles are shipped. Further, if one wants a certain article but cannot immediately finance the article, one desires delivery of the article at the soonest possible date after payment is made or desires to negotiate with a seller to offer conditions favorable to him, i.e., delivery of the article to him prior to the payment. Further, one who wants to sell a product, which is currently in use for business or pleasure, for raising funds for purchasing another product, may want to transact with a buyer who may let him use the product until a latest possible date, provided that the buyer agrees to purchase the products at a desired price.

As described above, sellers and buyers who look for counterparts to buy or sell articles have a variety of desires for trading dates such as the article delivery date, the payment due date, and so on in accordance with individuals' circumstances. Conventional auction methods, however, determine a successful bidder without considering such trading dates. Thus, the conventional auction methods have a problem that they fail to find a trading partner who offers a satisfactory trading date even though not at the highest price, fail to give the highest priority to a trading date for looking for a trading partner, and fail to decide that the successful bidder is a partner who offers the most favorable trading date rather than the soonest one, if there are a plurality of partners who have offered the highest price. On the other hand, in a counter-auction, which has been conventionally used for reservations of air-line tickets and hotels, a buyer offers information related to terms such as desired flight dates, stay days, and so on, while sellers offer information related to terms such as flight dates, stay days, and so on that meet the requirements. The information on terms in this event does not refer to the terms for a trade, so that a payment must be made by the previously determined due date by a successful bidder. Thus, the conventional auction takes it for granted that participants bid for an article on price, so that, although a client is satisfied with his requirements in terms of the price, requirements other than price are not always met. Even if a client gives higher priority to a certain requirement other than price, conventional auction methods have difficulties in giving the highest priority to the requirements other than price.

For example, when a customer hires a taxi, a counter-auction system may be employed to select the taxi that offers the lowest rate among a plurality of taxi companies. This scheme allows the customer to select the taxi with the lowest rate, but does not take into account where an assigned taxi is located, so that it creates the problem of selecting a taxi extremely far away from the customer (requester).

Generally, for hiring a taxi, a customer communicates with a taxi company by telephone or the like, and of the taxis the company owns, the taxi company assigns the taxi nearest to the customer to the customer. However, since the hiring of a taxi in this manner is conducted only with a single taxi company, a taxi belonging to another taxi company may be located closer to the customer, so that the taxi closest to the customer is not always assigned to the customer. Therefore, there is the problem that a customer cannot select the taxi positioned closest to him.

Turning back to the discussion of auctions, some auction participants may desire to trade articles with a numerical value in accordance with, for example, the longest (shortest), heaviest (lightest), most (least) articles, and so on due to a variety of circumstances. For example, a client who desires to purchase the longest possible article may desire to trade with a seller who offers the longest article irrespective of the price from among auction participants. In other words, some clients who participate in an auction may want to give a higher priority to a certain numerical value rather than the price as a bid condition in a trade. However, since conventional auction methods allow bidders to compete only regarding the price, such methods cannot be applied to an auction in which competition is made with some numerical value other than the price.

Also, some clients who request sale and purchase of articles in an auction may desire to reflect their requirements in articles due to a variety of circumstances. For example, a client who wants to purchase an art object or an antique object may want to purchase such an object at the most reasonable price in consideration of various conditions such as the created year, the custody history, scratches and so on. As another example, for purchasing a personal computer through an auction, while a client has specific requirements concerning the image quality of an associated display, the quality, the performance and processing speed of the computer itself, and so on, he does not know in some cases which product (model numbers or the like) most meets his requirements. As a further example, for requesting an engagement with a private tutor, a client, though having requirements, does not know how to select a specific private tutor based on criteria. Therefore, clients must intuitively narrow down products or persons that meet the requirements to some degree, and bid off one of such narrowed products or services finally on price. There is also a problem that trading partners are virtually limited to those who have been registered in an auction. On the other hand, some sellers desire that an offered product be purchased by a buyer who most understands the value of the product.

As described above, since conventional auctions take it for granted that participants bid for an article based on price, although a client is satisfied with his requirements in terms of the price, requirements other than the price are not always met. Even if a client gives higher priority to a requirement other than the price, conventional auction methods make it difficult to give the highest priority to the requirement. In addition, at present, a trade can be made only with trading partners who participate in an auction for offering products or services or those who want to offer articles or services.

SUMMARY OF THE INVENTION

The present invention has been achieved for solving the problems described above, and its first object is to provide an auction method, an auction system and a server which can satisfy requirements other than the price for a client.

It is a second object of the present invention to provide an auction method, an auction system and a server that permit a client who looks for a partner, with whom an article is sold or purchased, to find a trading partner who meets desired conditions in accordance with the client's circumstances with respect to trading dates such as the article delivery date, the payment deadline, and the like.

It is a third object of the present invention to provide an auction method, an auction system and a server that can achieve the first object as well as meet requirements with respect to the position of a client (requester).

It is a fourth object of the present invention to provide an auction method, an auction system and a server that can achieve the first object as well as permit a client who seeks a partner, with whom the client can trade an article or a service, to bid for the article or the service with a numerical value associated with the article or the service and find a trading partner who offers terms and conditions, including the numerical value, that meet desired requirements of the client.

It is a fifth object of the present invention to provide an auction method, an auction system and a server that can achieve the first object as well as find a trading partner who offers an article or a service that best meets even abstract requirements, for example, a requirement that cannot be represented by a numerical value such as a price.

It is a sixth object of the present invention to provide an auction method, an auction system and a server that achieve the first object as well as permit a person who requests rescue when he has encountered a disaster or the like to use an auction system to request a rescue party, for rescue, who can reach the spot of the rescue at the soonest possible time for rapid rescue activities.

In order to achieve these objects, in accordance with the present invention, there is provided a method of conducting an auction for bidding off an article or a service, or a person who receives provision of an article or a service, through a network, said method comprising:

a collection procedure in which an auction intermediary server provides information serving as a reference for bidding an article or a service to be traded, and transmits collection information to collect bids requesting to offer an element other than a price or converted information converted to said element, as an object to be bidden, to terminals through the network;

a bid procedure in which said server receives bid information including said element or said converted information offered by bidders from terminals of the bidders through communications via the network; and a bid acceptance procedure in which said server executes bid processing for finding a result of bidding with said element included in said bid information or an element derived by converting said converted information, based on said bid information, to select a successful bidder.

BRIEF DESCRIPTION OF THE DRAWINGS

FIG. 5 is an explanatory diagram regarding registration of an article;

FIG. 6 is an explanatory diagram regarding desired condition setting on the client side;

FIG. 8 is an explanatory diagram about setting of a price slide setting form;

FIG. 13 is an explanatory diagram for a bidding priority setting;

FIG. 14 illustrates a list screen;

FIG. 16 is a functional block diagram illustrating the functional configuration of an auction management system;

FIG. 29 illustrates a screen showing a list;

FIG. 43 illustrates a screen showing a list;

FIG. 54 illustrates a screen for displaying evaluation results;

FIG. 55 is a table showing evaluation data;

FIG. 56 is a table showing data of calculations;

FIG. 59 illustrates an element selection screen according to a seventh embodiment of the present invention;

FIG. 60 illustrates a screen for selecting a bidding system;

FIG. 63 illustrates a screen for setting an element priority;

FIG. 64 illustrates a screen showing a list;

FIGS. 73A and 73B are explanatory diagrams when a server selects a rescue ship;

FIGS. 76A through 76C are schematic diagrams illustrating auction forms.

DESCRIPTION OF THE PREFERRED EMBODIMENTS

First Embodiment

Figure 1:
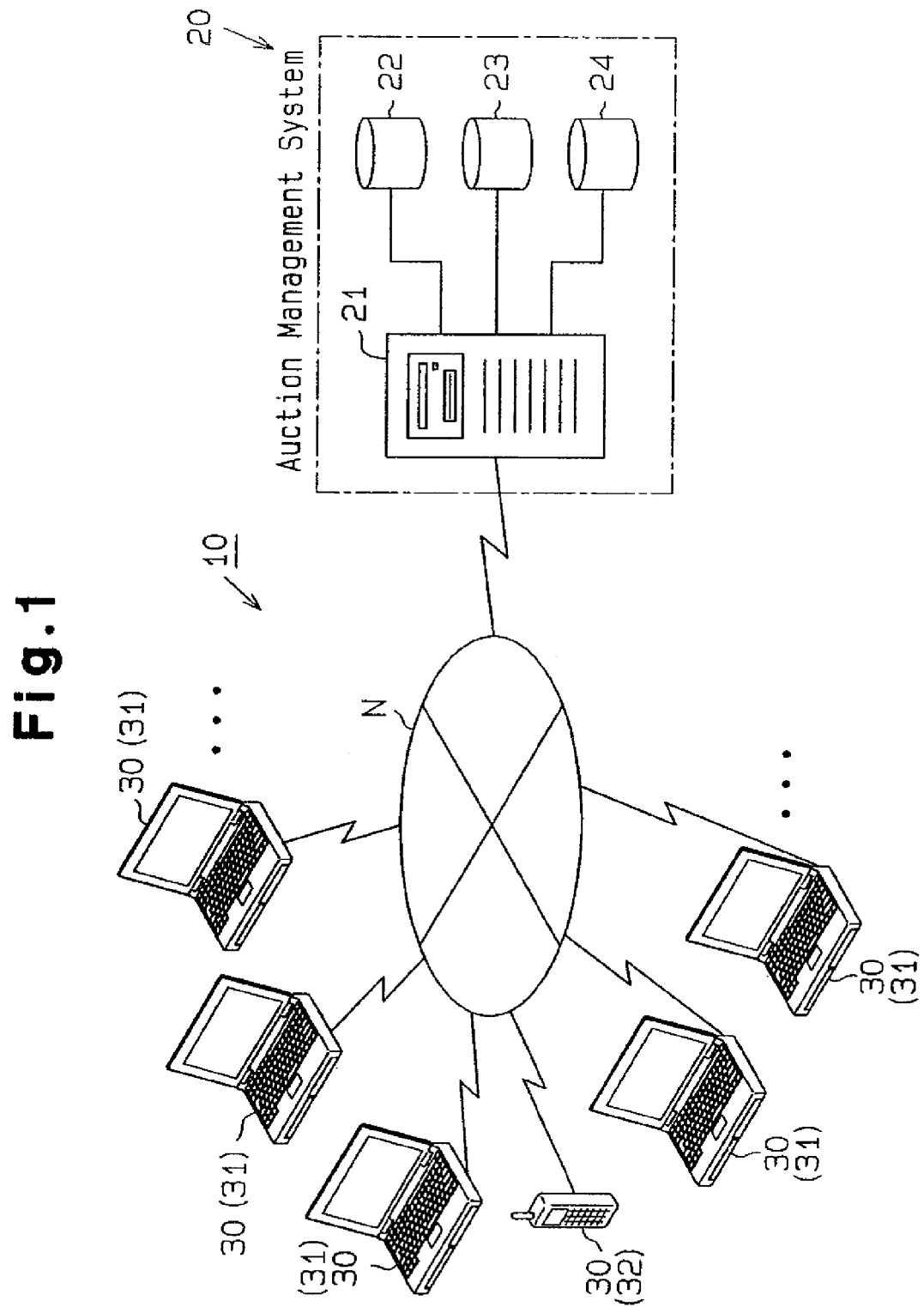
FIG. 1 is a schematic diagram generally illustrating the configuration of a time auction system according to an embodiment of the present invention.

A first embodiment which embodies the present invention will hereinafter be described with reference to FIGS. 1 through 14. FIG. 1 illustrates a time auction system for sellers and buyers to conduct auctions for articles through a network. In this example, an auction is held in which an article is bid for with time as an element.

The time auction system 10 includes an auction management system 20, a network (for example, the Internet) N, and terminals 30 for users (customers). The auction management system 20 in turn includes a server (web server) 21, a customer management database (DB) 22, an article management database (DB) 23, and a bidding management database (DB) 24. It should be noted that the server 21 may be configured by a separate web server and an application server.

Figure 2:
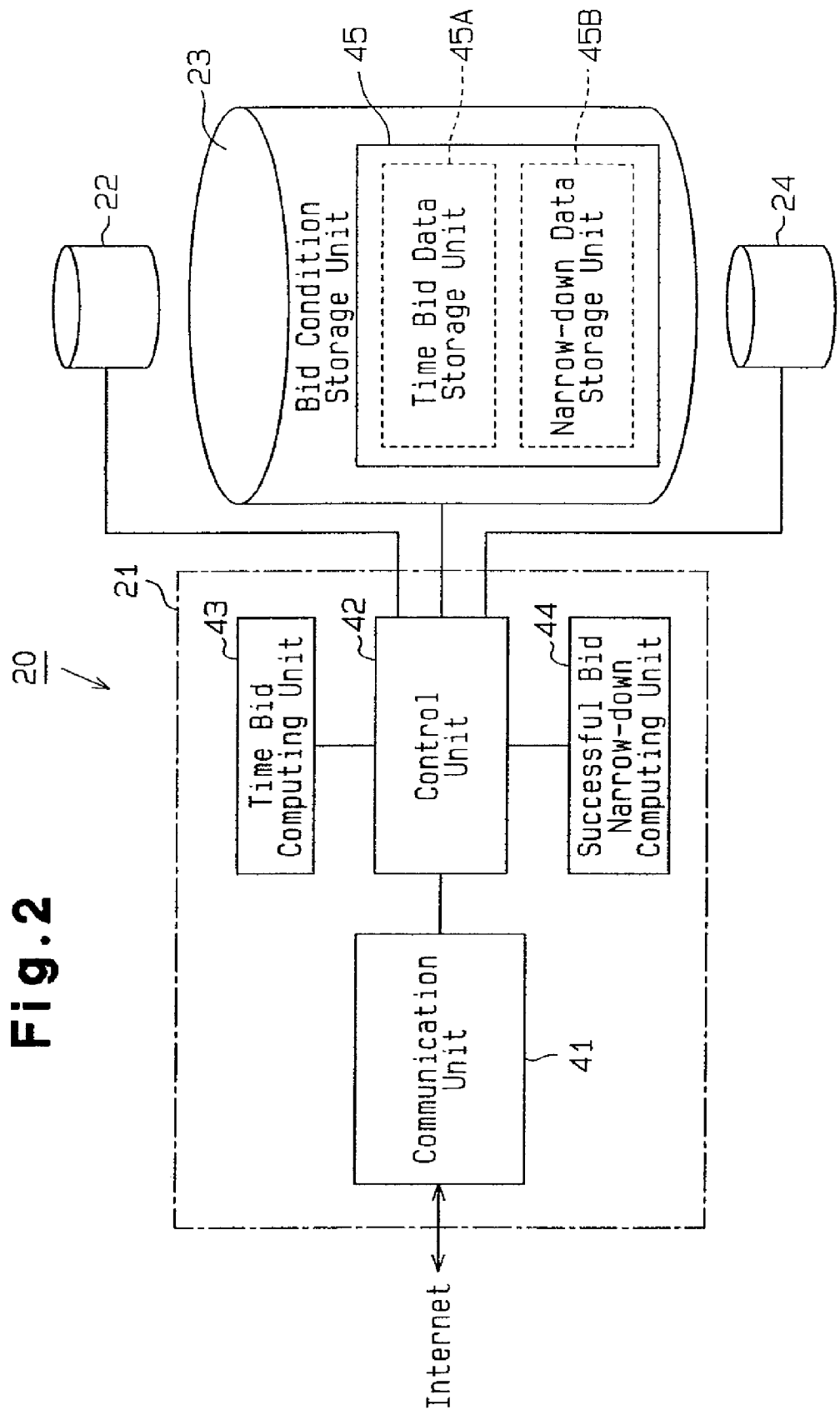
FIG. 2 is a functional block diagram illustrating the functional configuration of an auction management system.

FIG. 2 illustrates the functional configuration of the auction management system 20. The auction management system 20 comprises a communication unit 41, a control unit 42, a time bid computing unit 43, and a bid narrow-down computing unit 44. The communication unit 41, control unit 42, time bid computing unit 43 and bid narrow-down computing unit 44 are implemented by a server 21. The communication unit 41 operates in accordance with a predetermined communication protocol (HTTP). The article management DB 23 comprises a bid condition storage unit 45, which includes a time bid data storage unit 45A and a narrow-down data storage unit 45B. The control unit 42 and the respective computing units 43, 44 are used in computing control for identifying a successful bidder in a time auction, and a variety of data stored in the respective storage units 43A, 45B are used for this computing.

Figure 3:
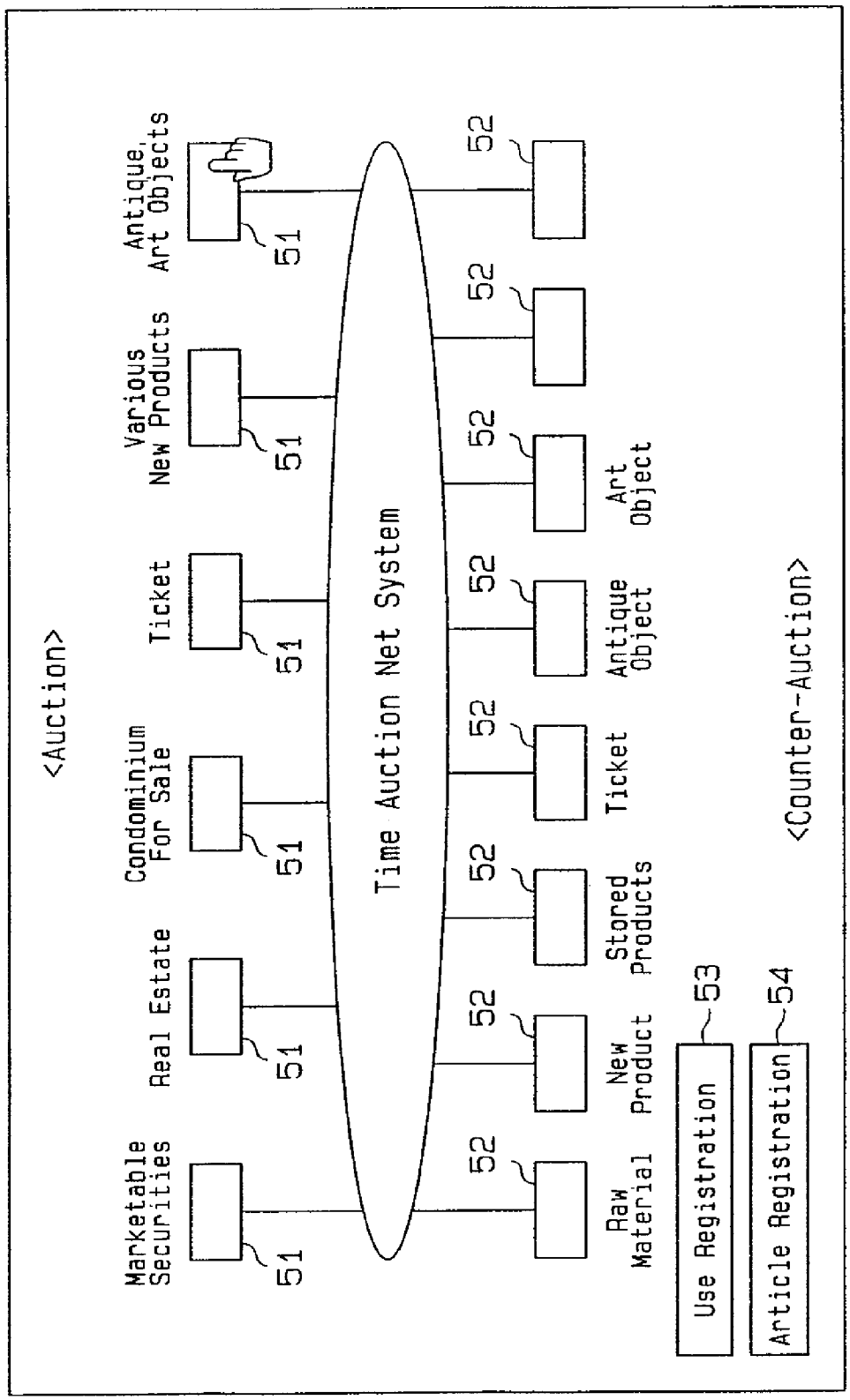
FIG. 3 illustrates a home page of a time auction.

A time auction home page (HP) (site) resides in the server 21, such that a user displays the time auction HP illustrated in FIG. 3 on a screen through the network N using a browser application from a terminal 30. The user can register or participate in an auction by entering required data on the time auction HP. Any user who has completed a user registration procedure is allowed to request purchase and/or sale of articles in the time auction or to participate in the time auction.

Figure 4:
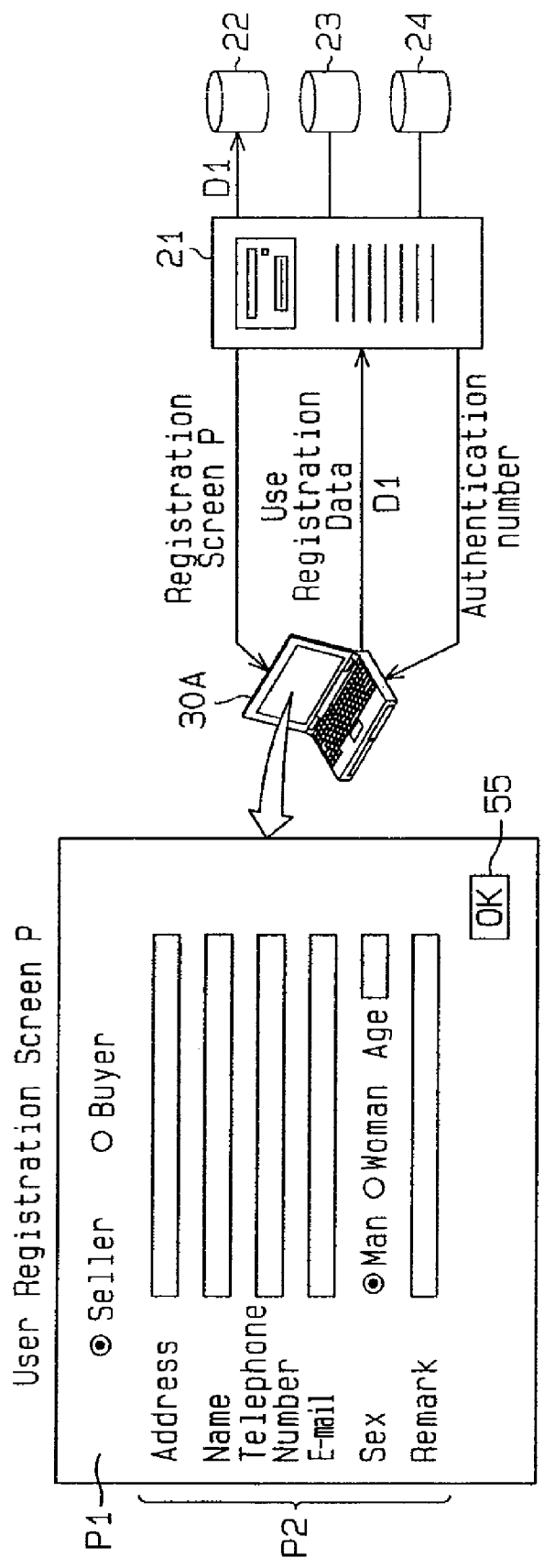
FIG. 4 is an explanatory diagram regarding registration of a user.

The time auction HP has a variety of screens linked thereto, including a user registration screen P illustrated in FIG. 4; an article registration screen Q illustrated in FIG. 5; a time bid scheme selection screen R illustrated in FIG. 6; a desired condition setting screen S; a slide price setting screen T illustrated in FIG. 8; and so on. The server 21 stores on its hard disk screen data for the variety of screens HP, P, Q, R, S, T, a program for use in displaying the screens and so on (for example, an HTML description program), a program for use in computing processing involved in the auction, and so on.

As illustrated in FIG. 3, the time auction HP is provided with a large number of selection buttons 51, which are classified according to articles possibly traded in an auction, and a large number of selection buttons 52, which are classified according to articles possibly traded in a counter-auction. A person who wants to participate in a bid (bidder) selects any of the selection buttons 51, 52 for classifying articles. It should be noted that FIG. 3 illustrates only a portion of the article classifications. The time auction HP is also provided with a user registration button 53 and an article registration button 54. The respective buttons 53, 54, when selected by the user, results in displaying the registration screen P (FIG. 4) and the registration screen Q (FIG. 5), respectively.

As illustrated in FIG. 4, the user registration screen P is provided with options P1 for selecting whether the user wants to participate in an auction as a seller or a buyer, and a variety of entry fields P2 for entering address, name, telephone number, electronic mail address, sex, age, remarks, and so on. When the user has entered all required items in associated fields on the user registration screen P displayed on the terminal 30A and selects an OK button 55, the just entered user registration data D1 is transmitted to the server 21 through the network N and added to customer management data stored in the customer management DB 22. Upon confirming that the user has paid a predetermined commission, the server 21 transmits an authentication number (ID and password) to the terminal 30A of the just registered user. The registered user uses the authentication number for utilizing the time auction. If the user is not yet definite whether he will use the time auction as a seller or a buyer at the time of the user registration, the user may register in this respect at a later time.

As illustrated in FIG. 5, the article registration screen Q is provided with a variety of entry fields Q1 to Q7 for entering article classification, article name, desired price, quantity, quality, custody place, article information, and so on. A range of values may be set in the field Q3 for entering a desired price. Also, the article registration screen Q is provided with options Q8 for selecting a desired price from three types: a fixed price, a slide price, and a minimum price. Here, fixed price means that the price is fixed. A slide price is a price that is set to vary in association with each of a plurality of trade terms along a time axis. For example, a slide price is used by a manufacturer that, upon accepting advanced orders for a new product, sets a price that becomes gradually lower as more days elapse from the announcing date to encourage more persons to buy the new product. The minimum price is the minimum acceptable bid. When this option is selected, an associated bidder should offer a limit price. The entry field Q6 is a field for entering (selecting) a current custody place for an article, and may be filled in with such items as custody by an auction management dealer, private custody organization, seller's warehouse, schedule for manufacturing, and so on. The entry field Q7 is filled in with a detailed description of an associated article. The desired price entered on this screen Q corresponds to sales price information or purchase price information.

When the user has entered required items in all fields on the article registration screen Q displayed on the terminal 30A and selects an OK button 56, article registration data D2, as article related information, is transmitted to the server 21 through the network N and added to article management data in the article management DB 23. Also, when the fixed price or the minimum price is selected in the options Q8, the time bid scheme selection screen R and the desired condition setting screen S illustrated in FIG. 6 are displayed on the terminal 30A. Alternatively, when the slide price is selected in the options Q8, the slide price setting screen T illustrated in FIG. 8 is displayed on the terminal 30A.

As illustrated in FIG. 6, the time bid scheme selection screen R is provided with six options R1 to R6 for selecting a particular time slide scheme. The options R1 to R6 provide a "due date advance scheme", a "due date delay scheme", and a "due data approach scheme" for a seller and a buyer, respectively. In addition, the "due date approach scheme" is provided with options R7, R8 for selecting either "before due date" or "after due date".

Figure 7A:
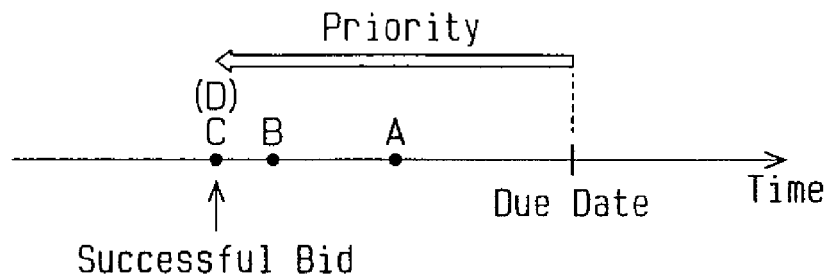
FIG. 7A is an explanatory diagram for a time slide scheme that is a due date advance scheme.

FIGS. 7A through 7D explain how a bid is conducted in each of the four types of time slide schemes provided for a seller and a buyer. The "due date advance scheme" in FIG. 7A is a scheme that preferentially determines a successful bidder as the person (bidder) who has offered the earliest possible trading date prior to the due date specified by a client (requester). Among bidders A, B, C who have offered trading dates prior to the specified due date, the bidder C, who has offered the earliest trading date, is determined to be the successful bidder.

Figure 7B:
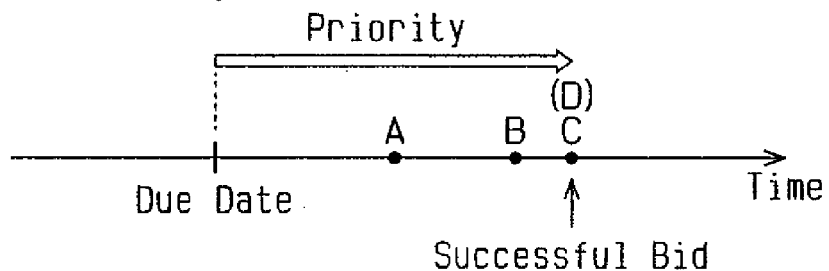
FIG. 7B is an explanatory diagram for a time slide scheme that is a due date delay scheme.

The "due date delay scheme" in FIG. 7B is a scheme that preferentially determines that the person who has offered the latest possible trading date after a due date specified by a client is the successful bidder. Among bidders A, B, C who have offered trading dates after the specified due date, the bidder C who has offered the latest trading date is determined as a successful bidder.

Figure 7C:
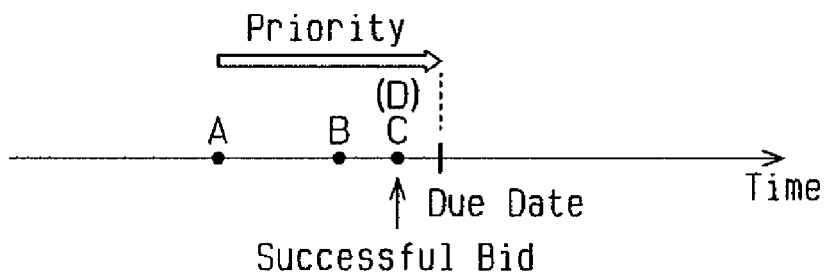
FIG. 7C is an explanatory diagram for a time slide scheme that is a closest pre-due date scheme.

A "closest pre-due date scheme" in FIG. 7C is a scheme that preferentially determines the successful bidder to be the person who has offered a trading date prior to and as close as possible to the due date specified by a client. Among bidders A, B, C, who have offered trading dates prior to the specified due date, bidder C has offered the latest trading date and is determined to be the successful bidder.

Figure 7D:
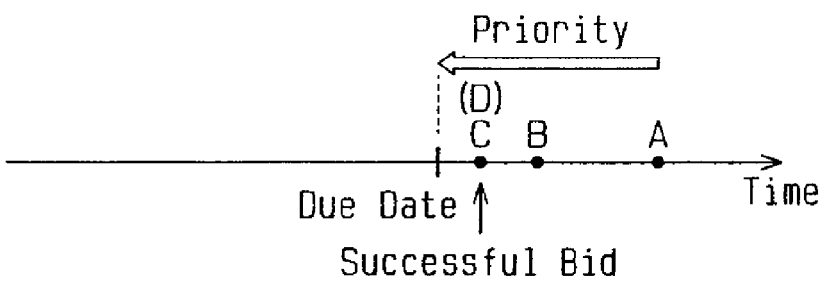
FIG. 7D is an explanatory diagram for a time slide scheme that is a closest post-due date scheme.
Figure 9:
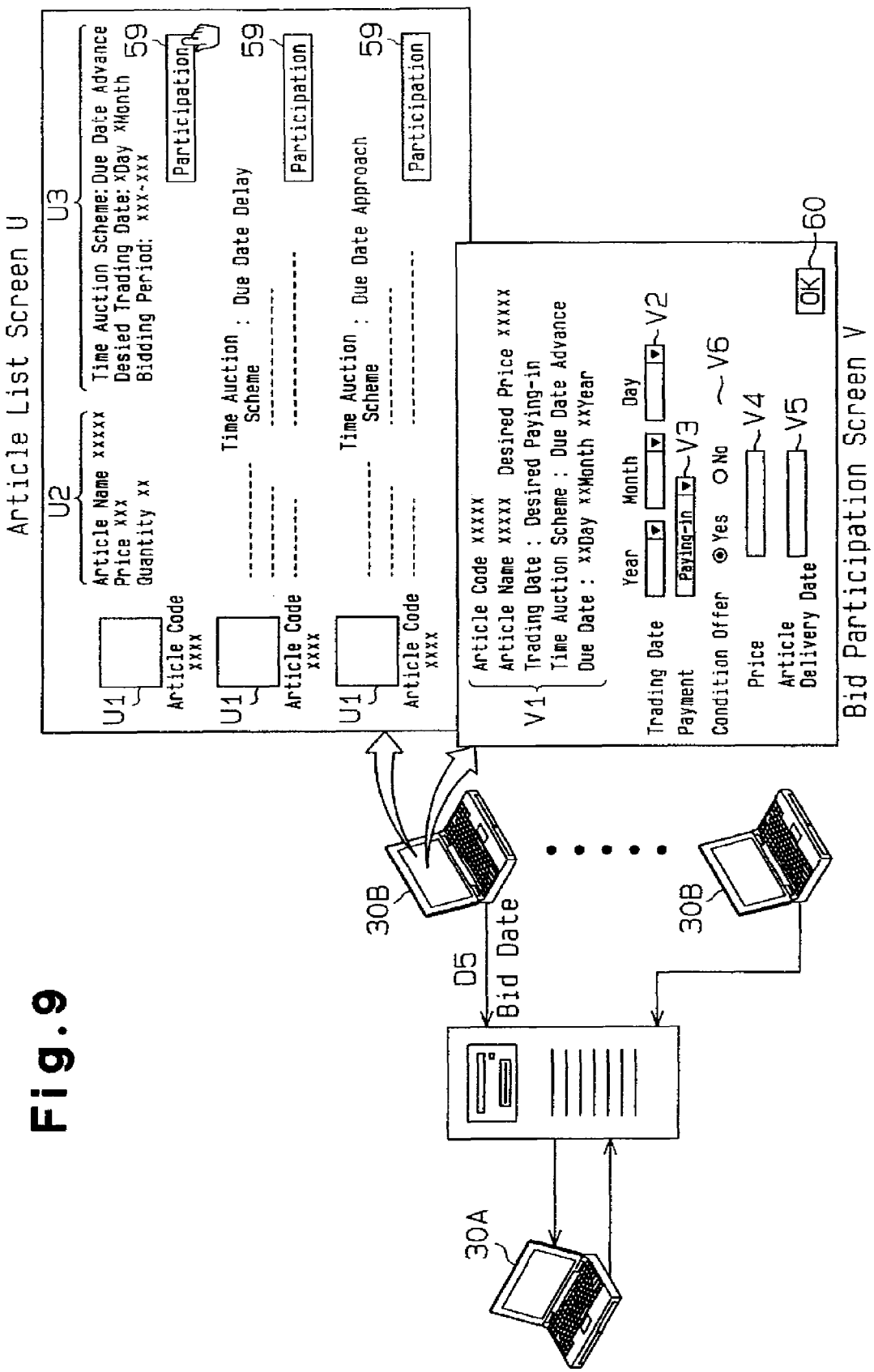
FIG. 9 is an explanatory diagram for setting on the bidder side.

A "closest post-due date scheme" in FIG. 7D is a scheme that preferentially determines the successful bidder to be the person who has offered a trading date that is after and as close as possible to a due date specified by a client. Among bidders A, B, C, who have offered trading dates after the specified due date, bidder C has offered the latest trading date and is determined to be the successful bidder. It should be noted that in either of the time bid schemes, if a number of bidders exceeding an upper limit of number of bidders compete on the most favorable trading date (for example, when two bidders C, D compete on a favorable trading date for a limit of one bidder as illustrated in FIG. 9), the bidders are narrowed down to a successful bidder based on predetermined rules, later described.

The desired condition setting screen S illustrated in FIG. 6, in turn, is provided with entry fields S1 to S4 for entering a specified due date (reference time), payment, article delivery period, and bidding period, and options S5 for selecting whether or not a bidder is allowed to offer a condition. The entry field S1 specifies a due date, which serves as a reference time in the time slide scheme.

As a trade is established, a client and a successful bidder proceed with payment for an article and delivery of the article. The entry fields S2, S3 are fields for setting a specific request from the client on a trading date offered by a successful bidder in the payment or the delivery of the article. The entry field S2 for "payment" is available when a client is a seller, while the entry field S3 for "article delivery" is available when a client is a buyer.

In the "payment" entry field S2, the client can select which of a plurality of options such as a paying-in date, bank transfer date, cash dispatch date, money collection date, electronic money payment date, first payment date of partial payment, down-payment making date, or the like is defined as the trading date. In the "article delivery" entry field S3, the client can select which of a plurality of options such as a delivery date, article shipment date, assignment issuing date, title document transfer date, contract date, occupation date (for a residence or the like), title transfer data, or the like is defined as the trading date. For each of these items, though not shown, it is also possible to set a period based on the trading date, for example, a period of a certain number of days after the trading date, within a period of a certain number of days (or certain number of weeks) from the trading date, or the like. A seller or a buyer, who is a client, sets specific contents and the desired due date (period) in accordance with the individual's circumstances with respect to payment or delivery of an article. Particularly, when the client has a desired due date for a paying-in date or a delivery date, the client may have bidders compete based on such a trading date to find a trading partner who is offering a favorable trading date for the client. This is a major advantage of the time auction system. Upon selection of an "OK" button 57 after required items have been entered on the screens R, S, bid condition data D3 comprised of data contents entered on the respective screens R, S is transmitted to the server 21.

As illustrated in FIG. 8, the slide price setting screen T in turn is provided with separate entry fields T1 for setting a plurality (three in the illustrated example) of periods; separate entry fields T2 for setting prices for the plurality of periods; and a field T3 for entering a bidding period. The respective entry fields T1 set periods (first through third periods) shifted from each other in a step-wise manner with respect to a time axis. The respective entry fields T2 set prices corresponding to the respective periods such that the price changes from one to another in association with a transition from one period to another. The slide price setting screen T may be used, for example, by a manufacturer (maker) that accepts advanced orders for new products through the price slide setting type time auction to distribute orders concentrated in an initial period immediately after the release of the products to the market and to review a production plan in accordance with a sales prediction based on the result of the bidding.

Further, not limited to manufacturers, the price slide setting type time auction may be used by clients who want to sell or buy a large number of articles efficiently or for selling or buying an article at an appropriate price for a particular trading period (for example, an article, such as a book, a music DC or the like, the value of which decreases over time from a release date). It should be noted that even with the price slide setting type time auction, the client can make an offer arbitrarily. For example, the price slide setting type time auction can set priority rules that may be applied when there is only one article to preferentially determine that the successful bidder is a bidder who satisfies a single combination desired by the client even if a number of bidders satisfy all of a plurality of combinations with respect to a period and a price. The auction may have priority rules for determining a bidder for each period. Then, upon selection of an "OK" button 58 after required items have been entered on the screen T, bid condition data D4 including the data contents entered on the screen T is transmitted to the server 21. As appreciated, the items set on the screens R, S in FIG. 6, except for the bidding period, correspond to trade period conditions, while the items set on the screen T in FIG. 8, except for the bidding period, correspond to trade period conditions. Also, the article registration data D2 and the bid condition data D3, D4 constitute bid request information as bid information, and the screens R, S, T correspond to requesting screens.

Figure 10:
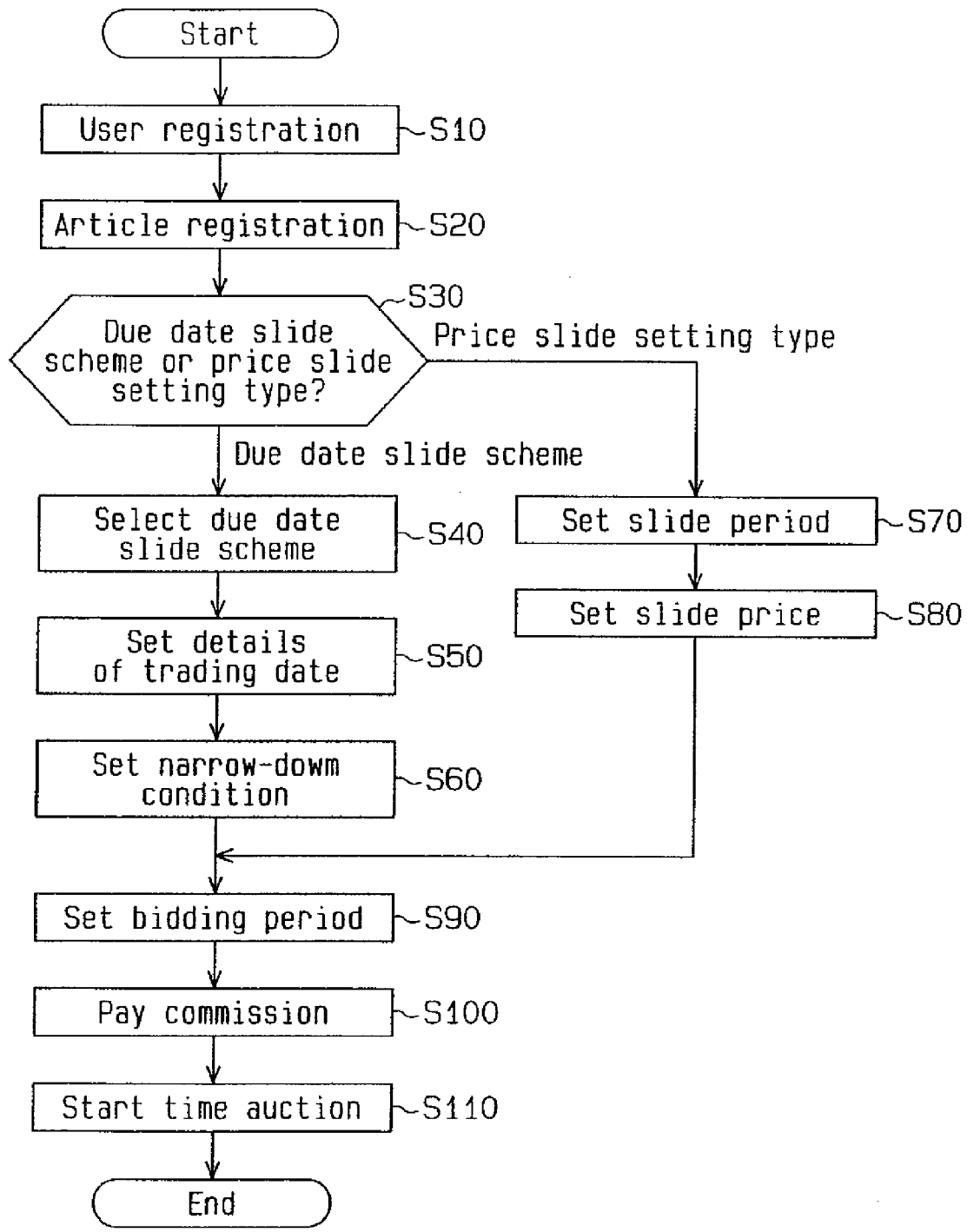
FIG. 10 is a flow chart illustrating a registration processing procedure.
Figure 11:
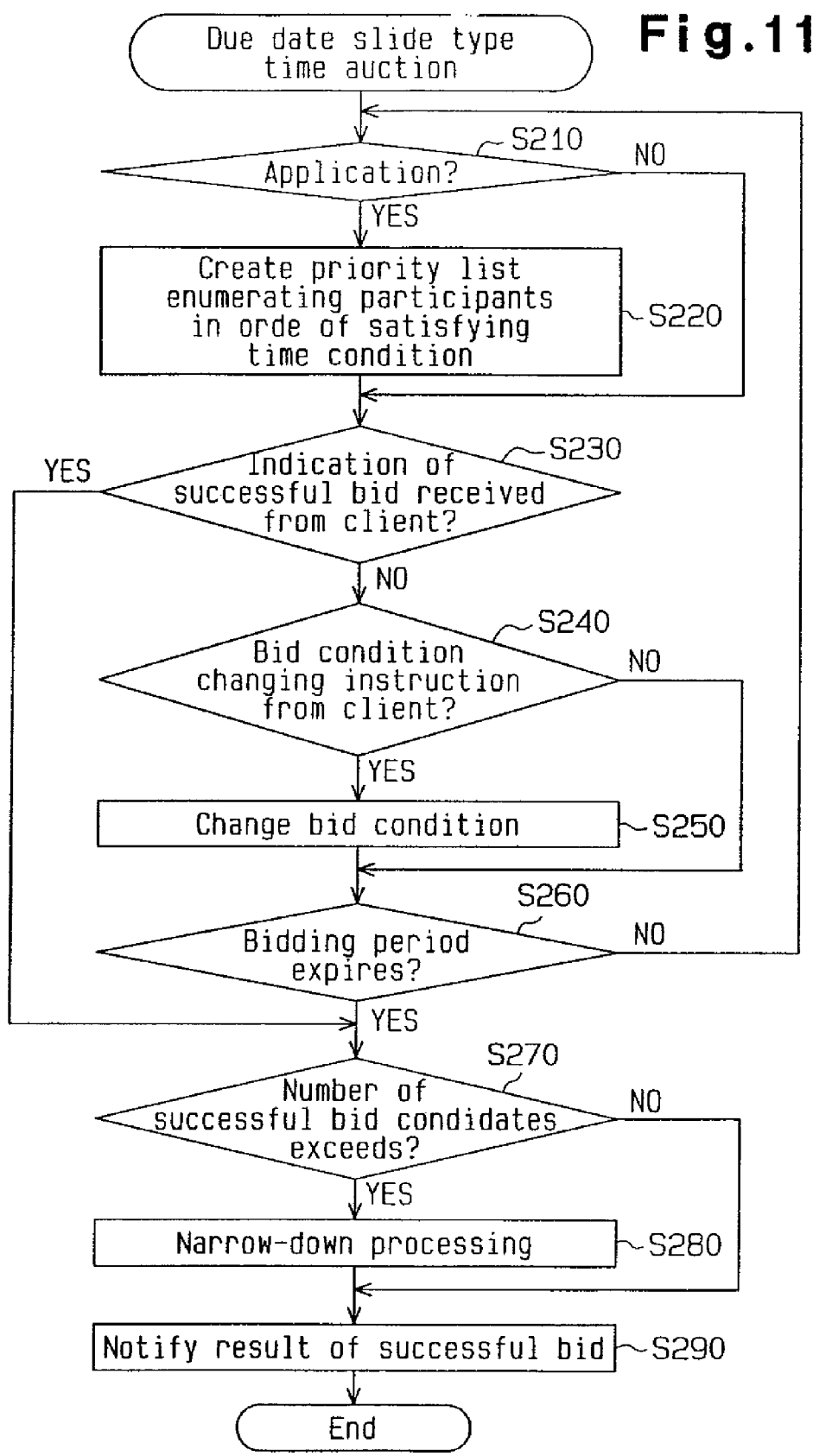
FIG. 11 is a flow chart illustrating a due date slide based time auction.
Figure 12:
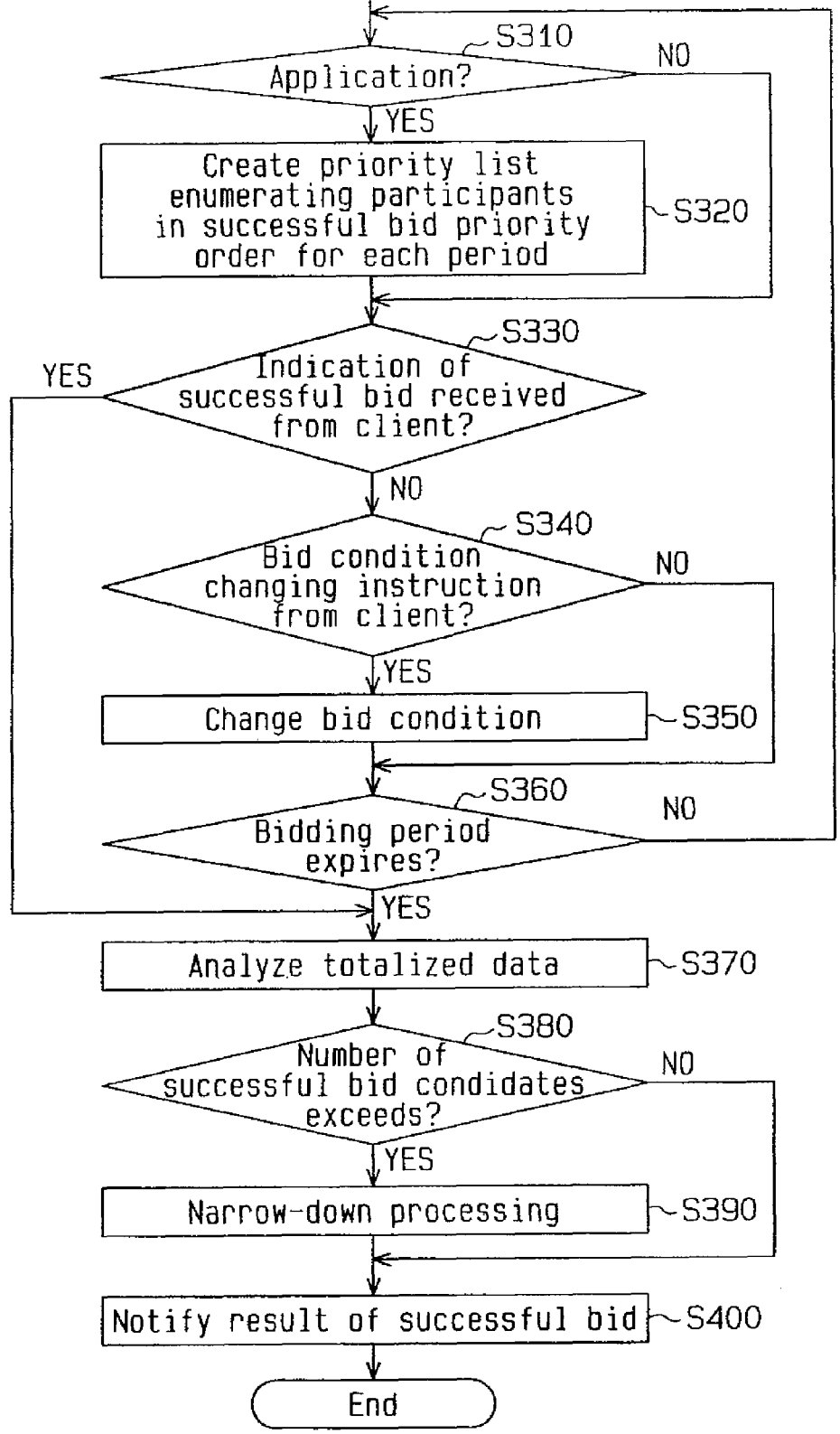
FIG. 12 is a flow chart illustrating a price slide setting based time auction.

FIGS. 10, 11, and 12 are flow charts illustrating a registration processing procedure for the time auction; a processing procedure for the period slide type time auction; and a processing procedure for a price slide setting type time auction, respectively.

An explanation is first given of the registration processing procedure for the time auction illustrated in FIG. 10. First, in step (hereinafter simply denoted as "S") 10, a user registration (customer registration) is made (see FIG. 4). In S20, an article registration is made (see FIG. 5).

In S30, it is determined which of the time slide scheme and the price slide setting type has been selected. It is recognized that the time slide scheme has been selected when the fixed price or the minimum price was selected in the options Q8 on the article registration screen Q of FIG. 5, followed by the time bid scheme selection screen R of FIG. 6 displayed on the terminal 30A. Alternatively, it is recognized that the price slide setting type has been selected when the slide price was selected in the options Q8, followed by the slide price setting screen T of FIG. 8 displayed on the terminal 30A.

In S40, the time slide scheme is selected (see FIG. 6). Each of the sellers and buyers selects one from the four types of time bid schemes displayed on the screen R of FIG. 6, i.e., due date advance scheme, due date delay scheme, closest pre-due date scheme and closest post-due date scheme. It should be noted that while, in this example, the due date is used as the reference time for the time bidding, the reference time may employ a function that sets hours, minutes, seconds, weeks, months, or years. In this event, the due date, which serves as the reference time for a time slide scheme selected from the four types, is set in the entry field S1 in FIG. 6.

In S50, specific contents meant by a trading date with respect to a payment for or a delivery of an article are set in detail. For example, when the client is a seller and wants to define the trading date as a paying-in date, the client may select "paying-in" in the input field S2. On the other hand, when the client is a buyer and wants to define the trading date as a delivery date, the client may select "delivery" in the input field S3.

In step S60, a narrow-down condition is set by the options S5. For example, for a seller who wants to ensure funds as soon as possible, it is advantageous that an offered article is bidden off by a trading partner who buys the article at a price higher than a desired price as long as a paying-in date is ensured. Alternatively, for a seller who wants to maintain an article at hand as long as possible, it is advantageous that the article is bidden off by a trading partner who offers an article delivery date later than a payment date. Therefore, if a plurality of bidders exceeding a limited number of bidders compete with the trading date, the client selects "possible" in the item "condition offered from bidder" on the screen S in order for a bidder to offer information for narrowing the bidders down to those who offer more favorable conditions for the client. Then, when the client is a seller, the options "price" and "article delivery date" are selected, by way of example, as information offered by bidders (buyers) (see FIG. 6). Alternatively, when the client is a buyer, the options "price" and "payment date" are selected, by way of example, as information offered by bidders (sellers). It should be noted that the entered contents on the screen R and the due date specified on the screen S correspond to the bid conditions.

On the other hand, when the price slide setting type has been selected, slide periods are set in S70 on the slide price setting screen T of FIG. 8. For example, three periods including a first period to a third period may be set. However, the number of set slide periods is not limited to three and may be four or more. Also, each slide period can be set in arbitrary time units of years, months, weeks, days, hours, minutes, or seconds. It should be noted that the contents entered on the screen T correspond to the bid conditions.

In next S80, slide prices are set. More specifically, prices corresponding to the respective previously set periods are set such that the prices changes from one to another in association with a transition of the periods from one to another. The price slide setting type may be used, for example, when a manufacturer (maker) uses the time auction for accepting advanced orders for a new product or predicting sales of the new product. Set as the slide periods may be a new product release period, an intermediate sale period in which the product becomes less popular, and a final sale period before a next new product is released. Then, a standard price, a discounted price (for example, 10% discount), and a disposal value (for example, 30% discount) are set as the slide price for the respective periods. The price slide setting type facilitates the production plan since the manufacturer can accept advanced orders over a long period of time from a release day, and helps review the production plan by predicting the sales from resulting orders.

In S90, a bidding period is set. In the time slide scheme, the bidding period is set on the screen S of FIG. 6, while in the price slide setting type, the bidding period is set on the screen T of FIG. 8. Selecting an OK button 57 or 58 on the screen S or T, data so far entered is transmitted.

In S100, a commission is paid. Also, if an article is expensive enough to exceed a predetermined price, a margin should be paid in addition to the commission.

In S110, upon confirmation of the paid commission (including the margin), a time auction is started. Specifically, as one accesses the time auction HP, he can view articles and their trading conditions on the screen of the terminal 30 through the network N, so that an article offered by a seller is sold at auction, or an article whose purchase conditions are offered by a buyer is bid at counter-auction. Also, the bid condition data D3, D4 received in this event are stored in the time bid data storage unit 45A if they are related to the time slide scheme and the price slide setting type, and in the narrow-down data storage unit 45B, if they are narrow-down condition data for use in narrowing down bidders. The procedure from S20 to S100 corresponds to a request procedure.

Next, a method of participating in the time auction will be explained.

The time auction HP illustrated in FIG. 3 classifies potential articles traded thereon into marketable securities, real estate, condominium for sale, ticket, new product, antique and art objects, and so on. As a person clicks on a button 51 or 52 associated with an article which he wants to sell at auction, the article list screen U illustrated in FIG. 9 is displayed on the terminal 30. The button 51 is provided for auction, while the button 52 is provided for counter-auction.

The article list screen U displays a photograph U1 and an article code number of each article, as well as article related information such as article name, desired price, quantity, and so on; and bid condition information such as time auction system, desired trading date (due date), bidding period and so on for each article. The article list screen U of FIG. 9 is displayed in the same form as well when a counter-auction is conducted. Since the article list screen U provides a participation button 59 for each article, one may select the participation button 59 for participating in a bid. The selection of the button 59 results in a bid participation screen V displayed on the terminal 30.

As illustrated in FIG. 9, the bid participation screen V displays article bid condition information V1 such as article code number, article name, desired price, detailed definition of a trading date (here, "paying-in"), time auction system (here, "due date advance"), due date, and so on, and is provided with entry fields V2 to V5, and an entry field for entering a traded quantity (not shown). This screen V is provided for a buyer, so that only "paying-in" can be entered in a payment selection field V3 provided for a trading date when a seller requests for paying-in. Entry fields V4, V5 for offering conditions are displayed when a seller participates in an auction on condition that bidders offer conditions for purchase. For offering conditions, a bidder selects "YES" in condition offer options V6 before entering conditions which the bidder can offer in the entry fields V4, V5 (at least one of the price and the article delivery date). Then, upon selecting an OK button 60 on the screen V, bid data D5 is transmitted to the server 21 and stored in the bid management DB 24. The server 21 sequentially executes the computing process for determining a successful bidder candidate based on the bid data transmitted thereto from the terminal 30B. The screens U, V correspond to bid screens, while the bid data D5 corresponds to bid information.

Next, a processing procedure involved in the due date slide type time auction will be explained with reference to FIGS. 2 and 11.

It is first determined in S210 whether or not any bid has been applied, and if there is any bid applied, all bid data D5 including that of newly applied bids are ordered such that higher priorities are given to those bids that satisfy more time conditions for the due date slide scheme in S220 to create a priority list that enumerates bidders in the priority order. More specifically, upon receipt of data of new bids, the control unit 42 reads time condition data (here conditions for the time slide scheme) from the time bid data storage unit 45A in the article management database 23, and also reads all bid data associated with an article code number involved in this auction from the bid management database 24. Then, the time bid computing unit 43 uses this data to compare trading dates in the respective data with the time condition to create a priority list which enumerates the bidders in the priority order. Subsequently, the computing unit 43 selects a bidder who offers a trading date that most satisfies the time condition as a successful bidder candidate. It should be noted that the procedure in S210, where the screens U, V are displayed on terminals 30 of bidders, and the server 21 receives the bid data D5 upon receipt of applied bids, corresponds to a bid procedure. Also, the procedure in S210 through S280 for determining a successful bidder corresponds to a bid acceptance procedure.

A client (for example, a seller) confirms a bidding situation on the screen of his terminal 30A and transmits a bid acceptance indication to the server 21 when a successful bidder candidate offers a desired trading date, even before the expiration of a bidding period. Conversely, when there is no bidders even if the client confirms a bidding situation on the screen, or when no bidder has offered desired conditions for a long time, the bid conditions (due date (period), price, and so on) may be changed even before the expiration of the bidding period.

In S230, when the server 21 receives a bid acceptance indication from the client, the flow continues to S270. In S240, if the server 21 receives an instruction to change the bid conditions from the terminal 30A of the client, the bid condition data stored in the bid condition storage unit 45 is changed. Then, unless no bid acceptance indication is received from the terminal 30A of the client, the processing procedure from S210 to S260 is repeated to collect bidders until the expiration of the bidding period is determined in S260. Then, upon confirming the expiration of the bidding period in S260, the flow continues to S270.

In S270, it is determined whether or not the number of successful bidder candidates exceeds a limited number of successful bidders. When it is determined that the number of successful bidder candidates exceeds, narrow-down processing is executed in S280.

In the narrow-down processing in S280, the control unit 42 reads narrow-down condition data from the narrow-down data storage unit 45B in the article management DB 23, and also reads all bid data associated with an article code number of the article from the bid management DB 24. Then, the bid narrow-down computing unit 44 uses these data to perform appropriate processing for narrowing down a successful bidder from the successful bidder candidates. Then, in S290, the bid narrow-down computing unit 44 notifies the respective terminals 30 of the client and the successful bidder of the result of the bid. Subsequently, a trading contract is concluded between the client and the successful bidder. It should be noted that the procedure from S210 to S290 corresponds to a bid acceptance procedure.

Next, a processing procedure of the price slide setting type time auction will be explained with reference to FIGS. 2 and 12.

After entering required details on offers by selecting a combination of desired period and price in the entry fields V2, V4 on the bid participation screen V in the same form as that illustrated in FIG. 9 (note that a portion of entry items is different), as the OK button 60 is selected, bid data D5 is transmitted to the server 21. The bid data D5 is stored in the bid management DB 24.

It is first determined in S310 whether or not any bid has been applied, and if there is a bid applied, all bid data D5 including those of newly applied bids are arranged in successful bid priority order for each of the periods in S320 to create a priority list. More specifically, upon receipt of new bid data, the control unit 42 reads time bid condition data (here, conditions for the price slide setting type) from the time bid data storage unit 45A in the article management DB 23, and also reads all bid data associated with an article code number involved in this auction from the bid management DB 24. Then, the time bid computing unit 43 uses these data to compare trading dates presented in respective data with one another to create a priority list which enumerates bidders in a priority order for each of the periods. Then, the bidder who has offered the trading date that most satisfies a time condition is selected as a successful bidder candidate. However, if the time condition consists only of the period specified by the client, the priority list is created by arranging bidders in order from the one which was accepted first. In this event, all bidders are determined as successful bidders. It should be noted that the procedure in S310, wherein the bid screen is displayed on terminals 30 of bidders, and the server 21 receives the bid data D5 upon acceptance of applied bids, corresponds to a bid acceptance procedure. Also, the procedure from S310 to S400 corresponds to the bid acceptance procedure as well.

The client (for example, a manufacturer or the like which acts as a seller) confirms a bidding situation on his own terminal 30, and transmits a bid acceptance indication to the server 21 even before the expiration of the bidding period if a scheduled number of successful bidder candidates are ensured. Conversely, when there is few bidders even if the client confirms a bidding situation on the screen, the bid conditions (period, price) may be changed even before the expiration of the bidding period.

When the server 21 receives the bid acceptance indication from the client in S330, the flow continues to S370. Alternatively, when the server 21 receives an instruction to change the bid conditions from the client in S350, the server 21 changes the bid condition data (period and price) stored in the bid condition storage unit 45. Then, unless the client sends the bid acceptance indication, the processing procedure from S310 to S360 is repeated to collect bidders until it is determined in S360 that the bidding period has expired.

Then, upon confirming the expiration of the bidding period in S360, the server 21 analyzes, for example, an article sale prediction using the totalized data in S370. Then, it is determined in S380 whether or not the number of successful bidder candidates exceeds a limited number of successful bidders. When it is determined that the number of successful bidder candidates exceeds the limit, the flow continues to S390.

In the narrow-down processing in S390, the successful bidder candidates on the priority list created by the time bid computing unit 43 are narrowed down to the limited number of bidders from the top of the list which are determined as successful bidders. Then, in S400, the result of accepted bids is notified to the terminals 30B of the successful bidders, while the client is notified of the result of accepted bids, and the totalized data and the result of the analysis on the data as required on the terminal 30A of the client. Subsequently, a trading contract is concluded between the client and the successful bidder.

As an alternative way of conducting the price slide setting type auction, it is possible to assume an auction system in which a seller only offers step-wise periods, while a buyer offers a single period selected from the offered periods together with a price (purchase price). As another alternative way, it is possible to assume an auction system in which a seller only offers step-wise prices, while a buyer offers a single price selected from the offered prices together with a trading date. Of course, a buyer can act as a client of the price slide setting type time auction.

Further alternatively, a bid acceptance priority order setting screen WA may be provided for setting priority levels to elements of conditions for a client to determine an accepted bid, for example, as illustrated in FIG. 13. The setting screen WA is provided with a plurality of entry fields WA1 to WA4, and is used, for example, in combination with the screens R, S in FIG. 6. A client has previously registered a rank of elements which are preferred in determining a successful bidder, and selects an OK button 61 on the screen WA, for example, to transmit preferred condition data Da to the server 21. For example, with "trading date" set in the entry field WA1 and "price" set in the entry field WA2, the highest priority is given to the trading date, in which case, when a plurality of bidders compete with the same trading date, the bidders are narrowed down based on elements at the second and lower priority levels such as the price and so on to identify a favorable trading partner in accordance with the priority desired by the client. Alternatively, with "price" set in the entry field WA1 and "trading date" set in the entry field WA2, the highest priority is given to the price, in which case, when a plurality of bidders compete with the same price, the bidders are narrowed down based on elements at the second and lower priority levels such as the trading date to identify a favorable trading partner in accordance with the priority desired by the client. In this case, since the trading period is taken into account, it is possible to find a trading partner who offers a favorable condition for the trading date as well. As possible elements which may be ranked in the priority hierarchy, several elements are provided other than the trading date and the price.

Alternatively, instead of the method of determining a successful bidder, conducted by the server 21, a trading partner may be determined in the following manner. For example, the server 21 lists information offered by bidders as it is, or creates a priority list by narrowing down successful bidder candidates at higher ranks, for example, to a limited number of bidders specified by the client based on the information offered by the bidders, and transmits the list to the terminal 30A of the client. Accordingly, a list screen XA as illustrated in FIG. 14 is displayed on the terminal 30A of the client. The screen XA is provided with a list XA1, an entry field XA2 for selecting a successful bidder, and an OK button 62. The list XA1 indicates a priority number, a code number, a trading date (date offered by a bidder), and bidder offered conditions (price, article delivery date and so on).

The client reviews offered conditions such as the trading dates in the list XA1 of the screen XA, determines a successful bidder favorable to the client, enters, for example, the priority number of the successful bidder in the entry field XA2, and selects the OK button 62. In response, the server 21 notifies the client and the successful bidder of an accepted bid. If the client can view the list XA1 on the terminal 30A in this way, the client can select a partner who offers favorable conditions for any element such as the price other than the trading date, even if several bidders offer the same paying-in date, or the client can select a partner who may concede in the price or the article delivery date even if the trading date is slightly late. The list screen XA corresponds to a browsing screen.

As appreciated from the foregoing description, the following advantages are provided according to the first embodiment.

(1) With the employment of the time auction in which a client offers a trading due date condition such that bidders compete the trading due date for an article or a buyer, the client can find a trading partner who satisfies requirements of the client in accordance with his personal circumstances with respect to the trading due date such as an article delivery date, a payment date, or the like.

(2) Since the time slide system is employed, the client can determine as a trading partner a bidder who offers the most favorable trading date for the client. In addition, since the four types of time slide systems are provided, the client can select an appropriate method of sliding the time axis with respect to the due date in accordance with the client's circumstances, thereby permitting the client to find a trading partner who offers a favorable trading date for the client.

(3) Since the price slide setting type is employed, the client can find a trading partner who satisfies the client's requirements in view of a combination of a period and a price. For example, it is possible to buy and sell an article (book, music CD, or the like), which becomes less popular and experiences a smaller value over time from the release day, at a price appropriate for a particular period. Also, when an enterprise uses the price slide setting type for collecting advanced orders for a new product, the enterprise can readily distribute the orders which would otherwise concentrate on the release day, and can be provided with totalized data on the result of bids and the result of an analysis on the data to predict the future sales of the product. The prediction in turn helps review a production plan.

(4) Since the first embodiment permits a bidder to offer conditions, it is possible to narrow down bidders, when they complete, to a trading partner favorable for the client based on secondary elements such as the price other than the trading due date. Also, a bidder is provided with an opportunity to offer conditions with which a higher priority may be given to him, so that the bidder can acquire a wanted article or buyer with a higher possibility.

Next, the definitions of the following terms used in the first embodiment will be explained.

(1) "Trading Due Date" is meant to have a large concept including a date on which a transaction is actually made such as a payment date, an article delivery date and so on, not limited to a date on which a trading contract is concluded.

(2) "Due Date" of the trading due date is meant to be a concept which includes a time point identified in temporal units such as years, months, weeks, days, hours, minutes and seconds, or a period which as a range of time.

Second Embodiment

A second embodiment which embodies the present invention will hereinafter be described with reference to FIGS. 15 through 23. In the first embodiment, an auction is conducted such that bidders compete with the time, more specifically, a trading due date, whereas in the second embodiment, an auction is conducted with an element other than the price such as position, distance and time. In the second embodiment, the time is not the trading due date but a required period of time. The required period of time may be, for example, a waiting time for a taxi to arrive.

A position auction is provided with a business auction for hiring a carrier such as a taxi which provides paid transportation services. For example, taxi companies may register themselves in this position auction as users to efficiently receive provision of customers through the position auction. Potential customers may also register themselves as users to use the position auction.

Next, the position auction will be explained in a specific manner.

An auction management system (intermediary management server system) 20 comprises a server 21, a display device 70, and an input device 71 comprised of a keyboard, a mouse and so on. The server 21 is connected to three databases 22, 23, 24. The server 21 is connected to the Internet N and further connected to terminals 30 of third parties for communications therewith through the Internet N. For example, personal computers in a plurality of taxi companies (hereinafter simply called the "personal computer") 72 are connected to the Internet N so that they can communicate with the server 21. For example, it is only taxi companies (including owner driver taxis) which have previously registered as users that are allowed to receive a customer provision service from the server 21. The customer terminals 30 connected to the Internet N can be communicated with the server 21. The customer terminals 30 may be a portable telephone 74 having the ability of making communications through the Internet (for example those supporting the i-mode) other than the personal computers 73. A transceiver 75 is connected to each of the personal computers 72 in the taxi companies, so that it can radio communicate with a transceiver 77 equipped in each of taxis 76 which belong to the company.

Figure 17B:
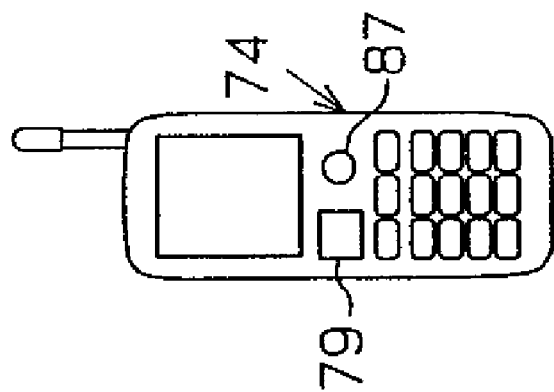
FIG. 17B is a schematic diagram of a portable telephone equipped with GPS.
Figure 17A:
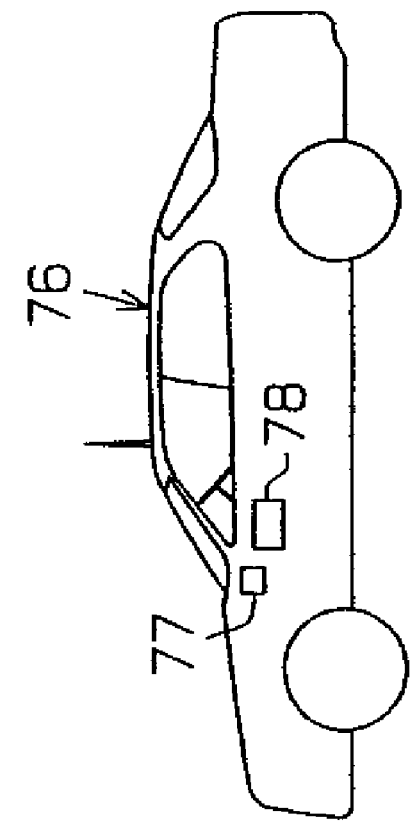
FIG. 17A is a schematic diagram of a taxi equipped with GPS.

As illustrated in FIG. 17A, each of taxis 76 is equipped with a GPS (Global Positioning System) 78 which measures a position utilizing radio waves of GPS satellites, so that the taxi 76 exactly measures a current position thereof through the GPS 78, and transmits the position information from the transceiver 77 in the taxi 76 to the transceiver 75 in the taxi company. Accordingly, the personal computer 72 exactly perceives current positions of all taxis 76 belonging to the taxi company. Also, as illustrated in FIG. 17B, the portable telephone 74 held by a customer contains a GPS 79 so that it supports the positioning capabilities. Therefore, a current position of the customer who carries the portable telephone 74 is sequentially measured, as required, by the GPS 79 contained in the portable telephone 74.

The server 21 of the auction intermediary company stores a variety of programs for auctions in a memory. An auction program is included in these programs. This program informs respective taxi companies of a current position of a customer through the Internet N to conduct an auction in which the taxi companies intend to knock the customer down. The respective taxi companies participate in the auction while offering position information on taxis of their companies. The server 21 in turn identifies the taxi which is positioned closest to the customer, as an acceptable bid condition based on the taxi position information, such that the customer determines this taxi as a successful bidder.

The personal computer 72 of the taxi company keeps track of current positions and current situations of the respective taxis 76 belonging to the company based on the information from the respective taxis 76. The current situation refers to a situation of the taxi (in a mission, on the move to a customer, during washing, lack of gasoline, during supply of gasoline, and so on), a situation of a driver (taking a break, at meal, and so on), a traffic situation (under construction, traffic jam, and so on). Any factor which causes a delay in an arrival time at a customer even if the taxi is positioned near the customer is taken into account in addition to the position (distance). Situation information may be fetched into the personal computer 72 by entering information acquired through a radio communication by a manager of each taxi company or digitally converting analog data received by the transceiver 75. It is preferred however that the situation information should be able to be transmitted automatically to the personal computer 72 without burdening the driver. For example, the taxi 76 may be equipped with a variety of sensors to detect predetermined situations, such that resulting situation data is sequentially transmitted automatically to the personal computer 72 by a program or the like. Such an automatic situation detecting method may rely on a variety of sensors, for example, a gasoline amount detecting sensor for detecting a lack of gasoline; a taxi meter operation detecting sensor or a seat sensor for confirming or detecting whether or not a passenger (customer) is present; and so on. Also, driver schedule management data is stored and matched with the time provided by a timing function to determine, using a program, whether the driver is in a break time or a working time. Further, a traffic situation may be kept track of based on traffic jam information and construction information provided by a transport management organization detected by traffic amount investigation devices installed along roads.

FIG. 16 illustrates the functional configuration of the auction management system 20. The auction management system 20 comprises a communication unit 81, a control unit 82, a position bid computing unit 83, and a successful bid narrow-down computing unit 84. The communication unit 81, control unit 82, position bid computing unit 83 and successful bid narrow-down computing unit 84 are implemented by the server 21. The communication unit 81 operates in accordance with a predetermined communication protocol (HTTP). An article management DB 23 comprises a bid condition storage unit 85 which is comprised of a position bid data storage unit 85A and a narrow-down data storage unit 85B. The control unit 82 and the respective computing units 83, 84 are used for computing control for identifying a successful bidder in a position auction, and a variety of data stored in the respective storage units 85A, 85B are used for the computing.

An auction home page (HP) (site) resides in the server 21 in the intermediary company. A user (customer) displays the auction HP illustrated in FIG. 18 on a screen through the network N using a browser application from a terminal 30 for viewing the auction HP. The auction HP in the second embodiment differs from the time auction HP in the first embodiment only in that the element "time" with which bidders compete is replaced with "position". A variety of screens such as the user registration screen P illustrated in FIG. 4, the article registration screen Q illustrated in FIG. 5, and so on are likewise linked to the auction HP. The server 21 stores in its hard disk, screen data for the variety of screens HP, P, Q, F, G and so on, a program for use in displaying the screens and so on (for example, an HTML description program), a program for use in computing involved in the auction, and so on.

Figure 18:
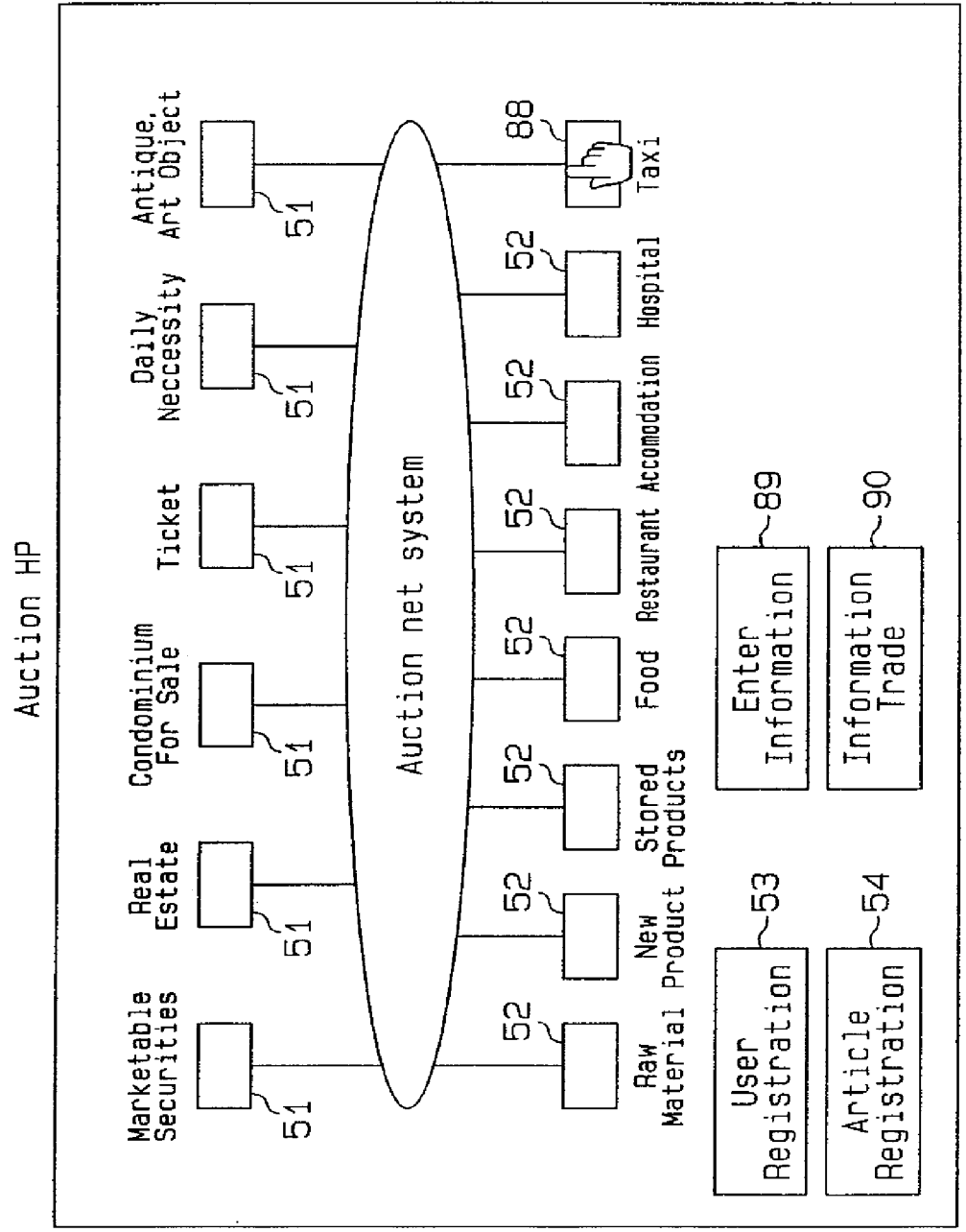
FIG. 18 illustrates a home page of an auction.
Figure 19:
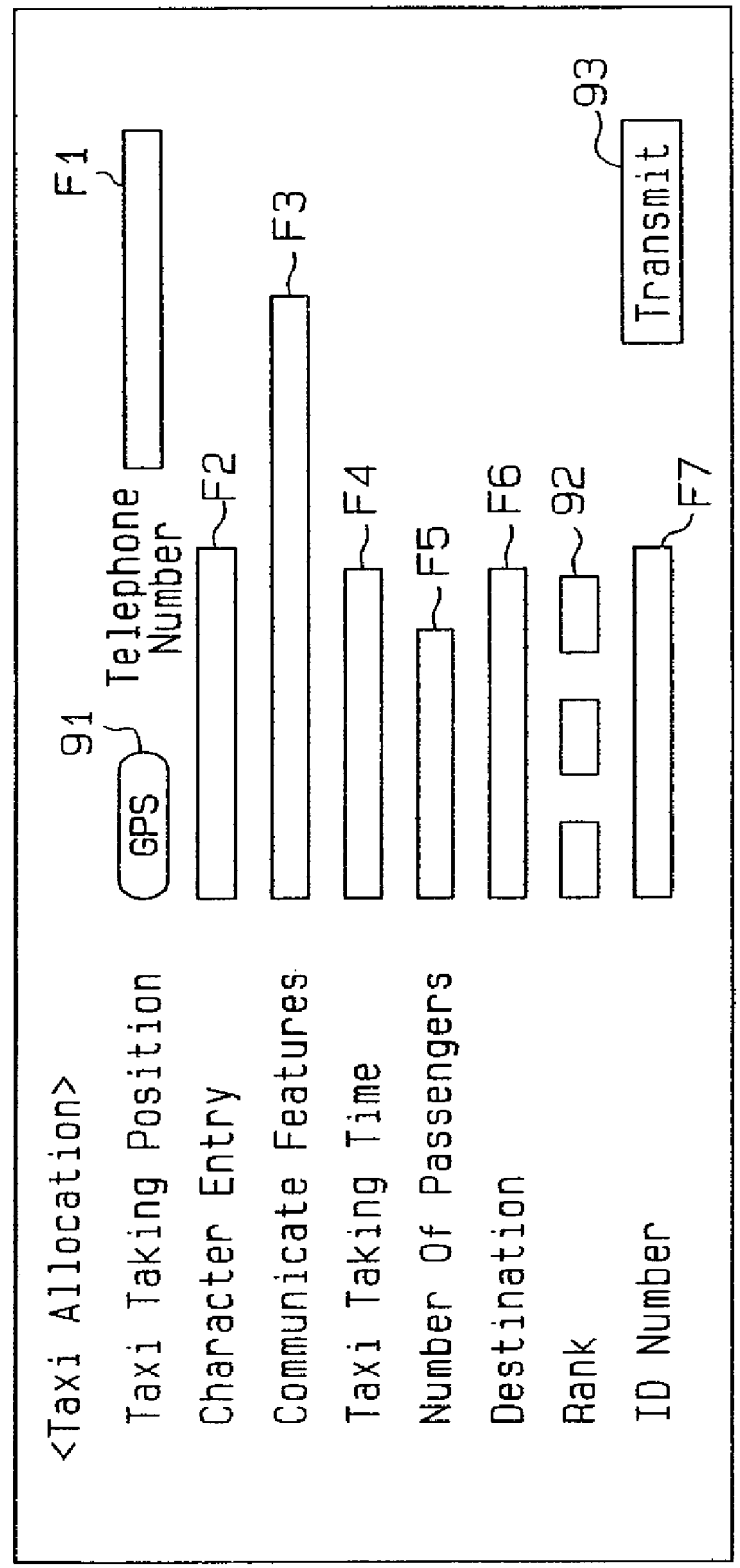
FIG. 19 is a diagram illustrating a screen for hiring a taxi.

As illustrated in FIG. 18, the auction HP is similarly provided with a large number of selection buttons 51 classified into respective articles and services for auction, and a large number of selection buttons 52 classified into respective articles for counter-auction. A person who wants to participate in a bid (bidder) selects a selection button 51 or 52 of a desired article classification. It should be noted that FIG. 18 illustrates only a portion of article and service classifications. The auction HP is also provided with a user registration button 53 and an article registration button 54. Selection of the button 53 or 54 results in the registration screen P (FIG. 4) or the registration screen Q (FIG. 5) displayed on the terminal 30, and data entered from the screen P or Q is transmitted to the server 21 to proceed with user registration or article/service registration. An article also includes information provision. The position auction also provides a business position auction (counter-auction) in which registered are dealers who provide a carrier such as a taxi which provides paid transportation services. For example, taxi companies may register themselves in this position auction as users to efficiently receive provision of customers through the position auction. While the taxi is given as an example in the second embodiment, the present invention may be applied to any mobile object (vehicle or the like) such as a collection/delivery car which is dispatched to a customer or a predetermined place near the customer for providing a service.

Since the auction HP has a "taxi" button 88, a customer may select this button. Then, the customer enters required items on a taxi allocation screen F illustrated in FIG. 19 which appears subsequent to the auction button HP in response to the selection of the taxi button 88. Specifically, the screen F is provided with a GPS button 91 for specifying a place at which the customer wants to take a taxi; a telephone number entry field F1, and a character entry field F2. The screen F is also provided with entry fields F3 to F6 for entering customer feature communication, desired take time (within how many minutes), number of passengers, and destination; a rank button 92 for specifying a taxi rank (large, middle, small, rate rank, and so on); and an ID number entry field F7. Here, the GPS button 91 on the screen F may be previously corresponded with the GPS 79 when using a portable telephone 74 which supports the GPS, so that GPS position data can be registered only by manipulating the button 91. As an alternative method of identifying a position, it is possible to enter a telephone number of the customer's residence, building or the like. The server 21 is connected to a system which identifies the address from the telephone number (telephone number search service company) so that the position can be identified provided that the telephone number is known. The character entry field F2 is filled with character information such as the address, place name, readily perceivable rendez-vous place, or the like. The feature communication entry field F3 is filled with identifiable features of the customer himself. It should be noted that the taxi allocation screen F corresponds to a request screen.

After entering these required items, the customer selects a transmission button 93 to transmit the customer information data to the server 21 through the Internet N as bid request information. The server 21 launches an auction program based on the customer information and widely promotes taxi companies to participate in the position auction through the personal computers 72.

The personal computers 72 in the taxi companies are operative at all times, and upon receipt of information on a new auction, notifies an operator (personal computer manager) to that effect through sound, display or the like. In this event, the server 21 provides an auction participation screen G as illustrated in FIG. 20.

Figure 20:
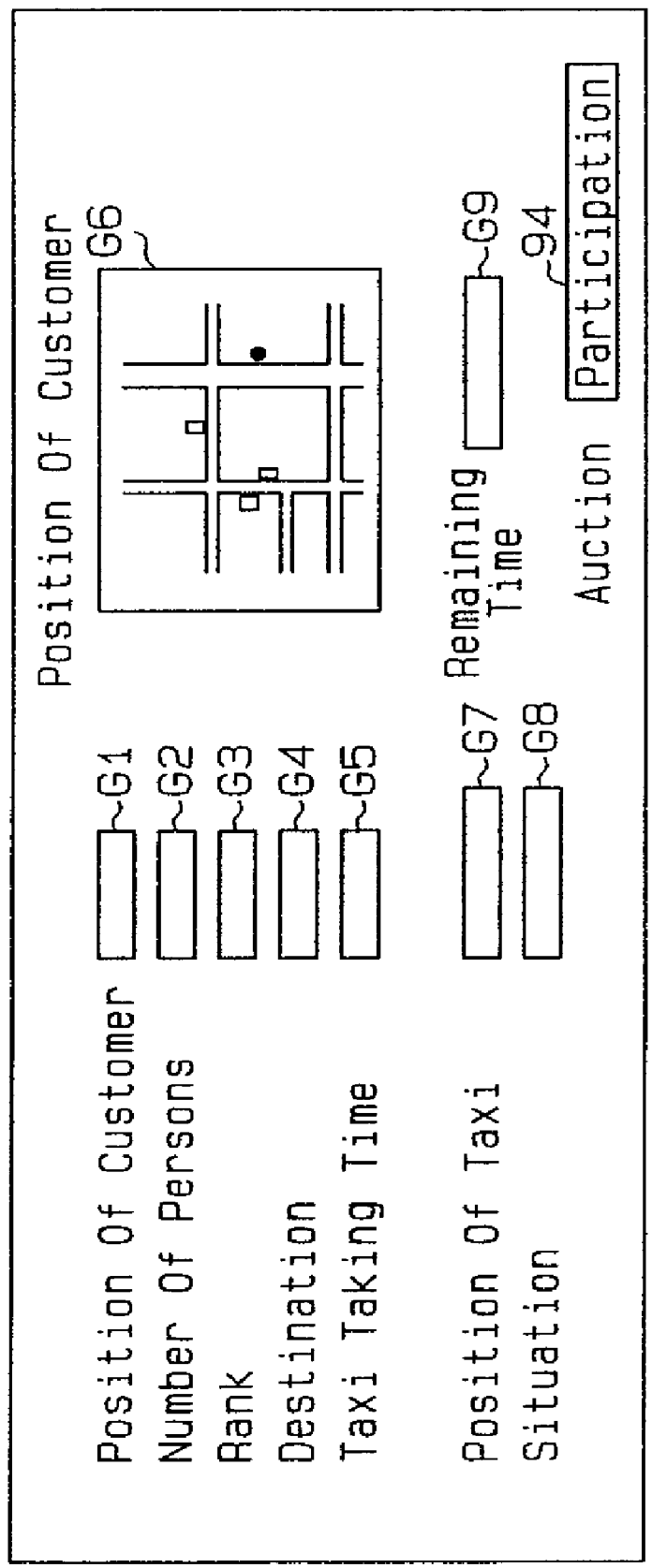
FIG. 20 is a diagram illustrating a screen for participating in an auction.

The auction participation screen G illustrated in FIG. 20 is provided with display fields G1 to G5 for offering customer information such as the position of a customer (a place at which the customer wants to take a taxi); the number of passengers; a specified rank of taxi; destination; the time at which the customer wants to take a taxi; and so on. The auction participation screen G is also provided with a map display field G6 which displays a map around the place at which the customer is present (map information). The position at which the customer is present (the place at which the customer wants to take a taxi) is indicated on the map (a black circle on the map in FIG. 20), such that the position at which the customer is present can be visually confirmed in a specific manner on the map. The screen G is also provided with entry fields G7, G8 for entering "taxi position" and "situation". For participating in the auction, there is a time limit in order not to have kept the customer waiting for a taxi to the utmost, so that a display field G9 is also provided for showing a remaining time. For participating in the auction, each taxi company should have entered required data in the entry fields G7, G8 within a time limit and select a participation button 94. It should be noted that the auction participation screen G corresponds to a bid screen.

The personal computer 72 of each taxi company keeps track of the positions and situations of all the taxis 76 belonging to the company, and identifies an appropriate taxi 76 that can arrive at the customer in the soonest time from these data and the place at which the customer is present (or his taxi taking place). Then, the operator of the personal computer 72 enters the position and situation of the identified taxi in the entry fields G7, G8 and participates in the bid in the name of the taxi, such that the taxi is determined as a successful bidder. The situation may describe, for example, "the taxi can directly go to the place"; "it takes three minutes to supply the taxi with gasoline at ABC gasoline station"; "the driver is taking a break. The taxi can start in five minutes"; "the taxi is transporting a passenger(s)"; and so on. For example, situation data which evaluate this kind of situation may be transmitted to the server 21, so that the server 21 identifies a taxi which can arrive soonest at the customer based on the position of the taxi and the situation data, and forces the identified taxi to bid off the customer. Of course, each of taxi companies may be fully responsible for the determination of the situation such that the taxi company determines not to participate in the auction if the time limit is exceeded before the taxi arrives at the customer due to bad situations, and forces an appropriate one of taxis which can participate in the auction to do so. In this event, since the taxi company is responsible for the determination of the situation, a penalty may be awarded to the taxi company if the allocated taxi has kept the customer waiting for the taxi. This system provides the position auction in which bidders purely compete only with the position.

Alternatively, the server 21 may fully determine a taxi situation to identify a taxi which can arrive soonest at the customer. As a relatively feasible implementation, a manager of each taxi company may enter pertinent ones of previously determined situation items in the entry field G8 as character information to notify the server 21 of the specific situations. This implementation, however, requires man power and is inefficient, so that it is desirable from a viewpoint of efficiency that the personal computer 72 determines the situation based on situation information (car situation information, driver situation information, traffic situation information) which can be acquired from respective taxis 76 and a variety of facilities. In this case, it is possible to convert this kind of situation into a distance, to add the distance for compensation to the actual position, and to participate in the auction with the compensated position. It should be noted that the situation information corresponds to time varying factor information.

The server 21 uses information (bid information) received from the personal computers 72 in the respective taxi companies (or mobile information terminals equipped in owner driver taxis such as mobiles, portable telephones), and performs predetermined processing on the information to identify a taxi 76 which can arrive in the soonest at a place specified by the customer. The server 21 stores rating system data of the respective taxi companies, and therefore automatically identifies a taxi which will collect the lowest rate, and determines the thus identified taxi as a successful bidder if some taxis offer a substantially identical required time within a predetermined allowable range.

Next explained is a method of identifying a taxi that can arrive in the soonest time at a customer.

Figure 21:
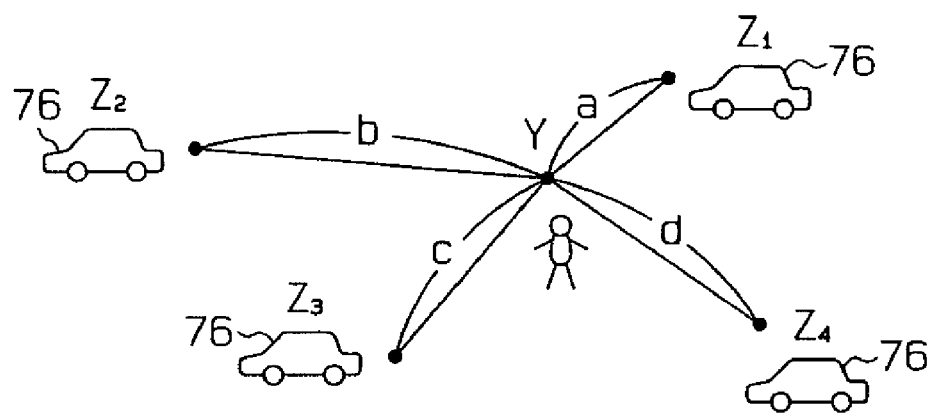
FIGS. 21A and 21B are explanatory diagrams of a position auction.
Figure 21:
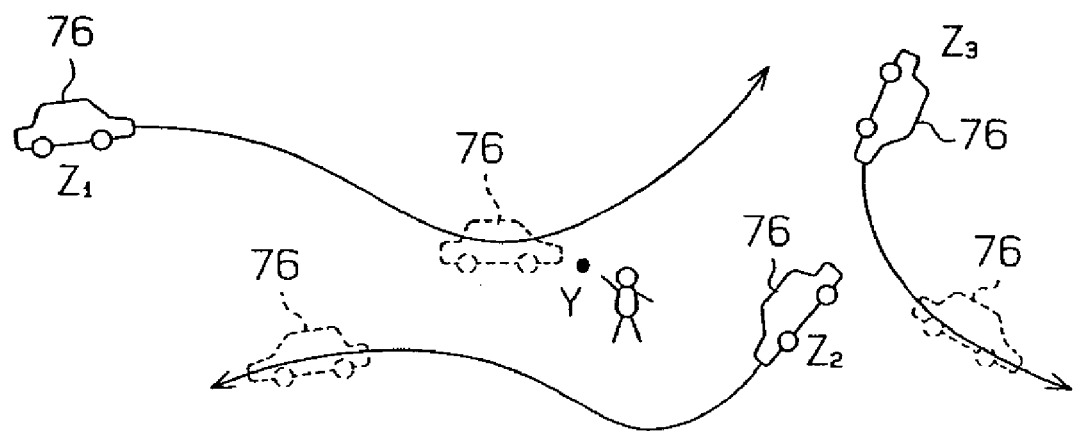

The server 21 calculates the distance between a taxi position and a customer position on a map based on data on the two positions. For example, as illustrated in FIG. 21A, when a total of four taxis 76, Z1, Z2, Z3, Z4 participate in a bid for a customer who is waiting for a taxi 76 at a Y point, the server 21 calculates the distances a, b, c, d between the respective taxis Z1, Z2, Z3, Z4 and the customer. In this event, while direct distances may be used, this embodiment uses distances on the map for calculating more exact distances (It should be noted however that in FIG. 21 the distances are schematically represented by linear lines). In a pure position auction, the server 21 compares these distances and determines the taxi at the shortest distance from the customer as a successful bidder for the customer.

For taking into account situation information other than the position, the server 21 calculates estimated required times of the respective taxis Z1, Z2, Z3, Z4 in consideration of sequentially acquired construction information and traffic jam information based on traffic information such as one-way roads and data from a traffic investigation organization, in addition to the distance data which are simply determined from the positions. Also, the server 21 converts situation data comprised of character information, numerical value data and so on into a required time, and reflects the converted time to the previously calculated required time to derive an estimated required time.

FIG. 21A shows a method of identifying an appropriate taxi for a customer in view of the distance between the current position of the taxi and the customer position, whereas FIG. 21B shows a like method in view of the distance between an intermediate position of a taxi on a scheduled transition route and a customer. This is called the "on-the-move position auction." The on-the-move position auction will be described later.

The server 21 determines a taxi 76 that offers the soonest estimated required time out of a plurality of taxis 76 participating in the bid as a successful bidder for the customer. Upon determination of the taxi 76 as the successful bidder, the server 21 notifies the personal computer 72 of the taxi company to which the winning taxi 76 belongs (or a portable telephone or the like, if an owner driver taxi was determined as a successful bidder) of the fact that the taxi 76 was determined as a successful bidder, and of other required items such as features (signs) of the customer and so on through a communication via the Internet N or the like. The taxi company, upon receipt of the notification of the successful bid, informs the pertinent taxi 76 to that effect, causing the taxi 76 to urgently go to the place specified by the customer.

Figure 22:
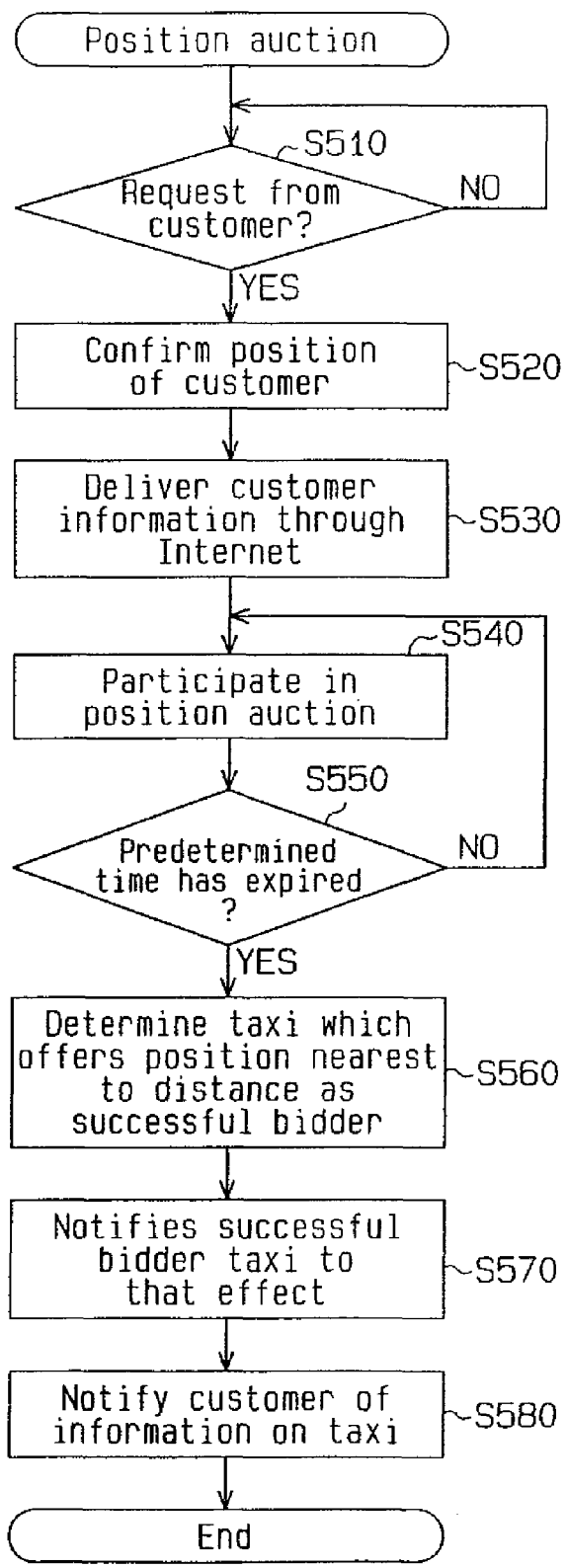
FIG. 22 is a flow chart illustrating a procedure of the position auction.

Next, a procedure flow of the position auction will be explained below with reference to FIG. 22. It should be first noted that the illustrated procedure flow does not necessarily show a processing procedure of the server 21 but shows a procedure (flow) of the entire position auction including communications between taxi companies and an intermediary company.

In S510, it is determined whether or not a request is made from a customer. If there is no request from a customer, the server 21 waits until a request is made from a customer. It should be noted that a procedure in S510 where a request screen is displayed on terminals of potential customers and the server 21 receives information on the customer correspond to a request procedure.

In Step S520, the server 21 confirms where the customer is present.

In Step S530, the server 21 delivers the customer information through the Internet N.

In Step S540, a bidder participates in the position auction. It should be noted that a procedure of displaying a bid screen on the terminal of the customer in S530, and a procedure of receiving bid information from bidders, which participate in the position auction, at the server 21 in S540 correspond to a bid procedure. Also, procedure from S540 to S560 corresponds to a bid acceptance procedure.

In S550, it is determined whether or not a predetermined time has expired. In other words, it is determined whether or not there is no remaining time until the deadline for the participation in the position auction.

In S560, the server 21 determines a taxi which offers the position nearest from the customer. A current taxi position (upon participating in the bid) is employed as position data, and the server 21 determines a taxi positioned at the shortest distance from the customer as a winning taxi. Alternatively, if situation data is taken into account, the server 21 determines a taxi which offers the soonest estimated required time for a movement from the current position to the customer position as a successful bidder for the customer in consideration of the situation in addition to the position.

In S570, the server 21 notifies the winning taxi to that effect. Specifically, the server 21 notifies the personal computer 72 in the taxi company to which the winning taxi 76 belongs of the fact that its taxi 76 was determined as a successful bidder. The taxi 76, upon receipt of the notification of the successful bid, urgently goes to a place specified by the customer based on the customer position information and so on fetched from the personal computer 72. In this way, the customer can call the taxi 76 in the soonest time.

In Step S580, the customer is notified of information on the taxi. Specifically, since the customer does not know which taxi will come to take him, the customer is notified of information which allows the customer to confirm the taxi (the taxi company, the color of the taxi, and so on).

In the following, the on-the-move position auction will be explained.

If a taxi can catch a customer midway to a destination, or if a collection/delivery car can collect extra parcels on a scheduled collection/delivery route, customers or parcels can be efficiently acquired. Also, from the customer side, it is possible to take a taxi sooner or to have the collection/delivery car collect or deliver a parcel sooner. For purposes of realizing such convenience, it is the on-the-move position auction that is provided for bidding off a customer who is going to take a vehicle (a taxi or the like) from the nearest position in the midway of a moving route of the vehicle or for bidding off a vehicle which is moving on a road closest to a customer. In this auction, a customer only needs to specify a place (taxi taking position) and a time at which a customer wants to use a taxi such that a taxi is allocated to him at the specified place and time, so that the taxi may be far away from the customer at the time of the auction.

While a variety of programs stored by the server 21 in the memory for the on-the-move position auction are basically similar to those used in the position auction, a screen G (FIG. 20) additionally includes an entry field for entering information for identifying a moving route on which a vehicle of interest is moving, and an entry field for entering information as to at which time the vehicle will pass the moving route (for example, data on the position at a certain time) in addition to the entry fields provided for the position auction. The server 21 relies on a similar technique to that used for the position auction to identify which taxi will pass the road closest to a place specified by a customer at a time specified by the customer from the moving route data and moving time data, and determines a taxi (or a collection/delivery car) which will pass the road closest to the specified place as a successful bidder for the customer. Conversely, if a customer is a client, the customer will select a taxi (or a collection/delivery car) which passes the closest road as a successful bidder. It should be noted herein that the moving route data and the moving time data also constitute converted data.

More specifically, as illustrated in FIG. 21B, when three taxis 76, Z1, Z2, Z3 move along moving routes shown in the figure, respectively, the server 21 calculates places (positions) passed by the respective taxis 76 on the move at a time t, and determines a taxi 76 which passes the place nearest from a Y point, at which a customer is present at the time t, as a successful bidder for the customer. Conversely, the customer determines a taxi 76 which passes nearest from him at the time t as a successful bidder. In the example illustrated in FIG. 21B, the taxi Z1 which is positioned closest to the customer (at a position indicated by a dotted line in FIG. 21B) at the time t will bid off the customer (however, without considering the situation). Likewise, in this case, a pure position auction may be conducted to determine a successful bidder simply from the position alone, or an estimated required time may be calculated in view of a determination on the situation such as a taxi situation, a traffic situation and so on as is the case in this example.

Figure 23:
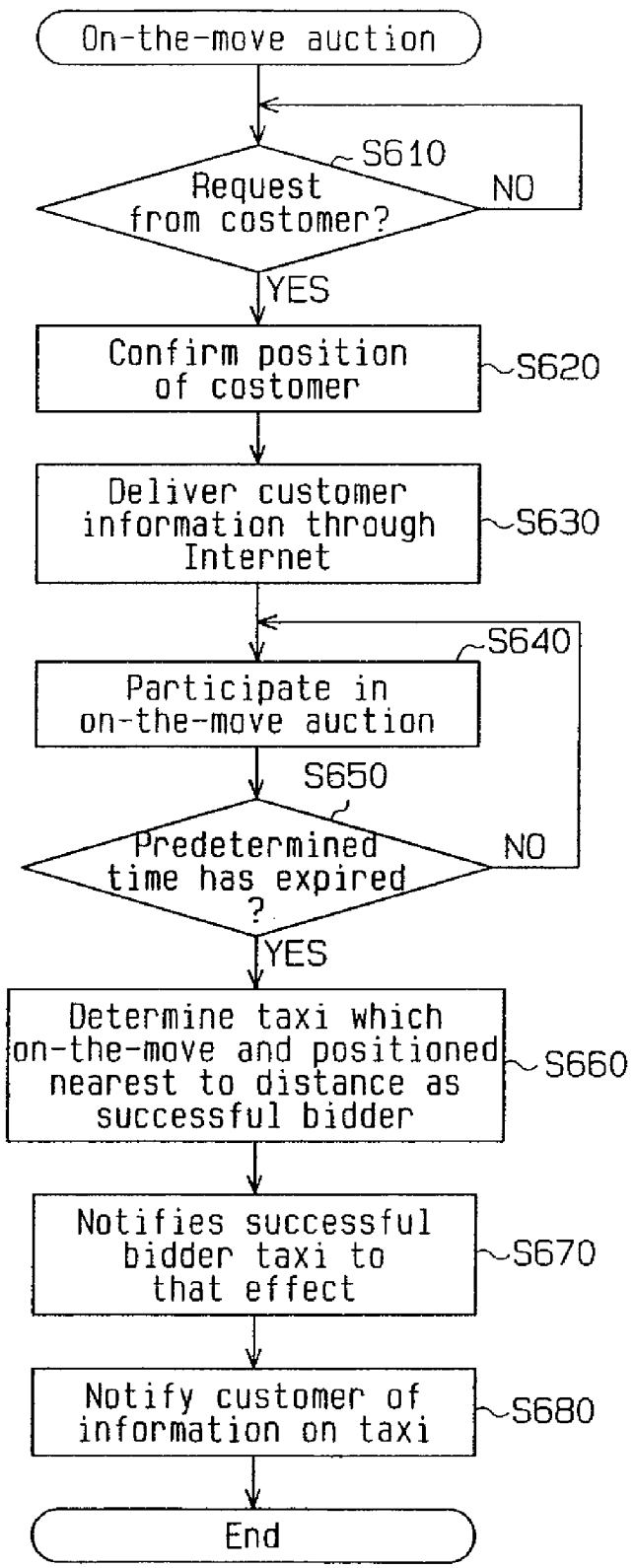
FIG. 23 is a flow chart illustrating a procedure of an on-the-move position auction.

Next, a procedure flow of the on-the-move position auction will be explained below with reference to FIG. 23. It should be noted that the procedure flow does not necessarily show a processing procedure of the server 21 but shows a procedure (flow) of the entire position auction including communications between taxi companies and an intermediary company.

In S610, it is determined whether or not a request is made from a customer. If there is no request from a customer, the server 21 waits until a request is made from a customer. It should be noted that a procedure in S610 where a request screen is displayed on terminals of potential customers and the server 21 receives information on the customers correspond to a request procedure.

In Step S620, the server 21 confirms the location of the customer.

In Step S630, the server 21 delivers the customer information through the Internet N.

In Step S640, a bidder participates in the position auction. It should be noted that a procedure of delivering customer information to display a bid screen on terminals of potential bidders in S630, and a procedure of receiving bid information from bidders, which participate in the position auction, at the server 21 in S640 correspond to a bid procedure. Also, a procedure from S640 to S660 corresponds to a bid acceptance procedure.

In S650, it is determined whether or not a predetermined time has expired. In other words, it is determined whether or not there is no remaining time until the deadline for the participation in the position auction.

In S660, the server 21 determines a taxi which offers the position nearest from the customer. In this event, the position of each taxi at a taxi taking time t, estimated from the moving route, is employed as position data, and the server 21 determines a taxi positioned at the shortest distance from the customer as a winning taxi. Alternatively, if situation data is taken into account, the server 21 determines a taxi which offers the soonest estimated required time for a movement from the current position to the customer position as a successful bidder for the customer in consideration of the situation in addition to the position.

In S670, the server 21 notifies the winning taxi to that effect. Specifically, the server 21 notifies the personal computer 72 in the taxi company to which the winning taxi 76 belongs of the fact that its taxi 76 was determined as a successful bidder. The taxi 76, upon receipt of the notification of the successful bid, urgently goes to a place specified by the customer based on the customer position information and so on fetched from the personal computer 72. In this way, the customer can call the taxi 76 in the soonest time.

In S680, the customer is notified of information on the taxi. Specifically, since the customer does not know which taxi will come to take him, the customer is notified of information which allows the customer to confirm the taxi (the taxi company, the color of the taxi, and so on).

As appreciated from the foregoing description, the following advantages are provided according to the second embodiment.

(5) A customer, when taking a taxi, can request for a taxi which can come to catch him the soonest. On the other hand, a taxi company can efficiently allocate a taxi which is positioned closest to the customer.

(6) In the on-the-move position auction, when a customer is positioned in the midway of a moving route of a vehicle of interest such as a taxi, a collection/delivery car or the like, the vehicle can catch the customer in the middle of its movement, thereby making it possible to efficiently acquire the customer. The customer does not either have to wait for a long time.

Third Embodiment

A third embodiment which embodies the present invention will hereinafter be described with reference to FIGS. 4, 15 through 17, 19 through 21, and 24 through 31. The third embodiment differs from the foregoing embodiments in that an auction is conducted such that bidders compete with the position as an element.

Figure 15:
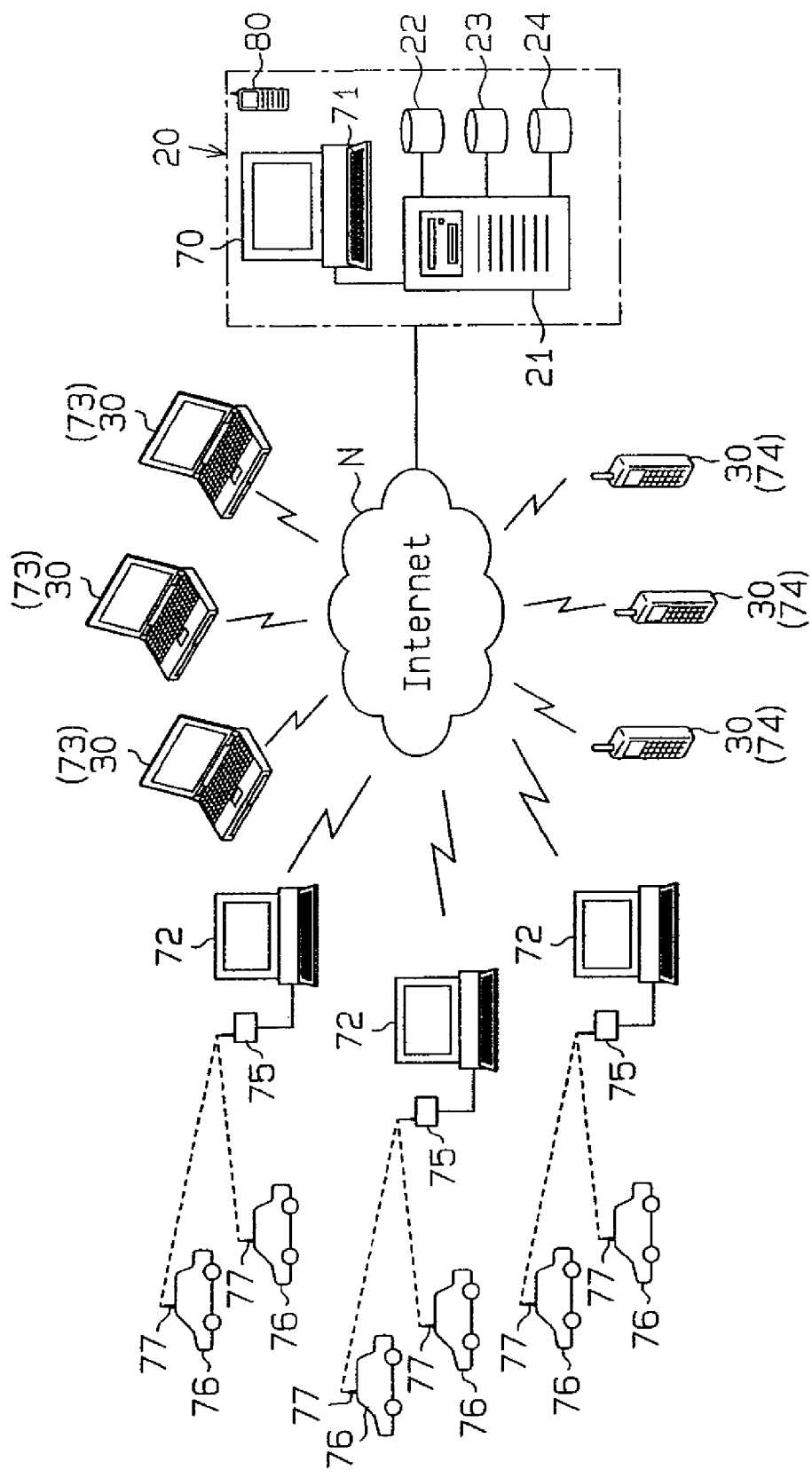
FIG. 15 is a schematic diagram generally illustrating the configuration of an auction system according to a second embodiment of the present invention.

An auction system for conducting a position auction is basically similar in configuration to the system illustrated in FIG. 15. The position auction refers to an auction system in which positional requirements offered by a client are transmitted to terminals of third parties through a network to widely promote bids, and then a bid is conducted with the position based on applied bid information to determine a bidder who offers the position that most satisfies the requirements of the client as a successful bidder. The client's requirements include requirements offered by the client himself, and requirements previously provided by a bid intermediary dealer, taken for granted from the contents of a request from the client (a purpose of the request).

The position auction is a bid for a position at which both parties acting as mutual trading partners, such as a buyer and a seller, are introduced, and may be conducted for any item such as articles, services and so on. A position auction is provided with a business auction for hiring a carrier such as a taxi which provides paid transportation services, and a collection/delivery car which comes to take a parcel and so on. For example, taxi companies may register themselves in this position auction as users to efficiently receive provision of customers through the position auction.

Next, the position auction will be explained in a specific manner. FIG. 15 illustrates a position auction system in which either a customer or a taxi company selects a trading partner who most satisfies a predetermined positional condition through a network (the Internet in this embodiment).

As illustrated in FIG. 15, an auction management system (intermediary management server system) 20 comprises a server 21, a display device 70, and an input device 71 comprised of a keyboard, a mouse and so on. The server 21 is connected to three databases 22, 23, 24. The server 21 is connected to the Internet N, and further connected to terminals 30 of third parties for communications therewith through the Internet N. For example, personal computers in a plurality of taxi companies (hereinafter simply called the "personal computer") 72 are connected to the Internet N so that they can communicate with the server 21. For example, it is only taxi companies (including owner driver taxis) which have previously registered as users that are allowed to receive a customer provision service from the server 21.

The customer terminals 30 connected to the Internet N can be communicated with the server 21. The customer terminals 30 may be a portable telephone 74 having the ability of making communications through the Internet other than the personal computers 73. A transceiver 75 is connected to each of the personal computers 72 in the taxi companies, so that it can radio communicate with a transceiver 77 equipped in each of taxis 76 which belong to the company.

A transceiver equipped in the taxi 76, and the portable telephone 74 are substantially similar in configuration to those illustrated in FIGS. 17A, 17B, respectively. As illustrated in FIG. 17A, each of taxis 76 is equipped with a GPS (Global Positioning System) 78 which measures a position utilizing radio waves (signals) transmitted form a plurality of satellites, so that the taxi 76 exactly measures a current position thereof through the GPS 78, and transmits the position information from the transceiver 77 in the taxi 76 to the transceiver 75 in the taxi company. Accordingly, the personal computer 72 of the taxi company exactly perceives current positions of all taxis 76 belonging to the taxi company based on the position information output from the GPS 78. Also, as illustrated in FIG. 17B, the portable telephone 74 held by a customer contains a GPS 79 so that it supports the positioning capabilities. Therefore, a current position of the customer who carries the portable telephone 74 is sequentially measured, as required, by the GPS 79 contained in the portable telephone 74.

The server 21 illustrated in FIG. 15 stores a variety of programs for auctions in a memory. An auction program is included in these programs. This program informs respective taxi companies of position information of a customer through the Internet N to conduct an auction in which the taxi companies try to bid off the customer. The respective taxi companies participate in the auction while offering position information on taxis of their companies. The server 21 in turn identifies the taxi 76 which is positioned closest to the customer, as an acceptable bid condition based on the taxi position information, and determines this taxi as a successful bidder.

The personal computer 72 of the taxi company keeps track of current positions and current situations of the respective taxis 76 belonging to the company based on the information from the respective taxis 76. The current situation refers to a situation of the taxi (in a mission, enroute, during washing, when lacking gasoline, when supplied with gasoline, and so on), a situation of a driver (taking a break, at meal, and so on), a traffic situation (under construction, traffic jam, accident and so on). Any factor which causes a delay in an arrival time at a customer even if the taxis is located near the customer is taken into account in addition to a current situation.

Condition information such as a situation of each car, a situation of a driver, and so on, and road information such as a road situation may be fetched into the personal computer 72 by entering information acquired through radio communications by a manager of each taxi company or digitally converting analog data received by the transceiver 75. It preferred however that the situation information should be able to be transmitted automatically to the personal computer 72 without burdening the driver. For example, a constitution is employed in which the taxi 76 may be equipped with a variety of sensors to detect predetermined situations, such that resulting situation data is sequentially transmitted automatically to the personal computer 72 utilizing a program or the like based on detected values from the sensors. In this embodiment, converted information is comprised of the condition information and the road information.

Such an automatic situation detecting method for automatically detecting the condition information such as a situation of a car, a situation of a driver, and so on, and the road information may rely on a variety of sensors, for example, a gasoline amount detecting sensor for detecting a lack of gasoline; a taxi meter operation detecting sensor or a seat sensor for confirming or detecting whether or not a passenger (customer) is present; and so on. Also, driver schedule management data is stored and matched with the time provided by a timing function to determine using a program whether the driver is in a break time or a working time. Further, a traffic situation may be known based on traffic jam information and construction information provided by a transport management organization detected by traffic amount investigation devices installed along roads. Position and situation data from the respective taxis 76 are fetched into the personal computer 72 in the taxi company as digital data. The road information from the transport management organization is managed by the server 21.

The auction management system for use in the position auction is substantially similar in configuration to that illustrated in FIG. 16. As illustrated in FIG. 16, the auction management system 20 comprises a communication unit 81, a control unit 82, a position bid computing unit 83, and a successful bid narrow-down computing unit 84. The communication unit 81, control unit 82, position bid computing unit 83 and successful bid narrow-down computing unit 84 are implemented by the server 21. The communication unit 81 operates in accordance with a predetermined communication protocol (HTTP). An article management DB 23 within three databases 22 to 24 comprises a bid condition storage unit 85 which is comprised of a position bid data storage unit 85A and a narrow-down data storage unit 85B. The control unit 82 and the respective computing units 83, 84 are used for computing control for identifying a successful bidder in a position auction, and a variety of data stored in the respective storage units 85A, 85B are used for the computing.

Figure 24:
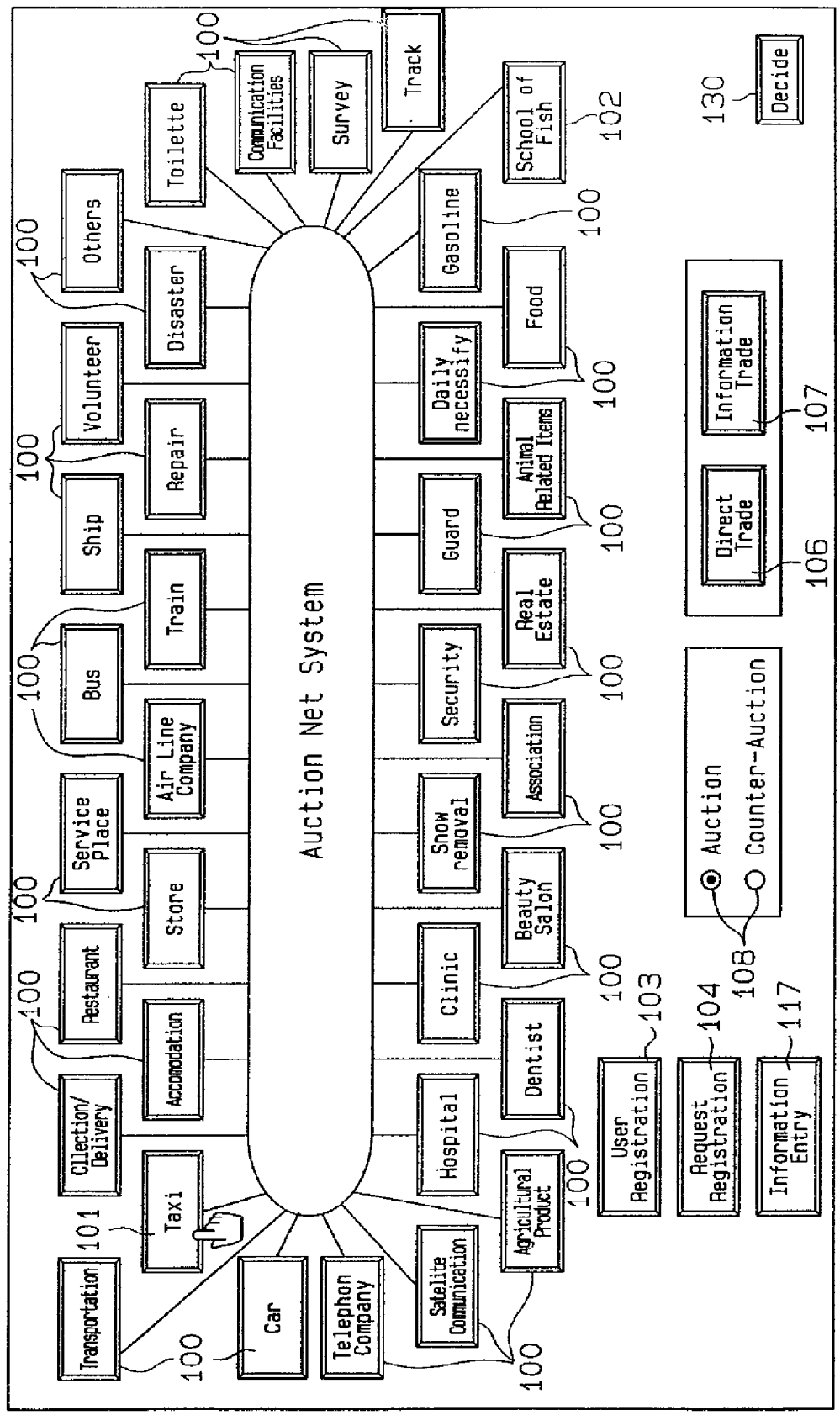
FIG. 24 illustrates a home page of an auction according to another embodiment.

An auction home page (HP) illustrated in FIG. 24 resides in the server 21. A user (customer) displays the auction HP illustrated in FIG. 24 on a screen through the network N using a browser application from a terminal 30 for viewing the auction HP. A variety of screens such as a user registration screen P similar to that illustrated in the aforementioned FIG. 4, a taxi allocation screen F similar to that illustrated in FIG. 19, the auction participation screen G illustrated in FIG. 20, and an article/service registration screen H illustrated in FIG. 25, and so on are linked to the auction HP. The server 21 stores in its hard disk, screen data for the variety of screens P, F, G, H, and so on, a program for use in displaying the screens and so on (for example, an HTML description program), a program for use in computing processing involved in the auction, and so on.

The position auction HP is provided with a large number of selection buttons 100, 101, 102 classified into respective articles and services potentially traded in the auction. A person who wants to participate in a bid (bidder) selects a selection button 100, 101 or 102 of a desired article/service classification. The position auction HP is also provided with a "user registration" button 103 and a "request registration" button 104, such that selection of the button 103 or 104 results in the registration screen P (FIG. 4) or a registration screen H (FIG. 25) displayed on the terminal 30, and data entered from the screen P or H is transmitted to the server 21 to proceed with user registration or article/service registration.

The user registration screen P illustrated in FIG. 4 is provided with options for selecting a private or a business registration in addition to the options P1 and the variety of entry fields P2. For example, a client who requests for a taxi 76 may select an option for the private registration, while a taxi company may select an option for the business registration, before entering other items for registration. The user registration screen P is also provided with an entry field for entering a credit card number or the like.

When the user has entered all required items in associated fields on the user registration screen P and selects an OK button 55, the just entered user registration data D1 comprised of these items, the selected option P1, and information entered in the entry field P2 is transmitted to the server 21 through the network N and stored in the customer management DB 22 of the three databases 22 to 24. Upon confirming that the user has paid a predetermined commission (registration fee), the server 21 transmits an authentication number (ID and password) to the terminal of the registered user. The registered user uses the authentication number for utilizing the position auction.

Figure 25:
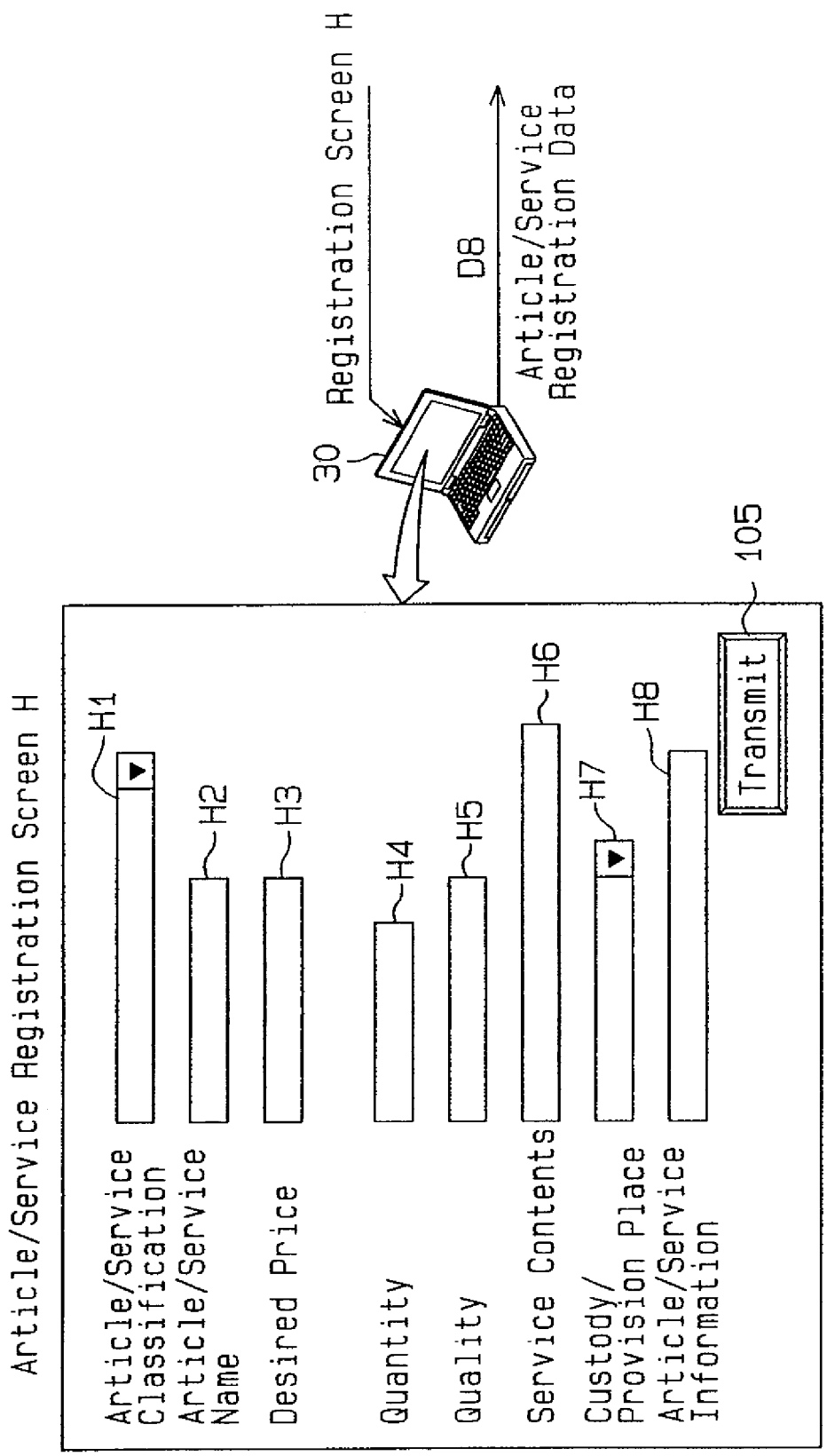
FIG. 25 is an explanatory diagram for registration of an article or a service according to a third embodiment of the present invention.

As illustrated in FIG. 25, the article/service registration screen H is provided with a variety of entry fields H1 to H8 such as article/service classifications, article/service name, desired price, quality, quantity, contents of service, custody/provision place (position), article/service information, and so on. When the user has entered all required items in associated fields on the article/service registration screen H displayed on the terminal 30 and selects a transmission button 105, article/service registration data D8 as bid information comprised of the information entered in the variety of entry fields H1 to H8 is transmitted to the server 21 through the network N and stored in the bid management DB 24. For example, in the case of articles such as gasoline, second hand articles and food, an auction may be conducted using bid information that is the article/service registration data D8 which has been previously registered upon acceptance of an advanced bid. In this event, the article/service registration screen H corresponds to a bid screen.

The position auction HP illustrated in FIG. 24 is provided with a "direct trade" button 106 and an "information trade" button 107. The direct trade button 106 is used for selecting an article or a service or a buyer of an article or a service directly through an auction. For example, the direct trade button 106 is used for directly bidding off a service by a taxi or a collection/delivery car (taxi allocation service, collection/delivery service, or the like), an article, or the like. The information trade button 107 in turn is used when a user wants to acquire useful information on an article or a service or its provider (a manufacturer, a service company or the like), and is selected when the user accepts only the provision of information from third parties.

A person who wants to participate in the position auction selects one of the direct trade button 106 and the information trade button 107, and then selects one of the selection buttons 100 to 102 associated with an article or a service (for example, allocation of a taxi, collection/delivery service, or the like) for which the person wants to participate in the auction. The selection button 102 is effective only for the "information trade". The position auction HP is also provided with options 108 for a client to select a normal auction in which the client bids off an article or a service or a counter-auction in which the client bids off a buyer of an article or a service. For example, a customer who wants the allocation of a taxi or a collection/delivery car may select the "auction", while a taxi company or a collection/delivery service company may select the "counter-auction" for obtaining a customer. Finally, an "established" button 130 is selected after all selections required on the position auction HP have been made.

A mobile body which is allocated to a customer or to a predetermined place near the customer is not limited to such vehicles as a taxi and a collection/delivery car, but may be any mobile body such as a helicopter, an airplane and so on.

In the following, the position auction will be explained for an example in which the button "taxi" 101 is selected on the position auction HP specifically about the screens and processing procedures provided for the position auction. Assume, for example, that a client (customer) selects the button "taxi" 101 to display the taxi allocation screen F illustrated in FIG. 19 on the screen of the terminal 30, and enters required items on the screen F. Specifically, the screen F is provided with a GPS button 91 for specifying a position at which the customer takes a taxi, a telephone number entry field F1, and a character entry field F2. The screen F is also provided with entry fields F3 to F6 for entering customer feature communication, desired take time (within how many minutes), number of passengers, and destination; a rank button 92 for specifying a taxi rank (large, middle, small, rate rank, and so on); and an ID number entry field F7. It should be noted that the taxi allocation screen F corresponds to a request screen.

Figure 26:
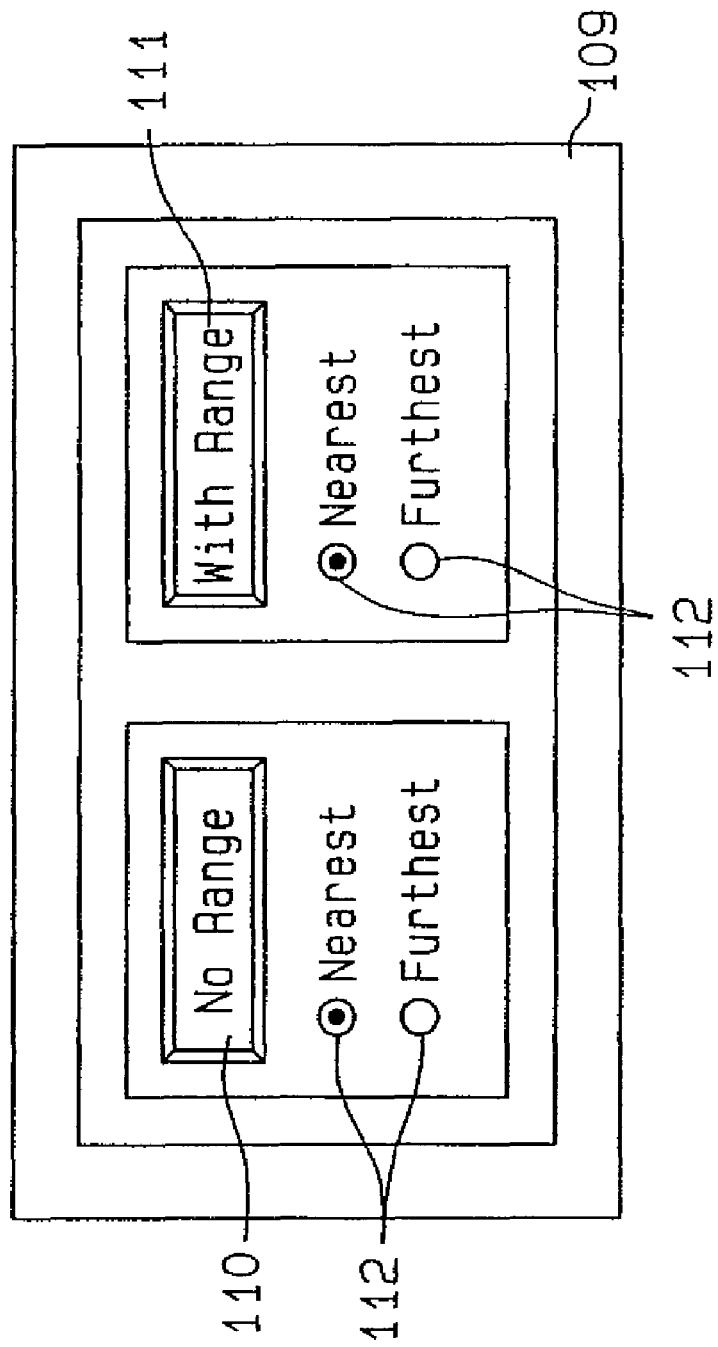
FIG. 26 illustrates a screen for selecting a range.

The screen F is also provided with a setting frame 109 as illustrated in FIG. 26 for specifying conditions on a range and position for a position at which the customer wants a taxi to come to pick up him. The setting frame 109 is provided with a "no range" button 110 and a "with range" button 111. The customer may select the "with range" button 111 when he wants to limit to those taxis which lie within a desired range from a taxi taking position. Beneath the respective buttons 110, 111, options 112 for selecting "nearest" and "furthest" are provided in the setting frame 109. When the customer selects "nearest" in the options 112, a taxi positioned nearest from a taxi taking position is bidden off, whereas when the customer selects "furthest," a taxi positioned furthest away from the taxi taking position is bidden off. A shorter waiting time is preferred when a customer requests for the allocation of a taxi, so that the selection of "nearest" is taken for granted. Therefore, if a positional condition is spontaneously limited from the characteristics of a particular service, the options 112 may be eliminated. Here, the taxi taking position specified by the customer corresponds to a desired value.

When the customer uses, for example, a portable telephone 74 supporting the GPS in order to indicate his position or a position at which he wants to take a taxi, the GPS button 91 on the screen F may be previously corresponded with the GPS, in which case GPS position data is registered (entered) and transmitted to the server 21 only by manipulating the button 91. As an alternative method of identifying a position, it is possible to enter a telephone number of the customer's residence, building or the like in the telephone number entry field F1. For example, the server 21 is connected to a system which identifies the address from the telephone number (telephone number search service company) so that the position can be identified provided that the telephone number is known. The character entry field F2 is filled with character information such as the address, place name, readily perceivable rendezvous place, or the like. The feature communication entry field F3 is filled with identifiable features of the customer.

Here, one of five types of possible bidding systems (bid conditions (successful bid priority rules)) illustrated in FIGS. 27A through 27E is determined depending on the presence or absence of a specified range and positional conditions which have been set in accordance with requirements of the customer. These five types of bidding systems will be explained below with reference to FIGS. 27A through 27E. It should be noted that a wide variety of bidding systems are provided for convenience of clients, so that some bidding systems may not be suitable for a request for the allocation of a taxi although they are also explained in the example in which a client requests for the allocation of a taxi.

Figure 27A:
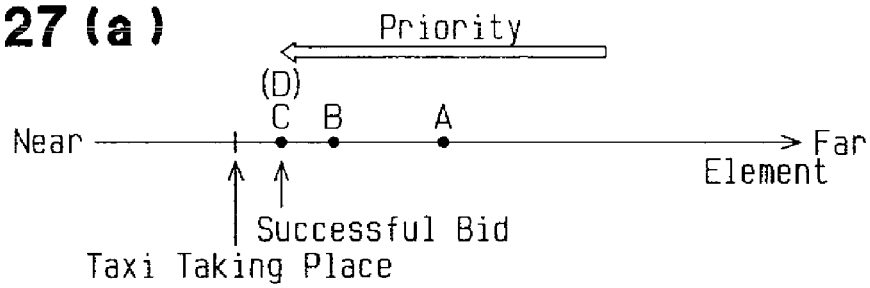
FIGS. 27A through 27E are explanatory diagrams regarding priority rules for the position auction.
Figure 27B:
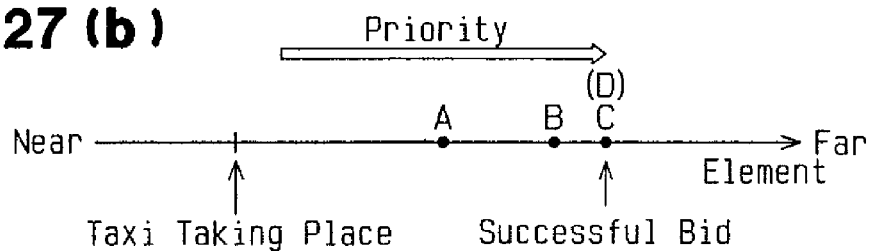

First, FIG. 27A illustrates the case where the client has set "no range" and "nearest" on the setting frame 109. This case corresponds to a priority rule which preferentially determines a party (bidder) who offers a nearest possible position to a taxi taking position specified by the client (customer) as a successful bidder. In this event, from bidders A, B, C, the bidder C who has offered the nearest position is determined as a successful bidder. FIG. 27B in turn illustrates the case where the client has set "no range" and "furthest" on the setting frame 109. This case corresponds to a priority rule which preferentially determines a party (bidder) who offers a furthest possible position to a specified taxi taking position as a successful bidder. In this case, from bidders A, B, C, the bidder C who has offered the furthest position is determined as a successful bidder.

Figure 27C:
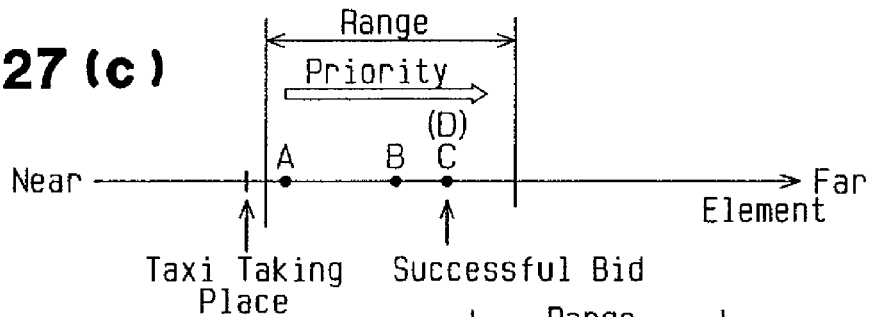
Figure 27D:
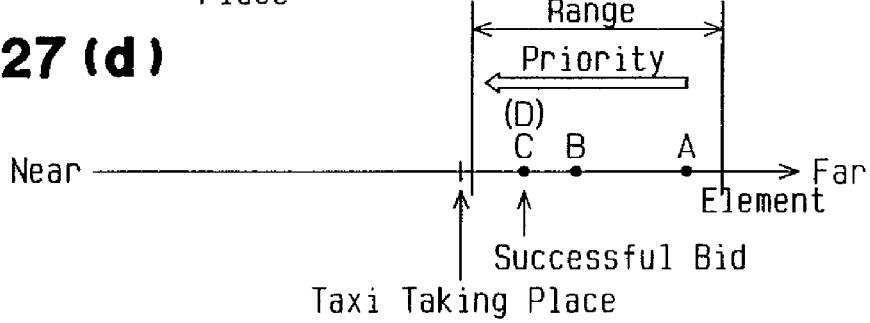
Figure 27E:
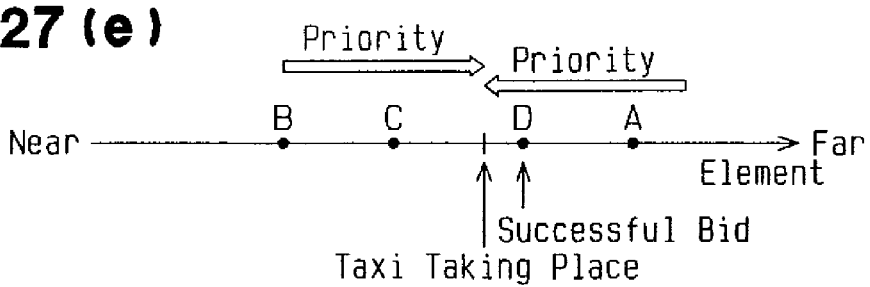

FIG. 27C illustrates the case where the client has set "with range" and "nearest" on the setting frame 109. This case corresponds to a priority rule which preferentially determines a party who offers a nearest possible position within a certain range specified by a customer. In this event, from bidders A, B, C, the bidder C who has offered the nearest position within a predetermined range is determined as a successful bidder. FIG. 27D in turn illustrates the case where the client has set "with range" and "furthest" on the setting frame 109. This case corresponds to a priority rule which preferentially determines a party who offers a furthest possible position within a certain range specified by a client. In this event, from bidders A, B, C, the bidder C who has offered the furthest position within a predetermined range is determined as a successful bidder. FIG. 27E illustrates a priority rule which preferentially determines the party who offers the nearest position from a specified taxi taking position as a successful bidder irrespective of whether it is from the near side or from the far side from the taxi taking position. In this event, from bidders A, B, C, D, the bidder D who has offered the nearest position is determined as a successful bidder.

It should be noted that in the bidding systems illustrated in FIGS. 27A through 27E, if a plurality of bidders fall under successful bidders (the bidder C or D shown in the respective figures), the bidders are narrowed down based on predetermined rules, later described. In this embodiment, assume that the customer selects the "no range" button 110 on the setting frame 109 illustrated in FIG. 26, and then selects "nearest" from the options 112 so that the customer selects the taxi 76 that is nearest to a position at which the customer wants to board a taxi.

After entering required items on the taxi allocation screen F, as the client selects a transmission button 93 to transmit the entered items, bid information data D9 as bid request information comprised of the entered required items as data contents is transmitted to the server 21 through the Internet N. Alternatively, the input device 71 provided for the auction management system 20 may be used to manually enter a variety of conditions for the allocation of a taxi which may be received from the telephone 80 (see FIG. 15). The bid information data D9 received by the server 21 is stored in the article management DB 23. Specifically, reference position data such as a taxi taking position specified by the customer, positional condition data (range, positional conditions, and so on), and so on within the bid information data D9 are stored in the position bid data storage unit 85A.

In addition, since a plurality of competing taxis satisfy most the positional conditions so that a customer cannot narrow down to one taxi as the case may be, the narrow-down data storage unit 85B previously stores narrow-down condition data which allows the customer to finally determine as a successful bidder a taxi which is favorable to the customer in terms of services and so on. In this embodiment, when a plurality of taxis are at the same distance from a taxi taking position of a customer within a predetermined allowable range (this range may be set by the customer) so that these taxis compete for the customer, they are narrowed down to one by adding a narrow-down condition. The server 21 stores a variety of data related to rating systems and services of respective taxi companies in the database 22, and reads the narrow-down condition from the database 22 when a plurality of taxis are at the same distance from a taxi taking position within the allowable range, to automatically identify a taxi which provides good services, offers a lower rate and satisfies the narrow-down condition, and determines this taxi as a successful bidder.

The server 21 executes the auction program at all times when it is operating to widely promote taxi companies to participate in the position auction by offering requirements of a customer on the personal computers 72 in the respective taxi companies through the internet N based on the bid information data D9 received from the customer. On the other hand, the personal computer 72 in each of the taxi companies is operating at all times, and upon receipt of new auction information, notifies the operator (personal computer manager) to that effect through sound, display or the like. In this event, displayed on the personal computer 72 is the auction participation screen G similar to that illustrated in FIG. 20, provided from the server 21. It should be noted that this auction participation screen G corresponds to a bid screen.

The auction participation screen G illustrated in FIG. 20 is provided with display fields G1 to G5 for offering customer information such as the position of a customer (a place at which the customer wants to take a taxi) as a desired value (a reference position); the number of passengers; a specified rank of taxi; destination; the time at which the customer wants to take a taxi; and so on. The auction participation screen G is also provided with a map display field G6 which displays a map around the place at which the customer is present. The position at which the customer is present (the place at which the customer wants to take a taxi) is indicated on the map (a black circle on the map in FIG. 20), such that the position at which the customer is present can be visually confirmed in a specific manner on the map. The screen G is also provided with entry fields G7, G8 for entering "taxi position" and "situation." For participating in the auction, there is a time limit in order not to have kept the customer waiting for a taxi to the utmost, so that a time display field G9 is also provided for showing a remaining time. For participating in the auction, each taxi company (auction participant) should have entered required data in the entry fields G7, G8 within a time limit and select a participation button 94. By selecting the participation button 94, bid data D10 as bid information comprised of information entered on this screen G is transmitted to the server 21. The bid data D10 is stored in the database 24.

The personal computer 72 of each taxi company keeps track of the positions and situations of all the taxis 76 belonging to the company, and identifies an appropriate taxi 76 which can arrive at the customer in the soonest time from these data and the place at which the customer is present (taxi taking place). Then, the operator of the personal computer 72 enters the position and situation of the extracted taxi 76 in the entry fields G7, G8 and participates in the bid in the name of the taxi 76, such that the taxi 76 is determined as a successful bidder. The situation refers to a situation of the taxi (in a mission, on the move to a customer, during washing, lack of gasoline, during supply of gasoline, and so on), a situation of a driver (taking a break, at meal, and so on), and so on. If a taxi will delay in arriving at a customer even if the taxis is located near the customer, the taxi should notify the situation which accounts for the delay. While the situation may be entered by typing on a keyboard, each of a variety of situations has previously been assigned a code for faster auction processing in this embodiment, so that the taxi company enters code data in the entry field G8. The code data indicates the type of situation, and a required time taken therefor, for example, in minutes.

In this embodiment, situation data is automatically captured into the personal computer 72 without burdening a driver or a manager of the taxi company. The personal computer 72 in each taxi company captures situation data, after converted into a digital form, through the transceivers 75, 77 from each of taxis 76 belonging to the taxi company via radio communications. The situation data detected by a variety of sensors mounted in the taxi 76 is automatically transmitted to the personal computer 72 in sequence together with position data making use of a program or the like. The personal computer 72 identifies eligible taxis 76 from the position and situation data captured from the respective taxis 76, and the manager views a list in which candidate taxis are enumerated, for example, in the ascending order of eligibility on the screen of the personal computer 72 to determine a taxi 76 which participates in the position auction. In this event, selection of a taxi on the list may cause the position and situation data associated therewith to be automatically entered in the respective entry fields G7, G8.

Alternatively, it is also possible to automatically register an eligible taxi 76 identified by the personal computer 72 in the entry fields F7, F8. In this event, the entry field F8 displays character information indicative of a situation corresponding to a code, wherein the code data may be transmitted to the server 21 such that the manager can readily confirm the situation. Of course, the situation data received from the respective taxis 76 via a radio communication may be manually entered by the manager of each taxi company into the personal computer 72. Further, the situation data may be presented to the server 21 in character information (text data or the like).

Also, in this embodiment, the situation data requested to the taxi companies is limited to a taxi situation and a driver situation which only the taxi companies can know, while a road situation (under construction, traffic jam, accident, and so on) is traced by the server 21. The server 21 sequentially receives road information from the transport management organization for management purposes to keep track of the traffic amount and construction information on a route from the position of each taxi to a taxi taking position of the customer within the bid information.

Also, the server 21 converts the situation data into a required time for eliminating the situation, and further converts the required time for eliminating the situation to a distance to derive a correction distance which is reflected to the actual position of the taxi to correct the position of the taxi. In other words, a delay due to a certain situation is converted into a correction distance, and the actual position of the taxi is shifted away by this correction distance. The resulting position is re-calculated as the distance which is offered when the taxi participates in the auction. The server 21 calculates the distance on the map between the position of each taxi and a taxi taking position based on the position data of the taxi in consideration of the situation.

Then, the server 21 identifies the taxi 76 which is positioned nearest from the taxi taking position of the customer using the bid data received from the personal computers 72 in the respective taxi companies (or portable information terminals (for example, mobiles, portable telephones, and so on) of owner-driver taxis) in consideration of the position and situation included in the bid data. It should be noted that data entered in the entry fields G7, G8 on the participation screen G correspond to position conversion information which is converted to a position (element).

Next explained is a method of identifying the taxi 76 which is positioned nearest from a taxi taking position of a customer. The server 21 calculates a point-to-point distance on a map based on respective data of the position at which each taxi 76 is positioned (the position after taking into consideration the situation) and the position at which the customer wants to take a taxi. For example, as illustrated in FIG. 21A, when a total of four taxis 76, Z1, Z2, Z3, Z4 participate in a bid for a customer who is waiting for a taxi 76 at a Y point, the server 21 calculates the distances a, b, c, d between the respective taxis Z1, Z2, Z3, Z4 and the customer. In this event, while direct distances may be used, this embodiment uses distances on the map for calculating more exact distances. It should be noted however that in FIG. 21A, the distances are schematically represented by linear lines. In the position auction, the server 21 compares these distances and determines the taxi at the shortest distance from the customer as a successful bidder for the customer. When a plurality of taxis are at the same distance from a taxi taking position of a customer within a predetermined allowable range so that these taxis compete for the customer, the server 21 narrows down to one taxi under a narrow-down condition in consideration of rating systems and services of respective taxi companies to automatically identify as a successful bidder a taxi which provides good services, offers a lower rate, and satisfies the narrow-down condition, and determine this taxi as a successful bidder.

Upon determination of the taxi 76 which is positioned nearest from the position at which the customer wants to take a taxi as the successful bidder, the server 21 notifies the personal computer 72 of the taxi company, to which the winning taxi 76 belongs, of the fact that the taxi 76 was determined as a successful bidder, and of other required items such as features (signs) of the customer and so on through a communication via the Internet N or the like. The taxi company, upon receipt of the notification of the successful bid, informs the pertinent taxi 76 to that effect, causing the taxi 76 to urgently go to the place specified by the customer. The customer, in turn, is notified through the Internet N of the company name, scheduled arrival time and so on of the taxi which is directing urgently to the specified place.

Alternatively, a taxi company may act as a client which requests for collection of customers in a position auction to conduct a normal auction in which customers make a bid. Specifically, a taxi company, which has been registered as a user, selects a customer who is present nearest from a present position of a free taxi 76 through the position auction. The taxi company may also select a customer who takes a taxi to the furthest destination through the position auction. In this event, a dealer request procedure screen is provided corresponding to the screen F of FIG. 19, wherein the taxi company selects "furthest" as a positional condition.

As a result of an auction, information on a single successful bidder is basically transmitted to the client. However, if the client wishes, a plurality of narrowed down candidates may be presented, as illustrated in a list screen XB of FIG. 29. Specifically, the server 21 creates information provided by bidders, as it is, into a list, or creates a priority list by narrowing down successful bidder candidates of higher priority levels, for example, into a limited number specified by the client, based on information offered by bidders, and transmits the created list to the terminal 30 of the client. Then, the list XB illustrated in FIG. 29 is displayed on the terminal 30 of the client. The screen XB is provided with a list XB1, an entry field XB2 for selecting a successful bidder, and a decision button 113.

The list XB1 indicates a priority number, a code number, and a position, reference information (information offered by bidders such as a rating system (price), and offered services (supplementary items and so on)). The client reviews the positions and reference information of respective taxis in the list XB1 on the screen XB to determine a taxi favorable for him as a successful bidder, enters, for example, the priority number (or the code number) of the winning taxi in the entry field XB2, and selects the decision button 113. In response, the server 21 notifies the client and the successful bidder of the successful bid. When the list XB1 can be viewed on the terminal 30 of the client, the client can select a taxi which is favorable for him in terms of other reference conditions such as the rating system, services and so on, other than the position, if a plurality of taxis offer the same positions within an allowable range, or can select a taxi which is favorable for him in terms of the rating system and services even if the taxi is slightly further away from the customer than other taxis.

Next, the flow of the position auction will be explained with reference to FIG. 31. It should be noted that the procedure flow does not necessarily show a processing procedure of the server 21 but shows a procedure (flow) of the entire position auction including communications between taxi companies and an intermediary company.

First in step (hereinafter simply denoted as "S") 701, a taxi taking position of a customer is entered.

In S702, a positional condition for the taxi taking position of the customer is entered. It should be noted that the procedure in S701 and S702 for displaying a request screen on the terminal of the customer, and receiving data entered on the screen at the server 21 corresponds to a request procedure.

In S703, it is determined whether or not a customer has made a request. If so, the procedure flow continues to S704.

In S704, a position auction is started. Specifically, data such as location data of the customer is delivered to the respective terminals 30.

In S705, the position of each taxi is entered.

In S706, condition information is entered. Specifically, entered in S706 are a car situation such as in a mission, during washing, lack of gasoline, during supply of gasoline, and so on, and a situation of a driver such as taking a break, at meal, and so on. It should be noted that the procedure of starting the auction to display the request screen on the terminal of the customer in S704 and receiving the data entered in S705 and S706 at the server 21 corresponds to a bid procedure.

In S707, it is determined whether or not there are applications to the position auction. In other words, it is determined whether or not there are bids from bidders. When no bid is applied, the server 21 waits for bids. On the other hand, when there are bids, the procedure flow continues to S708. A procedure from S707 to S715 corresponds to a bid acceptance procedure.

In S708, road information is entered. Specifically, road information from the transport management organization (information on traffic jam, under construction, accident and so on) is entered. Alternatively, the road information in S708 may be entered from the personal computer 72 in the taxi company as the request procedure.

In S709, the position correction processing is executed. Specifically, a required time for eliminating each situation is converted into a distance based on situation data to correct the position of each taxi.

In S710, the bid processing is executed with the position. Specifically, a priority order is determined for bidders as trading partners in accordance with the taxi taking position condition entered in S702 (the priority rules in FIG. 27).

In S711, it is determined whether or not a limited time has expired. When within the limited time, the procedure flow returns to S707 to repeat the processing from S707 to S710 to execute the bid processing each time a new bidder applies, until the limited time expires. At the expiration of the limited time, the procedure flow continues to S712.

In S712, it is determined whether or not a bid-off self selection is set. The procedure flow continues to S713 when the bid-off self selection is not set, and to S714 when the bid-off self selection is set.

In S713, narrow-down processing is executed. Specifically, a bidder who has offered the position which most meets requirements of the user (client) is bidden off as a trading partner.

On the other hand, if it is determined in Step S712 that the bid-off self selection is set, the list screen XB illustrated in FIG. 29 is displayed in S714 for enumerating bid information of a predetermined number of bidders in a list form. The user can view the list screen XB by selecting a screen display after entering a password on the screen of the terminal 30. The list screen XB enumerates candidates in a priority order in terms of the position (displayed as the code number), so that the user can determine a trading partner while referencing other information offered by the bidders. As the user determines a trading partner, the user enters the associated code number in the successful bidder selection entry field XB2 and then selects the decision button 113. The information on the successful bidder selected by the user is transmitted to the server 21 through the Internet N.

In S715, it is determined whether or not a successful bidder has been determined. This list screen XB is continuously displayed (S714) until the user determines a successful bidder, and the procedure flow continues to step S716 when a successful bidder is determined.

In S716, the server 21 notifies both the user and the successful bidder of the establishment of the trade.

Explained next is a position auction with a mobile body (taxi) on the move.

If a taxi can catch a customer in the midway to a destination, or if a collection/delivery car can collect extra parcels on a scheduled collection/delivery route, customers or parcels can be more efficiently acquired. Also, from the customer side, it is possible to take a taxi in a sooner time. For purposes of realizing such convenience, it is the on-the-move position auction that is provided for bidding off a vehicle on the move which is running nearest from a customer (FIG. 21B) or for bidding off a customer who takes a taxi at the nearest location from a route along which the taxi is moving (FIG. 29). In this on-the-move position auction, a customer only needs to specify a place (taxi taking position) and a time at which a customer wants to use a taxi such that a taxi is allocated to him at the specified place and time, while the taxi may be far away from the customer at the time of the auction.

Figure 30:
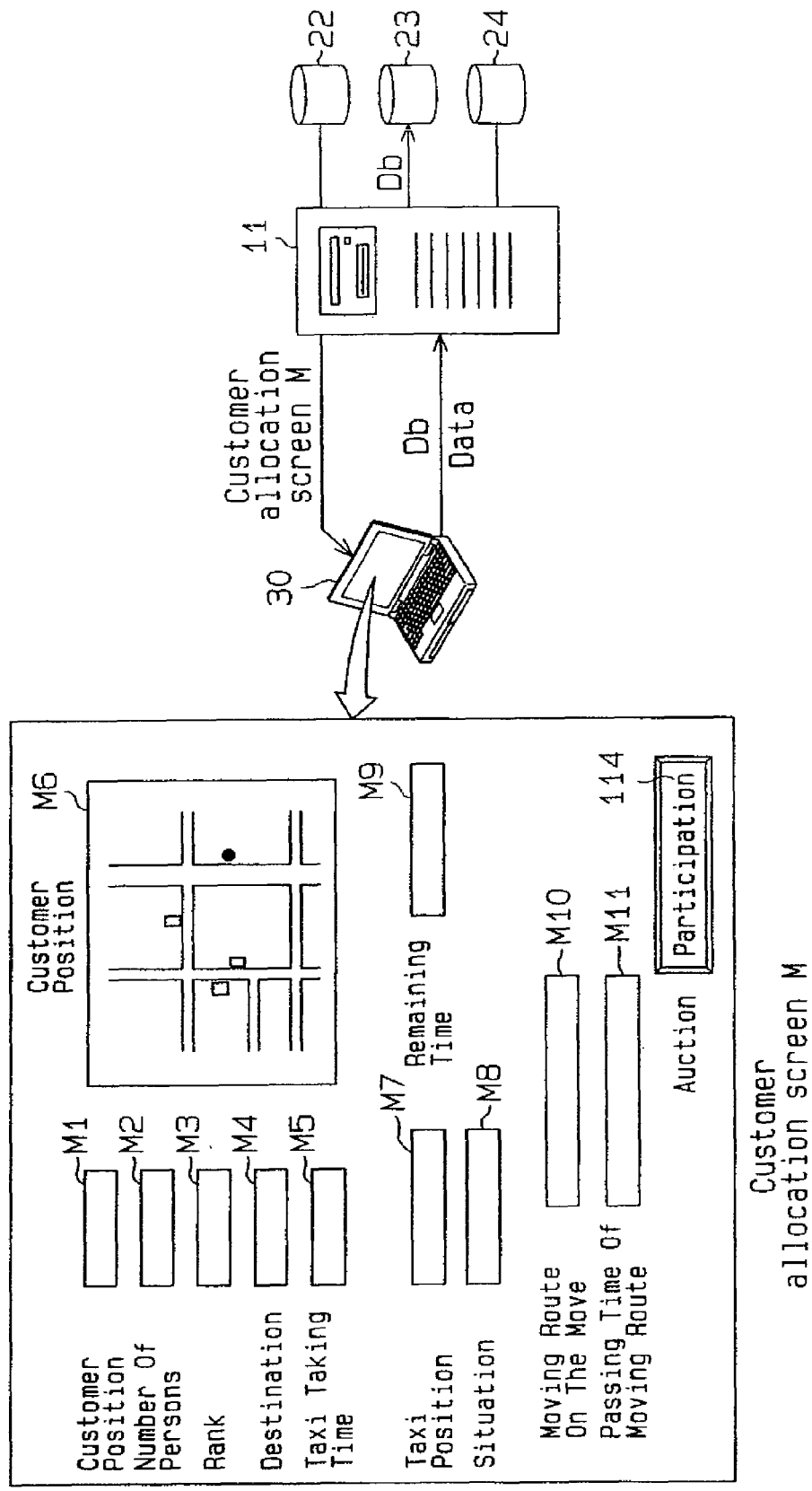
FIG. 30 illustrates a screen for confirming a customer in the on-the-move position auction.

Now, explanation is given of the position auction of the form illustrated in FIG. 29 for bidding off a customer who takes a taxi 76 at the nearest position from a route along which the taxi is moving. While a variety of programs stored in the memory for the server 21 to conduct the on-the-move auction are basically similar to those used in the position auction, a customer allocation screen M illustrated in FIG. 30 is displayed in the on-the-move auction. Assume herein that customers have already reserved for a bid for allocation of a taxi.

The customer allocation screen M is provided for display fields M1 to M5 for offering customer information such as a position of a customer (a place at which the customer wants to take a taxi) as a desired value (a reference position); the number of passengers; a specified rank of taxi; destination; the time at which the customer wants to take a taxi; and so on. The customer allocation screen M is also provided with a map display field M6 which displays a map around the place at which the customer is present (map information). The position at which the customer is present (the place at which the customer wants to take a taxi) is indicated on the map (a black circle on the map in FIG. 30), such that the details on the position at which the customer is present can be visually confirmed on the map. The screen M is also provided with entry fields M7, M8 for entering "taxi position" and "situation". For participating in the auction, there is a time limit in order not to have kept the customer waiting for a taxi to the utmost, so that a time display field M9 is also provided for showing a remaining time. It should be noted that the customer allocation screen M corresponds to a request screen.

Additionally, the screen M is also provided with an entry field M10 for entering information for identifying a route on which a taxi is moving, and an entry field M11 for entering information as to at which time the taxi passes along the route (for example, a position data at a certain time). A taxi company (auction participant) which participates in the auction enters required data on the screen M within the time limit, and selects a participation button 114. In response, bid data Db as bid request information comprised of the contents of data entered on the screen M is transmitted to the server 21.

The server 21 relies on a similar technique to that used for the position auction to identify which taxi 76 will pass a road closest to a place specified by a customer at a time specified by the customer from the moving route data and moving time data which have been converted from taxi taking position data of the customer and the moving route of the taxi 76. When a taxi company bids off a customer, a taxi (or a collection/delivery car) bids off a customer who is present nearest from the taxi after a predetermined time. On the other hand, if a customer bids off a taxi, the customer bids off a taxi which passes nearest from the customer after a predetermined time. It should be noted that information for identifying a moving route on which a taxi is moving, and information as to at which time a taxi passes the moving route also constitute converted information.

More specifically, when a taxi 76 bids off a customer, the following method is used for identifying the customer. As illustrated in FIG. 29, assume that customers are located at four points Z5, Z6, Z7, Z8, and a taxi 76 passes along a path illustrated in FIG. 29. In this event, the taxi 76 bids off a customer who is present at a position nearest from a Y point at time t. The value of the time t can be arbitrarily set irrespective of on the taxi company side or the customer side.

On the other hand, when a customer bids off a taxi 76, the following sequence is taken. As illustrated in FIG. 21B, when three taxis 76 (Z1, Z2, Z3) move along respective routes shown in the figure, respectively, the server 21 calculates places (positions indicated by broken lines in the figure) passed by the respective taxis 76 on the move at a time t, and the customer bids off a taxi 76 which passes the place nearest from a Y point at which a customer is present at the time t. In the example illustrated in FIG. 29 or 21B, one of the customer and the taxi 76 which is present nearest from the other at the time t bids off the other. Here, the taxi position at time t is the position after a correction in consideration of the situation and so on of the taxi 76. Therefore, in this case, the bid is conducted with the corrected taxi position by converting a traffic situation, taxi situation and so on to a distance. A pure position auction may be conducted instead to determine a successful bidder simply by comparing the position of the taxi with the position of the customer.

Figure 31:
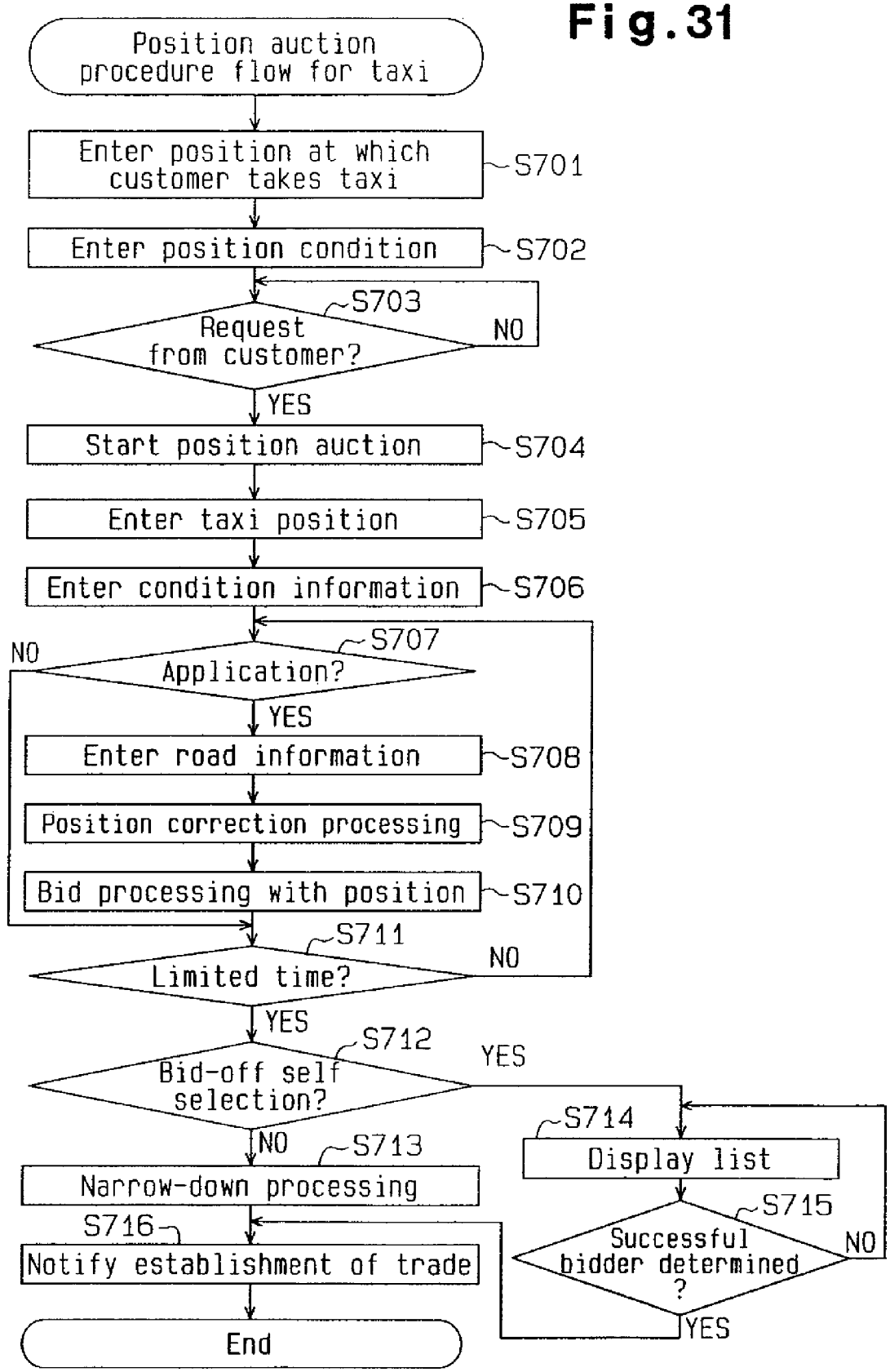
FIG. 31 is a flow chart illustrating a position auction procedure.

Basically, a procedure flow of the on-the-move position auction is substantially similar to the flow of the position auction illustrated in FIG. 31. However, the on-the-move position auction differs in that, because the taxi position at the time t is employed, the taxi position at the time t is calculated based on information for identifying a moving route along which the taxi is moving, and information as to at which time the taxi passes a certain point on the moving route to conduct the auction with the calculated position. Specifically, when a taxi bids off a customer, advanced bids are collected before the position auction is started in S704, and the position of a taxi, condition information, information for identifying a moving route along which the taxi is moving, information as to at which time the taxi passes a certain point (for example, a start point) on the moving route, and so on are entered to find the position of a taxi at the time t based on the respective data. Then, in steps subsequent thereto, a bid is conducted based on information of a customer who acts as a bidder to determine a successful bidder.

On the other hand, when a customer bids off a taxi, the information on a moving route along which a taxi is moving, information as to at which time the taxi passes the moving route, and so on are also entered, for example, in S706 in FIG. 31. Then, the position of taxi, after correction, at the time t estimated from the moving route is employed as position data. Then, in the bid processing in S710, a priority order is determined for a plurality of taxis 76 who have participated in the bid in an order from the taxi which passes the road nearest from the customer. Thus, the customer bids off the taxi 76 that is nearest to the corrected position, in consideration of the situation in addition to the position, to the position of the customer.

As appreciated from the foregoing, the following advantages are provided according to the third embodiment.

(7) With the employment of the position auction in which a client offers a trading position condition such that bidders compete the trading position for a trading partner, the client can find a trading partner who satisfies requirements of the client in accordance with his personal circumstances with respect to the trading position.

(8) With the employment of the on-the-move position auction in which a client offers a trading position condition such that bidders compete the trading position for a trading partner in consideration of a moving distance of a mobile body (taxi or the like), the client can find a trading partner who satisfies requirements of the client in accordance with his personal circumstances with respect to the trading position even if the mobile body is on the move.

Fourth Embodiment

Next, a fourth embodiment will be explained with reference to FIGS. 24 and 32 through 36. The fourth embodiment differs from the foregoing embodiments in that "information" is traded in a position auction.

The position auction according to the fourth embodiment is adapted to conduct a bid for information with a position indicated in the information. Here, an explanation is given of an example, illustrated in FIG. 24, in which a "school of fish" button 102 is selected on the position auction HP. A position auction for a school of fish is conducted to bid off information on the position of a school of fish which is nearest from the position of a fishing boat. Specifically, a fishing boat may provide fishermen and fishing boats with information on signs of fish which is not a target of the fishing boat itself but may be intended, for example, by other fishing boats, other than fish which is captured by the fishing boat. In this event, fishing boats and so on which expect such information generally want information on signs of fish nearest from them.

More specifically, a ship which has information on signs of fish provides the information to a server 21 in an intermediary company through the Internet N. For example, fishermen and fishing boats may use the position auction to look for any useful information on the fishing from nearby ships. Then, the server 21 widely provides terminals 30 of third parties with such an outline of information that let the third parties understand to which the information is related. A third party which views the outline makes dealing procedures to buy the information through the terminal 30.

Figure 32:
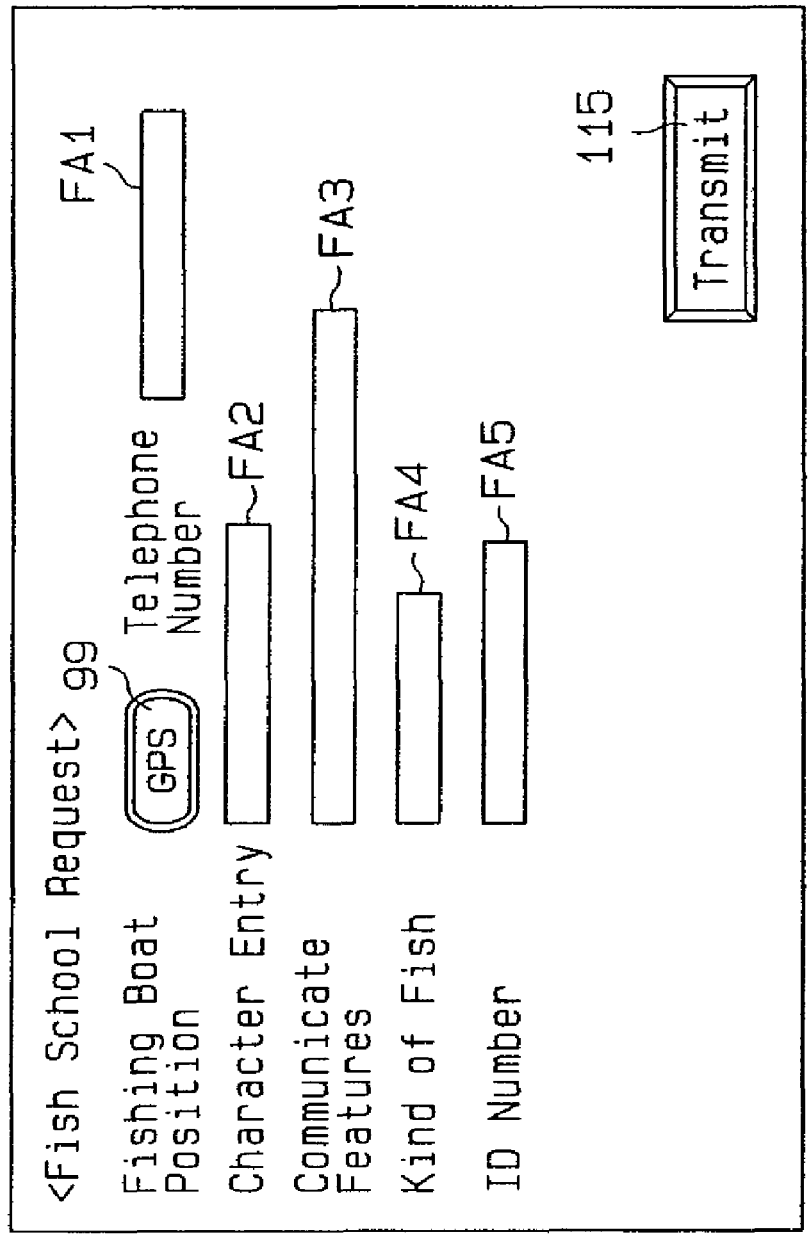
FIG. 32 illustrates a screen for providing information on a school of fish according to a fourth embodiment of the present invention.

For example, as a client (requester) selects the "school of fish" button 102, a fish school information requesting screen FA illustrated in FIG. 32 is displayed. Specifically, the screen FA is provided with a GPS button 99 for specifying the location of a client (for example, a fishing boat), a telephone number entry field FA1, a character entry field FA2, and so on. The screen FA is also provided with an entry field FA3 for entering notifying the characteristics of the fishing boat, an entry field FA4 for entering the kind of fish to be caught, an ID number entry field FA5, and so on. Further, though not shown, the screen FA is provided with a setting frame 109 illustrated in FIG. 26 for setting the presence or absence of a range, and selecting nearest or furthest from the location of the fishing boat as well. Then, as the client selects a transmission button 115, bid information data D11 as bid request information entered on the screen FA is transmitted to the server 21, and stored in the article management DB 23. It should be noted that the fish school information requesting screen FA corresponds to a request screen.

Figure 33:
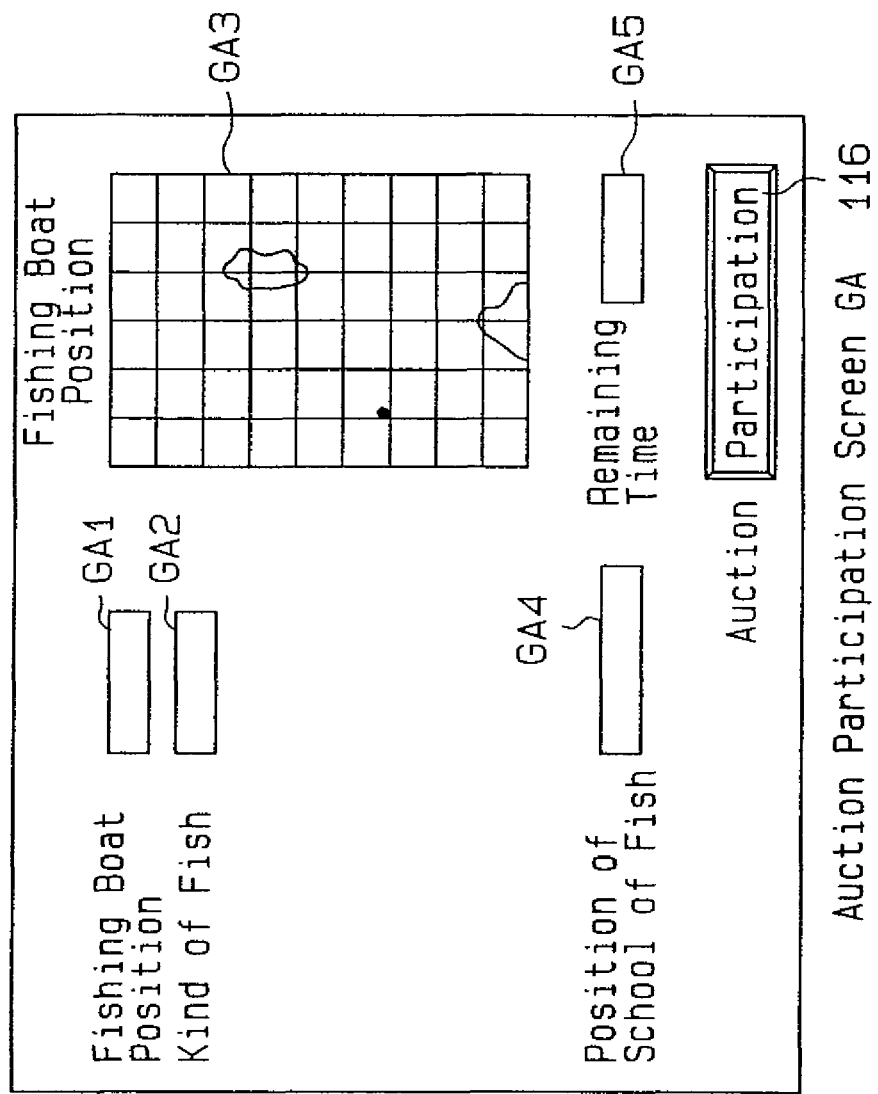
FIG. 33 illustrates a screen for participating in an auction.

Upon receipt of new auction information, the server 21 notifies the terminals 30 of third parties (personal computers, portable telephones and so on), which have been registered as users in the server 21, to that effect through sound, display or the like. Then, for participating in the position auction by providing information on the position of a school of fish, an auction participation screen GA illustrated in FIG. 33 is provided from the server 21 and displayed on the terminal 30. It should be noted that the auction participation screen GA corresponds to a bid screen.

The auction participation screen GA illustrated in FIG. 33 is provided with a display field GA1 for providing a customer information such as the position of a fishing boat, and a display field GA2 for displaying the kind of fish desired by the client. The screen GA is also provided with a chart display field GA3 which displays therein a chart around the position at which the fishing boat is present. The position of the fishing boat is displayed on the chart, so that the details on the position of the fishing boat can be visually confirmed on the chart. The screen GA is also provided with an entry field GA4 for entering "position of school of fish." Then, as a participant enters required data in the entry field GA4 within a time limit indicated in a display field G5 and selects a participation button 116, causing fish school position data D12 to be transmitted to the server 21 and stored in the bid management DB 24 as bid information.

Figure 34:
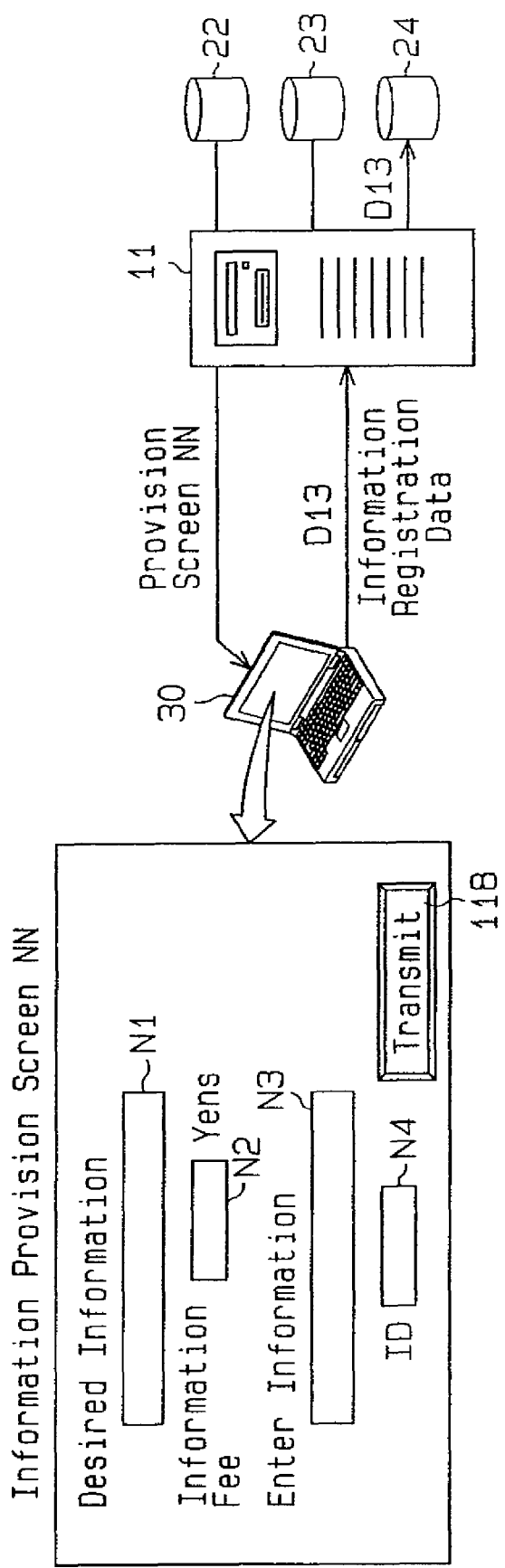
FIG. 34 is an explanatory diagram regarding registration of information.

Alternatively, an information registration screen NN illustrated in FIG. 34 may be displayed by selecting an "information registration" button 117 on the position auction HP in FIG. 24 to previously enter information on the position of a school of fish on the screen NN. The screen NN is provided with a display field N1 for displaying desired information, a display field N2 for displaying an information fee, and so on. The screen NN is also provided with an information entry field N3 and an ID number entry field N4. Such information providers should be limited to those who have registered as users in order to ensure the reliability of the information provided by them. As an information provider enters required items in the entry fields N3, N4 and selects a transmission button 118, information registration data D13 as bid information entered in the entry field N3 on the screen NN is transmitted to the server 21 and stored in the bid management DB 24. The information provider uses an authentication number when utilizing the position auction.

Then, the server 21 identifies information on the position of a school of fish which is situated nearest from a ship by using the information received from the respective terminals 30 and performing predetermined processing on the received information. Alternatively, instead of a normal auction in which a customer ship such as a fishing boat bids off information on the position of the nearest school of fish, a counter-auction may be conducted such that a fishing boat at the position nearest from the position of a school of fish is provided with information on the position of the school of fish (which may include a fishery right and so on).

Figure 35:
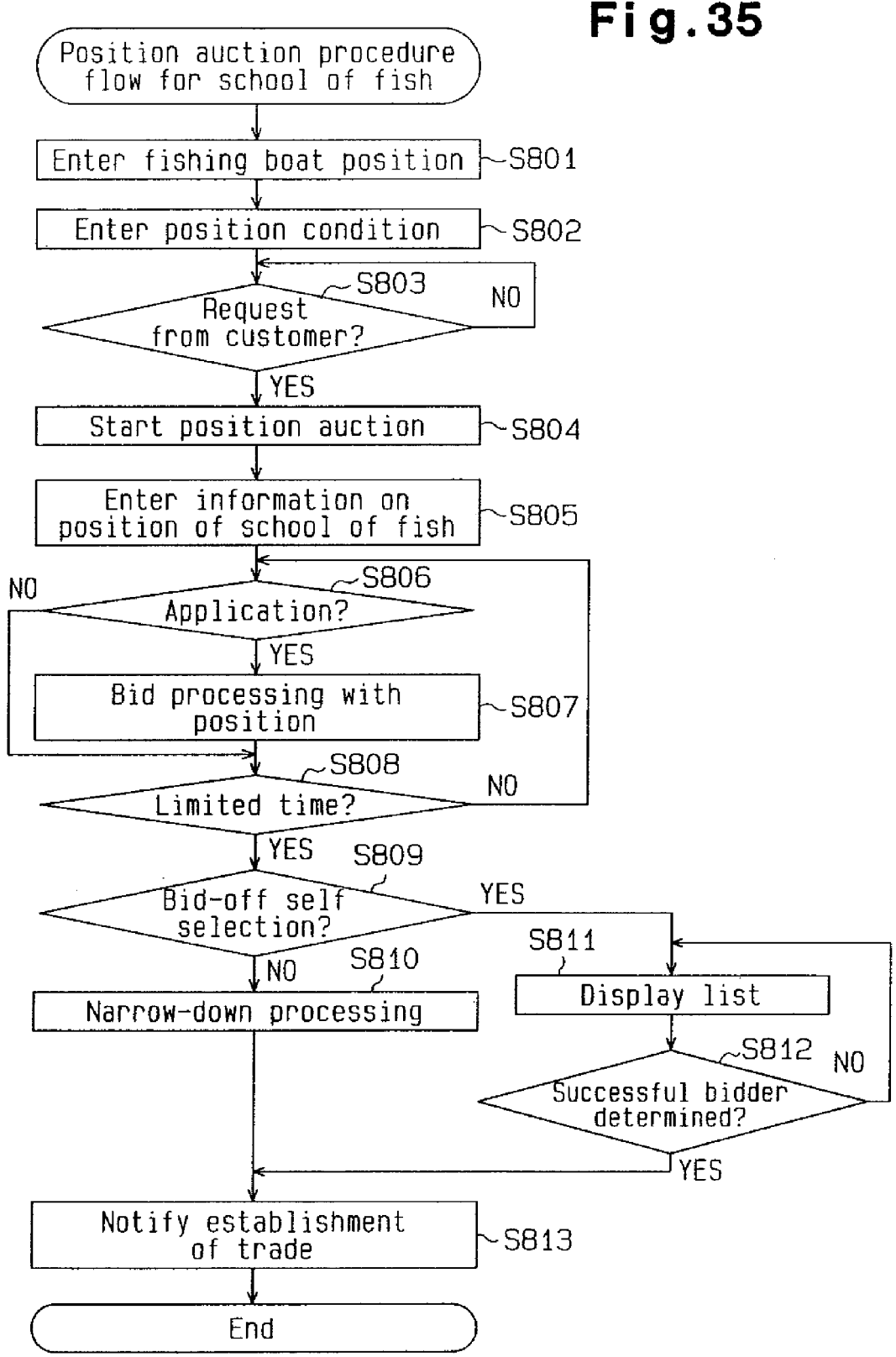
FIG. 35 is a flow chart illustrating a position auction procedure.

Next, a procedure flow of the position auction will be explained with reference to FIG. 35. It should be noted that the procedure flow does not necessarily show a processing procedure of the server 21 but shows a procedure (flow) of the entire position auction including communications between a fishing boat and an intermediary company.

First, in S801, the position of a fishing boat is entered.

In S802, a positional condition for the position of the fishing boat is entered. It should be noted that a procedure in S801, S802 wherein the request screen is displayed on a terminal 30 of a client, and the server 21 receives data entered on the screen, corresponds to a request procedure.

In S803, it is determined whether or not a customer has made a request. If a request has been made, the procedure flow continues to S804.

In S804, the position auction is started. Specifically, data such as the data on the position of the fishing boat is delivered to respective terminals 30.

In S805, bidders (participants of the bid) enter information on the position of a school of fish. It should be noted that a procedure of starting the auction and displaying the bid screen on the terminals 30 of the bidders in S804, and receiving the entered data at the server 21 in S805, corresponds to a bid procedure.

In S806, it is determined whether any application has been made to the position auction. In other words, the presence or absence of a bid from a bidder is determined. If there is no bid, the server 21 waits for bids. If there is a bid, the procedure flow continues to S807. It should be noted that a procedure executed from S806 to S812 corresponds to a bid acceptance procedure.

In S807, bid processing is executed with the position. Specifically, in comparison with the positional condition (the priority rules in FIG. 27) for the position of the fishing boat entered in S802, a priority order is determined for the bidders as trading partners.

In S808, it is determined whether or not a limited time has expired. When within the limited time, the procedure flow returns to S806 to repeat the processing in S807, S808 to execute the bid processing each time a new bidder applies, until the limited time expires. At the expiration of the limited time, the procedure flow continues to S809.

In S809, it is determined whether or not a bid-off self selection is set. The procedure flow continues to S810 when the bid-off self selection is not set, and to S811 when the bid-off self selection is set.

In S810, narrow-down processing is executed. For example, when a plurality of fish school position information compete, successful bidders are narrowed down with reference to the kind of fish, density of signs of fish and price of the information.

Figure 28:
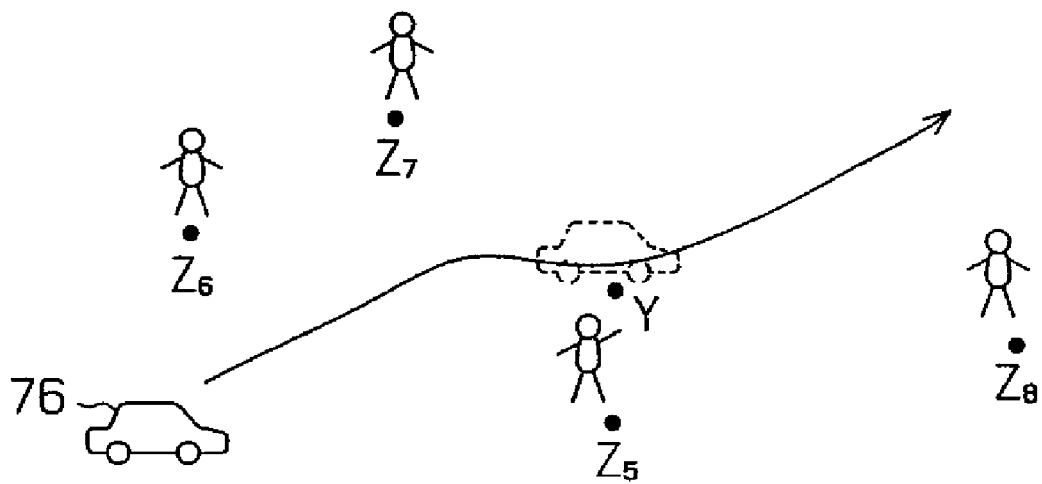
FIG. 28 is an explanatory diagram regarding the on-the-move position auction.

On the other hand, if it is determined in S809 that the bid-off self selection is set, a list screen similar to the list screen XB illustrated in FIG. 28 is displayed in S811 for enumerating bid information offered by a predetermined number of bidders in a list form. The user can view the list screen by selecting a screen display after entering a password on the screen of the terminal 30. The list screen enumerates candidates in a priority order in terms of the position (displayed as the code number), so that the user can determine a trading partner while referencing other information offered by the bidders.

In S812, it is determined whether or not a successful bidder has been determined. The list screen XB is continuously displayed (S811) until the user determines a successful bidder, and the procedure flow continues to step S813 when a successful bidder is determined.

In S813, the server 21 notifies both the user and the successful bidder of the establishment of the trade. Consequently, the fishing boat can obtain information on the school of fish positioned at the shortest distance from the fishing boat.

The position auction according to this embodiment is not limited to a taxi (allocation of a taxi or the like) and a school of fish, but may be extended to the articles and services assigned to the buttons 100 which are selected on the position auction HP illustrated in FIG. 24. Specifically, a predetermined button 100 is selected on the position auction HP to open an entry screen for a client to enter a position, desired information on the position, and so on. Then, from bidders who participate in the auction, a trading partner which is nearest (or furthest) from the position specified by a client, or information on the trading partner may be selected through the position auction.

Figure 36:
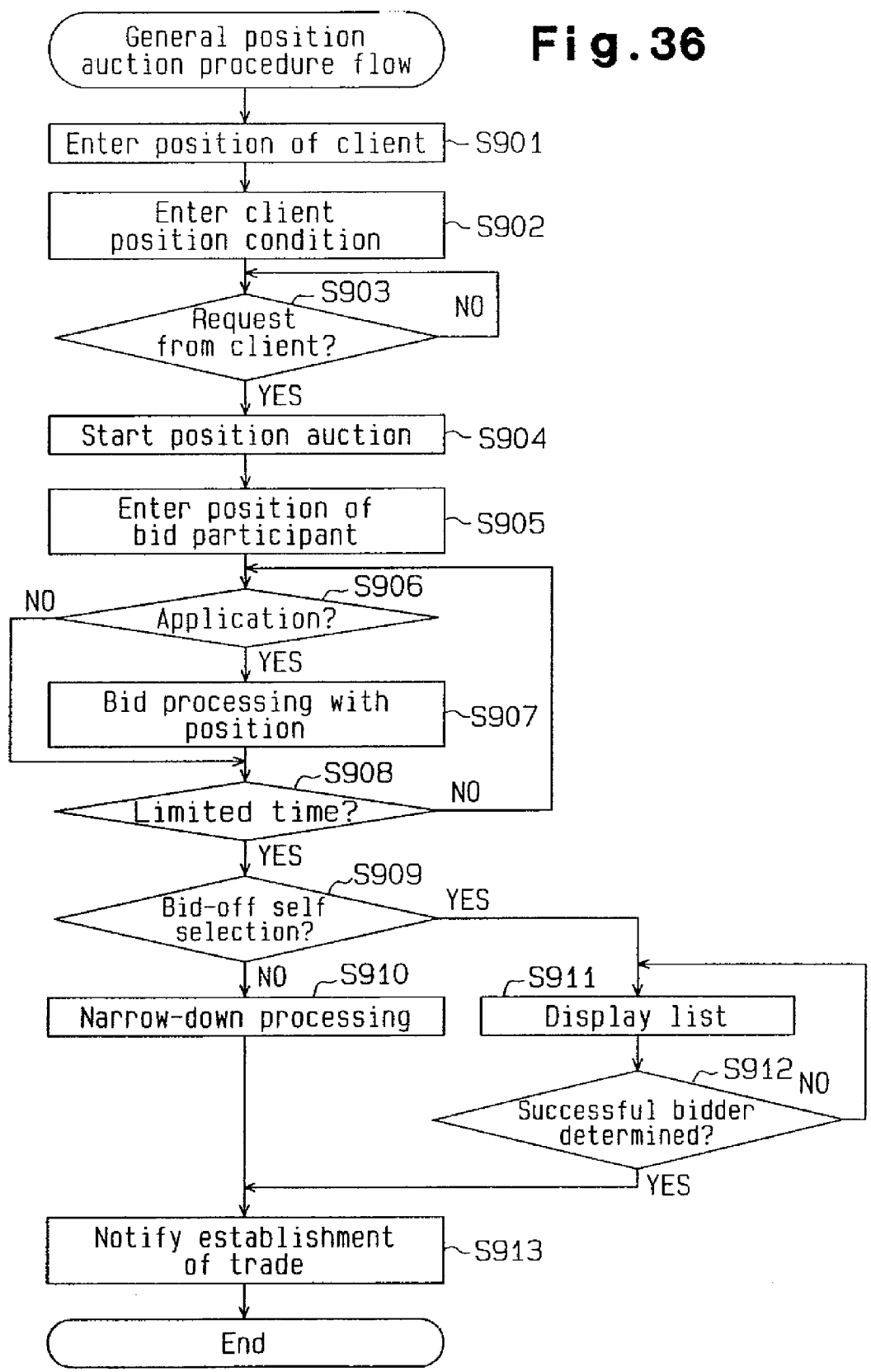
FIG. 36 is a flow chart illustrating a general-purpose position auction procedure.

In this event, the auction is conducted in accordance with a procedure flow illustrated in FIG. 36. Specifically, in S901, the position of a client is entered, and in S902, a positional condition desired by the client is entered. Then, it is determined in S903 whether or not there is a request from the client. If there is a request, the position auction is started in S904. In S905, the position of a bidder is entered, and it is determined in S906 whether or not there is an application to a bid. If so, bid processing is executed with the position in S907. Next, it is determined in S908 whether or not a time limit expires. S906 and S907 are repeated if the time limit does not expire in S908.

Then, it is determined in S909 whether or not a bid-off self selection is set. When the bid-off self selection is not set, narrow-down processing is executed in S910 to enumerate bidders in a priority order from the one who most satisfies the requirements of the client and determine a successful bidder as a trading partner. Conversely, if the bid-off self selection is set in S909, a list screen similar to that of FIG. 28 is displayed in S911. Then, in S912, the client bid off a bidder who satisfies the desired condition as a trading partner while viewing the list screen. In S913, the server 21 notifies both the client and the successful bidder of the establishment of the trade. Listed below are other specific examples for which a procedure flow illustrated in FIG. 36 may be used.

A counter-auction may be conducted such that a collection/delivery dealer collects a load. Specifically, a client can select a load which is nearest from the position of a collection/delivery worker, a collection/delivery car, collection/delivery ship, a collection/delivery airplane, or the like, or information associated therewith through the position auction.

A button may be selected from "toilette", "gasoline", "food", and "antique object" on the position auction HP illustrated in FIG. 24 to select a sales man, a sales place, a provider, a providing place, or the like of a requested object (gasoline, agricultural product, toilette, ukiyoe, or the like) which is nearest from a place at which a person who purchases or desires such requested objects is present, or a place specified by the person, or information associated therewith through the position auction. Alternatively, a counter-auction may be conducted such that the foregoing sales man, sales place, provider, providing place or the like of the required objects enumerated above collects a person who purchases or desires such requested objects. In other words, a client can select a person who purchases or desires the object of interest nearest from a sales man of the object or from a place at which a provider of the object is present, or information on him through the position auction.

By selecting the "service" button on the position auction HP illustrated in FIG. 24, it is possible to select a provider of a service or the like (right of using the service or the like) nearest from a place at which a person who desires the service or the like is present, or a specified place, or information on the service provider trough the position auction. Alternatively, a counter-auction may be conducted such that a service provider collects a person who desires a service of interest or the like. In other words, a person who provides a service of interest or the like may select a person who desires the service or the like nearest from him, or information on the person through the position auction.

By selecting one from the buttons "accommodation", "restaurant", "store", and "service place" on the position auction HP, a person who is looking for such facilities may select the business office (right of utilizing a service of interest or the like) located nearest from him, or information on the business office through the position auction. Alternatively, a counter-auction may be conducted such that a client can select the customer who is present nearest from a hotel, a restaurant, a store, a service place, or the like, or information on the customer through the position auction.

By selecting one from the buttons "hospital", "dentist", "clinic", and "beauty salon" on the position auction HP, a patient, an injured person, a customer, or the like who is looking for such facilities can selects a hospital, a dentist, an acupuncturist, a moxa-cauterizer, a massager, a chiropractic clinic, a beauty salon, and so on (in other words, a right of utilizing a service), located nearest from such a requester, or information on such facilities through the position auction. Alternatively, a counter-auction may be conducted such that a doctor, a dentist, an acupuncturist, a moxa-cauterizer, a massager, a chiropractic therapist, a beauty culturist, or the like can select a patient, a person who desires a service of interest, or the like and is present nearest from him or her, or information on such person through the position auction.

By selecting a button "satellite communication" on the position auction HP, a client can select the space satellite which is located nearest from a satellite reception facility, a receiver, or the like, or information on the space satellite through the position auction. Alternatively, a counter-auction may be conducted such that a client can selects a satellite reception facility, a receiver, or the like located nearest and available for receiving information (signal) transmitted from the space satellite, or information on the facility through the position auction.

By selecting a button "investigation" on the position auction HP, a client can select a space satellite, a helicopter, an investigation cat, an investigator, or the like which is located nearest from a place to be investigated, or information on such items through the position auction. Alternatively, a counter-auction may be conducted such that a client can selects the place to be investigated nearest from a space satellite, a helicopter, an investigation car, an investigator, or the like, or information on the place through the position auction.

By selecting one from buttons "repair", "snow-removing" and "volunteer" on the position auction HP, a client can select a person nearest from a requester who requests for repair, snow-removing, volunteer (helper), or the like and who accepts such a request, or information on the person through the position auction. Alternatively, a counter-auction may be conducted such that a client can select the requester who is present nearest from a repair car, a snow thrower, a Jack-of-all-trades, or the like, or information on the requester through the position auction.

By selecting a button "real estate" on the position auction HP, a person who desires to purchase an immovable can select the immovable located nearest from a desired place, or information on the immovable through the position auction. In this event, if bidders are collected after accepting a request from a person who desires to purchase an immovable, it is possible to more effectively select a desired immovable.

By selecting one of buttons "guard" and "disaster prevention" on the position auction HP, if an abnormal alarm is notified, or if a fire detector or a crime prevention system operates, or if a monitor perceives an abnormal situation, it is possible to select notification to a guard company, a disaster prevention security company, a guard man, a crime prevention person, or the like nearest from the site, ordering of the guard or crime prevention, or information thereon through the position auction.

By selecting a button "animal related items" on the position auction HP, an animal hospital, an animal hotel, or the like nearest from a place in which a pet or an animal is present, or information on such facility can be selected through the position auction.

The position auction is not limited to selection of the person (trading partner) who is present nearest from a place at which a requester (for example, a client) is located and accepts a request, or information on the person by auction, but may be used to select a trading partner who is present at the position furthest from a place at which a requester is located or from a specified position, or information on the trading person at auction. For example, it is possible to select the agricultural products or food (articles) which are stored furthest from a place suffering from radioactive or environmental pollution, or information on such products at auction by selecting the button "agricultural products" or "food" on the position auction HP illustrated in FIG. 24.

By selecting the button "taxi" on the position auction HP, a client such as a taxi company can select the passenger who goes furthest, or information on the passenger through the position auction.

By selecting one from buttons "taxi", "bus", "train", and "air line company" on the position auction HP, a client can select a taxi, a bus, a train, an airplane, or the like which takes the client to the most remote place with a declared amount of money, or information on such transportation means through the position auction. It should be noted that the conventional auction varies a unit value of a rate, whereas the position auction according to this example differs from the conventional auction in that a transportation distance is varied with a fixed unit value of the rate.

By selecting one of buttons "telephone company" and "communication facilities" on the position auction HP, a client can select a telephone company through which the client can place a call to the most remote place or a communication facility which can transmit to the most remote place for a declared amount of money, or information on such company or facility through the position auction. This example also differs from the conventional auction in that a call or communication distance is varied with a fixed unit value of the rate.

For selecting a person who accepts a request (trading partner) through the position auction of this embodiment, the position auction is not limited to simply make a selection based on the presence at the position furthest or nearest from a requester (for example, a client). For example, it is also possible to select the trading partner who is present nearest from a location at which a client is present or a specified position, or information on the trading partner within a specified predetermined range. For example, when the client selects the "taxi" button on the position auction HP illustrated in FIG. 24 and specifies a certain predetermined range, the client can select the taxi which is positioned nearest within the range, or information on the taxi through the position auction.

When the position auction is conducted with a certain range specified with respect to the position of a client, it is possible to select a person (trading partner) who accepts a request and is present at a place furthest within the specified range, without limiting to select a person who accepts the request and is present at the place nearest within the range. For example, by selecting the "facility" button on the position auction HP illustrated in FIG. 24, a requester can select a dealer who installs a processing facility, a cemetery, a crematory, a factory, an atomic power plant, a dangerous article depository, or the like at the furthest site within a determined range from a place specified by the requester, or information on the dealer through the position auction.

By selecting the "real estate" button on the position auction HP, it is possible to select an immovable which is located at the place furthest within a determined range from a place specified by a requester, or information on the immovable through the position auction.

When a client selects a predetermined one from the buttons on the position auction HP and specifies a certain range, the client can select an immovable, a store, a hotel, a service place, a hospital, a facility, a plant, a parcel (load), crop (agricultural products or the like), and recovered article which is found nearest within the range through the position auction. Alternatively, it is also possible to select the foregoing immovable, facility and article which are found furthest within the range, or information on them through the position auction.

By selecting one of buttons "car", "ship", "air line company" and "transportation" on the position auction HP, it is possible to select a car, a ship, an airplane, transportation equipment, or the like which is positioned at the place nearest or furthest within a specified range, irrespective of a client, or information on them through the position auction.

For conducting an on-the-move position auction based on the position of a mobile body such as a taxi after moving by a predetermined distance, the mobile body is not limited to the taxi. For example, by selecting the button "school of fish" on the position auction HP illustrated in FIG. 24, it is possible to select a fishery right or provision of its information for the ship which is located nearest from a destination to which a school of fish expected by a fish tracker is expected to move through the position auction.

The mobile body is not limited to the taxi and so on, but may include a transport vehicle for transporting wastes, excrement or the like. For example, by selecting the "transportation" button on the position auction HP illustrated in FIG. 24, it is possible to select the transported article loading or unloading place located nearest from a scheduled destination of a transportation car or a transporter on the move for transporting wastes, excrement or the like, or information on such a place through the position auction.

By selecting the button "collection/delivery" on the position auction HP, it is possible to select the transported article loading or unloading place located nearest from an expected destination of a collection/delivery worker, a collection/delivery ship, a collection/delivery car, a collection/delivery airplane, or the like on the move, or information on such a place through the position auction.

By selecting an "others" button on the position auction HP, it is possible to select a buyer or a person who wants something, who is present at the place nearest from a destination to which a sales man or a provider on the move is scheduled to move, or information on such a person through the position auction.

By selecting an "association" button on the position auction HP, it is possible to select a person who desires association or a person who desires a service who is present at the place nearest from a destination to which a sociable person or a service provider on the move is scheduled to move, or information on such a person through the position auction.

By selecting one of the buttons "accommodation", "restaurant", "store", and "gasoline" on the position auction HP, it is possible to select the business office which is located nearest from a destination to which a client, on the move, looking for a hotel, a restaurant, a store, a gasoline station, is scheduled to move, or information on the business office through the position auction.

By selecting one of the buttons "gasoline", "food" and "daily necessity" on the position auction HP, it is possible to select a place at which a requested article is provided, located at the place nearest from a destination to which a client on the move who is looking for an article such as gasoline, food, thing of daily necessity, or the like is scheduled to move, or information on the place through the position auction.

By selecting the button "hospital" on the position auction HP, it is possible to select a hospital which is located at the place nearest from a destination to which an urgent patient, on the move, suffering from a disease or an injury is scheduled to move, or information on the hospital through the position auction.

By selecting the button "satellite communication" on the position auction HP, it is possible to select, in a space satellite on the move, the satellite reception facility or a receiver which is located nearest and available for receiving information (signal) transmitted from a space satellite located at a scheduled destination, or information on such a facility through the position auction.

By selecting the "guard" button on the position auction HP, it is possible to select a guard man or a tracker who is present at the place nearest from a destination to which a person on the move requested to be caught or found is scheduled to move, or information on such a person through the position auction.

By selecting a "track" button on the position auction HP, it is possible to select a space satellite, a helicopter, a tracking car, a tracker, or the like which is located at a place nearest from a destination to which an object (for example, a vehicle) on the move is scheduled to move, or information associated therewith through the position auction.

As appreciated from the foregoing, the following advantages can be provided according to the fourth embodiment.

(9) With the employment of the position auction in which a client offers a trading positional condition to bid off information from a third party trading partner, the client can obtain information which meets his own requirements in terms of a trading position in accordance with his circumstances.

Fifth Embodiment

Next, a fifth embodiment will be explained with reference to FIGS. 1, 4, 13, 24, and 37 through 45. The fifth embodiment differs from the foregoing embodiments in that an auction is conducted such that bidders compete with a numerical value as an element. The numerical value as considered for a trade of an article may include length, height, area, volume, bulk, weight, amount, and so on.

An auction system for conducting a numerical value auction is basically similar in configuration to the system illustrated in FIG. 1. The numerical value auction refers to an auction system in which numerical value requirements offered by a client are transmitted to terminals of third parties through a network to widely promote bids, and then a bid is conducted with the numerical value based on applied bid information to determine a bidder which offers the numerical value that most satisfies the requirements of the client as a successful bidder. The client's requirements include requirements offered by the client himself, and requirements previously provided by a bid intermediary dealer, taken for granted from the contents of a request from the client (a purpose of the request).

The numerical value auction is a bid for a numerical value at which both parties acting as mutual trading partners, such as a buyer and a seller, are introduced, and may be conducted for any item such as articles, services and so on. A numerical value auction is provided with a business auction for requesting for a processing facility for processing wastes or the like as a paid service, and a collection/delivery car which comes to take a parcel and so on, as later described. For example, processing dealers and collection/delivery dealers may register themselves in this numerical value auction as users to efficiently receive provision of trading partners who most satisfy their requirements through the numerical value auction.

Next, the numerical value auction will be explained in a specific manner. FIG. 1 illustrates a numerical value auction system in which one of a client and a trading partner selects the other who most satisfies a predetermined numerical value condition through a network (the Internet in this embodiment).

As illustrated in FIG. 1, an auction management system (intermediary management server system) 20 comprises a server 21 which is connected to three databases 22, 23, 24. The server 21 is connected to the Internet N, and further connected to terminals 30 of third parties for communications therewith through the Internet N. The customer terminals 30 connected to the Internet N can be communicated with the server 21. The customer terminals 30 may be a portable telephone 32 having the ability of making communications through the Internet other than a personal computer 31. The terminals 30 may be classified into those possessed and used by individuals and those for business use installed in respective companies or the like.

The server 21 illustrated in FIG. 1 stores a variety of programs for the numerical value auction in a memory. An auction program is included in these programs. This program informs information desired by a client to bidders through the internet, such that the bidders participate in the auction by providing information related to numerical values which they can provide. Then, the server 21 extracts a bidder who most satisfies requirements of the client based on the information offered by the bidders, and bids off this bidder as a trading partner.

Figure 37:
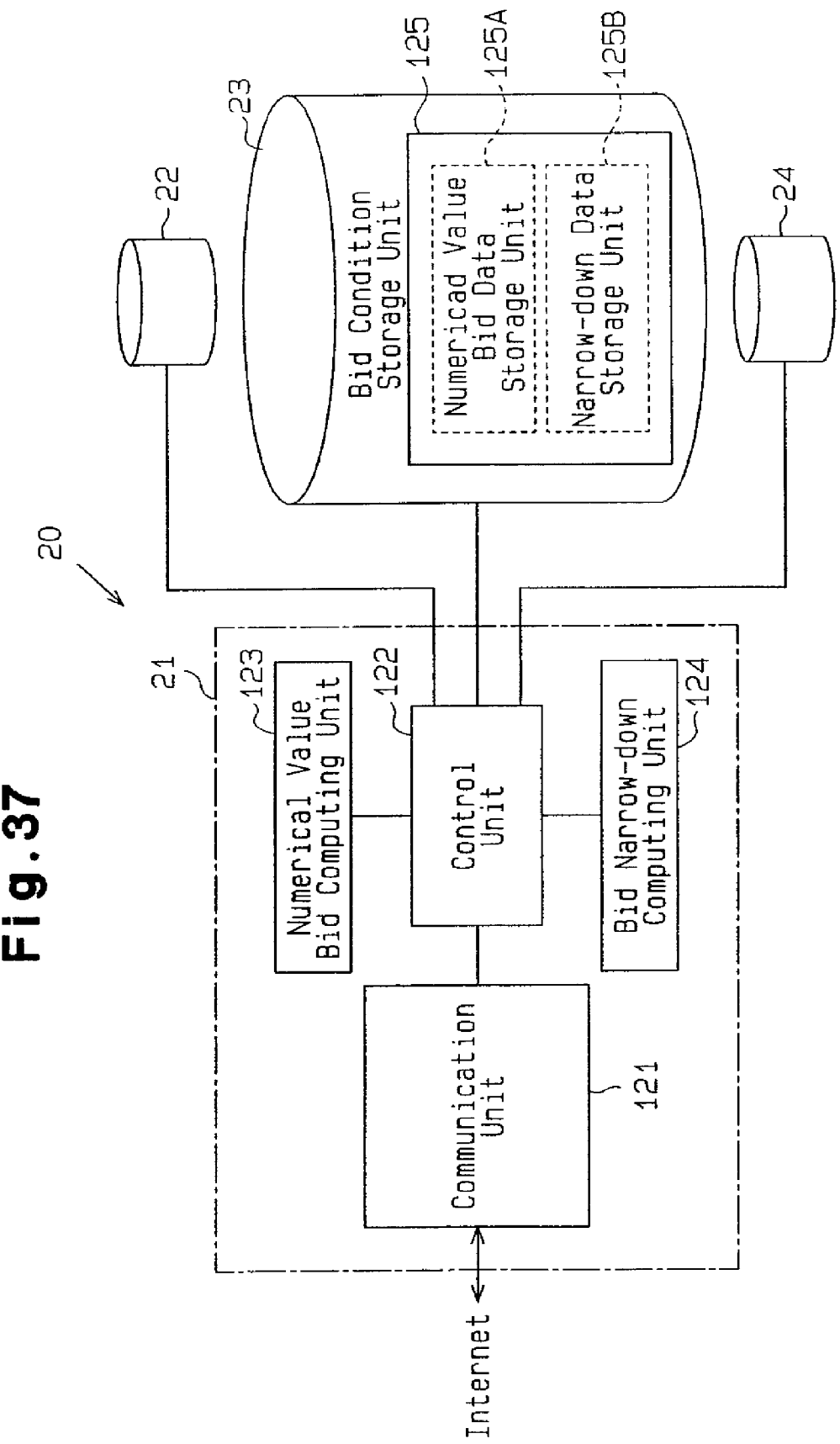
FIG. 37 is a block diagram illustrating the functional configuration of an auction management system according to a fifth embodiment of the present invention.

FIG. 37 illustrates the functional configuration of the auction management system 20. The auction management system 20 comprises a communication unit 121, a control unit 122, a numerical value bid computing unit 123, and a successful bid narrow-down computing unit 124. The communication unit 121, control unit 122, numerical value bid computing unit 123 and successful bid narrow-down computing unit 124 are implemented by the server 21. The communication unit 121 operates in accordance with a predetermined communication protocol (HTTP). Among three databases 22 to 24, an article management DB 23 comprises a bid condition storage unit 125 which is comprised of a numerical value bid data storage unit 125A and a narrow-down data storage unit 125B. The control unit 122 and the respective computing units 123, 124 are used for processing control for identifying a successful bidder in a numerical value auction, and a variety of data stored in the respective storage units 125A, 125B are used for the computing processing.

A numerical value auction home page substantially similar to the auction home page (HP) of FIG. 24 resides in the server 21. A user (client) displays the numerical value auction HP on a screen through the network N using a browser application from a terminal 30 for viewing the numerical value auction HP. A variety of screens such as the user registration screen P similar to that illustrated in FIG. 4, an article/service registration screen HA illustrated in FIG. 39, a bid form selection screen I illustrated in FIG. 39, an auction participation screen GB illustrated I in FIG. 40, and so on are linked to the numerical value auction HP. Also, a numerical value dimension selection screen J illustrated in FIG. 38 and an information provision screen NA illustrated in FIG. 42, later described, are also linked to the numerical value auction HP. The server 21 stores in its hard disk, screen data for the variety of screens P, HA, I, GB, J, NA and so on, a program for use in displaying the screens and so on (for example, an HTML description program), a program for use in computing processing involved in the numerical value auction, and so on.

As illustrated in FIG. 24, the numerical value auction HP is provided with a large number of selection buttons 100 to 102 classified into respective articles and services potentially traded in the auction. A person who wants to participate in a bid (a client or a bidder) selects a selection button 100 to 102 of a desired article/service classification. The numerical value auction HP is also provided with a "user registration" button 103 and a "request registration" button 104, such that selection of the button 103 or 104 results in the registration screen P (FIG. 4) or a registration screen HA (FIG. 39) displayed on the terminal 30, and data entered from the screen P or HA is transmitted to the server 21 to proceed with user registration or article/service registration.

As illustrated in FIG. 4, the user registration screen P is provided with options P1 for selecting a seller or a buyer, and a variety of entry fields P2 for entering address, name, telephone number, electronic mail address, sex, age, remarks, credit card number, and so on. In addition, the user registration screen P is provided with options for selecting for individual or for business, wherein, for example, a client who requests for a waste dealer or a collection/delivery dealer may select an option for the private registration, while a dealer or the like may select an option for the business registration, before entering other items for registration. When the user has entered all required items in associated fields on the user registration screen P and selects an OK button 55, the just entered user registration data D1 comprised of these items, the selected option P1, and information entered in the entry field P2 is transmitted to the server 21 through the network N and stored in the customer management DB 22 of the three databases 22 to 24. Upon confirming that the user has paid a predetermined commission (registration fee), the server 21 transmits an authentication number (ID and password) to the terminal of the registered user. The registered user uses the authentication number for utilizing the numerical value auction.

Figure 39:
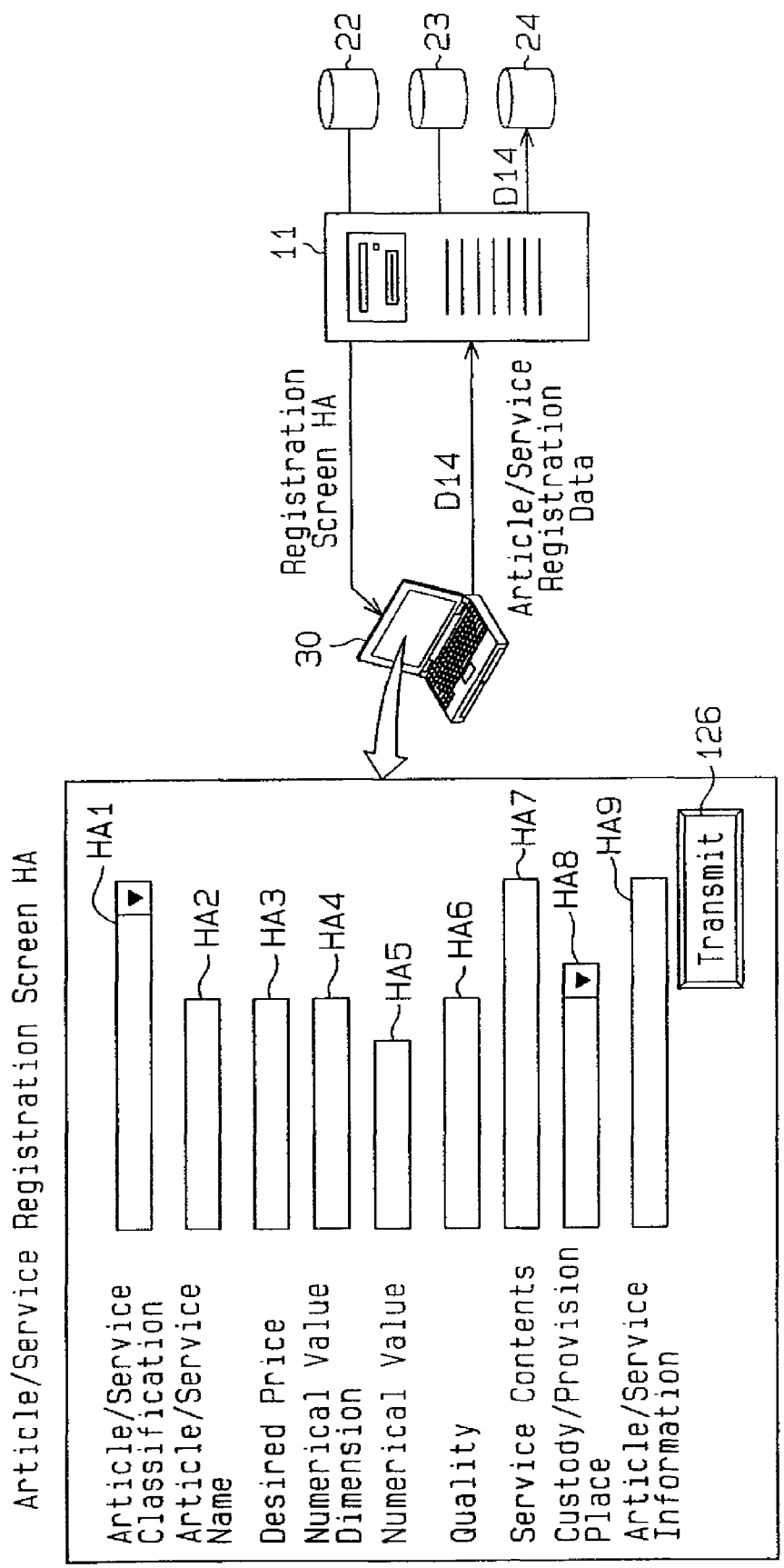
FIG. 39 is an explanatory diagram regarding registration of an article or a service.

As illustrated in FIG. 39, the article/service registration screen HA is provided with a variety of entry fields HA1 to HA9 such as article/service classifications, article/service name, desired price, numerical value dimension, numerical value, quantity, contents of service, custody/provision place (position), article/service information, and so on. The numerical value dimension entry field HA4 is filled with a dimension such as length, area, weight, amount or the like. The numerical value entry field HA5 in turn is filled with a specific value of a selected dimension. When the user has entered all required items in associated fields on the article/service registration screen HA displayed on the terminal 30 and selects a transmission button 126, article/service registration data D14 as bid information comprised of the information entered in the variety of entry fields HA1 to HA9 is transmitted to the server 21 through the network N and stored in the bid management DB 24. For example, in the case of articles such as gasoline, second hand articles and food, an auction may be conducted using bid information that is the article/service registration data D14 which has been previously registered upon acceptance of an advanced bid. In this event, the article/service registration screen HA corresponds to a bid screen.

The numerical value auction HP illustrated in FIG. 24 is provided with a "direct trade" button 106 and an "information trade" button 107. The direct trade button 106 is used for selecting an article or a service or a buyer or a seller of an article or a service directly through an auction. For example, the direct trade button 106 is used for directly bidding off a service by a collection/delivery car (collection/delivery service, or the like), an article, or the like. The information trade button 107 in turn is used when a user wants to acquire useful information on an article or a service or its provider (a manufacturer, a service company or the like), and is selected when the user accepts only the provision of information from third parties.

A person who wants to participate in the numerical value auction selects one of the direct trade button 106 and the information trade button 107, and then selects one of the selection buttons 100 to 102 associated with an article or a service for which the person wants to participate in the auction. The numerical value auction HP is also provided with options 108 for a client to select a normal auction in which the client bids off an article or a service or a counter-auction in which the client bids off a buyer of an article or a service. For example, a customer who wants the allocation a collection/delivery car or the like may select the "auction", while a collection/delivery service company may select the "counter-auction" for ensuring the customer. Finally, the client selects an "established" button 130 after he has selected a desired auction form, trading manner, and an item to be traded, respectively.

Figure 38:
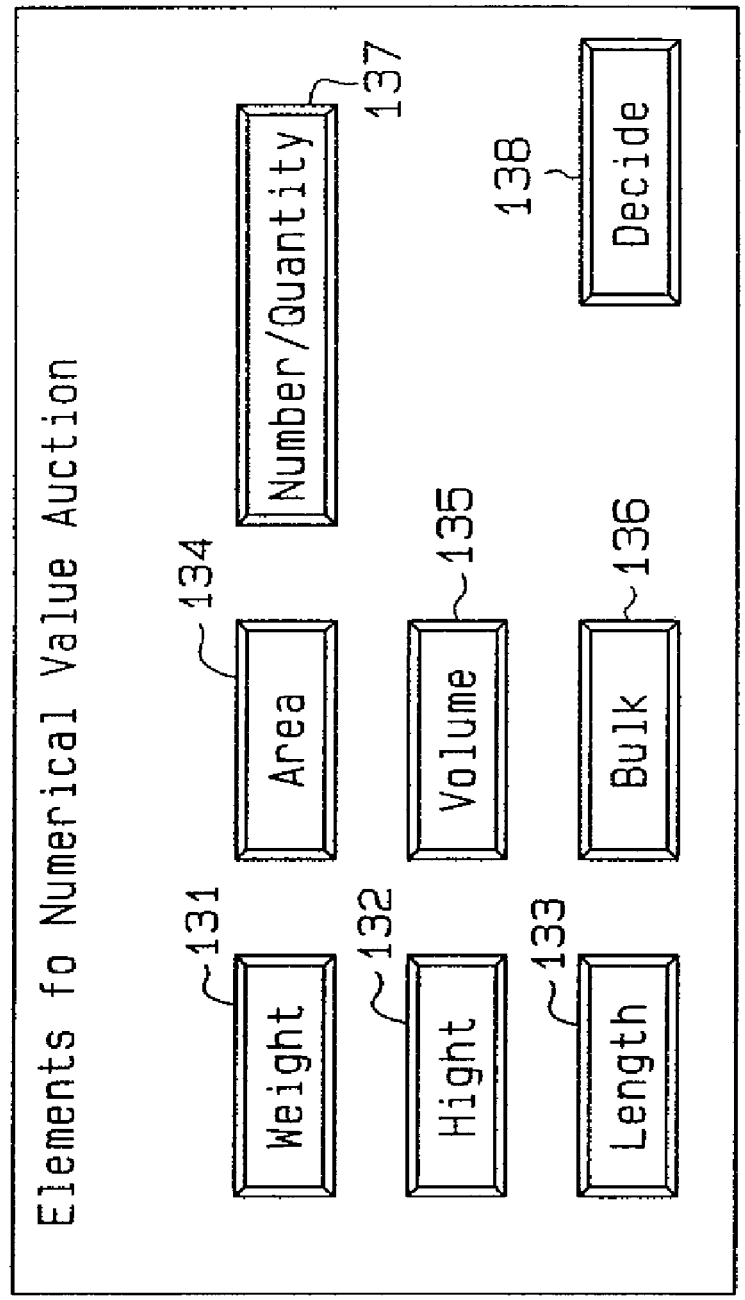
FIG. 38 illustrates a screen for selecting a specific numerical value which is displayed when a specific numerical value is selected.

In this embodiment, numerical values with which a bid is conducted may include length, height, area, volume, bulk, weight, amount, and so on, specific examples of which will be described later. Upon selecting the field of the article/service on the HP screen illustrated in FIG. 24 and then selecting specific article or service on a screen at a lower hierarchical level or the like, a numerical value dimension selection screen J illustrated in FIG. 38 is displayed. The numerical value dimension selection screen J is provided with numerical value selection buttons 131 to 137 for "length", "height", "area", "volume", "bulk", "weight" and "amount" and a decision button 138.

Figure 40:
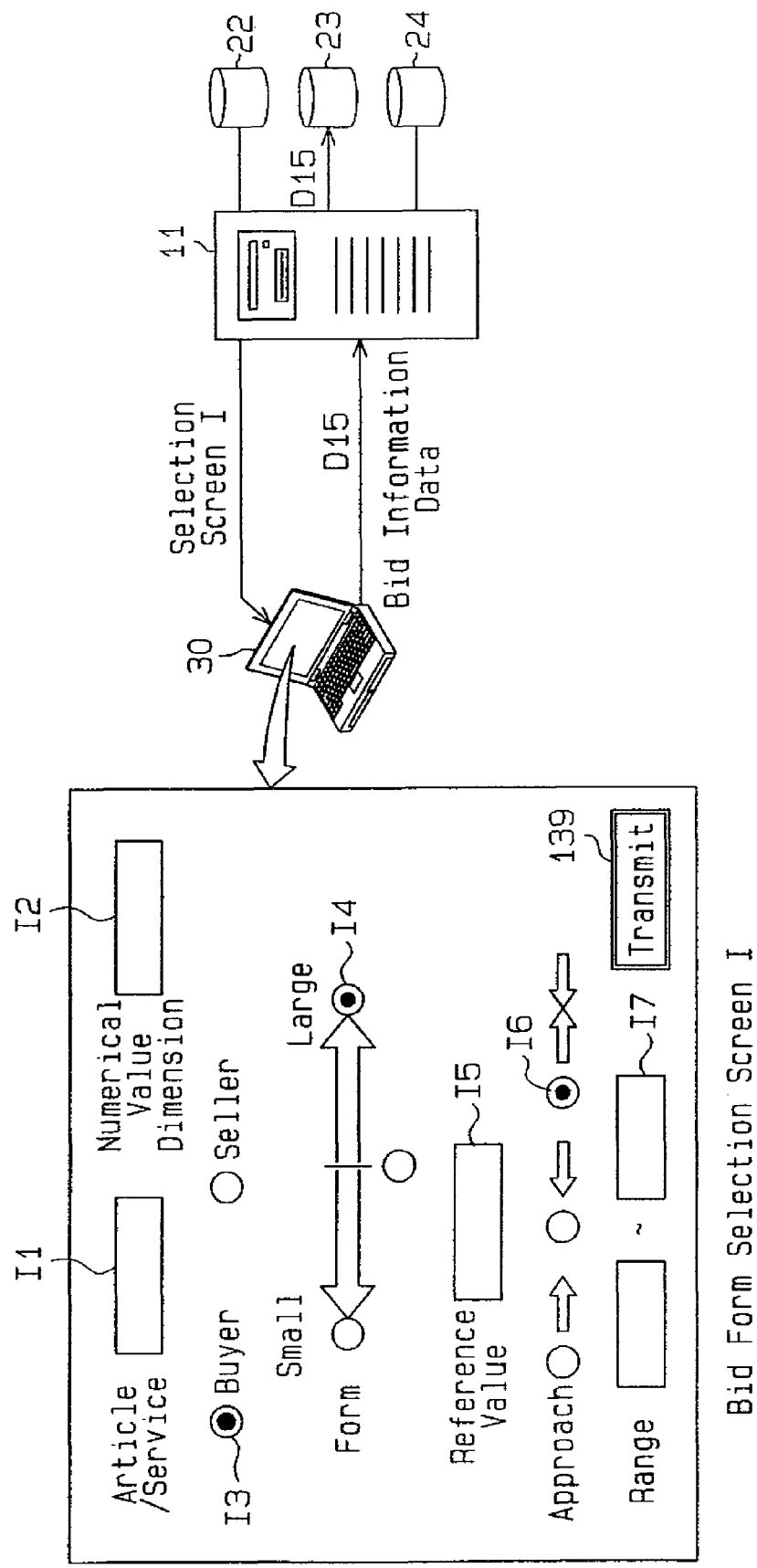
FIG. 40 is an explanatory diagram regarding selection of a bidding form.

The auction program is created such that the user can select a suitable numerical value in accordance with an article or a service which is traded by the user, and stored in the memory in the server 21. The program is illustrated in a flow chart of FIG. 46, in which a numerical value selected by the user is competed at auction. As the user selects a numerical value on the numerical value dimension selection screen J, a bid form selection screen I illustrated in FIG. 40 is displayed for selecting a bid form. It should be noted that the numerical value dimension selection screen J and the bid form selection screen I correspond to a request screen.

As illustrated in FIG. 40, the bid form selection screen I is provided with an article/service display field I1 and a numerical value dimension display field I2. The bid form selection screen I is also provided with options I3 for selecting a seller or a buyer, bid form options I4, a reference value entry field I5, an approach direction options I6, a range entry fields I7, and a transmission button 139. The bid form options I4 includes an option for specifying that a smaller value is given a higher priority level, an option for specifying a greater value is given a higher priority level, and an option for specifying a value closer to a specified reference value is given a higher priority level. The user may select one from these options.

The approach direction options I6 are provided for specifying from which direction a value should approach to a specified reference value, if any, and include an option for specifying that the reference value is approached from a smaller value direction, an option for specifying that the reference value is approached from a greater value direction, and an option for specifying that the reference value is approached from both directions. The user may select one from these options. The range entry fields I7, which are provided for specifying a range, allow the user to select only an upper limit or a lower limit or not to select a range. Bid information data D15 as bid request information comprised of the information selected in the respective options and entered in the respective fields I3 to I7 on the screen R is transmitted to the server 21 and stored in the bid information management DB 24. The reference value corresponds to a desired value. The information entered in the respective entry fields I4 to I7 corresponds to desired information.

Figure 41:
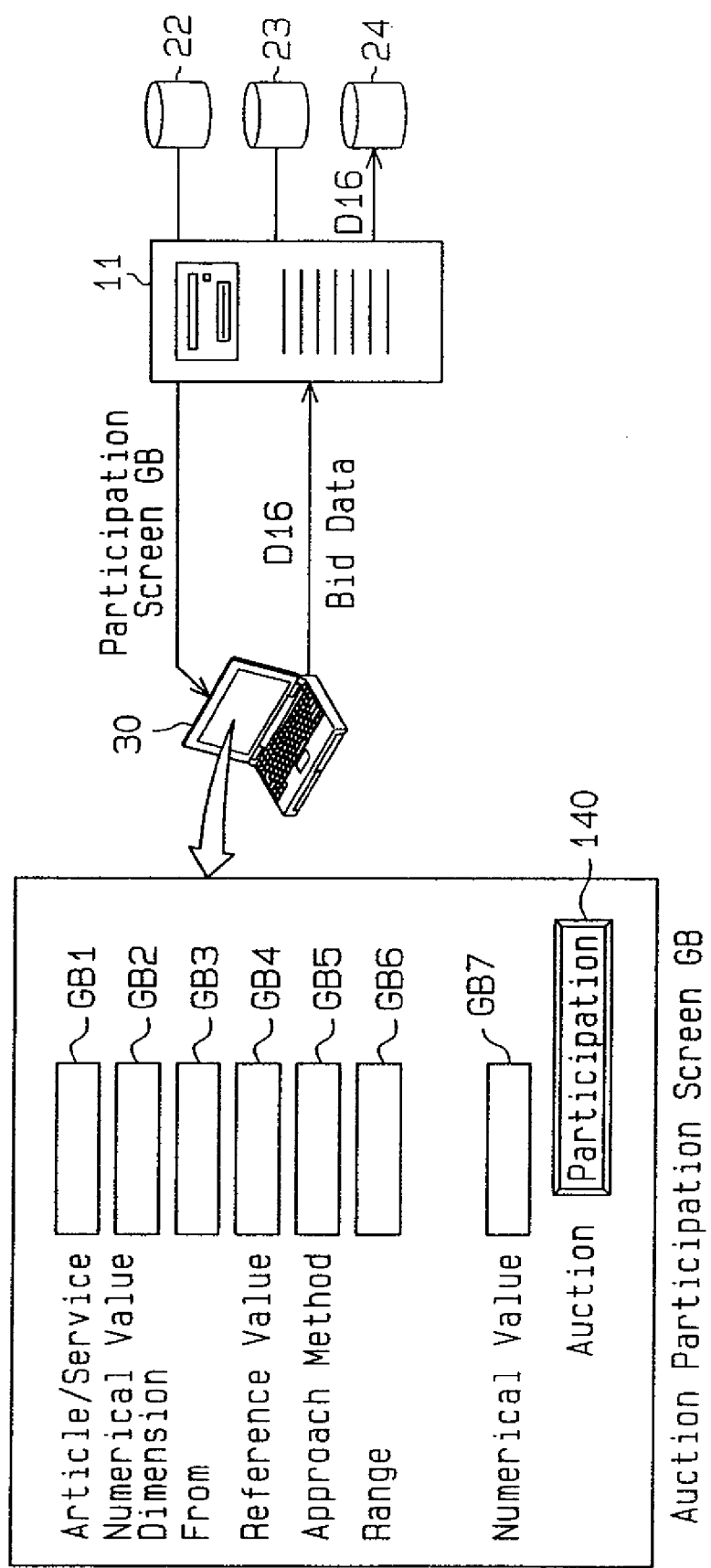
FIG. 41 is an explanatory diagram regarding participation in an auction.

Upon receipt of new auction information from a client, the server 21 transmits a notice to terminals 30 of third parties (bidders) to that effect through sound, display or the like. Then, an auction participation screen GB illustrated in FIG. 41 is provided from the server 21 and displayed on the terminals 30 of the bidders. It should be noted that the auction participation screen GB corresponds to a bid screen.

As illustrated in FIG. 41, the auction participation screen GB is provided with display fields GB1 to GB6 for displaying article/service, numerical value dimension, form, reference value, approach method, and range. The contents displayed in these display fields GB1 to GB6 corresponds to the contents entered in the respective entry fields I3 to I7 on the bid form setting screen I of FIG. 40. The screen GB is also provided with a numerical value entry field GB7 for entering a numerical value which can be offered by a bidder. As a bidder has entered a predetermined numerical value in this entry field GB7 and selects a transmission button 140, bid data D16 as bid information comprised of the information entered on the screen GB is transmitted to the server 21, and stored in the bid information management DB 24.

As illustrated in FIGS. 44A through 44E, five types of bids are available for the numerical value auction. Specifically, since a numerical value representing any of length, area, weight, amount and so on can be placed on a coordinate axis, a reference value is set on the coordinate axis such that rules are defined as to how a bid is conducted, i.e., whether a closest possible value is preferentially selected or whether a furthest possible value is preferentially selected.

FIGS. 44A through 44E are diagrams for explaining the types of the numerical value auction. For representing the dimension of a numerical value in accordance with the numerical value in a numerical value form, numerical values may be classified into concepts of incremental values and concepts of decremental values. For example, far, large, wide, long, heavy, many and so on are concepts of incremental values, while near, small, narrow, short, light, few and so on are concepts of decremental values. The bid form refers to the rules as to whether the largest one of offered numerical values and so on is determined as a successful bid; or whether the smallest one is determined as a successful bid; or whether a value coincident with or closest to a reference value specified by a customer is determined as a successful bid. There are the following five types of bids.

Figure 44A:
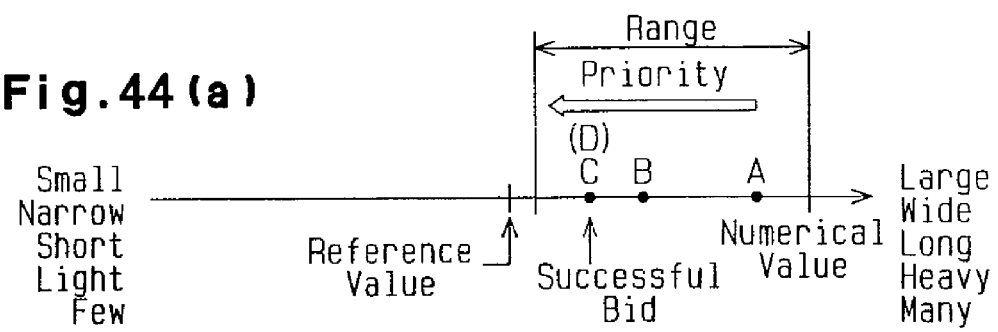
FIGS. 44A through 44E are explanatory diagrams regarding priority rules for a numerical value auction.
Figure 44B:
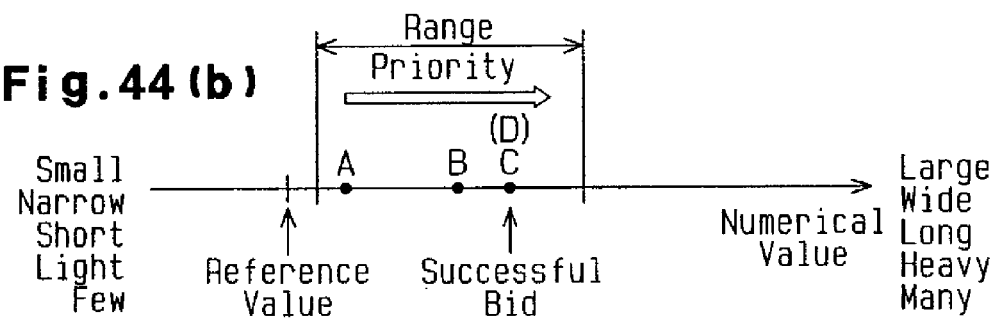

Here, one of five types of possible bidding systems (bid conditions (successful bid priority rules)) illustrated in FIGS. 44A through 44E is determined depending on the presence or absence of a specified range and positional conditions which have been set in accordance with requirements of the customer. These five types of bidding systems will be explained below with reference to FIGS. 44A through 44E. First, FIG. 44A shows a priority rule which preferentially determines a person who offers the smallest numerical value within a predetermined range as a successful bidder. In this event, from bidders A, B and C, the bidder C who has offered the closest numerical value to a reference value within a predetermined range is determined as a successful bidder. FIG. 44B shows a priority rule which preferentially determines a person who offers the furthest numerical value within a predetermined range as a successful bidder. In this event, from bidders A, B and C, the bidder C who has offered the furthest numerical value is determined as a successful bidder.

Figure 44C:
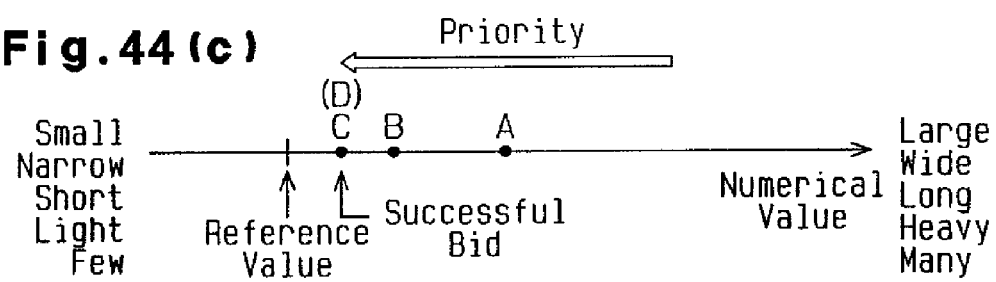
Figure 44D:
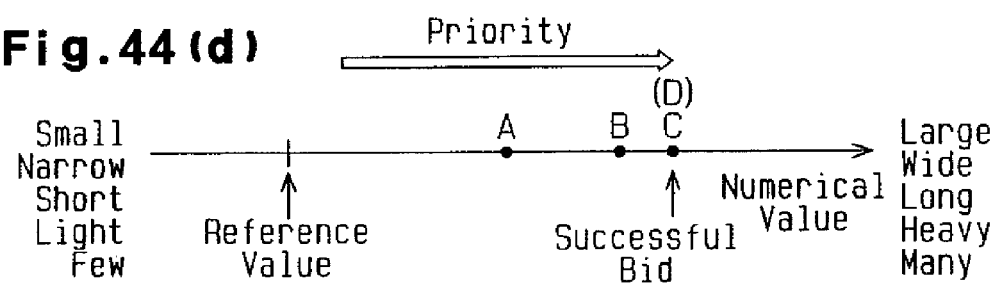
Figure 44E:
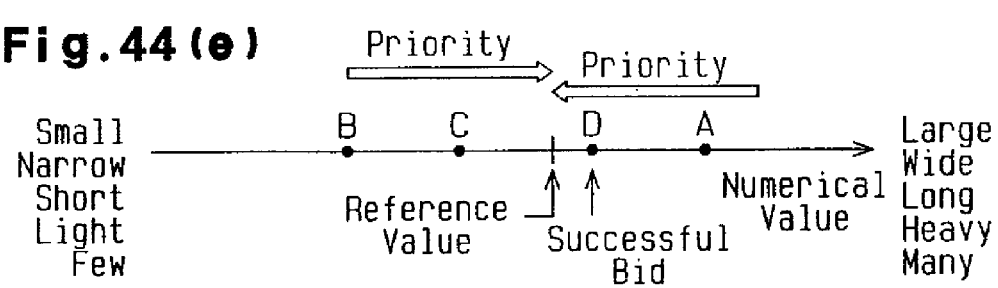

FIG. 44C shows a priority rule which preferentially determines a person who offers the value closest to a specified numerical value (reference value) from the greater value side. In this event, from bidders A, B and C, the bidder C who has offered the closest numerical value to the reference value is determined as a successful bidder. FIG. 44D shows a priority rule which preferentially determines a person who offers the value furthest away from a specified numerical value (reference value) from the smaller value side. In this event, from bidders A, B and C, the bidder C who has offered the furthest numerical value away from the reference value is determined as a successful bidder. FIG. 44E shows a priority rule which preferentially determines a person who offers a closest possible numerical value any way irrespective of whether it is from the smaller value side or from the greater value side with respect to a specified numerical value. In this event, from bidders A, B, C and D, the bidder D who has offered the smallest value within a predetermined range is determined as a successful bidder. It should be noted that in the bidding systems illustrated in FIGS. 44A through 44, if a plurality of bidders fall under successful bidders (the bidder C and D shown in the respective figures), the bidders are narrowed down based on predetermined rules, which will be described later.

Alternatively, a plurality of numerical values may be selected on the numerical value dimension selection screen J illustrated in FIG. 38. When two or more of the plurality of numerical value selection buttons 131 to 137 are selected, a successful bid priority order setting screen WA similar to that illustrated in FIG. 13 is displayed. The successful bid priority order setting screen WA is provided with entry fields WA1 to WA4 for specifying a maximum of n numerical values for a first priority, a second priority, . . . , an n-th priority (in this example, n=4), and an OK button 61. Numerical values of the first priority, the second priority, . . . , the n-th priority can be specified, and the priority order of the specified numerical values can be set freely by the user. A price may be set to a numerical value of the second priority or lower.

A plurality of numerical values can be set in this way because only one numerical value, for example, is not sufficient to narrow down to a predetermined number of successful bidders (generally one) in some cases, and are used to definitely narrow down bidders to a desired number of successful bidders. Then, successful bid order data D5 comprised of the successful bid order set on the screen WA is transmitted to the server 21. When a plurality of numerical values are selected, the server 21 can narrow down bidders in the order of numerical values of higher priorities, i.e., narrows down bidders to a predetermined number with the numerical value of the first priority, and again narrows down to a predetermined number with the numerical value of the second priority, and so on to eventually determine a successful bidder.

Further, information may be traded by selecting the information trade button 107 on the auction HP of FIG. 24. Specifically, when a certain article or service is desired, the auction is used for a trade to buy required information from the owner of the article, a company which sells the article, or a person who knows about a provider or a providing company of the service. Traded information may be in any fields and categories. Giving an example, when a length is selected for a numerical value, information on a provider who is offering, for example, a longest article may be selected from third parties at auction.

Figure 42:
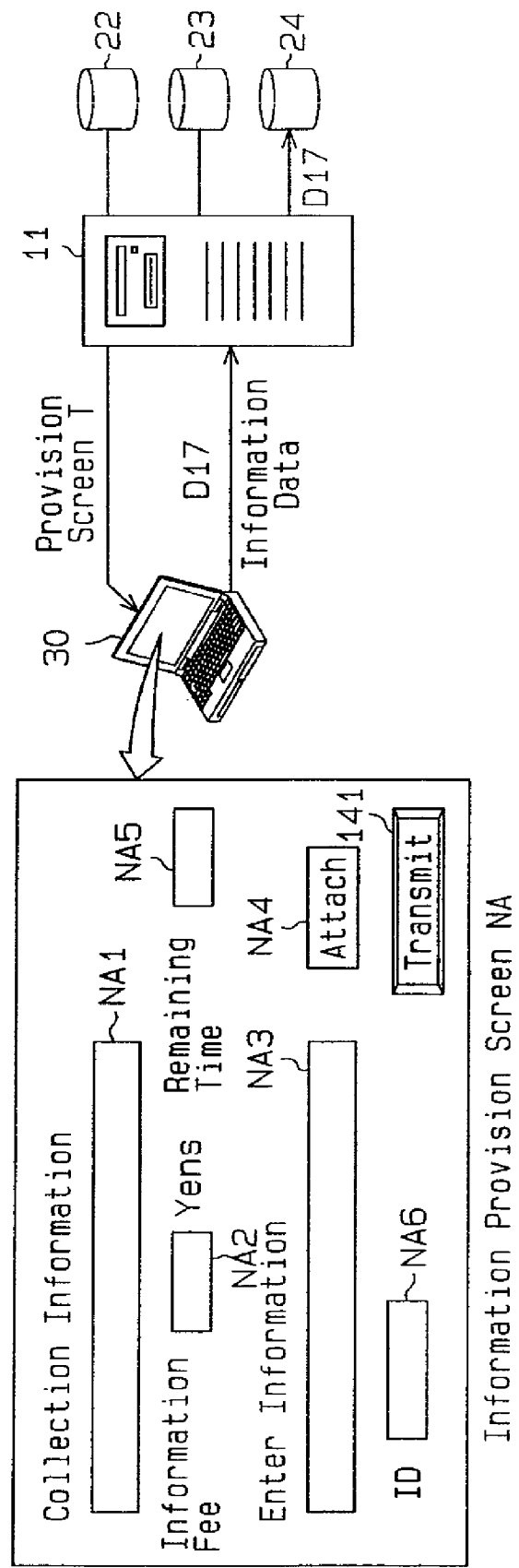
FIG. 42 is an explanatory diagram regarding provision of information.

For providing information, an information entry button 117 is selected on the numerical value auction HP to display an information provision screen NA illustrated in FIG. 42. The screen NA is provided with a collected information display field NA1, an information fee (compensation for providing information) display field NA2, an information entry field NA3, an information attachment button NA4, a remaining time display field NA5, an ID number entry field NA6, and a transmission button 141. The information provision screen NA is displayed when a person selects the information entry button 117 on the numerical value auction HP screen to select a portion which he wants to view from an information collection list displayed according to categories and fields. The information provision screen NA displays the contents of information which a client is looking for in the collected information display field NA1, and an information fee in the information fee display field NA2, so that a viewer who can provide desired information enters (fills) provided information in the information entry field NA3, or attaches data by manipulating for attachment on the next screen which is displayed when he selects the append button NA4, enters his ID number, followed by transmission of the information. Information data D17 as bid information comprised of information entered on this screen NA is transmitted to the server 21 and stored in the bid management DB 24.

For example, when information desired by a user is transmitted to the server 21, the server 21 searches the management data in the bid management DB 23 for pertinent information, and immediately collects the information when the information is not urgently required so that a collection time is allowed to some extent. Then, after the expiration of a limited time, i.e., a remaining time has been exhausted, collected information is analyzed to transmit information which most matches the needs of the client to a terminal 30 of the client. In this event, the client can select and specify one of the aforementioned bid forms, so that a successful bidder is determined in accordance with the rule of the specified bid form. The client who has acquired the desired information pays the information fee and an additional commission. The information fee is paid to the successful bidder. It should be noted that provided information may be entered before or after the server 21 receives a request.

As a result of an auction, information on a single successful bidder is basically transmitted to the client. However, if the client wishes, a plurality of narrowed down candidates may be presented, as illustrated in a list screen XC of FIG. 43. Specifically, the server 21 creates information offered by bidders, as it is, into a list, or creates a priority list by narrowing down successful bidder candidates of higher priority levels, for example, into a limited number specified by the client, based on information offered by bidders, and transmits the created list to the terminal 30 of the client. Then, the list XC illustrated in FIG. 43 is displayed on the terminal 30 of the client. The screen XC is provided with a list XC1, an entry field XC2 for selecting a successful bidder, and a decision button 142. The list XC1 indicates a priority number, a code number, and a numerical value (length, height, area, volume, bulk, weight, amount and so on), price, conditions offered by a bidder (supplementary items (extra) and so on).

The client reviews offered conditions such as a trading date in the list XC1 on the screen XC to determine a bidder favorable for him as a successful bidder, enters, for example, the priority number of the winning bidder in the entry field XC2, and selects the decision button 142. In response, the server 21 notifies the client and the successful bidder of the successful bid. When the list XC1 can be viewed on the terminal 30 of the client in this way, the client can select a partner which offers favorable conditions in terms of other numerical values such as the price, in addition to a specified numerical value, if a plurality of bidders offer the same numerical value, or can select a partner who may concede in the price, supplementary items and so on, even if the partner offers a numerical value slightly worse than the first bidder.

Figure 45:
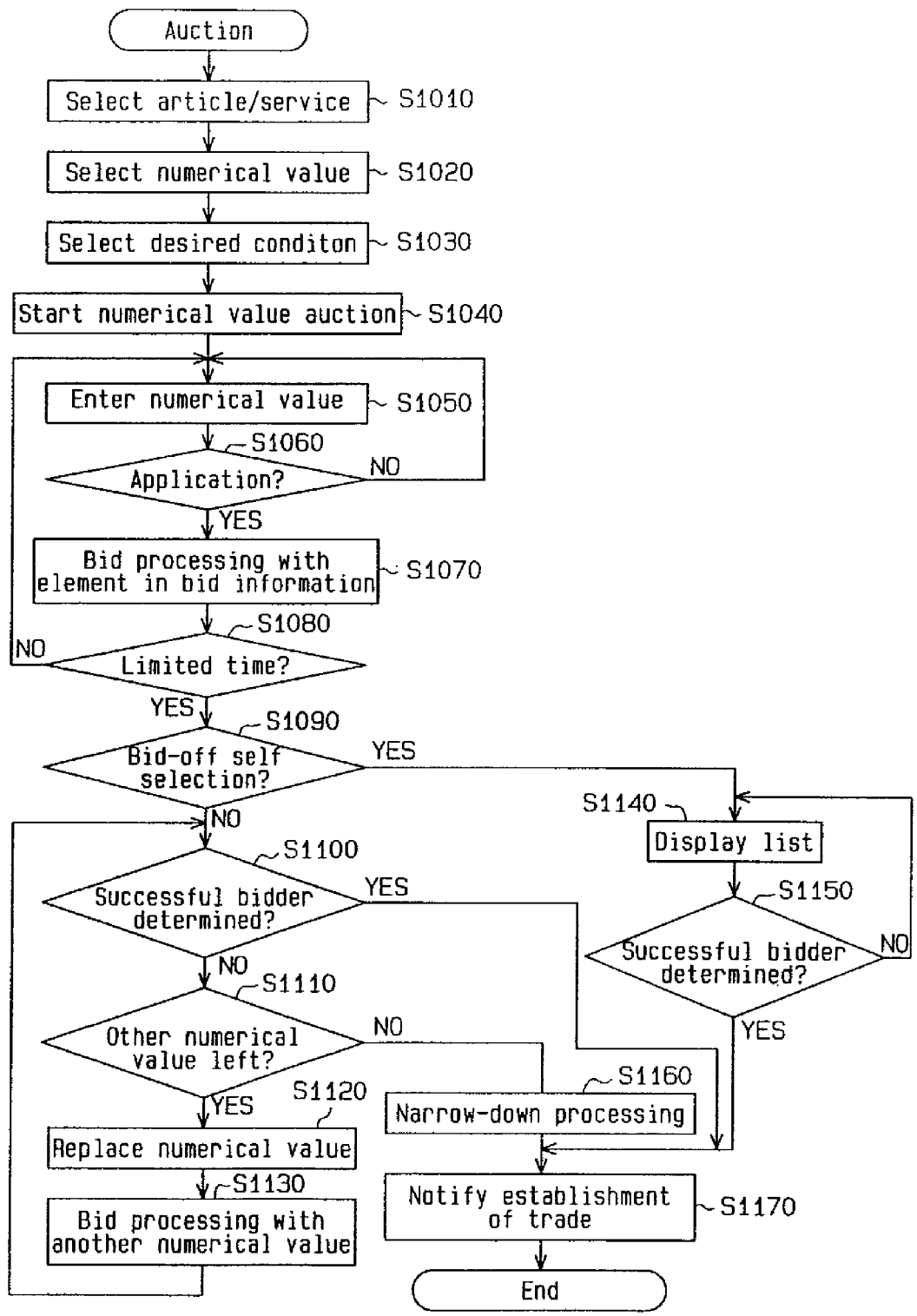
FIG. 45 is a flow chart illustrating a procedure of the numerical value auction.

Next, the procedure flow of the numerical value auction according to this embodiment will be explained with reference to FIG. 45. It should be noted that the procedure flow does not necessarily show a processing procedure of the server 21 but shows a procedure (flow) of the entire numerical value auction.

First in S1010, a client selects an article or a service on the numerical value auction HP. Specifically, the client selects a button associated with an article or a service desired by him within the selection buttons on the numerical value auction HP.

In S1020, the client selects a numerical value (length, height, area, volume, bulk, weight, amount, or the like) with which a bid is conducted.

In S1030, the client selects bid conditions (required items such as a bid form, a range, a bidding period and so on) for the numerical value. It should be noted that a procedure in S1020, S1030 for displaying a request screen on the terminal 30 of the customer, and receiving data (bid information data D15) entered on the screen at the server 21, corresponds to a request procedure.

In S1040, the numerical value auction is started. Specifically, the server 21 notifies third parties of a collection of bidders, and delivers data on the numerical value to terminals 30 of the third parties.

In S1050, a numerical value is entered. Specifically, bidders who participate in the numerical value auction enter bid information related to the numerical value. It should be noted that the procedure in S1040 for starting the auction to display the bid screen on the terminals 30 of the bidders, and in S1050 for receiving the entered data (article/service registration data D14, bid data D16, information data D17) at the server 21 corresponds to a bid procedure.

In S1060, it is determined whether or not any application is made to the auction. In other words, the presence or absence of a bid from a bidder is determined. If there is no bid, the server 21 waits for bids. If there is a bid, the procedure flow continues to S1070. This bid includes provision of information. It should be noted that a procedure executed from S1060 to S1170 corresponds to a bid acceptance procedure.

In S1070, bid information is acquired to execute the bid processing with the numerical value which has been offered as one piece of information within the bid information. If a plurality of numerical values are selected and set, the bid is conducted with a value of a first priority. Then, in comparison with the desired conditions (the priority rules shown in FIGS. 44A through 44E) in terms of the numerical value(s) within the bid information, a priority order is determined for the bidders as trading partners.

In S1080, it is determined whether or not a limited time has expired. When within the limited time, the procedure flow returns to S1050 to repeat the processing from S1050 to S1080 to execute the bid processing each time a new bidder applies, until the limited time expires. At the expiration of the limited time, the procedure flow continues to S1090.

In S1090, it is determined whether or not a bid-off self selection is set. The procedure flow continues to S1100 when the bid-off self selection is not set, and to S1140 when the bid-off self selection is set.

In S1100, it is determined whether or not a successful bidder is determined. In other words, it is determined whether bidders are narrowed down to a predetermined number of successful bidders. The procedure flow continues to S1110 if the bidders are not narrowed down to the predetermined number of successful bidders, and to S1160 if the bidders have been narrowed down to the predetermined number of successful bidders.

In S1110, it is determined whether there are any remaining numerical values which have not been processed for the bid, when a plurality of numerical values had been set. The procedure flow continues to S1120 if there are still remaining numerical values, and otherwise to S1160.

In S1120, a current numerical value is replaced with another one.

In S1130, the bid processing is executed with the replaced numerical value to narrow down bidders to a predetermined number of successful bidders. The bidders are narrowed down to the predetermined number of successful bidders by comparing the other numerical value (of the second priority) within the bid information with the desired conditions (the priority rules shown in FIGS. 44A through 44E). If the bidders cannot be narrowed down even with this bid processing, the current numerical value is replaced with another numerical value of the next lower priority, if there are still other numerical values which have not yet been used in the bid processing, to narrow down the bidders (S1110). The bid is conducted step-wisely with a different numerical value until the bidders are narrowed down to the predetermined number of successful bidders or the bid processing has been completed with all the numerical values set in the bid information.

In S1160, the narrow-down processing is executed. Specifically, when there is no numerical value for conducting a bid at the next stage, a bidder who has offered the price that most satisfies the requirements of the user is determined as a successful bidder. On the other hand, if a price is fixed or if a price itself is not handled in a bid, successful bidders are narrowed down to a predetermined number in accordance with a previously defined predetermined rule.

On the other hand, if it is determined in S1090 that the bid-off self selection is set, the list screen XC illustrated in FIG. 43 is displayed in S1140 for enumerating bid information of a predetermined number of bidders in a list form. The user can view the list screen XC by selecting a screen display after entering a password on the screen of the terminal 30. The list screen XC enumerates candidates in a priority order in terms of the numerical values (displayed as the code number), so that the user can determine a trading partner while referencing other information offered by the bidders. Upon determining a trading partner, the user enters the associated code number in the successful bidder selection entry field XC2 and then selects the decision button 142. The successful bidder information selected by the user is transmitted to the server 21 through the Internet N.

In S1150, it is determined whether or not a successful bidder has been determined. The list screen XC is continuously displayed (S1140) until the user determines a successful bidder, and the procedure flow continues to step S1170 when a successful bidder is determined.

In S1170, the server 21 notifies both the user and the successful bidder of the establishment of the trade.

Next, listed below are specific examples of "length/space", "weight" and "number/amount" for the numerical value auction, which are set as the numerical value.

(1) First, in examples of numerical values representative of "length/space", a buyer selects a seller who provides the greatest height, greatest length, widest area, largest volume, or largest bulk, or information on the seller through the numerical value auction.

A buyer may select a seller who provides a helicopter, an airplane, an aeronaut, a rocket, a satellite, or the like which flies to the greatest height, or information on the seller through the numerical value auction.

A buyer may select a seller who provides the highest or longest building, advertising display, ladder, crane, person, sample, tree, or the like, or a land, a mine, a steel tower, an aeronaut, a satellite or the like at the highest level from the see level, or information on the seller through the numerical value auction.

A buyer may select a seller who provides the widest land, building, advertising display, pool, sales place, stadium, parking area, room, warehouse, application facility place, car, furniture, carpet, or electric appliance product, or information on the seller through the numerical value auction.

A buyer may select a seller who provides a newspaper, a magazine, a book, a brochure, a leaflet, a home page, an advertising display, an advertising medium, or the like which provides the widest space, or information on the seller through the numerical value auction.

A buyer may select a seller who provides a car, a ship, an airplane, a train, an aeronaut, a satellite, or the like which has the largest loading bulk or volume, or a ground-based tank, a storage facility, a warehouse, an electric appliance product, a container, a storage, a bathroom, a waste, a processing facility, an article, or the like which has the largest volume, or information on the seller through the numerical value auction.

(2) In the next examples, a buyer selects a seller which provides the smallest height, the smallest length, narrowest range, smallest volume, or smallest bulk, or information on the seller through the numerical value auction.

A buyer may select a seller who provides a helicopter, an airplane, an aeronaut, a rocket, a satellite, or the like which flies at a smallest height, or information on the seller through the numerical value auction.

A buyer may select a seller who provides a transportation car, a bus, a taxi, a train, an airplane, a helicopter, or the like which runs the shortest distance to a destination, or information on a road, a bus, a train, an airplane, or the like through the numerical value auction.

(3) In the next examples, with the same numerical value, a seller selects a buyer who desires the greatest height, greatest length, widest area, largest volume, or largest bulk, or information on the buyer through the numerical value auction, contrary to the aforementioned (1).

A seller may select a buyer who desires a helicopter, an airplane, an aeronaut, a rocket, a satellite, or the like which flies to the greatest height, or information on the buyer through the numerical value auction.

A seller may select a buyer who desires the highest or longest building, advertising display, ladder, crane, person, sample, tree, or the like, or a land, a mine, a steel tower, an aeronaut, a satellite or the like at the highest level from the see level, or information on the buyer through the numerical value auction.

A seller may select a buyer who desires the widest land, building, advertising display, pool, sales place, stadium, parking area, room, warehouse, application facility place, car, furniture, carpet, or electric appliance product, or information on the buyer through the numerical value auction.

A seller may select a buyer who desires a newspaper, a magazine, a book, a brochure, a leaflet, a home page, an advertising display, an advertising medium, or the like which provides the widest space, or information on the buyer through the numerical value auction.

A seller may select a buyer who desires a car, a ship, an airplane, a train, an aeronaut, a satellite, or the like which has the largest loading bulk or volume, or a ground-based tank, a storage facility, a warehouse, an electric appliance product, a container, a storage, a bathroom, a waste, a processing facility, an article, or the like which has the largest bulk, or information on the buyer through the numerical value auction.

(4) In the next examples, a seller selects a buyer who desires the smallest height, the smallest length, the narrowest range, or the smallest volume, or information on the buyer through the numerical value auction.

A seller may select a buyer who desires a helicopter, an airplane, an aeronaut, a rocket, a satellite, or the like which flies at a smallest height, or information on the buyer through the numerical value auction.

A seller may select a buyer who desires a transportation car, a bus, a taxi, a train, an airplane, a helicopter, or the like which runs the shortest distance to a destination, or information on a road, a bus, a train, an airplane, or the like through the numerical value auction.

(5) Next, in examples of numerical values representative of "weight", a buyer selects a seller who offers the greatest weight in transportation, processing, purchase, or the like, or information on the seller through the numerical value auction.

A buyer may select a seller who sells the greatest weight of
a combustible such as petrol, coal, gasoline or the like, raw materials such as ore, clay, ballast and debris, water, wood or the like, natural products, agricultural products, aquatic products, marine products, food and beverage, articles, chemical raw materials, chemicals, fertilizers, machines, products, semi-finished products, or the like, or information on the seller through the numerical value auction. Alternatively, a buyer may select a provider or
an organization which provides a porter, a transportation company, a ship capable of transporting, a railway, a car, an airplane, an aeronaut, a rocket, transportation equipment or the like which transport the greatest weight of these loads, or information on the provider or the organization through the numerical value auction.

A buyer may select a dealer, a dealing company, an organization, or the like which processes the greatest weight of wastes, sludge, excrement, or the like, or information associated therewith through the numerical value auction. Alternatively, a buyer may select a facility, a machine, or the like which can process the greatest weight of such wastes to be processed, or information associated therewith through the numerical value auction. Further alternatively, a buyer may select a porter, a transportation company, or the like which can transport the greatest weight of such wastes to be processed, or information associated therewith through the numerical value auction.

A buyer may select a dealer, a dealing company, or the like which recycles wastes such as the greatest weight of used paper, empty containers, wasted materials, wasted objects, wasted metals, plastic, oil, electric products, household effects, clothing, and so on, or information associated therewith through the numerical value auction. Alternatively, a buyer may select a facility, machine, a system, a patent, or the like which can recycle the greatest weight of such wastes, or information associated therewith through the numerical value auction. Further alternatively, a buyer may select a porter or a transportation company which can transport the greatest weight of such wastes, or information associated therewith through the numerical value auction.

A buyer may select a seller who has a right of emitting a greatest weight of $CO_2$ gas, $SO_2$ gas, or a substance specified by the buyer, or information on the seller through the numerical value auction.

A buyer may select a warehouse, facility equipment, a system, a company, or the like which stores the greatest weight of gas, liquid, or solid, or information associated therewith through the numerical value auction. Alternatively, a buyer may select a system, a design drawing, a patent, a machine, a facility, a device, a factory, a company, or the like for processing the greatest weight of such materials, or information associated therewith through the numerical value auction.

(6) In the next examples, a seller selects a buyer who indicates the greatest weight in transportation, processing, sales, or the like, or information on the buyer through the numerical value auction.

A seller may select a buyer who buys the greatest weight of a combustible such as petrol, coal, gasoline or the like, raw materials such as ore, clay, ballast and debris, water, wood or the like, agricultural products, forest products, food and beverage, or the like, chemical raw materials, chemicals, fertilizers, products, semi-finished products, or the like, or information on the seller through the numerical value auction. Alternatively, a seller may select a transportation car, a transportation company, a car capable of transporting, a railway, a ship, an airplane, an aeronaut, a rocket, transportation equipment, a device, or the like which transport the greatest weight of these materials to be processed, or information associated therewith through the numerical value auction.

A seller may select a consumer who consumes the largest amount of electricity, water, gas, combustible, or the like, or information on the consumer through the numerical value auction. Alternatively, a seller may select power transmission, water supply, air supply, a transportation device, a system, a business entity which sends the largest amount of electricity, water, gas, combustible, or the like, or information associated therewith through the numerical value auction.

A seller may select a buyer who buys the greatest weight of articles to be disposed, stocks, valuable wastes, or second hand articles, or information on the buyer through the numerical value auction.

A seller may select a buyer who buy a right of emitting a greatest weight of $CO_2$ gas, $SO_2$ gas, or a substance specified by the seller, or information on the buyer through the numerical value auction.

(7) In the next examples, a buyer selects a seller who offers the smallest weight in transportation, processing, purchase, or the like, or information on the seller through the numerical value auction.

A buyer may select a seller who sells a combustible, a raw material, vinyl, plastic, wrapping materials, containers, things of daily necessity, electric appliances, furniture, clothing, semi-finished products, articles, or the like which generates the smallest weight of $CO_2$, poisonous gas, emission regulated material, or a substance specified by the buyer, or the like, when it is burnt, or information on the seller through the numerical value auction.

A buyer may select an electric product, a machine, a device, a semi-finished product, an article, a agricultural or marine product, forest products, seeds, processed food, a system, design drawings, a patent or the like which mixes or use the smallest weight of radiation, gas, water, solvent, detergent, foaming material, redox agent, corrosive, color former, disinfectant, agricultural chemicals, oil, mixing agent, a substance specified by the buyer, or the like, or information associated therewith through the numerical value auction.

A buyer may select a car, a ship, an airplane, a train, a rocket, a machine, a facility, an atomic power generation engine, or the like which emits or generates the smallest weight of radiation, exhaust gas such as $CO_2$ gas, nitrogen, phosphate compound and so on, emission regulated substance or the like, a substance specified by the buyer, or the like, or information associated therewith through the numerical value auction.

A buyer may select a land, a building, a product, an article, a factory, a company, a device, a facility, an atomic power generator, design drawings, a system, a patent, or the like which emits or generates the smallest weight of radiation, exhaust gas such as $CO_2$ gas, nitrogen, phosphate compound and so on, emission regulated substance or the like, a substance specified by the buyer, or the like, or information associated therewith through the numerical value auction.

A buyer may select a system, design drawings, a patent, a machine, a facility, a factory, a company, a product, or the like which emits or generates the smallest weight of radiation, gas, liquid or solid, or information associated therewith through the numerical value auction.

A buyer may selects a seller who has a right of emitting the smallest weight of $CO_2$ gas, $SO_2$ gas, or a substance specified by the buyer, or the like, or information on the seller through the numerical value auction.

(8) In the next example, a seller selects a buyer who offers the smallest weight in transportation, processing, purchase, or the like, or information on the seller through the numerical value auction.

When a seller sells or orders processing of industrial wastes, materials to be processed, recovered materials, second hand products, raw materials, intermediate products, or the like, the buyer may select a purchaser or a process engineer, or a legal person which purchases or processes, or an organization which possesses a factory, a machine, a facility, a technology, or the like which generates or emits the smallest weight of radiation, $CO_2$ gas, emission regulated gas, poisonous gas, polluted water, liquid waste, polluted substance, emission regulated substance, final waste, a substance specified by the seller, or the like in course of processing, repair, working, or the like, or information associated therewith through the numerical value auction.

A seller may selects a buyer who has a right of emitting the smallest weight of $CO_2$ gas, $SO_2$ gas, or a substance specified by the seller, or information on the buyer through the numerical value auction.

(9) Next, in examples of numerical values representative of "number/amount," a buyer selects a seller who offers the largest number or amount in transportation, processing, purchase or the like, or information on the seller through the numerical value auction.

A buyer may select a seller who sells the largest amount of contained or packaged combustible, row materials, food, articles, chemicals, products, semi-finished products, or the like, or information on the seller through the numerical value auction. Alternatively, a buyer may select a transportation car, a transportation company, a car capable of transporting, a ship, a train, an airplane, an aeronaut, a rocket, a transportation machine, a device, or the like which transports the greatest weight of these loads, or information associated therewith through the numerical value auction.

A buyer may select a dealer, a dealing company, or the like which recycles the largest amount of contained or packaged combustible, row materials, food, articles, products, semi-finished products, electric products, household stuffs, clothing, machines, or the like, or information on the seller through the numerical value auction, or may select a facility, a machine, a system, a patent, or the like which recycles the largest amount, or a transportation car, a transportation company, or the like which transports the largest amount, or information associated therewith through the numerical value auction.

A buyer may select a system, a warehouse, a facility, a device, a company, or the like which stores the largest amount of contained gas or liquid, packaged solid, or the like, or a system, a design, a patent, a machine, a facility, a device, a factory, a company, or the like which processes such object, or information associated therewith through the numerical value auction.

A buyer or a lessee may select a sales company, a financial company, a transportation/distribution company, a dealing company, a system, a design, a patent, a machine, a facility, a device, or the like which accepts the largest number of times of divided payment, divided purchase, divided transportation/distribution, divided processing, divided working, destruction working/method, or the like, or information associated therewith through the numerical value auction.

A buyer may select a seller who offers the largest number of scanning lines, pixels, storage capacity, transmission speed, processing speed, resolution, magnification, or the like, when the buyer is going to buy a television set, a cathode-ray tube, a display device, a video camera, a digital camera, a semiconductor device, a memory chip, a computer, an Internet terminal, a telephone, a server, a floppy disk, a projector, a telescope, or the like, or information on the seller through the numerical value auction.

A buyer may select a seller who offers, produces or sells the largest number or amount for the amount of created manuscripts for planning advertisement, the amount of created manuscripts for advertisements and articles on newspaper, television, radio, publication and Internet, the number of produced or sold videos, records, CDs, MDs, DVDs, the number of annual tickets for membership clubs, the number of rooms in accommodations, or the like, or information associated therewith through the numerical value auction.

(10) In the next examples, a seller selects a buyer who offers the largest number or amount in transportation, processing, sales, or the like, or information on the buyer through the numerical value auction.

A seller may select a buyer who purchases the largest amount of contained or packaged combustible, row materials, food, articles, chemicals, products, semi-finished products, or the like, or information on the seller through the numerical value auction. Alternatively, a seller may select a transportation car, a transportation company, a car capable of transporting, a ship, a train, an airplane, an aeronaut, a rocket, a transportation machine, a device or the like which transport the greatest weight of these loads, or information associated therewith through the numerical value auction.

A seller may select a consumer who consumes the largest amount of contained water, gas, combustible or the like, or information on the consumer through the numerical value auction. Alternatively, a seller may select a porter, a transportation company or the like, or a car, a ship, a train, an airplane, an aeronaut, a rocket, a transportation machine or a device capable of transporting, or a device, a system, a business entity, or the like which transports the greatest weight of these loads, or information associated therewith through the numerical value auction.

A seller may select a buyer who buys the largest amount of articles to be disposed, stocks, valuable wastes, or second hand articles, or information on the buyer through the numerical value auction. Alternatively, a seller may select a porter or a transportation company capable of transporting the largest amount of such loads, or a car, a ship, a train, an airplane, an aeronaut, a rocket, a transportation machine or a device capable of transporting, or information through the numerical value auction.

A seller or a lessor may selects a buyer, a lessee, an organization, a system company, a distribution/sales company, or the like which accepts the largest number of times of divided payment, divided purchase, and divided transportation, distribution and sales, or the like, or information associated therewith through the numerical value auction.

(11) In the next examples, a buyer selects a seller who offers the smallest number or amount, or information on the seller through the numerical value auction.

A buyer or a lessee may select a sales company, a financial company, a transportation company, a processing company, a dealing company, a system, a design, a patent, a machine, a facility, a device, or the like which accepts the smallest number of times of divided payment, divided purchase, divided transportation, divided processing, divided working, destruction working/method, or the like, or information associated therewith through the numerical value auction.

A buyer may select a system, a design, a patent, a machine, a facility, a device, a dealing company, or the like which can assemble or manufacture a building, a machine, a product, an article, or an object with the smallest number of parts, steps, works, or the like, or information associated therewith through the numerical value auction.

(12) In the next example, a seller selects a buyer who offers the smallest number or amount, or information on the buyer through the numerical value auction.

A seller or a lessor may select a buyer, a lessee, an organization, a system company, or the like which accepts the smallest number of times of divided payment, divided purchase, divided transportation, divided processing, divided working, destruction working/method, or the like, or information associated therewith through the numerical value auction.

As appreciated from the foregoing, the following advantages are provided according to the fifth embodiment.

With the employment of the auction system in which a requester (client) offers a desired trading condition with respect to a numerical value such that bidders complete with the numerical value, the client can conduct an auction with a numerical value other than the price, and find a trading partner who satisfies the requirements in accordance with the particular client in terms of the numerical value.

In the numerical value auction of this embodiment, a plurality of numerical values can be selected from length, area, weight, and so on, so that the client can select a trading partner who more satisfies the requirements of the client at auction.

The fifth embodiment employs the information auction in which the server accepts a request for information, widely addresses third parties to provide the requested information through the Internet N such that bidders compete with a numerical value included in the provided information to determine an information provider (bidder) who has offered the information that most matches the requirements of the client as a successful bidder. It is therefore possible to acquire most appropriate information as to how one can be provided with a desired article or service even if a provider or a providing company of such an article or a service does not participate in the auction. By thus trading information possessed by third parties, it is possible to effectively use information which is valuable for other persons viewed from the third parties.

Sixth Embodiment

Next, a sixth embodiment which embodies the present invention will be explained with reference to FIGS. 1, 4, and 46 through 58. The sixth embodiment differs from the foregoing embodiments in that an auction is conducted such that bidders compete with a numerical value indicative of evaluation.

An auction system for conducting an evaluation numerical value auction is substantially similar in configuration to that illustrated in FIG. 1. FIG. 1 illustrates an auction system for conducting an auction for an article or a service between a seller and a buyer through a network. The auction system comprises an auction management system 20, a network (the Internet in this embodiment) N, and terminals 30 of users (customers).

The auction management system (intermediary management server system) 20 comprises a server (web server) 21, a customer/article management database (DB) 145, a bid management database (DB) 146, and an evaluation data management database (DB) 147. It should be noted that the server 21 may be configured of a plurality of servers, such as a separate web server and application server.

The server 21 is connected to the Internet N and further connected to terminals 30 of third parties for communications therewith through the Internet N. The terminals 30 may be personal computers (hereinafter simply called the "personal computer") 31 of a manufacturer or individuals, or portable telephones 32 having the ability of making communications through the Internet (for example those supporting the i-mode). It is only individuals and dealers (manufacturers, stores, and so on) which have previously registered as users that are allowed to receive a customer provision service from the server 21. In the auction system according to this embodiment, the server 21 accepts a request from a client, and collects articles or services which most satisfy requirements of the client. On the other hand, when a client is a provider of an article or a service, the server 21 collects potential buyers.

Then, the server 21 evaluates, in the form of numerical value, applied (offered) articles or services or persons (buyers) who may be provided with an offered article or service from a viewpoint of the requirements of the client. Then, the server 21 determines the one who scores the evaluation value that most satisfies the requirements of the client as a successful bidder. In the following, this type of auction will be referred to as the "evaluation auction". More specifically, in the evaluation auction, an article or a service desired by a client is evaluated in the form of numerical value whether or not the article or the service satisfies requirements of the client. From a large number of bid information (articles, services, or the like) which have been previously registered, or collected each time a request is made, an evaluation point (numerical value) about an article or a service, or an object or a person who serves for the service, which most satisfies the requirements of the client, is determined as a successful bid.

Figure 46:
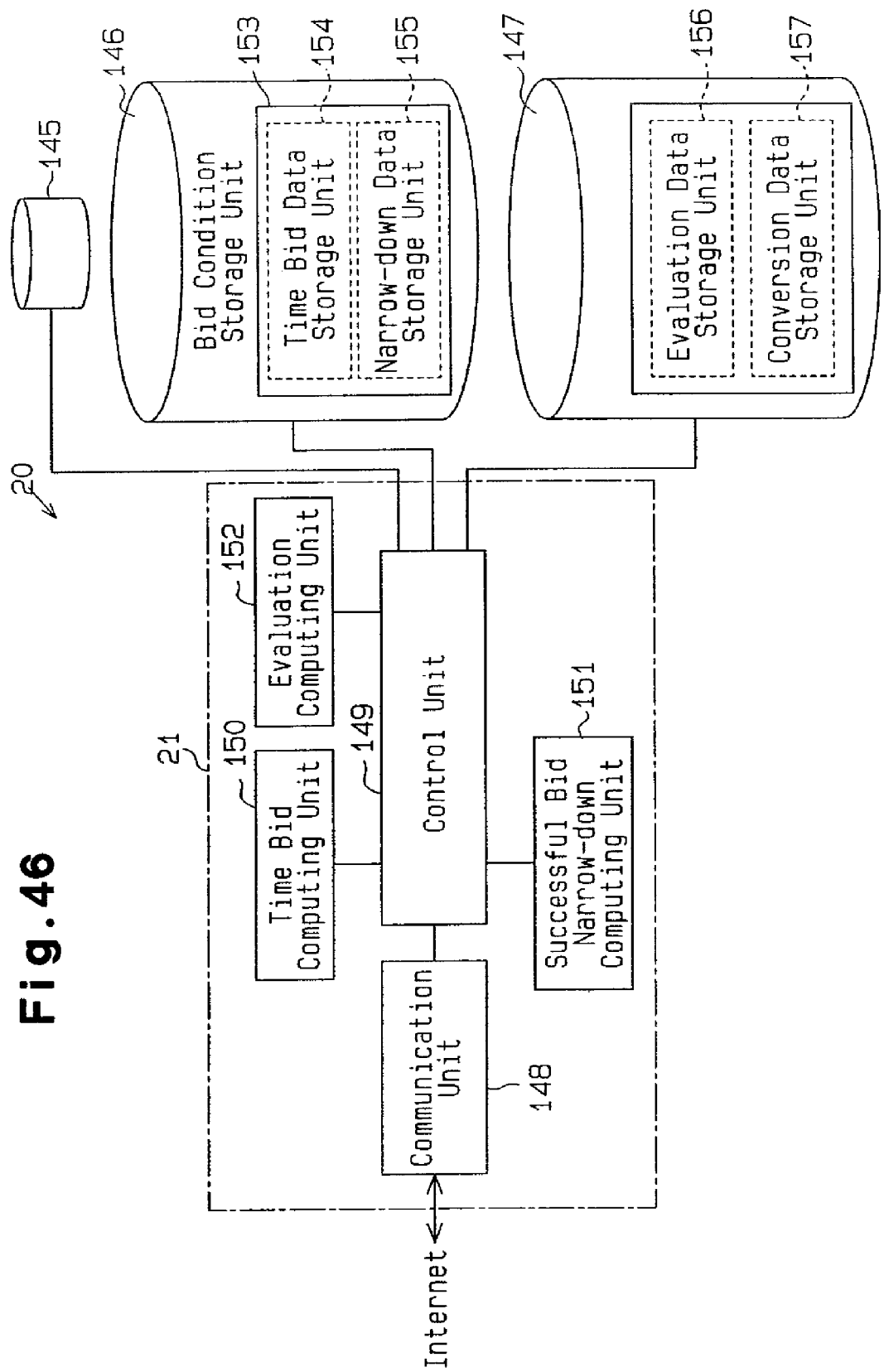
FIG. 46 is a schematic diagram illustrating the configuration of a trading system according to a sixth embodiment of the present invention.

FIG. 46 illustrates the functional configuration of the auction management system 20. The auction management system 20 comprises a communication unit 148, a control unit 149, a bid computing unit 150, a successful bid narrow-down computing unit 151, and an evaluation computing unit 152. The communication unit 148, control unit 149, bid computing unit 150, successful bid narrow-down computing unit 151, and evaluation computing unit 152 are implemented by the server 21. The communication unit 148 operates in accordance with a predetermined communication protocol (e.g., HTTP). A bid management DB 146 stores data and so on required for a bid, and comprises a bid condition storage unit 153 which includes a bid data storage unit 154 and a narrow-down data storage unit 155. An evaluation data management DB 147 stores data and so on required for numerical value evaluation of an article or a service, and comprises an evaluation data storage unit 156 and a conversion data storage unit 157. The control unit 149 and the respective computing units 150 to 152 are used for computing control for a numerical value evaluation or bid processing for competing with the numerical value in the evaluation auction, and a variety of data stored in the respective storage units 153, 156, 157 are used for the computing processing. The evaluation numerical value, with which a bid is conducted, is not limited to a pure numerical value, but may be an evaluation rank, for example, A, B, C, and so on, as long as it is a kind of numerical value which can be compared by computer processing.

An auction home page (HP) (site) resides in the server 21 of an intermediary company. A user (customer) displays an auction HP illustrated in FIG. 47 on a screen through the network N using a browser application from a terminal 30 for viewing the auction HP. A variety of screens such as the user registration screen P similar to that illustrated in FIG. 4, a request registration screen E illustrated in FIG. 48, a bid registration screen K illustrated in FIG. 52, an information provision screen NB illustrated in FIG. 53, and so on are linked to the auction HP. The server 21 stores in its hard disk, screen data for the variety of screens HP, P, E, K, NB and so on, a program for use in displaying the screens and so on (for example, an HTML description program), a program for use in computing processing involved in the auction, and so on.

Figure 47:
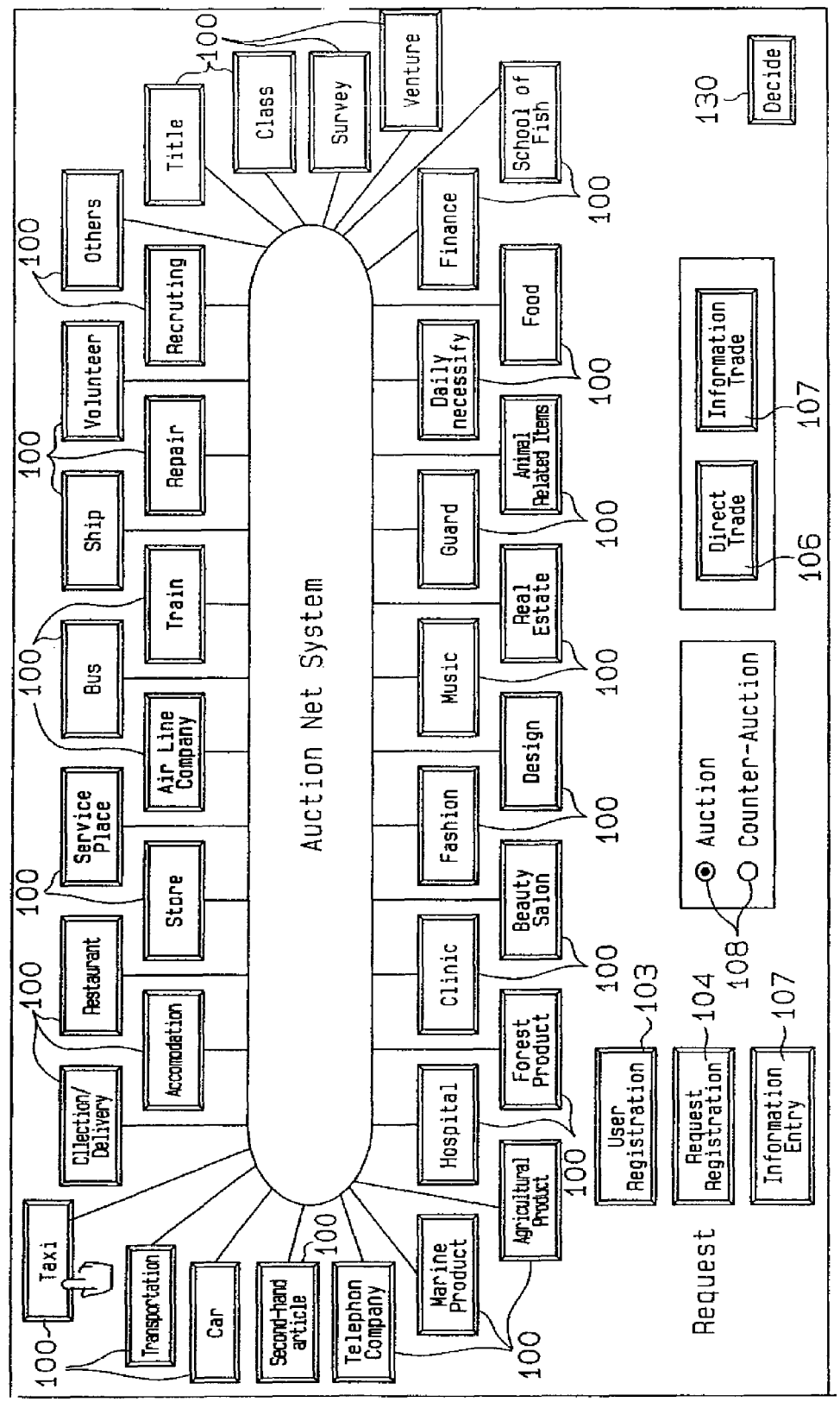
FIG. 47 illustrates a home page of an auction.

As illustrated in FIG. 47, the auction HP is provided with user registration button 103, a request registration button 104, an information entry button 117, a direct trade button 106, an information trade button 107, and a large number of selection buttons 100 classified into respective articles and services potentially traded in the auction, such as food, recruiting, culture school, real estate, finance, venture (entrepreneurial activity), antique objects, and so on, options 108 for a client to select a normal auction or a counter-auction, and a decision button 130. It should be noted that FIG. 47 illustrates only a portion of article and service classifications. Selection of the user registration button 103 results in the registration screen P (FIG. 4) displayed on the terminal 30.

As illustrated in FIG. 4, the user registration screen P is provided with options P1 for selecting whether the user wants to participate in an auction as a seller or a buyer, and a variety of entry fields P2 for entering address, name, telephone number, electronic mail address, sex, age, remarks, and so on. When the user has entered all required items in associated fields on the user registration screen P displayed on the terminal 30A and selects an OK button 55, the just entered user registration data D1 is transmitted to the server 21 through the network N and stored in the customer/article management DB 145. Upon confirming that the user has paid a predetermined commission, the server 21 transmits an authentication number (ID and password) to the terminal 30A of the registered user. The registered user uses the authentication number for utilizing the auction.

A client may request for an evaluation auction in two different ways: "direct trade" for directly looking for an object to be traded (a trading partner or an article/service) and "information trade" for looking for information on an object to be traded (a trading partner or an article/service). A client selects the request registration button 104 for conducting the "direct trade" and the information entry button 117 for conducting the "information trade". In either the "direct trade" or the "information trade," the client specifies a normal auction for bidding off an article or a service or a counter-auction for bidding off a buyer of an article or a service with the options 108, and selects a selection button 100 associated with a classification to which a desired article or service belongs. The direct trade button 106 and the information trade button 107 are provided for selecting the "direct trade" or the "information trade" upon conducting a bid, respectively.

Figure 48:
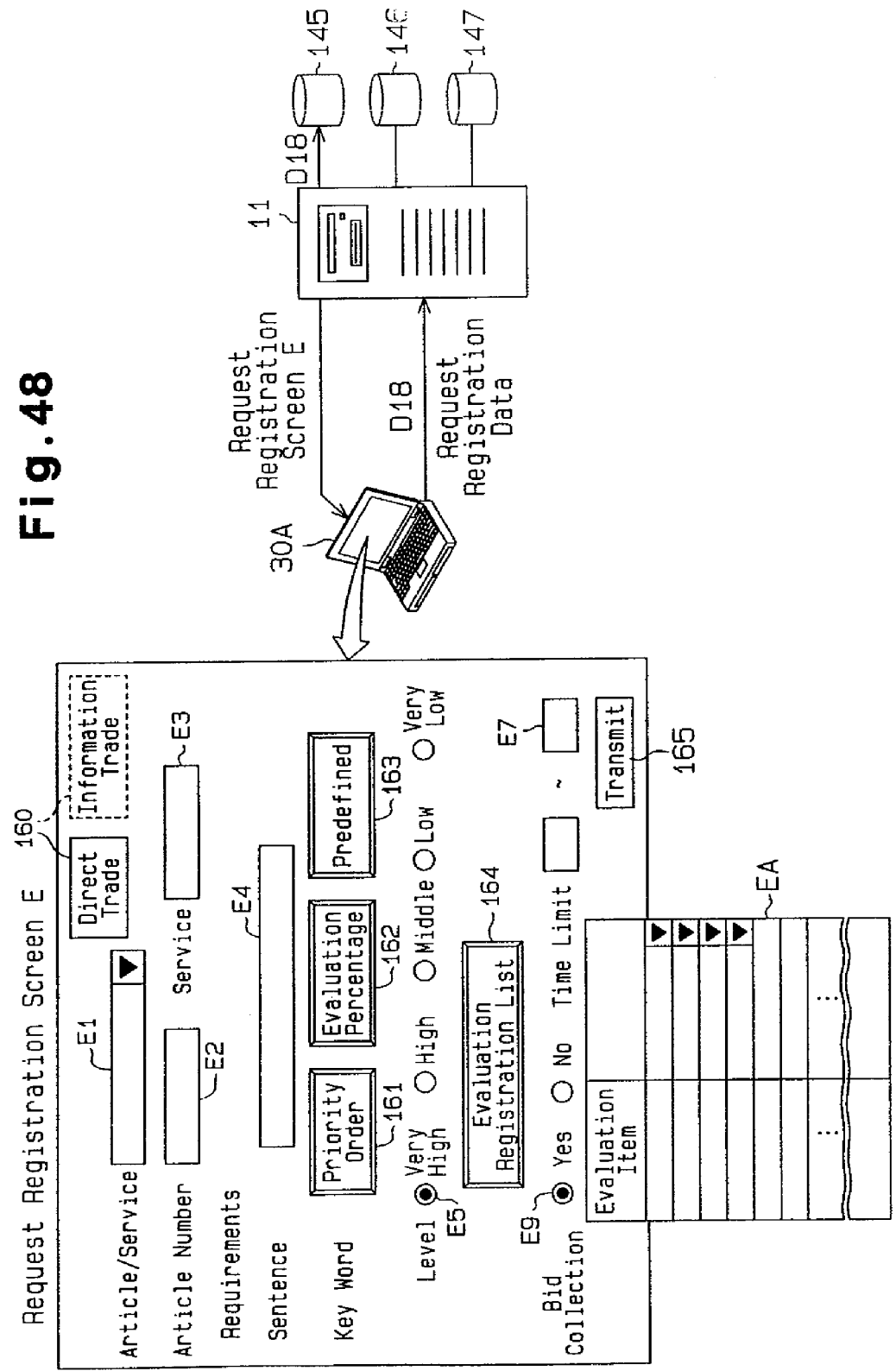
FIG. 48 is an explanatory diagram for explaining a request registration procedure.

When the client selects the decision button 130 while selecting a desired button 100 and the request registration button 104 or the information entry button 117, a request registration screen E illustrated in FIG. 48 is displayed. The request registration screen E is provided for identifying an article or a service to be traded, and entering requirements of a client with respect to the article or service. The screen E is provided with a trading type indicators 160 for indicating the type of trade, i.e., the "direct trade" or the "information trade", and a variety of entry fields E1 to E3 for identifying an article or a service such as the name of the article or service (for specifying details), an article number, the contents of the service, and so on. One of "direct trade" and "information trade" in the trading type indicators 160, which is selected by the client, remains active (FIG. 48 shows that "direct trade" is active).

Requirements can be entered in a plurality of different ways, so that the screen E is provided with a sentence entry field E4 for entering a sentence which describes requirements; key word registration buttons 161, 162, 163 for identifying requirements with key words; and an evaluation registration list button 164 for identifying requirements by specifying a numerical value or the like for each evaluated item (specifications or the like). The screen E is also provided with options E5 for specifying a level of requirements at five levels: "very high", "high", "middle", "low", and "very low". The options E5 are provided because, for example, when a word such as "good", "low" or the like indicative of a level is entered in a sentence, the level must be definitely identified. The options E5 is used as required since a level of requirements must be identified as well when the requirements are identified with key words, which will be described later. The screen E is further provided with options E6 for selecting whether or not bids are collected after the registration of the request, and an entry field F7 for entering a limited time. When "yes" is selected (bids are collected) in the options E6, the server 21 delivers the requirements of the client to collect bidders after the registration of the request, the client enters a desired bidding period in the time limit entry field E7.

The server 21 analyzes a sentence that describes requirements, entered in the sentence entry field E4, and automatically allocates a key word suitable for the requirements by internal processing. A microcomputer in the server 21 analyzes the sentence to extract key words which are possibly regarded as evaluation items, thereby finding out appropriate evaluation items from the sentence. Also, the microcomputer identifies which of evaluation items should be given importance from the contents of the requirements which are understood from the result of the analysis on the sentence in accordance with data for specifying an evaluation percentage to assign an evaluation percentage to each evaluation item (key word). The evaluation data management DB 147 stores database data for extracting appropriate key words (evaluation items) from words within a sentence, and the data for specifying an evaluation percentage for assigning an evaluation percentage to each key word from the intention of the requirements (for example, the intention of the requirements identified from a sequence of combined key words) which may be understood from the result of the analysis on the sentence.

An example of an entered sentence may be, for example, "a food which is good, cool and healthful" or the like. In this sentence, "good" is a subjective taste, so that the microprocessor in the server 21 responds with a query "enter the good taste in more specific terms". The client may enter, for example, "sweet and good" as a detailed description on the good taste. If the sentence is proper, it is broken down into words "sweet", "good", "cool", "healthful", and "food", and a key word "healthful" may be extracted, by way of example, from a combination of two words "healthful" and "food". With the key word "healthful", a predetermined equation is identified and set such that a food which contains components indispensable for the health, such as vitamins, minerals and so on is given a greater evaluation point within components of the food. For example, the evaluation data management DB 147 stores evaluation data which has been created based on data submitted by the client, previous data, and so on. The evaluation data serves as database data, for example, related to components data such as vitamins, minerals, and so on of a food, as well as the quality, characteristics, components, performance, title, specialty, and so on for a variety of articles and services, and providers of such articles and services. An evaluation point for a key word is calculated using evaluation data in accordance with predetermined equation associated with the key word.

Expressing "healthful" in the exemplary sentence again in more specific terms, assume that the entered sentence describes "a food which is sweet, cool, good and effective for diabetes". In this event, the sentence is broken down into the following words: "sweet", "cool", "good", "diabetes", and "food". For example, a key word "diabetes" may be extracted from a sequence of three words "sweet", "food", and "diabetes". Also, "sweet" may be extracted as another key word. With the key word "diabetes", a predetermined equation is identified and set such that a food which contains less sugar in its contents is given a greater evaluation point, and its evaluation percentage is higher (high percentage). The evaluation data management DB 147 stores database data for identifying a key word from a sequence of combined words, and for determining the tendency of the evaluation percentage and evaluation point in the manner described above. This database data has been created based on integrated knowledge of experts or empirical rules. When "sweet" is extracted a key word (evaluation item), a high evaluation point is given to a food with a high sweetness, which uses a sweetener other than sugar, if "diabetes" is included in key words.

Figure 49:
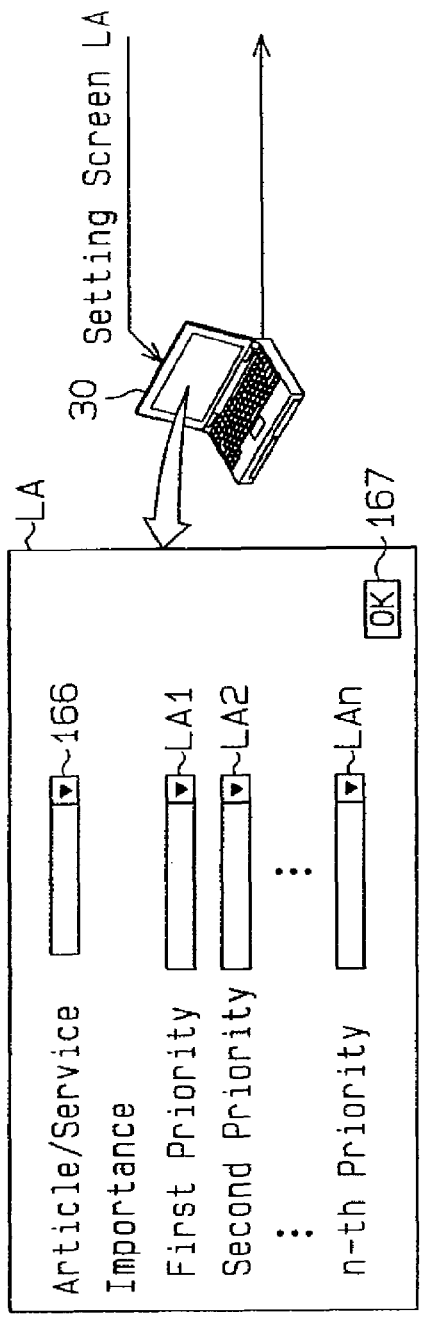
FIG. 49 illustrates a request registration screen for registering a key word.
Figure 50:
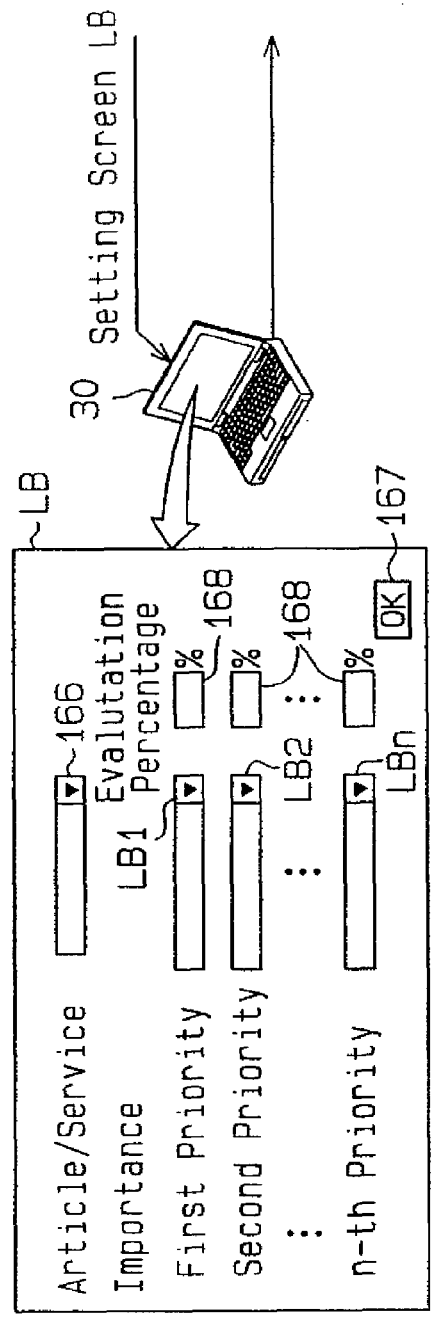
FIG. 50 illustrates a request registration screen for registering a key word different from that in FIG. 49.
Figure 51:
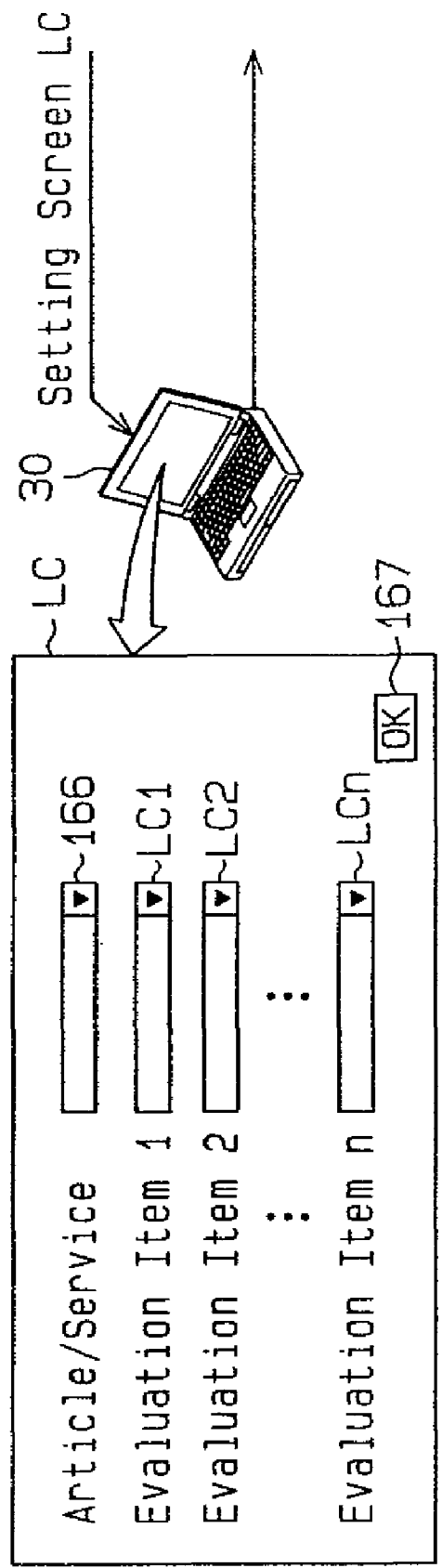
FIG. 51 illustrates a request registration screen for registering a key word different from that in FIG. 50.

A client offers a desired article or service, and identifies specific requirement, if any, in the desired article or service, by registering key words. The registration of key word is classified into three: "priority order registration", "evaluation percentage registration", and "predefined registration" which are selected by three buttons 161, 162, 163, respectively. FIGS. 49, 50, 51 illustrate three types of customer registration screens provided for a client to enter his requirements. When the client selects the button 161, 162 or 163 on the screen E, one of the three types of request registration screens LA, LB, LC illustrated in FIGS. 49, 50, 51 is displayed. The request registration screen LA of FIG. 49 is provided for registering key words in the "priority order registration" which allows the client to specify a priority order for the key words. This screen LA is provided with an article/service display field 166, entry fields LA1 to LAn for entering a maximum of n key words for a first priority, . . . , an n-th priority in a priority order in which higher importance is given to the key words in the evaluation, and an OK button 167.

The request registration screen LB of FIG. 50 is provided for registering key words in the "priority order registration" which allows the client to specify a rate in accordance with the importance of each key word in the form of evaluation percentage (%). This screen LB is provided with an article/service display field 166 similar to that in FIG. 49, entry fields LB1 to LBn for entering key words with a first priority to an n-th priority, evaluation percentage entry fields 168 for the key words, and an OK button 167.

The request registration screen LC of FIG. 51 is provided for registering key words "predefined registration" for which no priority order is given in particular or to which a predefined priority order, which has been initially preset by a program, is applied. This screen LC is provided with an article/service display field 166, entry fields LC1 to LCn for entering a maximum of n key words as evaluation items, and an OK button 167.

For the entry fields LA1 to LAn, LB1 to LBn, LC1 to LCn on the respective request registration screen LA, LB, LC, key words may be selected from those previously prepared, or freely entered.

As the evaluation registration list button 164 is selected, a registration list EA is displayed. The registration list EA enumerates a plurality of previously provided evaluation items which are estimated to be required for evaluating an article or a service specified by the client. The client enters required items such as a desired numerical value, a range, and so on for a specified evaluation item. It should be noted that the screens E, LA, LB, LC and the registration list EA correspond to a request screen.

When the client has entered required items on the request registration screens E, LA, LB, LC and the registration list EA displayed on the terminal 30A, and selects the transmission button 165 on the screen E, bid registration data D18 as bid request information including article/service related information and requirement information is transmitted to the server 21 through the network N. The request registration data D18 is divided into a variety of database data, as required, classified into respective trading types, fields and so on, and stored in the respective database 145, 147. Here, the article/service related information corresponds to attribute information.

Figure 52:
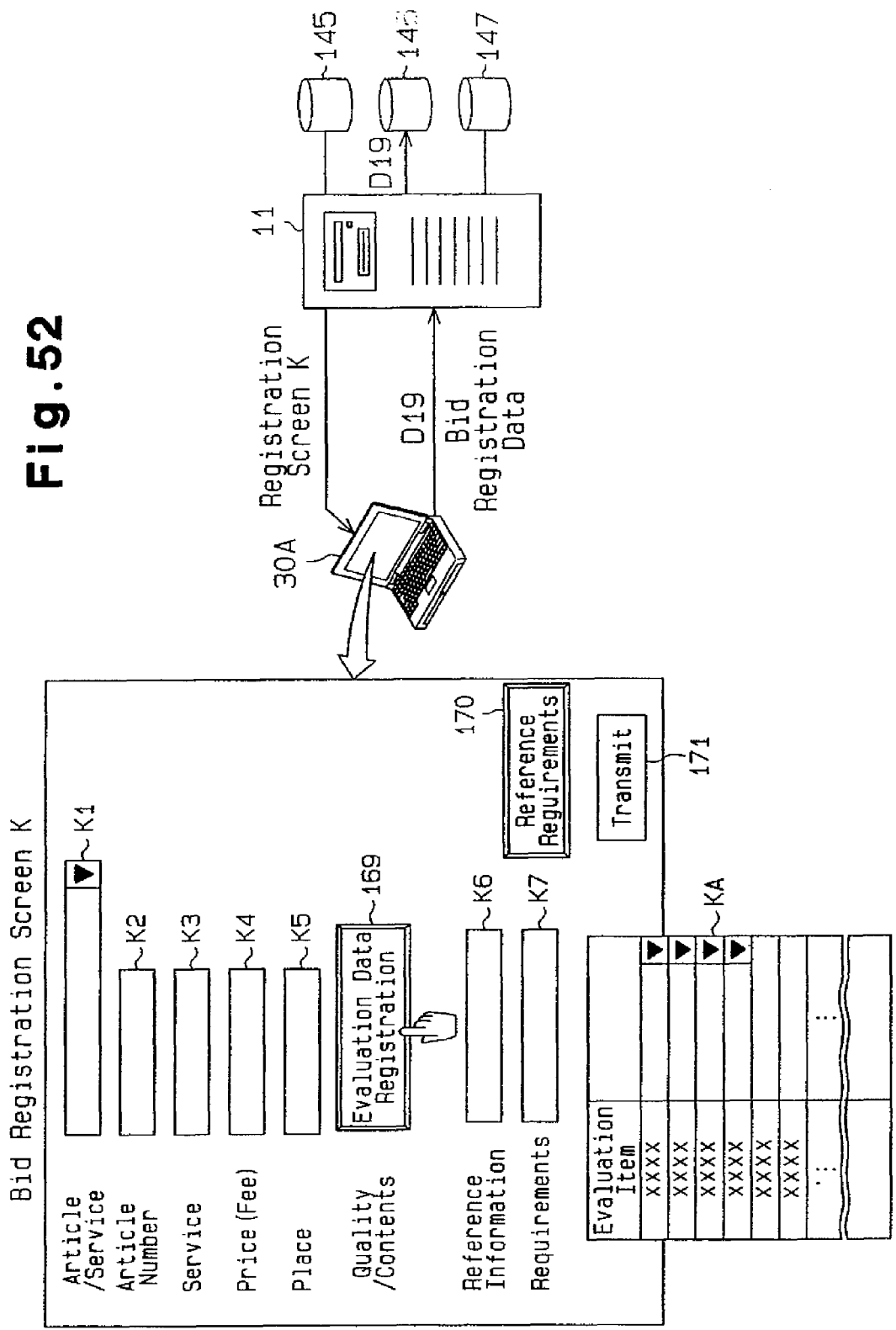
FIG. 52 is an explanatory diagram for explaining a bid registration procedure.
Figure 53:
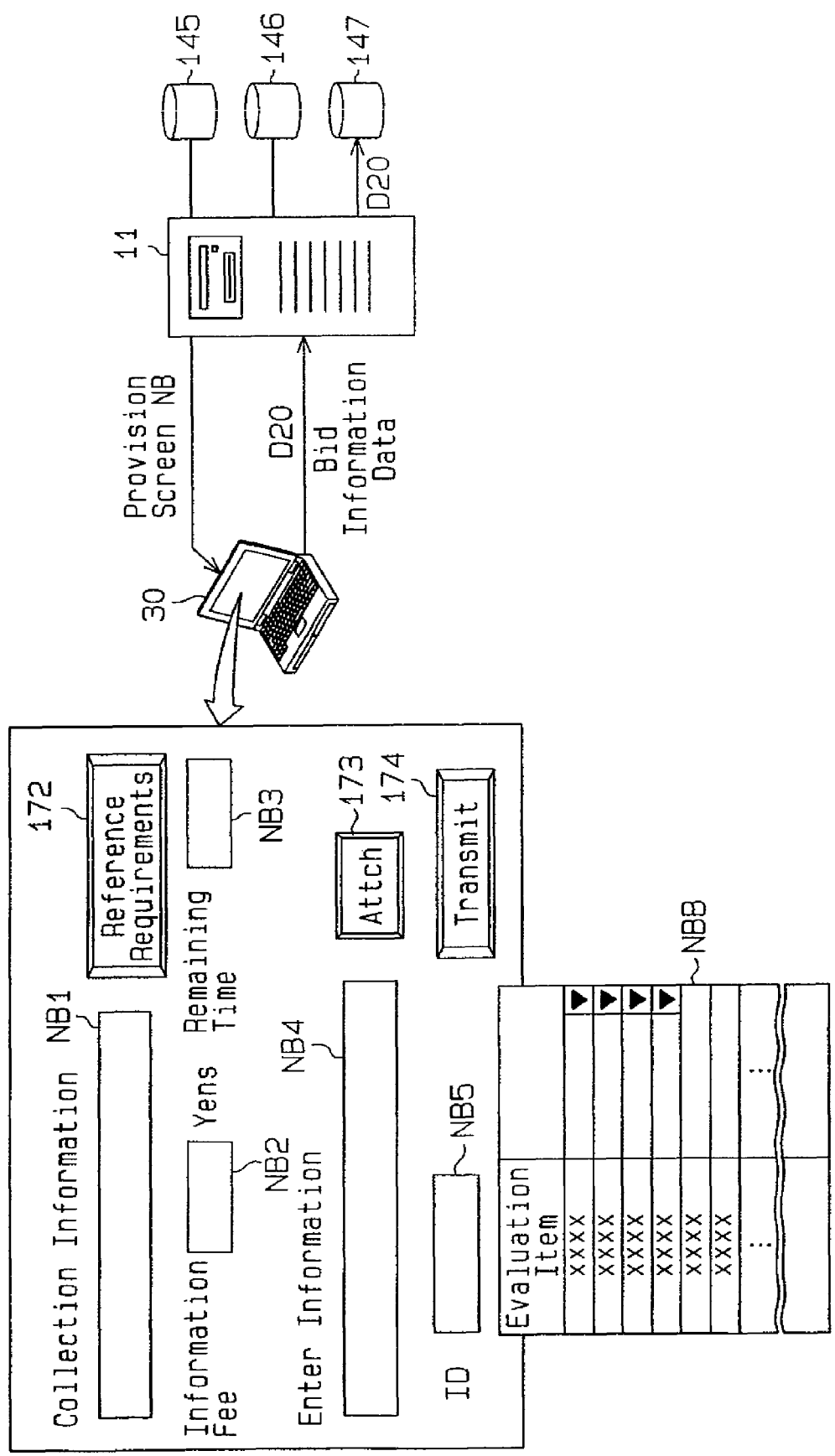
FIG. 53 is an explanatory diagram for explaining an information provision based bidding procedure.

A client may request for an evaluation auction in two different ways: "direct trade" and "information trade". A client selects the direct trade button 106 on the evaluation auction HP screen for participating in a bid for "direct trade," or selects the information trade button 107 on the evaluation auction HP screen for participating in a bid for "information trade". In either the "direct trade" or the "information trade", the client specifies a normal auction or a counter-auction with the options 108, selects a selection button 100 associated with a classification to which a desired article or service belongs, and then selects the decision button 130. In response, a bid registration screen K illustrated in FIG. 52 is displayed when the "direct trade" is selected, while an information provision screen NB illustrated in FIG. 53 is displayed when the "information trade" is selected. It should be noted that the bid registration screen K and the information provision screen NB correspond to a bid screen.

As illustrated in FIG. 52, the bid registration screen K is provided with a variety of entry fields K1 to K6 for entering an article or service name (specified in detail), an article number, the contents of a service, a price (fee), a place, reference information, and so on; an evaluation data registration button 169 which is selected for registering evaluation data for use in numerical value evaluation; a requirement display field K7 for displaying requirements of a client; and a requirement reference button 170. When a client specifies requirements without sentence (key word registration or evaluation item registration (specification or the like)), the requirement reference button 170 selected by the client results in displaying detailed requirements for key words or evaluation items registered by the client on an auxiliary screen.

On the other hand, when the client selects the evaluation data registration button 169, a registration list KA is displayed. A person who is going to register in a bid enters required items (evaluation data) in evaluation items and so on enumerated in the registration list KA. A client enters required items in all the fields on the bid registration screen K displayed on the terminal 30A, and selects a transmission button 171, causing bid registration data D19 as bid information to be transmitted to the server 21 through the network N. Within the bid registration data D19, data associated with article/service management is added to the customer/article management DB 145; data associated with evaluation management is stored in the evaluation data storage unit 156 in the evaluation data management DB 147, as classified into respective fields or the like.

In the evaluation auction, requirements of a client are analyzed and replaced with evaluation items (for example, represented by key words or the like). Then, an associated article or service is evaluated in the form of numerical value for each of the evaluation items. Consequently, the evaluation numerical values are individually evaluated for each of the evaluation items, or the respective evaluation points for all the evaluation items are summed to derive a total evaluation point which is to be evaluated.

A bid is conducted in two different systems: an advanced bid system in which the contents of a bid are previously registered before a request is made, and a normal bid system in which bidders are collected after a request is made. In the advanced bid system, bid information has been previously registered in the auction management system 20 before a request is made, and when a request is made afterwards from a client, a bid is conducted among bid data which have been previously registered. In the normal bid system, after accepting a request from a client, his requirements are widely notified on terminals 30 of third parties through the network N to collect bidders. The advanced bid system is suitable when the contents of an article or a service available for the bid are fixed. Upon accepting a request, it is immediately find an article, a service, or a buyer which satisfies the requirements, or information associated therewith a short waiting time. On the other hand, the normal bid system allows a bidder to view and confirm details on a request of a client and participate in a bid after determine an article or a service which the bidder can offer, so that the client can determines a bidder who has offers conditions preferred to the requirements as a successful bidder. The bid registration data D19 and the bid information data D20 (see FIG. 53) are stored in the customer/article management DB 145 and the evaluation data management DB 147, respectively when the advanced bid system is conducted, and stored in the bid data management DB 146 when the normal bid system is conducted. In the advanced bid system, the bid data stored respectively in the DBs 145, 147 are read for bidding upon acceptance of a request from a client.

An article may be information. Specifically, when a certain article or service is desired, an auction may be used for a trade for buying required information from a person who knows an owner of the article, a company which sells the article, or a provider or a providing company of the service.

Traded information may be in any fields and categories. Giving a mere example, there is information on schools of fish (about what time which kind of fish in which region and at which density of signs of fish) information on resources (information on where rare metals, petrol, or the like is buried), and so on.

When entering "information on a school of fish called "OO" (in a certain region) is wanted", or " . . . (in a certain place or region)", "fish called "OO" (a kind of fish), and "sign of fish" are entered in the key word entry field, the sentence is used as it is as information to widely collect information related to this information through the Internet N in the former case. If someone who views the information knows some related information, he selects an information provision button OO on the screen. In response, an information provision screen illustrated in Fig. OO is displayed, so that he enters the valuable information possessed by himself in an information provision entry field DD for bidding.

How to handle information on a school of fish at auction will be explained as an example. For example, a fishing boat may provide fishermen and fishing boats with information on signs of fish which is not a target of the fishing boat itself but may be intended, for example, by other fishing boats, other than fish which is captured by the fishing boat. In this event, ships and so on which expect such information generally want information on signs of fish from a ship nearest to them. For this purpose, the ships participate in an auction to acquire information from the nearest ship. Specifically, a ship which has information on signs of fish provides the information to a server 21 in an intermediary company through the Internet N. For example, fishermen and fishing boats may use the auction to look for any useful information on the fishing from nearby ships. In this event, it is possible to enter the kind of fish or the like in the priority entry field to narrow down information. It is also possible to narrow down a range of region.

Then, the server 21 widely provides terminals 30 of third parties with such an outline of information that let the third parties understand to which the information is related. A third party which views the outline may buy the information through the terminal 30.

For example, when an information entry button 117 is selected on the auction HP as illustrated in FIG. 47, an information provision screen NB illustrated in FIG. 53 is displayed. As illustrated in FIG. 53, the information provision screen NB for use in a bid for the "information trade" is provided with a collected information display field NB1, an information fee (compensation for providing information) display field NB2, a remaining time display field NB3, an information entry field NB4, an ID number entry field NB5, a requirement reference button 172, an information attachment button 173, and a transmission button 174. The collection information display field NB1 displays the contents of information, which a client is looking for, in sentence. When a client specifies requirements without sentence (key word registration or evaluation item registration (specification or the like)), the requirement reference button 172 selected by the client results in displaying detailed requirements for key words or evaluation items registered by the client on an auxiliary screen. Since an information fee is displayed in the information fee display field NB2, a viewer who can provide the collected information enters (fills) the provided information in the information entry field NB4, or attaches detailed data by entering required items such as evaluation data and so on on a registration list NBB which is displayed when he selects the append button 173, enters his ID number, followed by transmission of the information. Then, as the viewer selects the transmission button 174 after entering his ID number, bid information data D2 as bid information is transmitted to the server 21 through the network N.

The information provision screen NB displays the contents of information which a client is looking for in the collected information display field NB1, and an information fee in the information fee display field NB2, so that a viewer who can provide desired information enters (fills) provided information in the information entry field NB4, or attaches data by entering data on evaluation items (specifications or the like) on a registration list NBB which is displayed when he selects the append button 173, and manipulating for attachment, enters his ID number, followed by transmission of the information. The server 21 manages the information in the database 147. For example, when the client transmits information on requirements to the server 21, the server 21 searches the management data in the database 147 for pertinent information, and immediately collects the information when the information is not urgently required so that a collection time is allowed to some extent. Then, after the expiration of a limited time, at which a remaining time has exhausted, collected information is analyzed to transmit the information which most matches the needs of the client to a terminal 30 of the client. In this event, a reference of evaluation point is specified for bidding off in accordance with a level of requirements specified by the client, so that a successful bidder is determined in accordance with the specified evaluation level. The client who has acquired the desired information pays the information fee and an additional commission. The information fee is paid to the successful bidder.

Alternatively, a client may only notify a desired article or service, in which case the server 21 stores evaluation data for properly evaluating previously registered articles or services to evaluate a plurality of previously determined evaluation items in the form of numerical value such that the client bids off the article or service which has a high total evaluation point.

Next explained is a method of evaluating whether an item satisfies a client's requirements in the form of numerical value. The requirements are analyzed and replaced with evaluation items. Then, an associated article is evaluated in the form of numerical value for each of the evaluation items (represented, for example, by key words or the like). Consequently, the evaluation numerical values are individually evaluated for each of the evaluation items, or the respective evaluation points for all the evaluation items are summed to derive a total evaluation point which is to be evaluated. This evaluation point is competed, and the client preferentially bids off an article, the evaluation point of which more satisfies conditions of a bid form. In this way, the bid is conducted with numerical values which obtain evaluation points that satisfy the requirements.

Alternatively, a client or a bidder may only notify a desired article or service, in which case the server 21 stores evaluation data for properly evaluating previously registered articles or services to evaluate a plurality of previously determined evaluation items in numerical value such that the client bids off the article or service which has a high total evaluation point.

FIG. 55 shows evaluation data D21 which records an evaluation point for each of evaluation items associated with articles and services, wherein an evaluation point for each of evaluation items is recorded for each of registered articles A, B, C, . . . . In this example, the articles are evaluated on the basis of 100 points.

FIG. 56 shows equation data D22 which records equations for use in converting a key word into a numerical value, wherein a corresponding equation is recorded for each key word. Variables in the equations corresponds to evaluation items, so that an evaluation point is calculated for a key word by substituting evaluation points of evaluation items corresponding to the respective variables in the equations and calculating the equations.

For example, for looking for a food through the t numerical value auction, when evaluation items include key words such as "safety," "healthful", "disease" and so on, by way of example, these requirements are totally and properly evaluated for conversion into an evaluation point. To each key word, an equation has been previously set such that the key word is correctly evaluated. For example, with "safety", evaluation items used as variables of an associated equation includes a natural vegetable using ratio, a synthetic seasoning using ratio, a sugar using ratio, agricultural chemicals/fertilizers, minerals, and so on, each of which is given a greater point as an associated food is more healthful to a human body. For example, an equation "$\Sigma kn\ (=k1, 2+ \ldots n)$" (where kn is an evaluation value for an evaluation item n). In this way, an evaluation point is found in accordance with a key word based on the evaluation data D21 and the equation data D22. With "disease", in turn, an equation is employed such that an evaluation item (for example, a component such as a vitamin or the like) more effective for curing this disease is more highly weighted. A food which is given a high point to the effective evaluation item is properly evaluated so that its evaluation point for the key word "disease" basically becomes greater. For example, for diabetes, an equation is employed such that an evaluation point for a sugar percentage is more highly weighted, so that a food having a low sugar percentage is significantly highly evaluated. The respective data D21, D22 are stored, for example, in the database 147.

For example, when a client uses the screen LA of FIG. 49 for setting a plurality of key words, evaluation points for respective key words of the first priority to the n-th priority are weighted in the priority order, so that requirements of the client are totally evaluated. For example, a total evaluation point is calculated in accordance with its predefined evaluation percentage, for example, 100% for the first priority, 80% for the second priority, . . . , 10% for the n-th priority, and so on. When the screen LB of FIG. 50 is used, evaluation points for respective key words of the first to the n-th priority are weighted in accordance with corresponding evaluation percentage % to calculate a total evaluation point. When the screen LC of FIG. 51 is used, respective key words are equivalently evaluated with an equal evaluation percentage. It should be noted that requirement data (for example, key words and so on) from the client, which is information that is the basis for conversion into numerical values such as evaluation points for individual items and a total evaluation point correspond to information under evaluation.

FIG. 54 illustrates an evaluation result display screen O. For example, when a client sets a plurality of key words, candidate articles (or services) which satisfy requirements are displayed in the order of greater total evaluation points as illustrated in FIG. 54. On this screen O, an individual evaluation point for each evaluation item (key word) and a total evaluation point are displayed for the respective articles (or services) selected as candidates. The number of bidders enumerated in a list on the evaluation result display screen O is determined by the server 21, and are narrowed down to a fixed percentage of all bidders, or to a fixed number of bidders specified by the client. When the client can view the evaluation result display screen O on the terminal 30, the client can select by himself a successful bidder or an article with reference not only to the total evaluation point but also to an individual evaluation point for each of the evaluation items.

On the screen O, a bid-off button 175 at a right end position corresponding to an article (or a service) ranked at the first position as a successful bid candidate is displayed as selected. When the client wants to individually view an evaluation point for each key word and changes an article to be bidden off to an article at a lower rank candidate, the client may select a right end position corresponding to the article to switch the position at which the bid-off button 175 is selected to the position of the selected article. Then, the client selects an OK button 176 with the bid-off button 175 being selected. On the other hand, for a correction or a cancel, a correction button 177 may be selected. As the client selects an article to be bidden off and selects the OK button 176, the associated bid-off data is transmitted to the server 21, which, upon receipt of the bid-off data, notifies both the seller and the buyer of the establishment of the trade. Of course, information on a successful bidder may only be transmitted to the client. In other words, the server 21 determines the bidder who has obtained the highest total evaluation point as a successful bidder, and notifies the client to that effect together with details on the evaluation.

Figure 57:
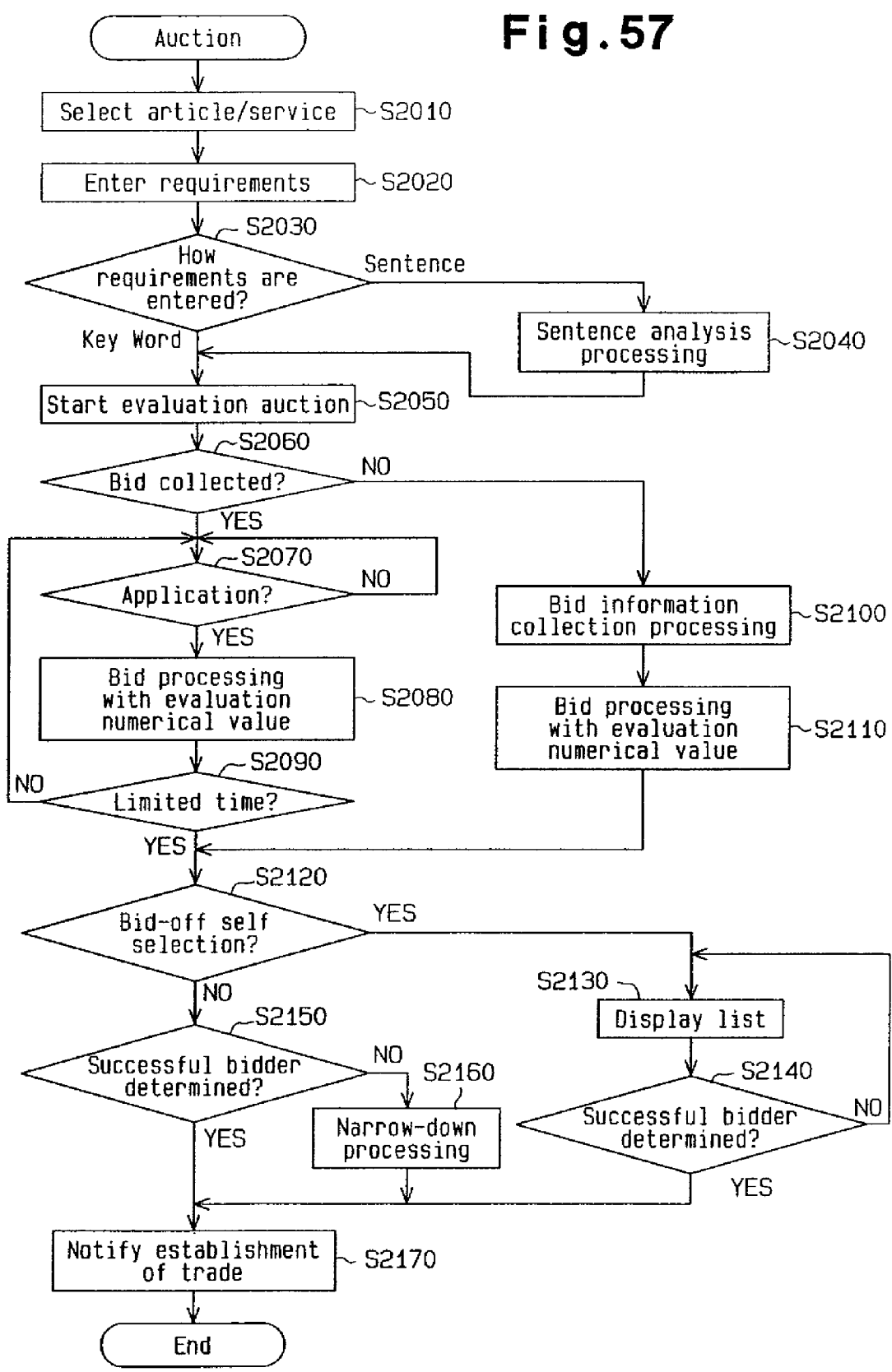
FIG. 57 is a flow chart illustrating a procedure of an auction.

Next, an auction procedure will be explained with reference to a flow chart of FIG. 57.

First in S2010, an article/service is selected. Specifically, on the auction HP, the type of trade (direct trade, information trade) is selected by the buttons 106, 107, and the field of the article/service is identified by selecting a selection button 100. Subsequently, the decision button 130 is manipulated, and a desired article or service is specifically identified in the identified field on the next screen (request registration screen) E (however, depending on the field, an article or the like may have been previously identified before the request registration screen E is displayed). It should be noted that a procedure of receiving the data entered in S2010 to 2040 at the server 21 corresponds to a request procedure.

In S2020, requirements on the article or service are entered. Specifically, for entering the requirements as a sentence, the sentence is entered in a sentence entry field E4 on the request registration screen E. On the other hand, when the requirements are to be identified using key words, one of three buttons 161, 162, 163 is selected on the request registration screen E. Then, on the next screen LA, LB, LC associated with the selected button, key words are entered. In addition, on the screen LB, an evaluation percentage for each key word is entered in an evaluation percentage entry field 168. Also, for specifically entering numerical values or the like for evaluation items (specifications or the like), the numerical values or the like for the evaluation items (specifications or the like) are entered on a list EA which is displayed when an evaluation registration list button 164 is selected.

In S2030, it is determined whether the requirements have been entered as a sentence or as key words. For a sentence, the procedure flow continues to S2040, while for key words, the procedure flow continues to S2050.

In S2040, the sentence is analyzed to extract key words from the sentence. Here, the sentence analysis involves dividing the sentence into words (nouns, adjectives, and so on), determining whether or not each of the words is found in registered words in the database, and selecting a key word associated with the registered word if found. Also, since a certain word may only have abstract and vague meaning so that the word alone cannot be used as the basis for evaluation (for example, "good"), the meaning is found in consideration of the relationship with other words such as those previous and subsequent to that word, and a key word pertinent to the resulting meaning is also selected. Further, if there are a plurality of key words associated with a matching registered word, the key words are narrowed down from the meaning found from the relationship among the words. In this event, since the article or service has been already determined, an appropriate key word is extracted in consideration also to their natures and characteristics. Moreover, if a word has too vague meaning to narrow down key words, the client is required to re-enter a specific word.

In S2050, an evaluation auction is started. Specifically, the server 21 creates a bid registration screen K in which details on a request received from a client is reflected, and delivers the bid registration screen K, such that those who access the screen K can view the auction, to solicit a participation in a bid for an article or service offered by the client. The server 21 widely collect bids on terminals 30 of third parties through the Internet N. In this event, if the auction is conducted for an article or a service available from particular dealers, the server 21 transmits bid collection information only to such particular dealers.

In S2060, it is determined whether or not a bid collection is specified. Specifically, when the bid collection "YES" is set in the options E6 and a bidding period is set in the entry field E7 on the request registration screen E, bidders are collected during the bidding period. Since some article or service is not suitable for a bid, the contents of which is changed according to the details on the request, when viewed, articles or services are narrowed down to those that most satisfy the requirement from previously registered data if such a type of article or service is traded at auction. On the other hand, when an article or a service is suitable for a bid, the contents of which is determined after details on a request is viewed and considered, bidders who offer conditions and so on that satisfy requirements are collected during the bidding period. It should be noted that a procedure of starting the auction to display the bid registration screen K on the terminals 30 of bidders in S2050 and receiving bid information at servers 21 in S2060 when there is an application, corresponds to a bid procedure.

In S2070, it is determined whether or not any application is made to the auction. In other words, the presence or absence of a bid from a bidder is determined. In this event, the presence or absence of the bid registration data D19 is determined when the client has specified the "direct trade," while the presence or absence of the bid information data D20 is determined when the client has specified the "information trade."

If there is no bid, the server 21 waits for bids. If there is a bid, the procedure flow continues to S2080. It should be noted that a procedure executed from S2070 to S2170 corresponds to a bid acceptance procedure.

In S2080, bid information is acquired to execute the bid processing which involves evaluating each of evaluation items in the form of numerical value based on a variety of data for evaluation which has been offered as one piece of information within the bid information, summing the respective numerical values to produce a total evaluation numerical value, and conducting the bid with the total evaluation numerical value. Bidders are ranked in a priority order in which positioned at a higher rank is a bidder who is given a greater total evaluation point which is derived by summing respective numerical values representative of evaluations for respective evaluation items for the contents of offers of the bidders.

In S2090, it is determined whether or not a limited time has expired. When within the limited time, the procedure flow returns to S2070 to repeat the processing from S2070 to S2090 to execute the bid processing each time a new bidder applies, until the limited time expires. At the expiration of the limited time, the procedure flow continues to S2120.

On the other hand, if it is determined in S2060 that the bid collection "no" is specified, bid information is collected in S2100. Specifically, the bid registration data D19 or the bid information data D20 previously managed as databases in the DBs 145, 147 are searched to extract previously registered articles or services pertinent to the specified article or service.

Then, in next S2110, the bid processing is executed for the extracted articles or services with evaluation numerical value. Specifically, articles or services offered by the respective bidders are evaluated in the form of numerical value for evaluation items (key words or the like) identified from the requirements of the client, and are narrowed down to those which are given a total evaluation point, the sum of evaluation numerical values for the respective evaluation items, that most satisfies the requirements of the client.

In S2120, it is determined whether or not a bid-off self selection is set. The procedure flow continues to S2150 when the bid-off self selection is not set, and to S2130 when the bid-off self selection is set.

In S2150, it is determined whether or not a successful bidder is determined. In other words, it is determined whether bidders are narrowed down to a predetermined number of successful bidders. The procedure flow continues to S2160 if the bidders are not narrowed down to the predetermined number of successful bidders, and otherwise to S2170.

In S2160, the narrow-down processing is executed. Bidders are narrowed down to a predetermined number of potential successful bidders in consideration of other reference information other than evaluation numerical values. A bidder who has offered conditions or the like that most satisfy the requirements of the client is determined as a successful bidder. On the other hand, if a price is fixed or if a price itself is not handled in a bid, successful bidders are narrowed down to a predetermined number in accordance with a previously defined predetermined rule.

On the other hand, if it is determined in S2120 that the bid-off self selection is set, the evaluation result display screen O, which lists bid information provided by a predetermined number of successful bidders, illustrated in FIG. 54 is created. The user can view the evaluation result display screen O by selecting a screen display after entering a password on the screen of the terminal 30. The evaluation result display screen O enumerates candidate items (articles/services) or candidate persons in a priority order in which candidates given greater total evaluation points are ranked at higher places.

In S2140, it is determined whether or not a successful bidder has been determined. The evaluation result display screen O is continuously displayed (S2120) until a successful bidder is determined, and the procedure flow continues to step S2170 when a successful bidder is determined. The client determines a trading partner while referencing individual evaluation points for the respective evaluation items as well as the total evaluation points and further referencing other information offered by the bidders. On the screen O, the bid-off button 175 is displayed as selected at a position corresponding to an article (or a service) at the first place of the candidate ranking. When the client wants to individually view an evaluation point for each key word and changes an article to be bidden off to an article at a lower rank candidate, the client may select a right end position corresponding to the article to switch the position at which the bid-off button 175 is selected to the position of the selected article. On the other hand, for a correction or a cancel, a correction button 177 may be selected. When the client eventually determines a trading item (trading partner, an article or a service) after changing the selection of the bid-off button 175 as required on the screen O, the client selects the OK button 176. In response, the associated bid-off data is transmitted to the server 21 through the Internet N, which determines that a successful bidder has been determined, followed by the procedure flow continuing to S2170.

In S2170, the server 21 notifies both the user and the successful bidder of the establishment of the trade.

Figure 58:
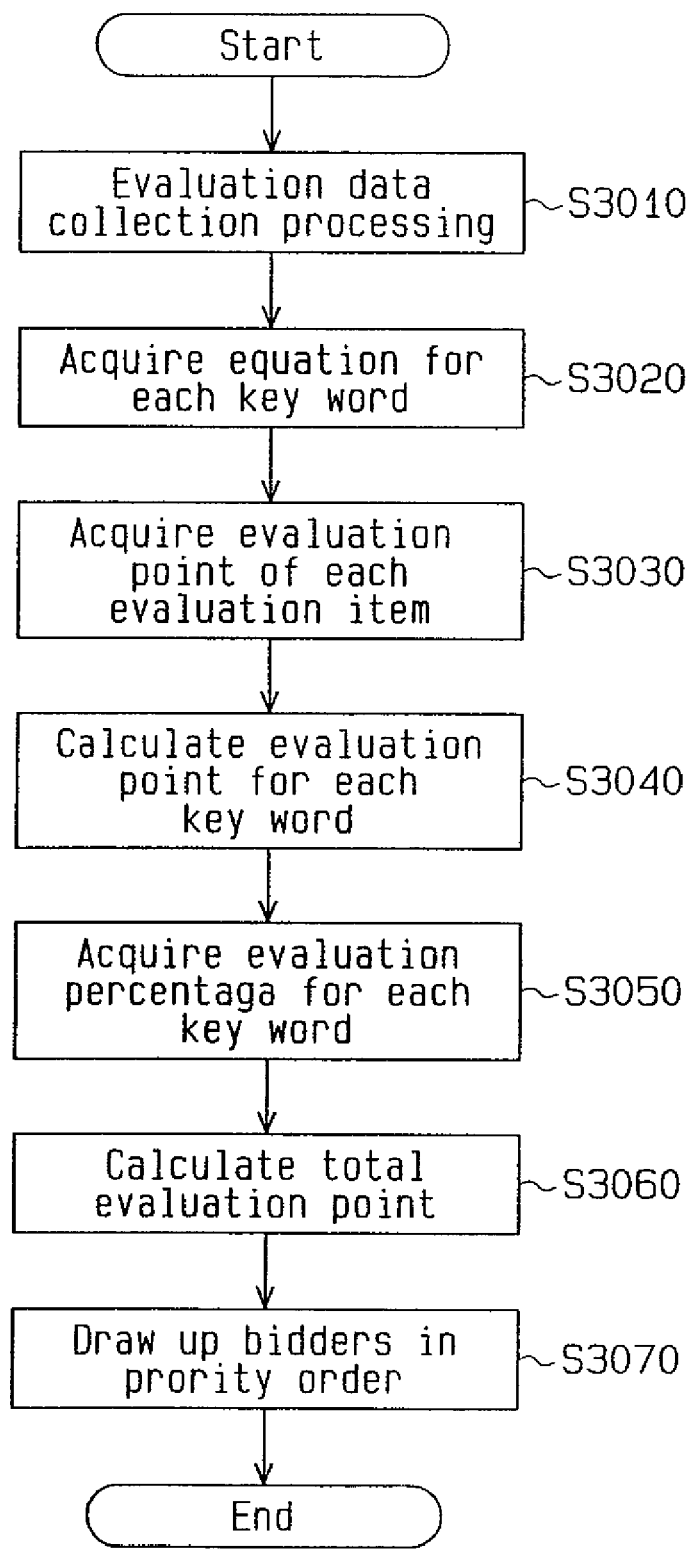
FIG. 58 is a flow chart illustrating a procedure of an evaluation auction.

Next, a procedure of the evaluation auction will be explained with reference to a flow chart of FIG. 58. This procedure is used when a bid is conducted with evaluation numerical values in the flow chart of FIG. 57. It should be noted that a procedure shown in S3010 to 3070 also constitutes a bid-off procedure.

In S3010, the server 21 collects the evaluation data D21 (FIG. 55) associated with an article or a service (including a provider).

In S3020, the server 21 acquires an equation for a key word. Specifically, the server 21 searches the equation data D22 with the key word to acquire an equation corresponding to the key word.

In S3030, evaluation items corresponding to variables used in an equation for each key word are searched to acquire an evaluation point for each evaluation item.

In S3040, the evaluation points for the evaluation items are substituted into the variables in the equation for the key word to calculate an evaluation point for the key word.

In S3050, an evaluation percentage is acquired for each key word. When requirements are registered as key words, an evaluation percentage determined from a priority order is employed in "priority order registration"; an evaluation percentage specified by the client is employed in "evaluation percentage registration"; and a predefined evaluation percentage (for example, an equivalent evaluation percentage), which has been initially set, is employed in "predefined registration". On the other hand, when the requirements are entered as a sentence, an evaluation percentage specified to each of key words from the result of an analysis on the sentence is employed.

In S3060, the evaluation point for each of the key words is multiplied by each evaluation percentage associated therewith, and the resulting values are accumulated to calculate a total evaluation point.

In S3070, the result of the evaluation is displayed on the screen. In this event, the evaluation points given to items offered by respective bidders are compared to draw up the bidders (or offered articles or services) in order. In this event, a range of points is determined in accordance with the level of the requirements registered by the client on the request registration screen E, so that the bidder who has been given the highest total evaluation point, for example, within the range of points is determined as a successful bidder.

Next, several examples for the evaluation auction will be enumerated below.

(A) Desired conditions and the degree of satisfaction of a buyer is evaluated, such that a seller who has offered the conditions/contents which are given the highest value, or information on the seller is selected at auction.

(1) A judge or a buyer evaluates the novelty or inventive step, performance, usability and functions, notability and favorability, price, design, and so on of an article or a product, a machine, a facility, a system, design drawings, a design, a patent or the like, or desired condition, degree of satisfaction or the like of the judge or the buyer, and selects an item which was given the highest point for an individual numerical value or a combination of all the numerical values, or information on the item at auction.

(2) A judge or a buyer evaluates locality, characteristics, valuability, distribution, notability, quality, quantity, price, preservation, color, shape, and so on of a fuel, a raw material, an agricultural product, a marine product, a forest product, a processed item, a product, an article, or the like, or desired condition, degree of satisfaction or the like specified by the judge or the buyer, and selects an item which was given the highest point for an individual numerical value or a combination of all the numerical values, or information on the item at auction.

(3) A judge or a buyer selects an answerer, an examinate, a player, a performer, a man of ability or the like which has acquired the highest point, or information associated therewith at auction.

(4) A judge or a buyer evaluates the figure, sense, style, fashion, singing ability, playing ability, dance ability, force, vitality, skill, conversational skill, intellectual ability, notability, or the like, or desired conditions, degree of satisfaction, evaluation of the performance, or the like specified by the judge or the buyer, and selects a client, a seller or an evaluated person which was given the highest point for an individual numerical value or a combination of all the numerical values, or information on the item at auction.

(5) A financier, an investor, or a judge evaluates the sales amount, revenue, contents of closing accounts, capital force, possessed technological specialties, development capabilities, future capabilities, number of employed persons, expenditure, asset, creditability, or the like of an individual or a legal person, or conditions specified by the financier, the investor or the judge, and selects an item which was given the highest point for an individual numerical value or a combination of all the numerical values, or information on the item at auction.

(6) A judge or an information provider, or a buyer of a company, an individual, an association, an organization, a nonprofit institution, a credit company, an Internet company, a public organization, a service company or the like evaluates a paying ability and results, a purchase ability and result, creditability, fortune, education, profession, professional history, age, avocation, skill, title, native place and address, membership history, or the like of an ordinary customer, client, member, employee or the like, or conditions specified by the judge or the buyer, and selects an item which was given the highest point for an individual numerical value or a combination of all the numerical values, or information on the item at auction.

(7) When a judge or a buyer is going to learn at a school, a driving school, or a training school for acquiring a title, or a sport, music, picture, language, skill or cultural class, or with a home tutor or the like, the judge or the buyer evaluates a school fee, required period for acquiring a title, time required to reach the class and transportation means, higher grade school entrance and recruiting accomplishment, experiences and evaluations by learned students, environment, equipment, facilities and so on of the class, or the like, or conditions, degree of satisfactory, or the like specified by the judge or the buyer, and selects an item which was given the highest point for an individual numerical value or a combination of all the numerical values, or information on the item at auction.

(8) When a judge or a buyer is going to make an order to a carpenter or a construction or a facility company, a house reform company, or a plate, paint or repair company for a car, a machine or the like, a repair company for a business machine, dairy necessities or the like, a transportation company for movement, delivery or the like, an on-demand production company, or the like, the judge or the buyer evaluates a price, a fee and a payment method, the number of days required for production, repair and mending, a service period and a range of insurance of the after service, time and distance to the house or the office of a contractor, evaluations of customers for a seller and work results, the skill and personal evaluation of a contract, and so on, or conditions, degree of satisfactory, or the like specified by the judge or the buyer, and selects an item which was given the highest point for an individual numerical value or a combination of all the numerical values, or information on the item at auction.

(B) A seller evaluates desired conditions, and selects a buyer who has offered the highest numerical value or information on the buyer at auction.

(1) When an information provider or a seller sells, rents, or sells information on a transportation means such as a car, a ship, an airplane, a rocket or the like, an article, a product, a machine, a facility, a system, a building, a land, engineering, a design, a copyright, a patent, or the like, or sells a fuel, a raw material, an agricultural product, a marine product, a forest product, a processed item, or the like, or sells information associated therewith, the information provider or the seller evaluates a sales price, a lease fee, the quantity, a weight, an order and a delivery due date, a use period, an order date and an order place, a use day and a use place, the number of times of uses, a delivery place, the distance, a method, or the like, or conditions of the seller or the information provider, and selects an item which was given the highest point for an individual numerical value or a combination of all the numerical values, or information on the item at auction.

(2) A client or a job hunter evaluates a salary, treatments, weekly holidays, annual holidays, the established year of a company, a capital, the number of employees, a constitutional organization, welfare facilities, environment, site conditions, facilities, types of works, settlements, trading companies, or the like, or result, a method of employment, contents of course, a course fee, a period, a system, or the like, or conditions desired by the client or the job hunter, or conditions of an information provider, and selects an item which was given the highest point for an individual numerical value or a combination of all the numerical values, or information on the item at auction.

(3) A person who receives an investment, a finance or information evaluates a financed amount, a finance execution date, an interest, a payment period, the number of times and the amount of commission, a collateral rate, the presence or absence of a guarantor offered by a bank, a credit company, a financial dealer, an investor, or an investment company, or notability, creditability or the like of a finance company or an individual, or the like, or conditions desired by the person who receives an investment or a finance, or conditions of an information provider, and selects an item which was given the highest point for an individual numerical value or a combination of all the numerical values, or information on the item at auction.

(C) A buyer evaluates desired conditions or degree of satisfaction, and selects a seller who offers the smallest numerical value or information associated therewith at auction.

(1) When a judge or a buyer selects an article or a product, a car, a ship, an airplane, a rocket, a machine, a facility, a patent, or the like, the judge or the buyer evaluates used years, manufactured year, price, degree of repairs, abrasion, corrosion, deformation, discoloration, noise environment contamination degree, or the like, or conditions specified by the judge or the buyer, or the result of examinations, and selects an item which was given the smallest point for an individual numerical value or a combination of all the numerical values, or information on the item at auction.

(2) When a judge or a buyer selects an agricultural product, a marine product, a forest product, a processed item, a product, an article, or the like, the judge or the buyer evaluates the quantity, a weight, a price, or defects or difficulties such as wounds, damaged freshness or the like, or conditions specified by the judge or the buyer or the result of examinations, and selects an item which was given the smallest point for an individual numerical value or a combination of all the numerical values, or information on the item at auction.

(3) A judge or a buyer selects an answerer, an examinate, a player, a performer, a man of ability or the like which has offered the smallest numerical value with respect to erroneous answers, a lost point, defects or the like, or information associated therewith at auction.

(4) A judge, a financier, an investor, a service company or the like evaluates ages of employees, a percentage of part-time workers, a loan ratio, an asset ratio, a personnel expense ratio, a bill issuing ratio, the number of times of delayed payments, the number of times of accidents, or the like, or conditions specified by the judge or the like, or the result of examinations, and selects an item which was given the smallest point for an individual numerical value or a combination of all the numerical values, or information on the item at auction.

(5) When a judge or a buyer selects a fuel, vinyl, plastic, a wrapping product, a container, dairy necessities, electric appliance, furniture, clothing, a raw material, an intermediate product, an article or the like, the judge or the buyer evaluates $CO_2$, poisonous gases, emission regulated substances or the like, which are generated when they are burnt, or the amount of substances, generated by burnt, specified by the buyer or the judge, and selects an item which was given the smallest point for an individual numerical value or a combination of all the numerical values, or information on the item at auction.

(6) When a judge or a buyer selects a machine, an apparatus, an intermediate product, an article, an agricultural product, a marine product, a forest product, a processed food, or the like, a system, design drawings, a patent or the like, the judge or the buyer evaluates the amount of mixture or use of a gas, water, a solvent, a detergent, a foaming agent, a redox agent, a corrosive, a coloring agent, a disinfectant, agricultural chemicals, oil, a mixing agent, or the like, or a substance specified by the judge or the buyer, and selects an item which was given the smallest point for an individual numerical value or a combination of all the numerical values, or information on the item at auction.

(7) When a judge or a buyer selects a car, a ship, an airplane, a train, a rocket, a machine, a facility, an atomic power plant, or the like, the judge or the buyer evaluates the amount of emission of exhausted gases, emission regulated substances or the like such as radiation, $CO_2$ gas, nitrogen, phosphate compounds, or the like, or a substance specified by the buyer or the judge, and selects an item which was given the smallest point for an individual numerical value or a combination of all the numerical values, or information on the item at auction.

(8) When a judge or a buyer selects a factory, a company, an apparatus, a facility, an atomic power generator, design drawings, a system, a patent, or the like, the judge or the buyer evaluates the amount of emission of radiation, $CO_2$ gas, poisonous substances, emission regulated substances, or the like, or a substance specified by the judge or the buyer, and selects an item which was given the smallest point for an individual numerical value or a combination of all the numerical values, or information on the item at auction.

(9) When a judge or a buyer selects a system, design drawings, a patent, a machine, a facility, a factory, a company, a product, or the like, the judge or the buyer evaluates the amount of emitted radiation, gases, liquids, solids, or the like, and selects an item which was given the smallest point for an individual numerical value or a combination of all the numerical values, or information on the item at auction.

(10) When a judge or a buyer is going to learn at a school, a driving school, or a title acquisition class, or a skill, language, sport, music, picture, or cultural class, or with a home tutor or the like, the judge or the buyer evaluates problems on a school fee, required period for acquiring a title, the distance to the class or the school, or the like, or conditions specified by the judge or the buyer, and selects an item which was given the smallest point for an individual numerical value or a combination of all the numerical values, or information on the item at auction.

(11) When a judge or a buyer is going to make an order to a carpenter or a construction or a facility company, a house reform company, or a plate, paint or repair company for a car, a machine or the like, a repair company for facilities, institutions, companies, business machines, dairy necessities or the like, a transportation company for movement, delivery or the like, an on-demand production company, or the like, the judge or the buyer evaluates problems on a price, a fee, the number of days required for production, repair and mending, time and distance to the house or the office of a contractor, or the like, or conditions specified by the judge or the buyer, and selects an item which was given the smallest point for an individual numerical value or a combination of all the numerical values, or information on the item at auction.

(D) A seller evaluates desired conditions, and selects a buyer who has offered the smallest numerical value, or information on the buyer at auction.

(1) When a seller sells industrial wastes, recovered or second hand products, raw materials, intermediate products, or the like, or requests processing thereof, a buyer evaluates the amount of generation or emission of $CO_2$ gas, emission regulated gases, poisonous gases, contaminated water, contaminated substances, emission regulated substances, waste water, or the like which are generated or emitted from a factory, a machine or a facility at stages of processing, repair, and working, or a substance specified by the seller, and further evaluates a sales price, repair, work, processing fee, a period and techniques required therefor, or the like, or conditions desired by a judge or the seller, and selects an item which was given the smallest point for an individual numerical value or a combination of all the numerical values, or information on the item at auction. It should be noted that the price and fee are not included when the above items are evaluated with individual numerical values.

As appreciated from the foregoing, the following advantages are provided according to the sixth embodiment.

(13) With the employment of an auction system in which a bid is conducted with evaluation points which are evaluated in the form of numerical values by a client for requirements to bid off an article, a service, or a buyer, the client can find a trading partner who satisfies the requirement of the individual client.

(14) Since a bid form can be selected from a plurality of bid forms, it is possible to find a trading partner who most satisfies requirements of a client.

(15) Since requirements of a client are evaluated in the form of numerical value such that an auction is conducted to compete the evaluated numerical value, abstract requirements (degree of satisfaction, future, potential growth, usability, key word, and so on) which cannot be replaced with physical amounts can be auctioned to trade the provision of an article or a service which most satisfies the requirement by auction.

(16) Upon receipt of a request for acquisition of information from a client, the server widely promotes third party through the Internet N to provide the requested information, conducts a bid for a certain element within the contents of provided information in such a manner that the client selects an information provider (bidder) who offered contents of information that most satisfies the requirements of the client as a successful bidder. It is therefore possible to acquire most appropriate information as to how one can be provided with a desired article or service even if a provider or a providing company of such article or service does not participate in the auction. Particularly, a fishing boat may provide a nearby fishing boat or the like with information on signs of fish which is not a target of the fishing boat itself but may be intended, for example, by other fishing boats, other than fish which is captured by the fishing boat, thereby making it possible to effectively use information which is valuable for other persons viewed from the third parties.

Seventh Embodiment

Next, a seventh embodiment which embodies the present invention will be described with reference to FIGS. 1 through 3, 15, 16, 18, 59 through 69. While in the respective embodiments described above, a bid is conducted to compete a time or a trading due date, a position, a numerical value, an evaluation numerical value, and so on, the seventh embodiment allows for a selection from a plurality of elements including the time and position, as elements other than the price, as well as the time and position. More specifically, a bid may be conducted to compete a time, a position (including on the move), a space (length or the like), a quantity, a weight, a numerical value, and so on.

The general configuration of an auction system in the seventh embodiment is basically similar to those described in the respective embodiments in connection with FIGS. 1 and 15. Also, the functional configuration is substantially similar to those illustrated in FIGS. 2 and 16, except that the auction system of the seventh embodiment can support multiple elements as well as the time and position and therefore comprises an increased amount of databases corresponding to the respective elements.

A bid may be conducted to compete time, position, space, quantity, weight, numerical value, and so on. An auction home page is similarly provided for showing an entire menu corresponding to those of FIGS. 3 and 18. Upon selecting the field of articles/services on the HP screen and then selecting specifically an article or a service on a lower level screen, an element selection screen JA illustrated in FIG. 59 is displayed. The element selection screen JA is provided with options JA1 for selecting an auction or a counter-auction (which may not be selected if it has been selected on the previous screen), element selection buttons 180 to 186 including "time", "position", "on the move", "length/space", "number/quantity", "weight", and "numerical value", and a decision button 187.

Figure 68:
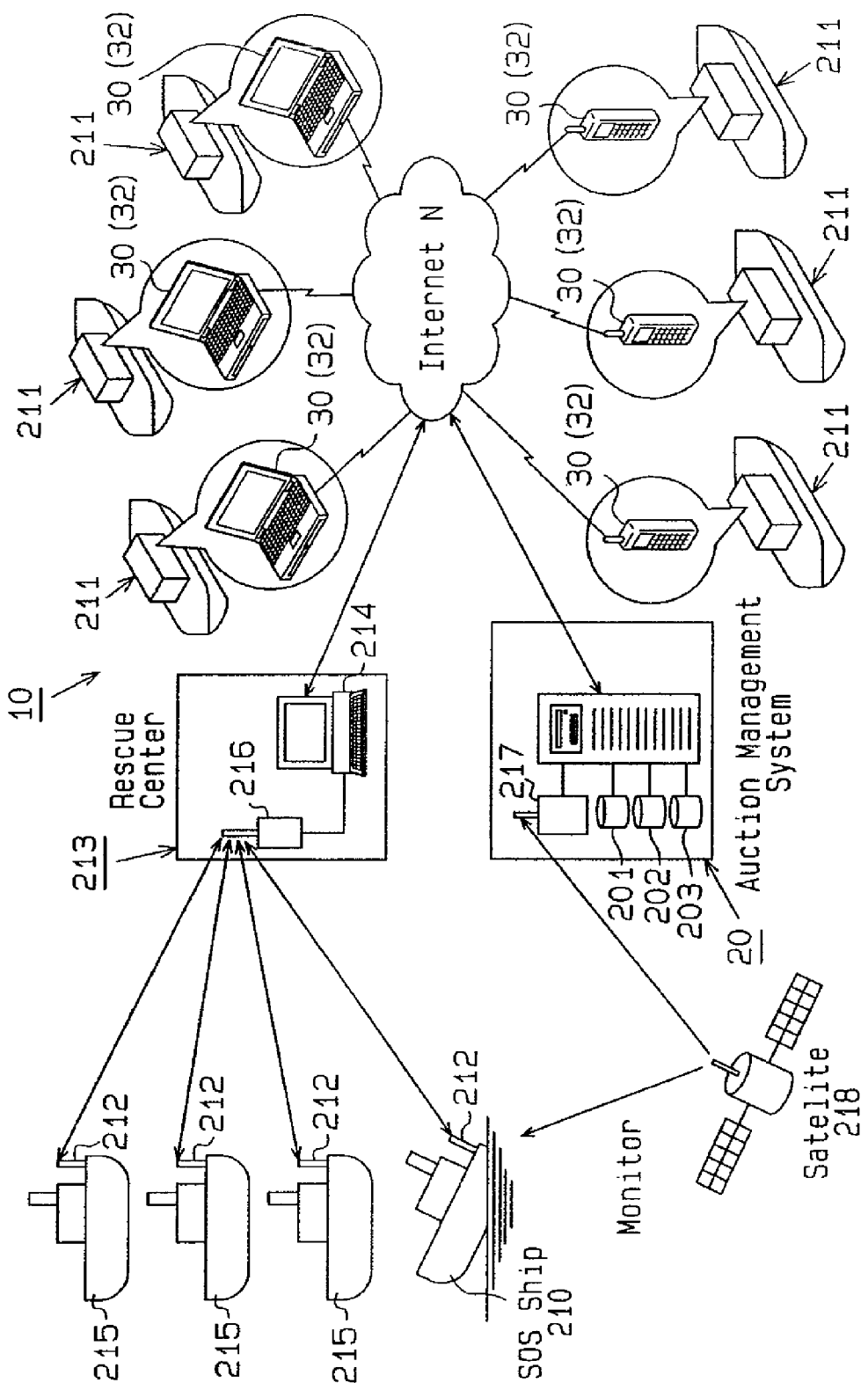
FIG. 68 is a schematic diagram generally illustrating the configuration of a private rescue system that is different from the system of FIG. 67.
Figure 69:
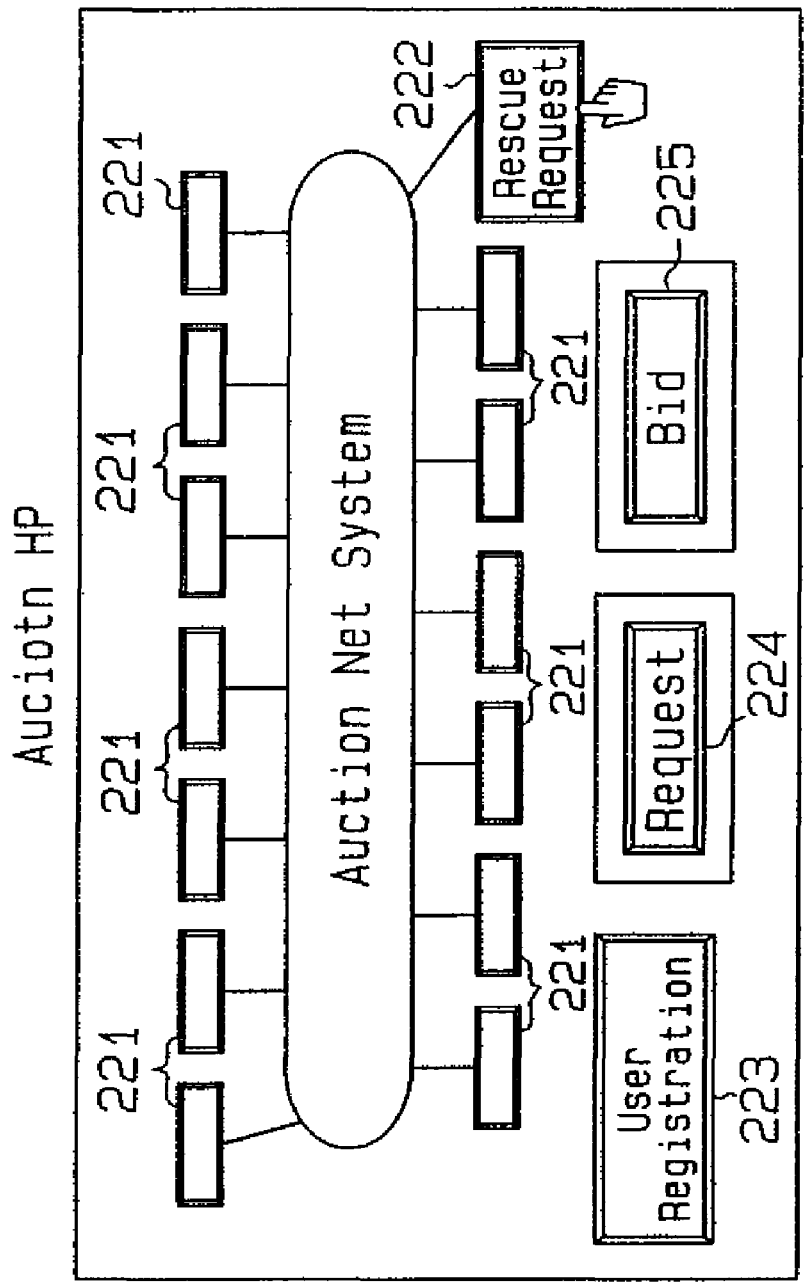
FIG. 69 illustrates an auction home page provided by the private rescue system.
Figure 70:
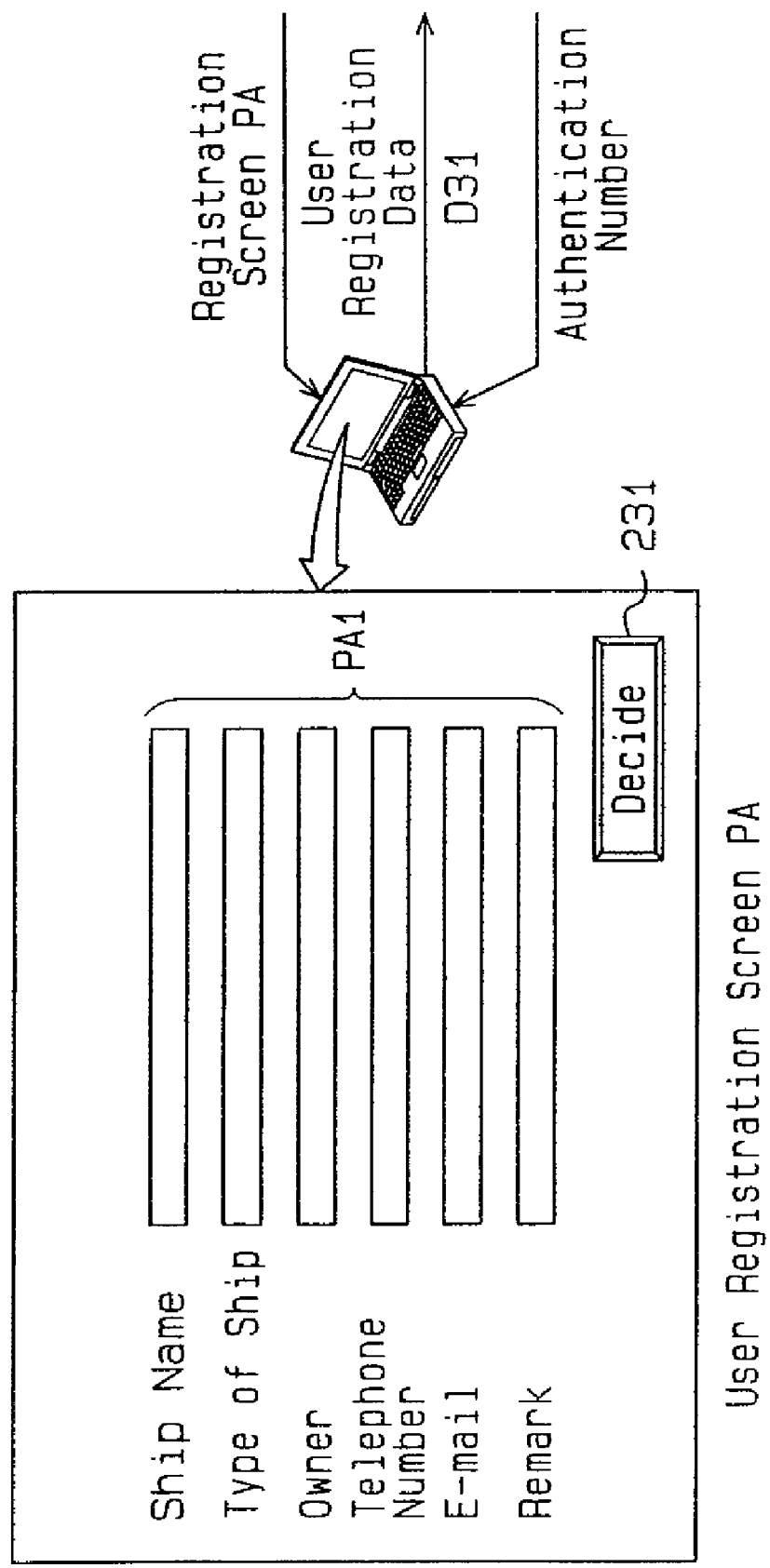
FIG. 70 illustrates a screen for registering a user.

A program is created to allow the user to select a suitable element in accordance with an article or a service to be traded, and is stored in a memory of a server 21. FIGS. 68 and 69 illustrate the program in the form of flow chart, wherein an element selected by the user is basically competed in a bid, not limited to the time in the program illustrated in the first embodiment. Of course, "PRICE" may be included as an element of a bid in addition to the elements shown in FIG. 59. It should be noted that the screen JA of FIG. 59 and a bid form selection screen IA illustrated in FIG. 60, which will be described later, correspond to request screens, and contents of data entered on these request screens correspond to bid request information.

Similar to the first embodiment, a slide system is provided for the bid form. Specifically, since either of elements such as time, position, space, quantity, weight, numerical value and so on can be represented on a coordinate axis as a numerical value, a reference value is specified on the coordinate axis such that a numerical value closer to the reference value is preferentially selected as a successful bid, a value further away from the reference value is preferentially selected as a successful bid, and so on. Five types of such rules are set as bid forms for determining a successful bid.

FIG. 60 illustrates the bid form selection screen IA for selecting a bid form. The bid form selection screen IA is provided with an article/service display field IA1, an element display field IA2, bid form selecting options IA3, a reference value entry field IA4, an approaching direction selecting options IA5, a range entry field IA6, and a transmission button 188. In the bid form selecting options IA3, one is selected from three options including an option for specifying that a smaller value is given a higher priority; an option for specifying that a greater value is given a higher priority; and an option for specifying that a value closer to a specified reference value is given a higher priority. The approaching direction selecting options IA5 are provided for specifying from which direction, a reference value, if specified, is approached. One is selected from three options including an option for specifying an approach from a smaller value to the reference value; an option for specifying an approach from a greater value to the reference value; and an option for specifying an approach from both directions to the reference value. The range entry field IA6 is provided for specifying a range, wherein one of an upper limit and a lower limit may only be specified, or no range may be specified. It should be noted that the reference value corresponds to a desired value.

FIGS. 62A through 62D are diagrams for explaining four of the five bid forms. When each element is represented by a numerical value, the numerical value may be classified into concepts of incremental values and concepts of decremental values. For example, far, larger, wide, long, heavy, and so on are concepts of incremental values, while near, small, narrow, short, light and so on are concepts of decremental values. The bid form refers to the rules as to whether the largest one of offered numerical values and so on is determined as a successful bid; or whether the smallest one is determined as a successful bid; or whether a value coincident with or closest to a reference value specified by a customer is determined as a successful bid. There are the following five types of bids. It should be noted that these forms are not set in a numerical value auction, later described.

Figure 62A:
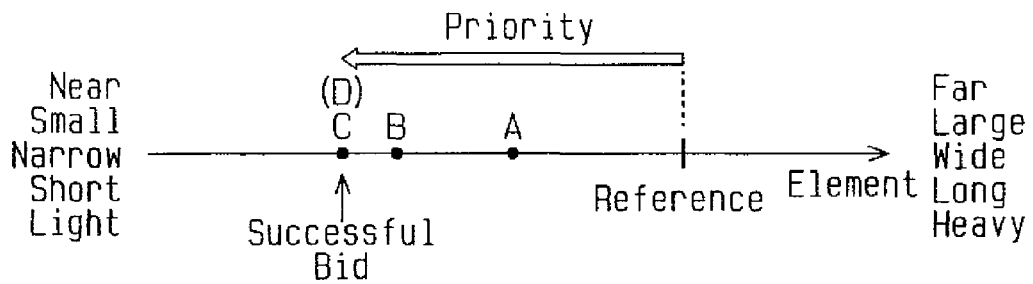
FIGS. 62A through 62D are explanatory diagrams regarding bidding forms.

(1) A priority rule which preferentially determines a person who offers the smallest numerical value within a predetermined range as a successful bidder (FIG. 62A).

Figure 62B:
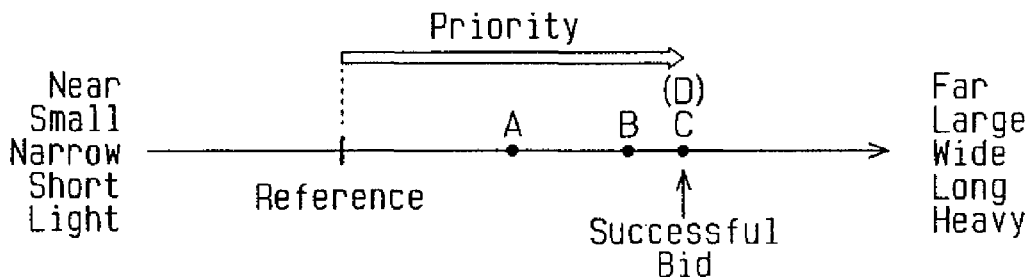

(2) A priority rule which preferentially determines a person who offers the greatest numerical value within a predetermined range as a successful bidder (FIG. 62B).

Figure 62C:
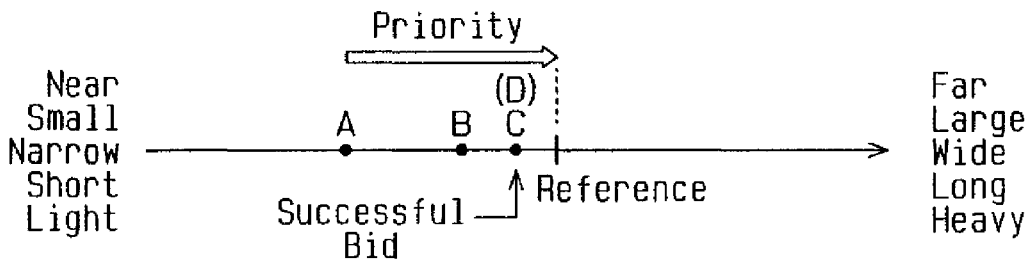

(3) A priority rule which preferentially determines a person who offers the value that most approaches to a reference value of a specified element from the smaller value side as a successful bidder (FIG. 62C).

Figure 62D:
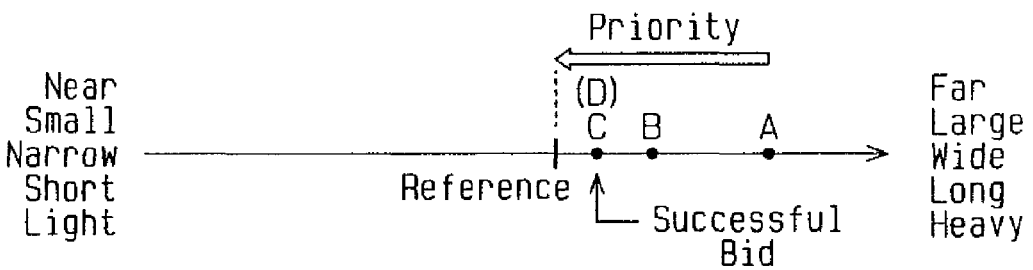

(4) A priority rule which preferentially determines a person who offers the value that most approaches to a reference value for a specified element from the greater value side as a successful bidder (FIG. 62D).

(5) A priority rule which preferentially determines a person who offers a closest possible value to a reference value for a specified element any way irrespective of whether it is from the smaller value side or from the greater value side with respect to a specified numerical value. It should be noted that while in the rules (3) to (5), a value coincident with the reference value is most preferred, the value closest to the reference value, not including the reference value, may be preferred.

Alternatively, a plurality of elements may be selected on the element selection screen JA of FIG. 59. When two or more of the plurality of element selection buttons 180 to 186 are selected, an element priority order setting screen WB illustrated in FIG. 63 is displayed. The element priority order setting screen WB is provided with entry fields WB1 to WB4 for specifying a maximum of n numerical values for a first priority, a second priority, . . . , an n-th priority (in this example, n=4), and a decision button 191. Elements of the first priority, the second priority, the n-th priority can be specified, and the priority order of the specified elements can be set freely by the user. A price may be set to a value of the second priority or lower. A plurality of elements can be set in this way because only the position, for example, selected as an element is not sufficient to narrow down to a predetermined number of successful bidders (generally one) in some cases, and are used to definitely narrow down bidders to a desired number of successful bidder. A client registers the order of preferred elements. Then, as the client selects the decision button 191 on the screen WB, priority condition data Db is transmitted to the server 21.

Information may be traded as an article. Specifically, when a certain article or service is desired, the auction is used for a trade to buy required information from the owner of the article, a company which sells the article, or a person who knows about a provider or a providing company of the service.

Traded information may be in any fields and categories. Giving a mere example, there are information on signs of fish (about what time which kind of fish in which region and at which density of signs of fish) information on resources (information on where rare metals, petrol, or the like is buried), and so on.

An example of handling information on signs of fish in a position auction will be explained below. For example, a fishing boat may provide fishermen and fishing boats with information on signs of fish which is not a target of the fishing boat itself but may be intended, for example, by other fishing boats, other than fish which is captured by the fishing boat. In this event, fishing boats and so on which expect such information generally want information on signs of fish nearest from them. For this purpose, these fishing boats may participate in the position auction to acquire information from the nearest ship. Specifically, a ship who has information on signs of fish provides the information to the server 21 of an intermediary company through the Internet N. For example, fishermen and fishing boats may use the position auction to look for any useful information on the fishing from nearby ships. In this event, it is possible to narrow down information by entering the kind of fish in the priority entry field. Also, a positional range may be narrowed down.

The server 21 widely provides terminals 30 of third parties with such an outline of information that let the third parties understand to which the information is related to, so that a third party which views the outline buys the information through the terminal 30.

Figure 61:
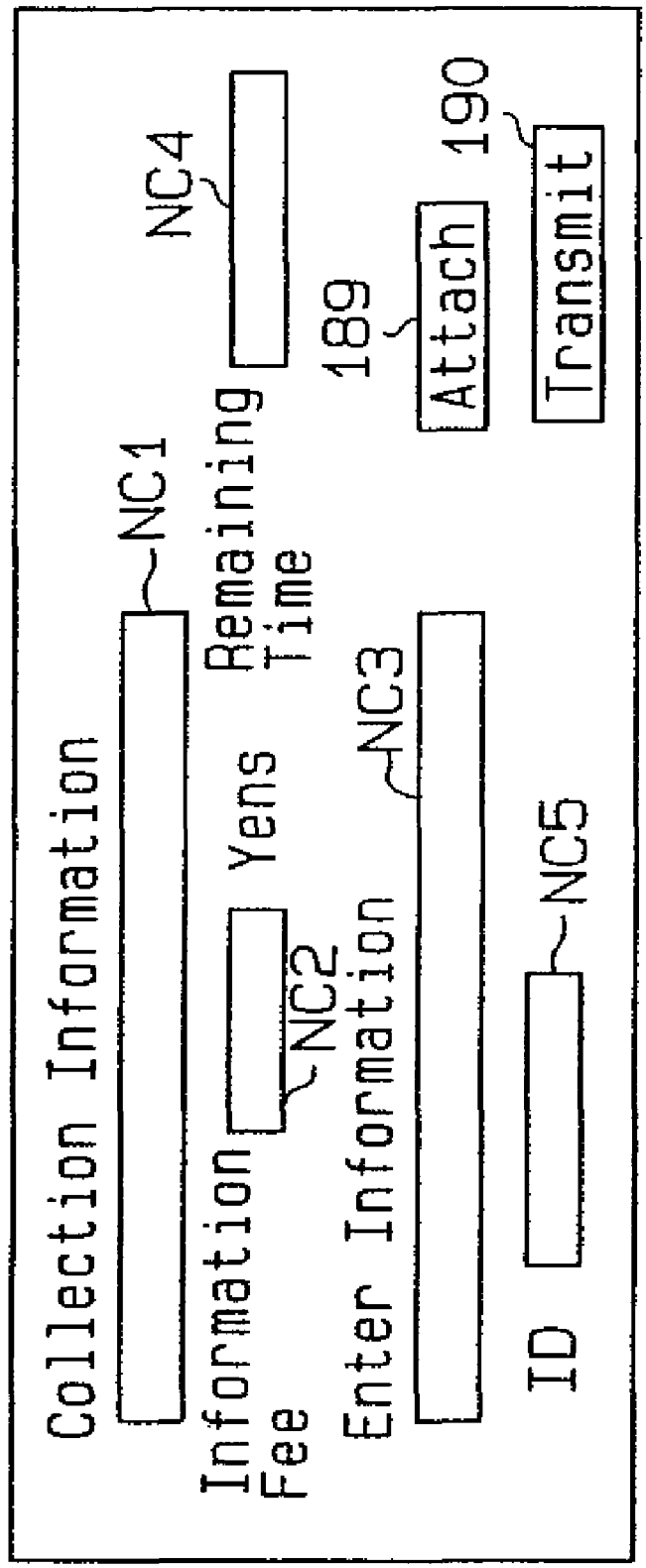
FIG. 61 illustrates a screen for providing information.

For example, as illustrated in FIG. 18, the auction HP screen is provided with an information entry button 89 and an information trade button 90. When the information entry button 89 is selected on this auction HP screen, an information provision screen NC illustrated in FIG. 61 is displayed. The screen NC is provided with a collected information display field NC1, an information fee (compensation for providing information) display field NC2, an information entry field NC3, an information attachment button 189, a remaining time display field NC4, an ID number entry field NC5, and a transmission button 190. The information provision display NC is a screen which is displayed when a viewer selects an item, which the viewer wants to view, from an information collection list displayed for each of categories/fields upon selection of the information entry button 89 on the home page screen. On the information provision screen NC, the collection information display field NC1 displays the contents of information which a client is looking for, and the information fee display field NC2 displays an information fee, so that a view who can provide the wanted information enters (fills) the provided information in the information entry field NC3, or attaches data by performing manipulations associated with the attachment on the next screen which is displayed when he selects the append button 189, enters his ID number, followed by transmission of the information. The information is managed by the server 21 in the database 24. It should be noted that the information provision screen NC comprises a bid screen.

For example, when information desired by a user is transmitted to the server 21, the server 21 searches managed data in the database 24 for pertinent information, and immediately collects the information when the information is not urgently required so that a collection time is allowed to some extent. Then, after the expiration of a limited time, i.e., a remaining time has been exhausted, collected information is analyzed to transmit information which most matches the needs of the client to a terminal 30 of the client. In this event, the client can select and specify one of the aforementioned bid forms, so that a successful bidder is determined in accordance with the rule of the specified bid form. The client who has acquired the desired information pays the information fee and an additional commission. The information fee is paid to the successful bidder. It should be noted that in this embodiment, an auction or a counter-auction is selected using the options JA1 on the screen JA illustrated in FIG. 59, rather than selecting an auction system by selecting the button 51 or 52 on the HP screen of FIG. 18. Also, this embodiment is provided likewise with a screen substantially similar to the bid registration screen K illustrated in FIG. 52 of the sixth embodiment, so that a bidder may enter required items on the screen K, and the entered bid information is transmitted to the server 21.

As a result of an auction, information on a single successful bidder is basically transmitted to the client. However, if the client wishes, a plurality of narrowed down candidates may be presented, as illustrated in a list screen XD of FIG. 64. Specifically, the server 21 creates information offered by bidders, as it is, into a list, or creates a priority list by narrowing down successful bidder candidates of higher priority levels, for example, into a limited number specified by the client, based on information offered by bidders, and transmits the created list to the terminal 30 of the client. Then, the list XD illustrated in FIG. 64 is displayed on the terminal 30 of the client. The screen XD is provided with a list XD1, an entry field XD2 for selecting a successful bidder, and a decision button 192. The list XD1 indicates a priority number, a code number, and an element numerical value (values representative of time, position, space, weight, evaluation and so on), and conditions offered by a bidder (price, supplementary items (extra) and so on). The client reviews the offered conditions such as a trading date from the list XD1 on the screen XD to determine a bidder favorable for him as a successful bidder, enters, for example, the priority number of the winning bidder in the entry field XD2, and selects the decision button 192. In response, the server 21 notifies the client and the successful bidder of the successful bid. When the list XD1 can be viewed on the terminal 30 of the client in this way, the client can select a partner which offers favorable conditions in terms of another element such as the price, in addition to a specified element, if a plurality of bidders offer the same element numerical value, or can select a partner who may concede in the price, supplementary items and so on, even if the partner offers an element numerical value slightly worse than the first bidder.

When the element selection button 186 "numerical value" is selected on the screen JA of FIG. 59, a numerical value auction is conducted. The numerical value auction refers to an auction trade in which an article or a service desired by a client is evaluated in the form of numerical value whether or not the article or the service satisfies requirements of the client, and from a large number of articles and services which have been previously registered, or collected each time a request is made, an evaluation point (numerical value) about an article or a service, or an object or a person who serves for the service, which is given the highest evaluation point as a result of evaluation, is determined as a successful bid.

A client offers a desired article or service, and identifies specific requirement, if any, by selecting such requirement from previously provided key words. Likewise, in this embodiment, the screens LA, LB, LC illustrated in FIGS. 49, 50, 51 are provided for the client to enter his requirements. Screen data for these screens are stored in the memory of the server 21. It should be noted that the screens LA to LC also comprise request screens.

The request registration screen LA of FIG. 49 is provided with an article/service display field 166, entry fields LA1 to LAn for entering a maximum of n key words, associated with important aspects for an article or a service desired by the client, for a first priority, an n-th priority in a priority order of importance.

The request registration screen LB of FIG. 50 is provided with an article/service display field 166 similar to that in FIG. 49, entry fields LB1 to LBn for entering key words with a first priority to an n-th priority, and evaluation percentage entry fields 168 for specifying an evaluation percentage (%) in accordance with the ratio of importance of respective key words.

The request registration screen LC of FIG. 51 is provided for registering key words for which no priority order is given in particular or to which a predefined priority order, which has been initially preset by a program, is applied. This screen LC is provided with evaluation item entry fields LC1 to LCn for entering a maximum of n key words.

Alternatively, an article or a service may only be offered, in which case the server 21 stores evaluation data for properly evaluating previously registered articles or services, evaluates a plurality of previously determined evaluation items in the form of numerical values, and determines an article or a service which is given a high total evaluation point as a successful bid.

This embodiment also comprises the data 21, 22 shown in FIGS. 55 and 56. FIG. 55 shows evaluation data 21 which records an evaluation point for each of evaluation items associated with articles and services, wherein an evaluation point for each of evaluation items is recorded for each of registered articles A, B, C, . . . . In this example, the articles are evaluated on the basis of 100 points.

FIG. 56 shows equation data 22 which records equations for use in converting a key word into a numerical value, wherein a corresponding equation is recorded for each key word. Variables in the equations corresponds to evaluation items, so that an evaluation point is calculated for a key word by substituting evaluation points of evaluation items corresponding to the respective variables in the equations and calculating the equations.

For example, for looking for a food through the numerical value auction, when evaluation items include key words such as "safety", "healthful", "disease"; and so on, by way of example, these requirements are totally and properly evaluated for conversion into an evaluation point. To each key word, an equation has been previously set such that the key word is correctly evaluated. For example, with "SAFETY", evaluation items used as variables of an associated equation includes a natural vegetable using ratio, a synthetic seasoning using ratio, a sugar using ratio, agricultural chemicals/fertilizers, minerals, and so on, each of which is given a greater point as an associated food is more healthful to a human body. For example, an equation "$\Sigma kn$ (=$k1+k2+\ldots+kn$)" (where kn is an evaluation value for an evaluation item n). In this way, an evaluation point is found in accordance with a key word based on the evaluation data 21 and the equation data 22. With "disease," in turn, an equation is employed such that an evaluation item (for example, a component such as a vitamin or the like) more effective for curing this disease is more highly weighted. A food which is given a high point to the effective evaluation item is properly evaluated so that its evaluation point for the key word "disease" basically becomes greater. For example, for diabetes, an equation is employed such that an evaluation point for a sugar percentage is more highly weighted, so that a food with a low sugar percentage is extremely highly evaluated for this key word. The respective data 21, 22 are stored, for example, in the database 24.

For example, when a client uses the request registration screen LA of FIG. 49 for setting a plurality of key words, evaluation points for respective key words of the first priority to the n-th priority are weighted in the priority order, so that requirements of the client are totally evaluated. For example, a total evaluation point is calculated in accordance with its predefined evaluation percentage, for example, 100% for the first priority, 80% for the second priority, . . . , 10% for the n-th priority, and so on. When the request registration screen LB of FIG. 50 is used, evaluation points for respective key words of the first to the n-th priority are weighted in accordance with corresponding evaluation percentage % to calculate a total evaluation point. When the request registration screen LC of FIG. 51 is used, respective key words are equivalently evaluated, i.e., evaluated with weights in accordance with predefined ratios. The customer request registration screens are not limited to the foregoing, but alternatively, requirements may be entered in the entry field, for example, as a sentence, such that the sentence is analyzed to automatically assign appropriate key words for the requirements. It should be noted that requirement data (for example, key words and so on) from the client, which is information that is the basis for conversion into numerical values such as evaluation points for individual items and a total evaluation point correspond to information under evaluation.

Also, this embodiment comprises the evaluation result display screen O illustrated in FIG. 54 as well. For example, when a client sets a plurality of key words, candidate articles (or services) which satisfy requirements are displayed in the order of greater total evaluation points as illustrated in FIG. 54. On this screen O, an individual evaluation point for each evaluation item (key word) and a total evaluation point are displayed for the respective articles (or services) selected as candidates.

On the screen O, a bid-off button 175 at a position corresponding to an article (or a service) ranked at the first position as a successful bid candidate is displayed as selected. When the client wants to individually view an evaluation point for each key word and changes an article to be bidden off to an article at a lower rank candidate, the client may select a right end position corresponding to the article to switch the position at which the bid-off button 175 is selected to the position of the selected article. For a correction or a cancel, a correction button 177 may be selected. Then, the client selects an OK button 176 when he determines an article to be bidden off. In response, the associated bid-off data is transmitted to the server 21 which notifies both the seller and the buyer of the establishment of the trade.

Figure 65:
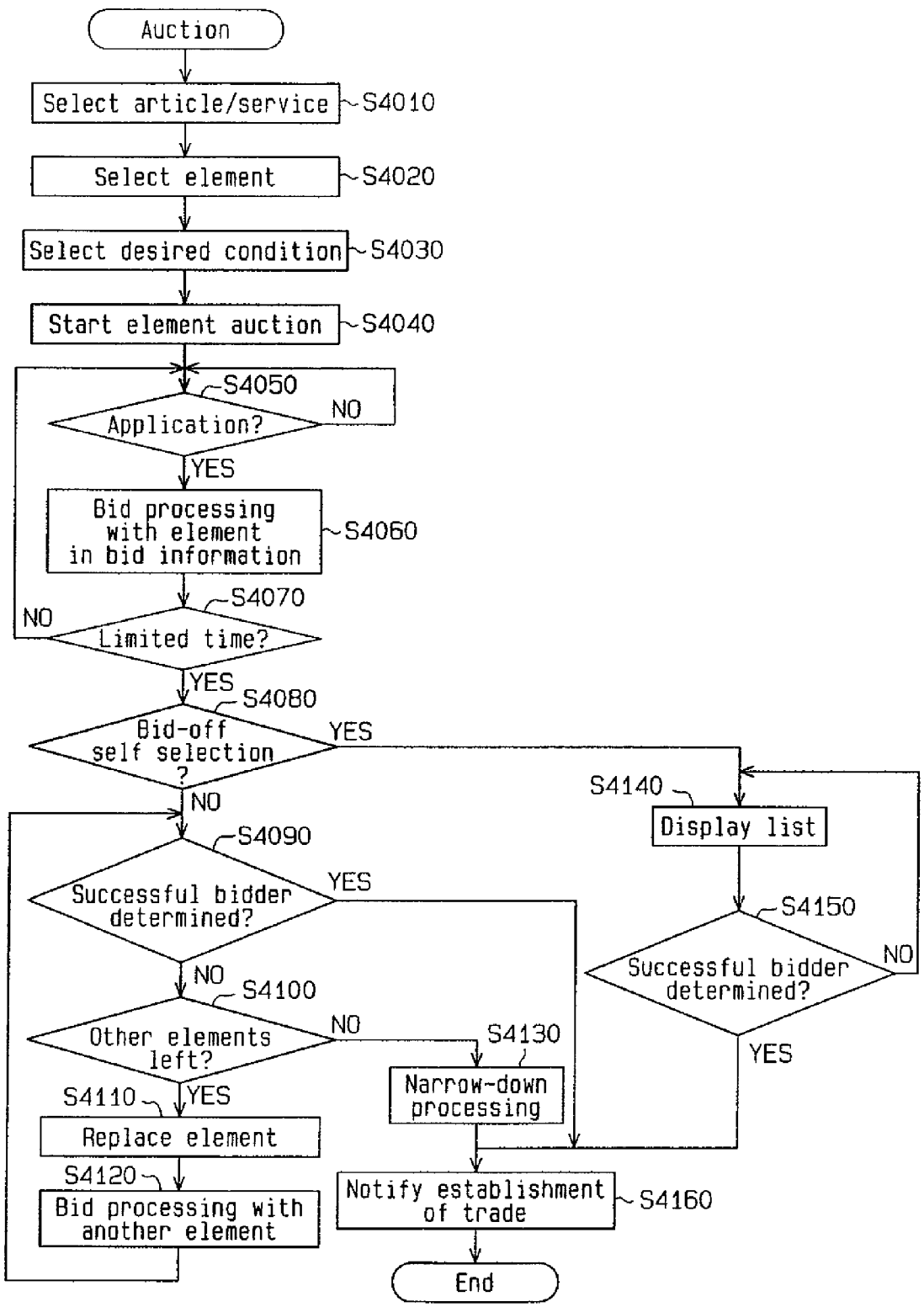
FIG. 65 is a flow chart illustrating an element auction procedure.

Next, an auction procedure will be explained with reference to a flow chart of FIG. 65.

First, in S4010, an article or a service is selected.

In S4020, an element (time, position, space, numerical value, or the like) is selected for conducting a bid. It should be noted that a procedure of receiving bid request information at the server 21 in S4020, S4030 corresponds to a request procedure.

In S4030, desired conditions (required items such as a bid form, a range, a bidding period and so on) are selected.

In S4040, an element auction is started. Here, the server notifies a plurality of terminals of a collection of bidders to promote potential bidders to participate in the auction.

In S4050, it is determined whether or not any application is made to the auction. In other words, the presence or absence of a bid from a bidder is determined. If there is no bid, the server 21 waits for bids. If there is a bid, the procedure flow continues to S4060. It should be noted that a procedure of starting the auction to display a screen for bidding on terminals of bidders in S4040 and receiving bid information entered when a bid is applied in S4050 at the server 21 corresponds to a bid procedure, and a procedure executed from S4050 to S4160 corresponds to a bid acceptance procedure.

In S4060, bid information offered by bidders is acquired to execute the bid processing with an element which has been offered as one piece of information within the bid information. If a plurality of elements are selected and set, the bid is conducted with an element of a first priority. Then, in comparison with the desired conditions (the priority rules shown in FIGS. 62A through 62D) in terms of the element(s) within the bid information, a priority order is determined for bidders.

In S4070, it is determined whether or not a limited time has expired. When within the limited time, the procedure flow returns to S4050 to repeat the processing from S4050 to S4070 to execute the bid processing each time a new bidder applies, until the limited time expires. At the expiration of the limited time, the procedure flow continues to S4080.

In S4080, it is determined whether or not a bid-off self selection is set. The procedure flow continues to S4090 when the bid-off self selection is not set, and to S4140 when the bid-off self selection is set.

In S4090, it is determined whether or not a successful bidder is determined. In other words, it is determined whether bidders are narrowed down to a predetermined number of successful bidders. The procedure flow continues to S4100 if the bidders are not narrowed down to the predetermined number of successful bidders, and otherwise to S4160.

In S4100, it is determined whether there are any remaining elements which have not been processed for the bid, when a plurality of elements are set. The procedure flow continues to S4110 if there are still remaining elements, and otherwise to S4130.

In S4110, a current element is replaced with another one.

In S4120, the bid processing is executed with the replaced element to narrow down bidders to a predetermined number of successful bidders. The bidders are narrowed down to the predetermined number of successful bidders by comparing the other element (of the second priority) within the bid information with the desired conditions (the priority rules shown in FIGS. 62A through 62D). If the bidders cannot be narrowed down even with this bid processing, the current element is replaced with another element of the next priority if there are still other elements which have not yet been used in the bid processing to narrow down the bidders (S4110). The bid is conducted step-wisely with a different element until the bidders are narrowed down to the predetermined number of successful bidders or the bid processing has been completed with all the elements set in the bid information.

In S4130, the narrow-down processing is executed. Specifically, when there is no element for conducting a bid at the next stage, a bidder who has offered the price that most satisfies the requirements of the user is determined as a successful bidder. On the other hand, if a price is fixed or if a price itself is not handled in a bid, successful bidders are narrowed down to a predetermined number in accordance with a previously defined predetermined rule.

On the other hand, if it is determined in S4080 that the bid-off self selection is set, the list screen XD illustrated in FIG. 64 is displayed for enumerating bid information of a predetermined number of bidders in a list form. The user can view the list screen XD by selecting a screen display after entering a password on the screen of the terminal 30. The list screen XD enumerates candidates in a priority order in terms of the values of elements (displayed as the code number), so that the user can determine a trading partner while referencing other information offered by the bidders. Upon determining a trading partner, the user enters the associated code number in the successful bidder selection entry field XD2 and then selects the decision button 192. The successful bidder information selected by the user is transmitted to the server 21 through the Internet N.

In S4150, it is determined whether or not a successful bidder has been determined. The list screen XD is continuously displayed (S4140) until the user determines a successful bidder, and the procedure flow continues to step S4160 when a successful bidder is determined. In S4160, the server 21 notifies both the user and the successful bidder of the establishment of the trade.

Figure 66:
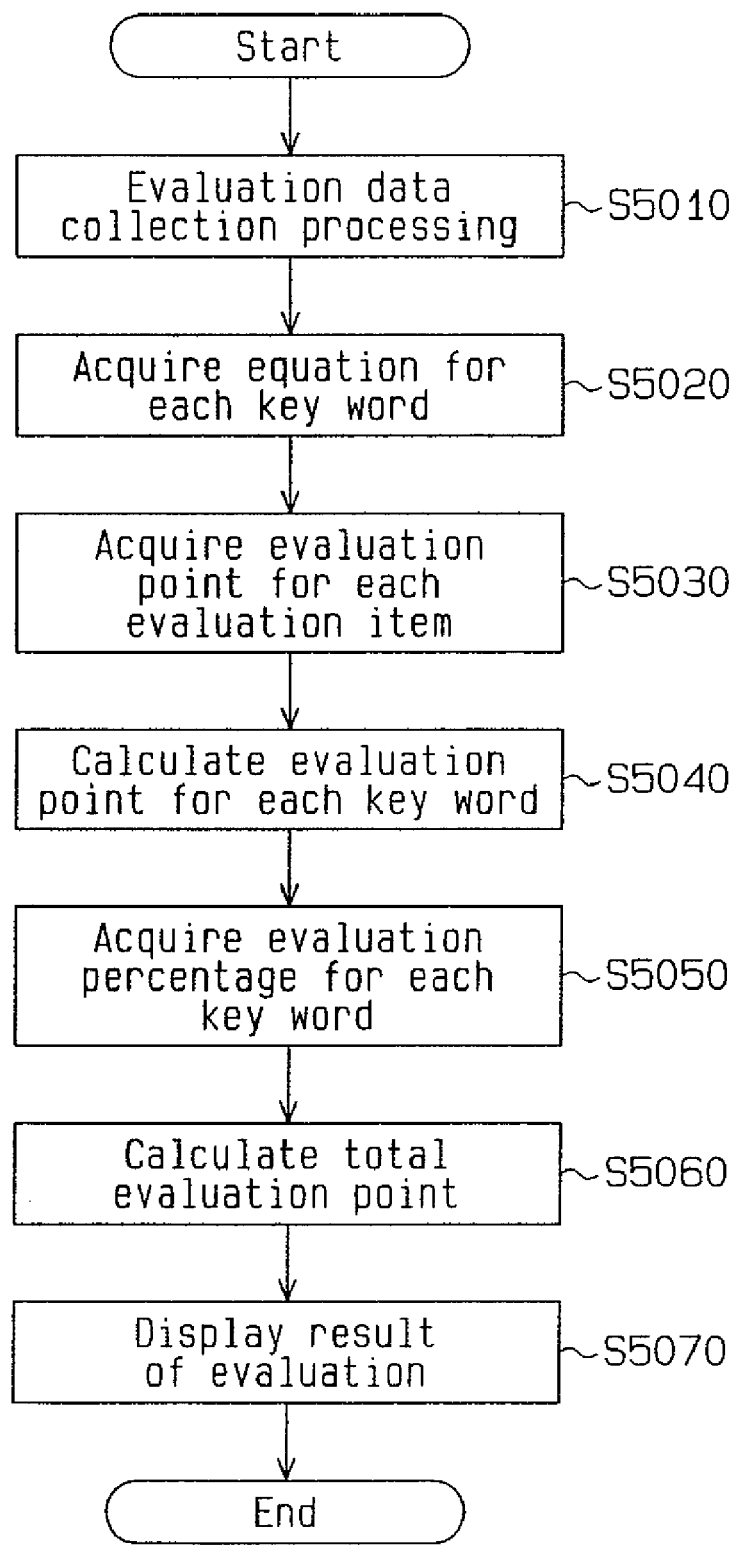
FIG. 66 is a flow chart illustrating a numerical value evaluation auction procedure.

Next, a procedure of a numerical value auction will be explained with reference to a flow chart of FIG. 66. This procedure is used for conducting a bid, when "NUMERICAL VALUE" is selected as an element in the element auction of FIG. 59, to compete the element (numerical value). It should be noted that a procedure shown from S5010 to S5070 also comprises a bid procedure.

In S5010, evaluation data 21 is collected to an associated article or service.

In S5020, an equation is acquired for a key word.

In S5030, evaluation points are acquired for evaluation items corresponding to variables used in the equation for the key word.

In S5040, the evaluation points are substituted for the variables in the equation for the key word to calculate an evaluation point for the key word.

In S5050, evaluation percentages are acquired.

In S5060, the evaluation point of each key word is multiplied by each evaluation percentage, and resulting products are accumulated to calculate a total evaluation point.

In S5070, the result of the evaluation is displayed on the screen.

As appreciated from the foregoing, the following advantages are provided according to the seventh embodiment.

(17) Since a bid is conducted with an element other than the price, it is possible to conduct an auction which satisfies requirements other than the price.

(18) Since a plurality of elements can be selected, it is possible to conduct an auction which more satisfies requirements of a client.

(19) Since requirements of a client are evaluated in the form of numerical value such that an auction is conducted to compete the evaluated numerical value as an element, abstract requirements (degree of satisfaction, future, potential growth, usability, key word, and so on) which cannot be replaced with physical amounts can be auctioned to trade the provision of an article or a service which most satisfies the requirement by auction.

(20) Upon receipt of a request for acquisition of information from a client, the server widely promotes third party through the Internet N to provide the requested information, conducts a bid for a certain element within the contents of offered information in such a manner that the client selects an information provider (bidder) who offered contents of information that most satisfies the requirements of the client as a successful bidder. It is therefore possible to acquire most appropriate information as to how one can be provided with a desired article or service even if a provider or a providing company of such article or service does not participate in the auction. Particularly, a fishing boat may provide fishermen and fishing boats with information on signs of fish which is not a target of the fishing boat itself but may be intended, for example, by other fishing boats, other than fish which is captured by the fishing boat, thereby making it possible to effectively use information which is valuable for other persons viewed from the third parties.

Eighth Embodiment

In the following, an eighth embodiment which embodies the present invention will be explained with reference to FIGS. 67 through 74. An auction system of this embodiment (hereinafter referred to as the "victim rescue system") selects the most appropriate rescuer for a rescue activity, and conducts a bid to compete a numerical value or an evaluation numerical value as an element. In other words, this system employs the evaluation auction according to the seventh embodiment to evaluate whether or not a bidder is appropriate for requesting him for a rescue in the form of numerical value, as a system for selecting a rescuer who performs rescue activities at an accident spot, and conducts a bid with the evaluation value. This victim rescue system is possessed by rescue support service dealers (companies) which practice, as business, rescue operations and rescue intermediary operations for ensuring the safety of customers such as a security company, a guard company, and so on, and customers such as individuals, legal persons and so on which have concluded a utilization contract with such a dealer can only use this system through terminals. The utilization of this system at an individual or family level may include a rescue from a racketeer such as an invader (stealer, intruder) to one's house, a rescue from an accident and wreck when one is out, a saving when one is ill, a rescue in the event of fire, disaster such as inundation, and so on. On the other hand, the utilization of this system by a legal person may include a rescue of an employee when he is involved in an accident or an affair, a rescue of a car, a ship, an airplane or the like possessed by the legal person from an accident or a wreck. This embodiment will be described for an example in which a marine transportation dealer (legal person) is a customer who uses the victim rescue system to select a rescue ship for rescuing an SOS ship at auction.

A ship, if involved in an accident and asks for a rescue, would want to find a ship which could come to its rescue soonest. However, when the ship transmits SOS to all ships, the respective ships are moving in their respective directions. If several ships individually change their directions to go to the rescue of the ship, confusion would prevail near the spot, leading to a secondary disaster as the case may be. Therefore, the victim rescue system of this embodiment selects at auction, as a rescue ship, a ship which, for example, is moving toward and nearest from an SOS ship, has a sufficiently high level of rescue skill required for a rescue activity for the SOS ship, and can start the rescue activity most rapidly.

Figure 67:
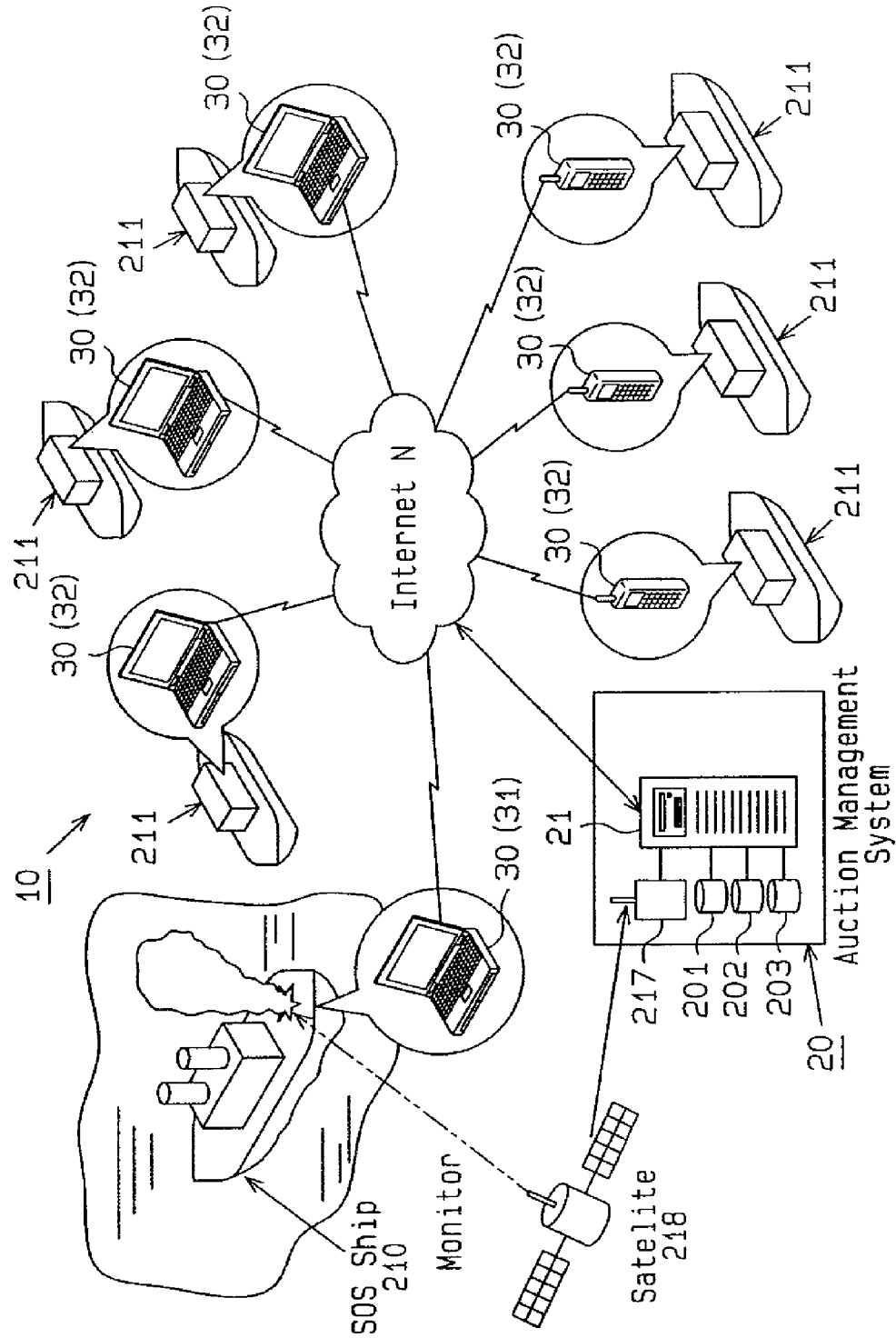
FIG. 67 is a schematic diagram generally illustrating the configuration of a private rescue system according to an eighth embodiment of the present invention.

FIG. 67 generally illustrates the configuration of the victim rescue system. The victim rescue system 10 comprises an auction management system 20 for managing the system 10, a network (for example, the Internet) N, and terminals 30 of users connected to the auction management system 20 through the network N. The auction management system 20 comprises a server 21 for providing information and services in conformity to a request from a user, and three databases 201 to 203 connected to the server 21. Alternatively, the server 21 may be comprised of a web server and an application server in separation.

Figure 71:
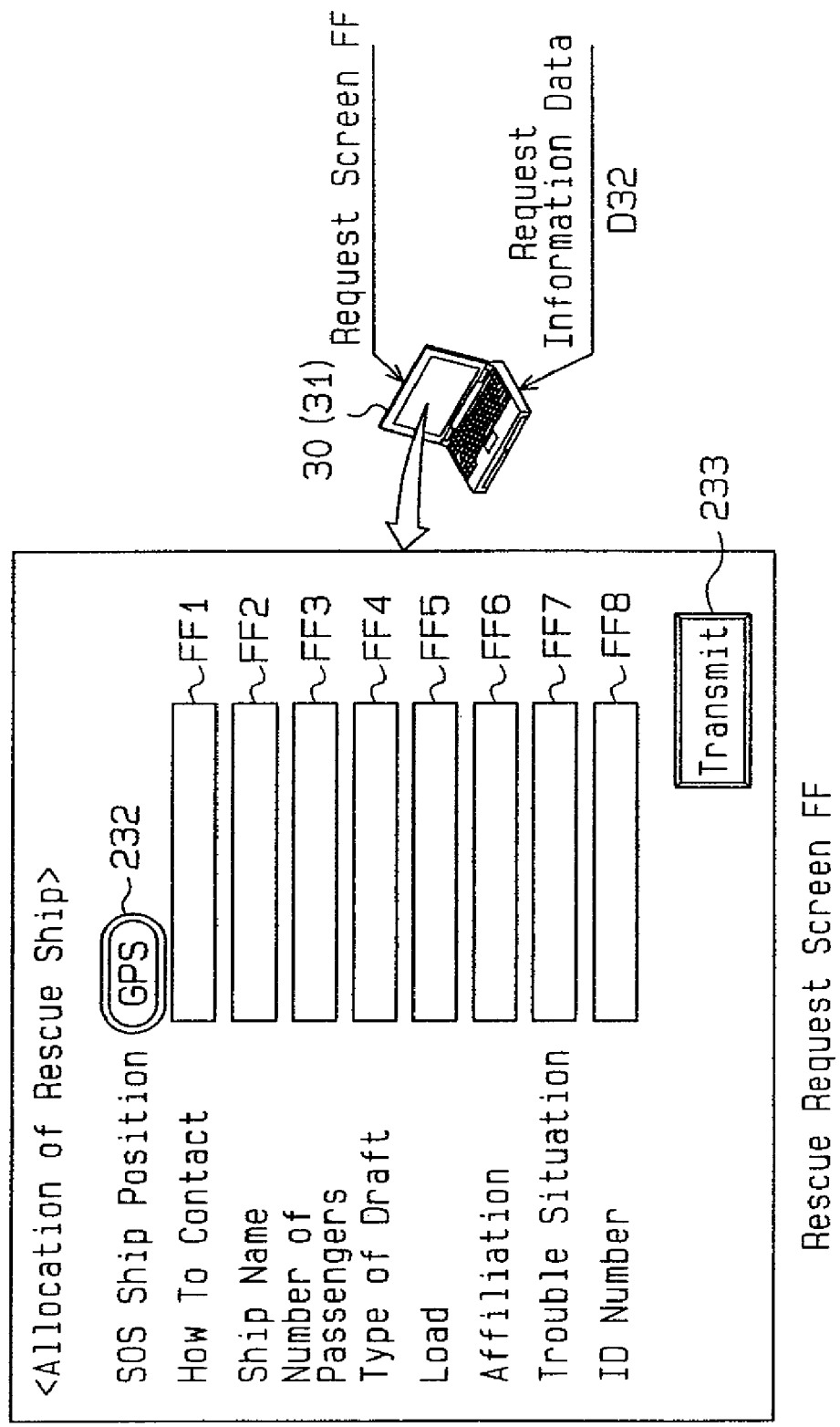
FIG. 71 illustrates a screen for requesting for a rescue.
Figure 72:
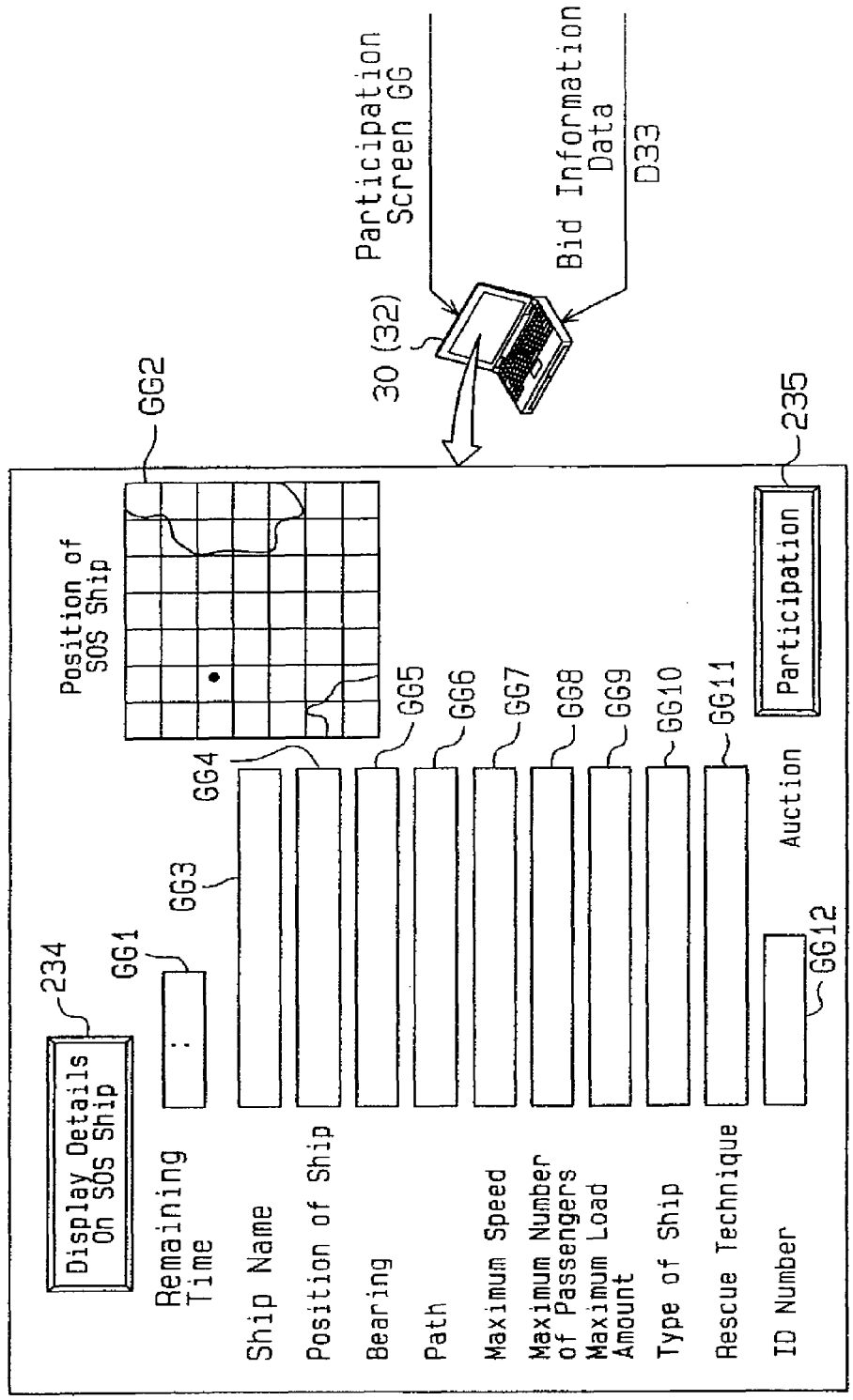
FIG. 72 illustrates a screen for participating in an auction.

The terminals 30 of users are classified into a terminal 31 equipped in a SOS ship 210 as a rescue requester, and a terminal 32 equipped in an participant ship 211 as a bidder which is notified of a rescue request, if any, from the SOS ship 210. When the SOS ship 210 requests for a rescue to the victim rescue system 10 from the terminal 31 through the network N, a rescue request screen FF illustrated in FIG. 71 is displayed on the terminal 31 to enter required items on the screen FF. Then, after entering the data, information on the SOS ship 210 is delivered to the auction management system 20 through the network N.

Upon receipt of the rescue request, the auction management system 20 notifies a plurality of ships 211, which have subscribed in the system, of the fact that the rescue request has been received through the network N. Among participant ships 211 which have received the request, those which can go to the rescue of the SOS ship 210 each display an auction participant screen GG illustrated in FIG. 72 on the terminal 32, enter required items on the screen GG, and deliver information related to the ship 211 itself to the auction management system 20 through the network N after entering the data, thereby participating in an auction. Then, the auction management system 20 selects the ship most suitable for the rescue out of the participant ships 211 as a rescue ship at auction.

Alternatively, the victim rescue system 10 may be configured such that an SOS ship 210 requests for a rescue through a radio transmission using a transceiver 212 via a rescue center 213, as illustrated in FIG. 68. More specifically, the rescue center 213 comprises a terminal 214 connected to the network N, and a transceiver 216 capable of communicating with transceivers 212 equipped in the respective ships 210, 215. Then, information related to the respective ships 210, 215 may be previously registered in the rescue center 213, so that upon a request for a rescue from an SOS ship 210, a rescue request is sent from the SOS ship 210 through radio communication to notify the rescue center 213 of information on its current position.

Then, the information related to the SOS ship 210 is delivered from the rescue center 213 to the auction management system 20 through the network N. Subsequently, the auction management system 20 collects ships which can go to the rescue of the SOS ship 210, in a manner similar to FIG. 67, and selects as a rescue ship the ship most suitable for the rescue from the participant ships 211 at auction. Alternatively, the rescue center 213 may be equipped with a radar or the like, such that the radar locates the SOS ship 210, in which case the SOS ship 210 may only need to transmit an SOS signal through radio communication at the time of accident.

As illustrated in FIGS. 67 and 68, the victim rescue system 10 also comprises a transceiver 26 which is capable of communicating with a space satellite 218. The space satellite 218 comprises an exploration system capable of positioning the SOS ship 210, which may comprise a camera having a telephoto lens, a radar system, an infrared exploration system, a variety of radio wave exploration systems equipped in the satellite, or the like. The auction management system 20 receives video data on the accident spot captured by these systems through the transceiver 217. The video data is transmitted to the respective terminals 32 of the participant ships 211 through the network N, so that each of the participant ships 211 can monitor the situation of the SOS ship 210 by displaying the accident spot (accident situation) of the SOS ship 210 on the screen of the terminal 32.

In the following, there are listed examples of rescue ships which, even if selected by the auction management system 20 as a rescue ship which can arrive at the accident spot soonest, cannot serve as an appropriate rescue ship. (1) When an SOS ship is a special ship such as a transportation ship for transporting chemical substances, radioactive substances, explosive hazardous substances, wasted substances, and so on, an LNG ship, a petrol tanker, and so on. (2) When an SOS ship is so large that a small rescue ship can save only a limited number of persons, requires a long time for a rescue, or is exposed to a danger in the rescue. (3) When an SOS ship is small, while a rescue ship is large, contrary to (2). (4) When a rescue ship is in a particular relationship with an SOS ship, such as a concernment, a congeneric relationship, and so on. (5) When an SOS ship was fired, sea-jacked, attacked by an armed ship, or the like.

In the above listed cases, other elements should also be taken into consideration in addition to the time which is an element for selecting an appropriate rescue ship. More specifically, elements such as the sizes of both ships, the number of persons to be saved (quantity), degree of danger, rescue techniques, and so on are required in addition to the time, for selecting a rescue ship at auction. Therefore, in this auction, the elements other than the time are evaluated to select the rescue ship which appears to be the most appropriate from participant ships and public ships, followed by notification of a request for a rescue to the selected ship. When an SOS ship is sea-jacked, a guard ship nearest from the SOS ship is notified. In the case of a fire, a chemical fire boat, a chemical fire helicopter, a fire boat, or the like may be selected as a rescue ship, depending on the fire.

On the other hand, when there is no ship to which a request for a rescue can be made around the SOS ship 210, or when a ship, even if it can arrive at the accident spot of the SOS ship 210 soonest, is determined to have physical difficulties in participating in rescue activities, other ships which do not participate in the victim rescue system 10 are addressed for participation. For example, this may be applied to a situation in which the SOS ship 210 is expected to have sunk at the time even the ship, which can arrive the accident spot soonest, would arrive at the SOS ship 210. In this event, since this is concerned with a humanistic problem, the system must be extended so that a ship apt to be a rescue ship, whether it participates in the rescue system or not, is included as a potential rescue ship. Therefore, in this event, a request for a rescue is broadcast to other systems which do not participate in the victim rescue system, in which case the space satellite 218, for example, may be used to find the potential rescue ship which is positioned nearest from the SOS ship 210 and is navigating toward the SOS ship 210, and to request this ship for a rescue through radio communication.

Thus, there are two contract forms concluded by the SOS ship 210 for the system 20: (1) the SOS ship 210 or a person who requests for SOS (customer) directly uses the victim rescue system 10 (FIG. 67); and (2) the SOS ship 210 or a person who requests for SOS (customer) requests for a rescue ship, for example, to the rescue center 213 in which the SOS ship 210 or the person has registered as a customer, rather than directly utilizing the system 10, and uses the system 10 from the rescue center 213 or the like (FIG. 68). In the former case, there is a contract relationship between the SOS ship 210 or the person who requests for SOS and the system 20, while in the latter case, there is a contract relationship between the rescue center 213 or the like and the system 20. An auction may be conducted using either of the cases. This embodiment will be described for the case in which the victim rescue system 10 configured as illustrated in FIG. 67 is employed.

An auction home page (HP) (site) resides in the server 21, such that a user utilizing the victim rescue system 10 displays the auction HP illustrated in FIG. 3 on a screen through the network N using a browser application from a terminal 30. The user can register or participate in an auction by entering required data on the time auction HP. Here, person who are permitted to participate in an auction are limited to those who have registered as users in order to ensure the reliability of the information provided by them. The auction HP has a variety of screens linked thereto, including a user registration screen PA illustrated in FIG. 70; a rescue request screen FF illustrated in FIG. 71; an auction participation screen GG illustrated in FIG. 72; and so on. The server 21 stores on its hard disk screen data for the variety of screens HP, PA, FF, GG and so on, a program for use in displaying the screens and so on (for example, an HTML description program), a program for use in computing processing involved in the auction, and so on.

As illustrated in FIG. 69, the time auction HP is provided with a large number of selection buttons 221, 222 which are classified according to articles and services possibly traded in an auction. A person who desires to participate in the victim rescue system 10 selects a "rescue request" button 222 from among the large number of selection buttons 221, 222. The auction HP is also provided with a "user registration" button 223 for registration of a user for an auction; a "request" button 224 for an SOS ship 210 to request for a rescue; a "bid" button 225 for a ship participating in an auction to participate in the auction; and so on.

Selection of the "user registration" button 223 causes the user registration screen PA, illustrated in FIG. 71, to be displayed on the terminal 30. The user registration screen PA, where the user is a marine transportation dealer, is provided with a variety of entry fields PA1 for entering the name of a ship, the type of the ship, the owner of the ship, a telephone number of the owner, an electronic mail address of the owner, remarks, and so on. As the user enters required items in all the entry fields on the user registration screen PA and selects a "decision" button 231, this user registration data D31 is transmitted to the server 21 through the network N and stored in a customer management database 201. Upon confirming that the user has paid a predetermined commission, the server 21 transmits an authentication number (ID number and password) to the terminal 30 of the registered user. The registered user uses the authentication number for utilizing the time auction.

When an SOS ship 210 requests for a rescue, the operator opens the auction HP, selects the "request" button 224 on the auction HP, and displays the rescue request screen FF illustrated in FIG. 71 on a terminal 31 on the SOS ship 210. The rescue request screen FF is provided with a GPS button 232 for identifying the position of the SOS ship 210, and a variety of entry fields FF1 to FF8 for entering how to contact the SOS ship 210, the name of the ship, the number of passengers, the type of draft, a load, an affiliation to which the SOS ship 210 belongs, a trouble situation, an ID number, and so on. The SOS ship 210 contains GPS (Global Positioning System), so that upon selection of the GPS button 232 on the screen FF, the position measured by the GPS is set as a current position of the SOS ship 210.

In an affiliation entry field FF6, information for determining a priority order upon selecting a rescue ship is entered in consideration of the interest, kindred, special relationship and so on with the SOS ship 210, such that the entered information is used to preferentially request, for example, a ship having the kindred with the SOS ship 210 for a rescue, avoid requesting a ship having the interest with the SOS ship 210 for a rescue, and so on. In a trouble situation entry field FF7, in turn, a situation of an accident (details on the accident), for example, is entered in characters. As the user enters required items in the respective entry fields FF1 to FF8 and selects a transmission button 233, the request information data D32 is transmitted to the server 21 and stored in a request information management database 202.

The auction management system 20, upon receipt of a request from the SOS ship 210 for a rescue, transmits information on the SOS ship 210 together with a notice of rescue ship collection to ships which have subscribed in the victim rescue system 10. Here, on the terminal 32 which receives the notice of the rescue ship collection, the notice is displayed on the screen, or an alarm or the like is generated from a speaker for notification. When a participant ship 211 offers a rescue of the SOS ship 210, the participant ship 211 opens the auction HP, and selects the "bid" button 255 on the auction HP to display an auction participation screen GG illustrated in FIG. 72 on its terminal 32.

The auction participation screen GG is provided with a "display details on SOS ship" button 234, a remaining time display field GG1, and an SOS ship position display field GG2. Upon selecting the "display details on SOS ship" button 234, information on the SOS ship 210 is displayed, so that detailed information on the SOS ship 210 can be viewed in the participant ship 211. The auction participation screen GG is also provided with entry fields GG3 to GG12 respectively for entering the ship name of the participant ship 211, the position of the participant ship 211, the bearing, a path, a maximum speed, a maximum number of passengers, a maximum load amount, the type of ship, rescue techniques, and an ID number. In the bearing entry field GG5, the bearing (for example, the orientation) of the participant ship 211 is entered. In the path entry field GG6, a path until the position of the SOS ship 210 is entered. In the ship type entry field GG10, the type of the participant ship 211 (the type of ship, for example, a tanker, a sightseeing ship, a marine communication ship, and so on) is entered. In the rescue technique entry field GG11, specific details on rescue techniques which can be provided for rescue activities are entered, for example, apparatus for use in the rescue provided by the participant ship 211, rescue techniques and technical level possessed by passengers on board the participant ship 211, and so on.

Upon selection of the participation button 235 after entering required items in the respective entry fields GG3-GG12, bid information data 33 is transmitted to the server 21 and stored in the bid information management database 203. The server 21 uses data transmitted from the respective participant ships 211, and selects a participant ship 211 which can most effectively rescue the SOS ship 210 as a rescue ship. In this event, for simplifying entry operations, items other than the SOS ship position and trouble situation on the rescue request screen FF may have been previously entered in the database 202 of the system 20, such that minimally required items may be entered upon requesting for a rescue ship. Likewise, on the auction participation screen GG, items other than the position, bearing, path of the participant ship 211 may have been previously entered in the database 203 such that minimally required items may be entered upon participating in the auction. Alternatively, the system 20 may be configured such that only selection of the "transmission" button 233 on the rescue request screen FF causes input values to be automatically entered in the associated fields and transmitted to the auction management system 20. Likewise, the system 20 may be configured such that only selection of the "participation" button 235 on the auction participation screen CC causes input values to be automatically entered in the associated field and transmitted to the system 20.

Only rescue contractors which have concluded to be rescuer with rescue support service dealers can be bidders and a rescuer (successful bidder). For this reason, the bid screen is transmitted only to terminals of the rescue contractors. The rescue contractors should employ a terminal which has an arrival notifying function for notifying incoming data by means of sound, vibrations, light, or the like. Of course, it is possible to use a commercially available portable terminal such as a portable telephone and so on which has an arrival melody function or an arrival vibration function. With a portable terminal (for example, PDA or the like), a small personal computer and so on which do not originally comprise a software program for implementing the arrival notifying function, a program of the arrival notifying function may be entered in bid screen display data transmitted by the server, such that the arrival notifying function is performed when the bid screen display data is received.

While a rescue requester may have a commercially available portable telephone, PDA or small personal computer, a portable terminal dedicated to a rescue may be supplied to the rescue requester. This portable terminal may comprise, in addition to GPS and a camera, a plurality of selection buttons, for example, classified according to the contents of rescue. The rescue requester can transmit required information including the position, video, and details on a rescue to the server only through manipulation on a button. The video is transmitted, for example, for a fixed period of time (for example, 10 seconds to 5 minutes) after a manipulation on the button. The camera, in turn, may be for capturing a moving image or for capturing a still image.

It is contemplated herein that even if the ship which can arrive at the accident spot soonest is selected, the rescue operation will not progress satisfactorily if the selected rescue ship is small in scale or lacks rescue techniques. To solve this problem and select a ship which can most efficiently and smoothly carry out the rescue operation, an auction in this embodiment is conducted to compete not only the time but also other elements. In other words, the server 21 evaluates input values (entered data) entered in the respective entry fields GG3 to GG11 on the auction participation screen GG for each of items which are requisites for a rescue, and conducts an auction based on numerical values resulting from the evaluation.

More specifically, as illustrated in FIG. 73A, using input values entered in the respective entry fields FF3 to FF8 on the rescue request screen FF of FIG. 71, the server 21 conducts numerical evaluation (for example, on the basis of 100 points), as requisite items for a rescue, for example, an available time (minutes) which is a limited time available for a rescue, the size of the ship (t), the number of persons to be saved (persons), and a required rescue technical level which is required to rescue the SOS ship 210.

Next, the server 21 selects a rescue ship from a F plurality of participant ships 211 based on the numerical values associated with the SOS ship 210. Specifically, as shown in FIG. 73B, using input values entered in the respective entry fields GG4 to GG11 on the auction participant screen GG of FIG. 72, the server 21 evaluates, for each of the participant ships 211, a time required to arrive at the accident spot (minutes), the size of the ship (t), and the number of persons who can be saved (persons), as requisite items for the rescue, as well as the rescue technique degree possessed by the participant ship 211. Here, the server 21 selects a participant ship Y which offers all the numerical values greater than those of the SOS ship 210, as a rescue ship, from among participant ships X to Z shown in FIG. 73B. Then, the server 21 selects the participant ship 211, as a rescue ship, which can arrive at the SOS ship 210 soonest and receive the number of persons to be saved, and has the rescue techniques which can avoid the danger to an accident situation of the SOS ship 210.

In this event, not limited to the selection of only one rescue ship, a plurality of rescue ships may be selected. For example, if the SOS ship 210 is so large that only one rescue ship cannot accommodate, the server 21 may select a plurality of participant ships 211 which have the rescue techniques available for the rescue operation and can arrive at the SOS ship 210 within a predetermined time as a plurality of rescue ships.

Alternatively, information provided by third parties (information provision contractors in principle) may be used to conduct an auction, without limiting to the auction system in which ships participating in the auction can only be selected as a rescue ship. In other words, the server 21 may widely promote third parties to provide information on ships which can be suitable for rescue ships, and conduct an auction based on the information to select the most suitable rescue ship. A ship selected by the information is notified through a radio communication, the Internet or the like to force the ship to go to the accident spot.

The rescue of the SOS ship described above is a mere example, and the auction method according to this embodiment may be used for a rescue for a wreck in mountain, attack by a bear, a person or the like, fire in a building or the like, bandit, confinement or the like, natural disaster or disaster caused by man, accident, and so on. In this event, the police, fire stations, hospitals and related facilities, accident concerns and private patrol cars, guard cars, private rescue organization members and so on may participate in the system 10 through a device or a communication terminal which notifies crime watch, fire, accident, emergency or the like. The system 10 evaluates the situation and selects one which offers numerical values that indicate that it can rescue soonest.

Elements of the system for narrowing down such a large number of rescuers, rescue facilities, rescue ships, rescue cars and so on to the most optimal rescuer or rescue method for selection include time, distance, movement, size, quantity, technical level, relation degree, specialty, public degree, dangerous degree, price and so on, all of which are combined with one other. Thus, the auction of this embodiment evaluates respective elements for automatic determination and narrow-down in order to select the most optimal one from all possible combinations as a rescuer (a rescue method).

By using the auction of this embodiment, it is possible to select the security company, guard company, guardsman or the like that is most suitable for a rescue from many eligible rescuers. In a conventional security system (guard system) in which a rescue requester directly makes a contract with a security company, a guard company or the like, the rescue requester will request the previously contracted security company (guard company) for a rescue when the rescue requester suffers from a disaster, accident, crime or the like.

In contrast, when the victim rescue system 10 is used, a plurality of rescue dealing companies (security companies, guard companies and so on) and individuals such as guardsmen and so on participate in the auction, which is conducted among the participant companies and individuals to select a company or an individual (guardsman or the like) optimal to a particular rescue field. Also, when a person is out from his house or company and encounters an accident, an affair, an illness or a wreck and therefore requires a rescue, he, i.e., a resulting rescue requester (customer) may use the victim rescue system 10 using an individually carried terminal (for example, the portable terminal 74 having the GPS 79 illustrated in FIG. 17) to select the rescue organization or an individual who happens to be near the rescue position or can arrive soon at the spot utilizing appropriate facilities, and has the most appropriate techniques and skills in accordance with details on a particular rescue request (accident, crime, disaster or the like). Thus, even if a person is attacked by a racketeer or an animal (bear or the like) when he is out, the most convenient policeman, guardsman or hunter is selected so that the appropriate rescuer is sent to the rescue requester. Of course, ordinary alpinists, volunteers and so on may register as rescuers from the friendly spirit for a simple rescue. If a rescue can be easily performed by anyone, a person who happens to pass nearby is selected as a rescuer, so that a rescue requester can be promptly rescued without inducing exaggerative activities. For example, assuming that a senior person, walking alone along a mountain path while on a journey, falls down and wants a help for recovery, if the senior person requests for a rescue with a portable terminal, a traveller who happens to be walking along the same mountain path is selected as a rescuer so that the senior person can be rescued (helped) immediately. Also, even if a person receives a serious wound on a mountain path, a traveller who happens to pass nearby is selected as a rescuer so that the traveller can give first aid to the person before a true rescuer (ambulance man or the like) arrives. The request screen is provided with an entry field for entering a technical level required for a rescue, and general persons such as alpinists, volunteers and so on may be regarded as candidate rescuers when a rescue requires a low technical level. Further, if a rescue requester offers a required level (rescue capabilities, results, contribution and so on), the auction of this embodiment may be used to select an optimal organization or individual in accordance with the required level of the requester.

Figure 74:
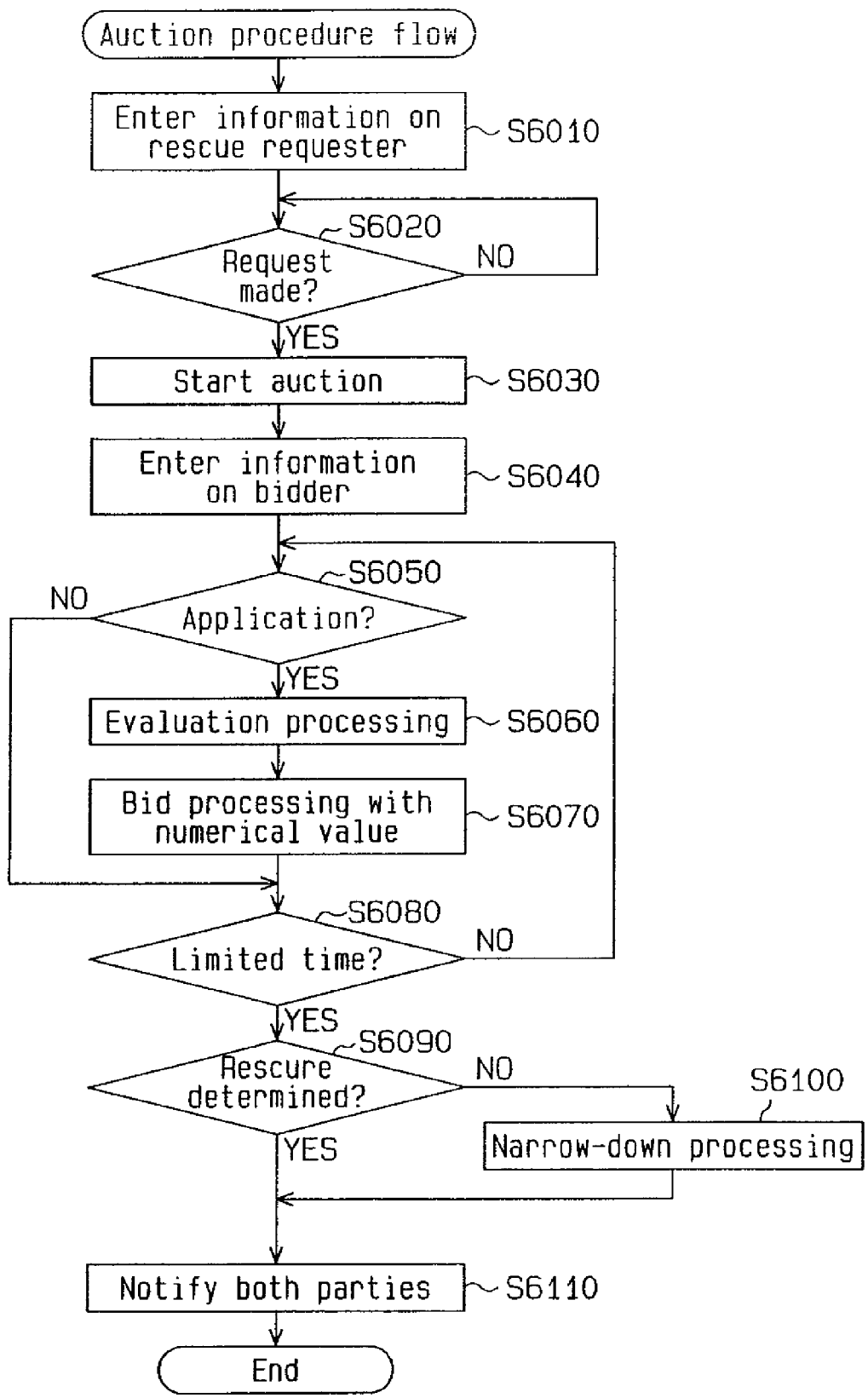
FIG. 74 is a flow chart illustrating a procedure of an auction.

Next, a flow of the auction from a request for a rescue to selection of a rescuer(s) will be explained with reference to FIG. 74. It should be first noted that the illustrated procedure flow does not necessarily show a processing procedure of the server 21 but shows a procedure (flow) of the entire auction. The following explanation is given for an example in which a rescue requester is a ship belonging to a marine transportation dealer (SOS ship).

In S6010, information on the rescue requester is entered. Specifically, when the SOS ship 210 requests for a rescue, required items are entered in the respective entry fields FF1 to FF8 on the rescue request screen. It should be noted that a procedure in S6010 wherein the rescue request screen is displayed on a terminal of the requester, and the server 21 receives request information data 32 of the SOS ship 210 entered on that screen corresponds to a request procedure.

In S6020, the presence or absence of a request for a rescue from a rescue requester is determined. The procedure flow waits in S6020 until a request for a rescue is made.

In S6030, an auction is started. Here, a request for rescuing a ship is notified to respective terminals 32 possessed only by ships which have subscribed in the victim rescue system 10 through the network N to collect participants in the auction.

In S6040, information offered by a bidder is entered. Specifically, when a participant ship 211 participates in the auction with intention for rescuing the SOS ship 210, the participant ship 211 enters required items in the respective entry fields GG3 to GG12 on the auction participation screen GG. It should be noted that the procedure in S6030, wherein the bid screen is displayed on terminals 31 of bidders, and the server 21 receives the bid information data 33 on the participant ship 211 entered on that screen, corresponds to a bid procedure.

In S6050, it is determined whether or not there are applications to the auction. In other words, it is determined whether or not there are bids from bidders. When there are bids, the procedure flow continues to S6060. On the other hand, when no bid is applied, the procedure flow continues to S6080. A procedure from S6050 to S6110 corresponds to a bid acceptance procedure.

In S6060, the evaluation processing is executed. Specifically, each of requisites for rescuing the SOS ship 210 (for example, arrival time, size of ship, rescue technical level and so on) is evaluated using input values entered in the entry fields GG4 to GG11 on the auction participation screen GG of FIG. 72.

In S6070, bid processing is executed with numerical values. Specifically, participant ships 211 which have participated in the auction are listed in a priority order using the numerical values resulting from the evaluation in S6060, wherein ships more suitable as a rescue ship are given higher priority levels, to select a rescue ship.

In S6080, it is determined whether or not a limited time has expired. When within the limited time, the procedure flow returns to S6050 to again determine the presence or absence of new participants in the auction. At the expiration of the limited time, the procedure flow continues to S6090.

In S6090, it is determined whether or not a rescuer has been determined. Specifically, for selecting a rescue ship, the procedure flow continues to S6110 if only one ship has been selected as a rescue ship in S6070. Otherwise, the procedure flow continues to S6100 when a plurality of ships have been selected as rescue ships because calculated numerical values are the same.

In S6100, narrow-down processing is executed. Here, for selecting only one from participant ships 211 which offered the same condition when the bid processing was executed in S6070, the participant ships 211 are narrowed down based on conditions other than the numerical values resulting from the evaluation, for example, the expenditure required for requesting for a rescue ship, such that the SOS ship 210 is least possibly burdened in terms of funds.

In S6110, the server 21 notifies both parties of the establishment of the trade. While FIGS. 67 through 74 have illustrated the system configurations and screen layouts intended for a rescue for a ship, the entry fields on the screen may be changed as appropriate in consideration of who is a rescue requester and which type of rescue is required. For example, with intention for a rescue at an individual or family level or for a rescue for individual employees of a legal person, each requester carries a GPS equipped terminal (a portable telephone, PDA or the like), so that the variety of screens are displayed on the terminal carried by each requester or rescue contractor (bidder). Information entered on the request screen for use as materials for determining a rescuer includes details on a rescue for a requester, for example, an accident, an affair (type of crime), whether or not the requester is wound, graveness of wound, situation of victim, situation of wreck, name of disease, episode, techniques required for a rescue, number of persons to be saved, and so on. Also, the bid screen displays a map (map information) in place of a chart, on which the rescue position is identified.

In addition to the GPS, the terminal of the rescue requester may be equipped with an imaging device such as a camera. For example, the portable terminal 74 equipped with the GPS 79 illustrated in FIG. 17 is used and is equipped with a camera 87 as an imaging means as illustrated in the figure. In this event, an image captured by the camera 87 is displayed on terminals of bidders, so that the bidders can confirm the situation of the victim of the rescue requester (or a person who requests for a saving other than the requester) on the screen before participating in the bid. For example, if a person is involved in an accident or an affair while he is out, the position can be notified through the GPS 79, and a request for a rescue can be made with an image of the accident or an image of the affair captured by the camera 87 of the portable terminal 74, thereby making it possible to determine techniques and skills required for candidate rescuers from the video images to select a more appropriate rescuer. It is also possible to correctly know required information such as a situation of wound of the rescue requester and so on and moreover consider appropriate rescue methods through the video images. Thus, the rescue requester is rapidly saved by a more optimal rescuer in accordance with the details on the request for a rescue. It is also possible to view the images from the imaging device in the management system 20 to determine the victim level of the disaster or the like from the video image in the management system 20 and evaluate a rescue technical level by a judge of the system 20.

As appreciated from the foregoing, the following advantages are provided according to the eighth embodiment.

(21) A rescue requester can select the most appropriate rescuer from among rescuers participating in an auction by making use of the system 20 through a terminal. For example, when a ship belonging to a marine transportation dealer encounters a wreck, this SOS ship (SOS originator) 210 can select the most appropriate rescue ship (rescuer) from participant ships 211 which participate in the auction. It is therefore possible to accomplish effects such as execution of rapid rescue activities, avoidance of confused rescue activities, and so on as well as to limit an extra expenditure such as a cost which would occur when even ships useless for the rescue were asked for the rescue.

(22) Conventionally, when an individual, a family or a legal person is secured, it is general tendency to make a contract with a security company, a guard company or the like, so that they will request the previously contracted company for a rescue upon requesting for a rescue. However, by the use of the victim rescue method of this embodiment, an auction is conducted among a plurality of bidders to select the most suitable bidder as a rescuer, thereby making it possible to extend the range of the request for a rescue, and select a rescuer more suitable for a particular rescue as compared with the prior art.

(23) Conventional security companies and guard companies are intended for the guard of a residence or a company, so that an accident, an affair (crime), an illness, or a disaster encountered while a person is out for journey, shopping and so on cannot be contemplated for a rescue. For this reason, a rescue, while a person is out, can only be requested by telephone to a public organization such as the police, the fire station or the like which is dedicated to a rescue. However, with the use of the system 20, even when a requester is out, he may request the system 20 for a rescue through a terminal carried by himself (the portable telephone 74, PDA or the like), resulting in selection of an optimal organization or individual as a rescuer, in accordance with the rescue position and details on the request for a rescue. Therefore, the requester is rapidly saved in an appropriate rescue method at the rescue position while he is out.

(24) The utilization of the system 20 results in an extended range of requests for rescues, so that when ordinary persons such as alpinists, volunteers and so on register as rescuers from the friendly spirit intended for a simple rescue, for example, such as a help, a person who happens to pass nearby can be selected as a rescuer, so that a rescue requester can be promptly rescued without inducing exaggerative activities.

The eighth embodiment may be modified in the following manners.

The bid procedure is not limited to the method of entering required items on the request screen displayed on the screen of a terminal of a requester. For example, if a rescue requester (victim) holds a GPS equipped portable terminal and connects to a rescue support service server through the portable terminal, the server acquire automatically position data of the rescue requester from a terminal through communications, and inquires a current victim situation of the victim with an artificial voice so that the server receives voice data of the victim who orally answers questions as bid request data as it is. With the employment of such a request procedure, even if a victim has difficulties in using hands or viewing, for example, due to wound or illness, it is possible to correctly accept the situation of the victim, and realize an appropriate rescue.

A rescue requester and a victim are not limited to be identical. This is because, for example, a person who has found a victim may use the rescue support service, determining that the person cannot accommodate the victim. In this event, the rescue requester enters spot position data if he requests for a rescue from a position away from the spot. In addition, since a rescue spot may move, as is the case of requesting for a rescuer for saving a person who was taken over by a robber together with his car, information on a predicted rescue spot position, a moving route, and so on is also provided to bidders, such that the rescuer nearest from the destination, rather than the position upon requesting, is selected.

Video data is not limited to be transmitted to bidders for viewing video images on the bid screen. For example, a disaster situation may be determined by viewing a video image on the server side to make sure of appropriate rescuers and rescue capabilities such as rescue techniques and so on on the service provider side and reflect the result of determination on the contents of the displayed bid screen.

For collecting bids of rescuers, it is possible to limit a bid collection area (region) since an area (region) in which rescuers can work is limited from position data in the rescue request information received from a terminal of a requester. For example, for a normal rescue which does not need the use of special facilities, apparatus and so on for the rescue, it is desirable to limit a collection area to surrounding regions (for example, cities, towns, villages) around the requester. For determining the area, the server comprises area determination condition data. In the area determination condition data, areas are set in steps in accordance with details on disasters, by way of example, and an area is set based on the urgency, and a ratio of the number of persons who can be rescuers. For example, for an accident, an affair, a sudden attack of illness, and so on, which should be quite urgently treated, a narrow area (for example, a city, a town, a village) is set. Also, when a large number of persons can serve as rescuers (for example, for a simple rescue (assist) (for example, a help or the like) for which anyone can be a rescuer), a narrow area (for example, a city, a town, a village, or a narrower area) is set.

The server 21 may sequentially sense the position of a rescuer after the rescue request procedure to notify a requester of a situation in which the rescuer is going to the rescue. Also, the server 21 may transmit video data received from a terminal of a requester, after the rescue request procedure, to a terminal of a rescuer to notify the rescuer of a disaster situation of a requester.

A specific configuration for communicating with the terminal 30 equipped in the SOS ship 210 or a participant ship 211 participating in an auction through a network using a personal computer may be implemented, for example, by connecting a portable telephone or PHS capable of communicating through the Internet to the personal computer, or by connecting a terminal dedicated to a connection to the network to the personal computer.

A terminal for use in requesting for a rescue or placing a bid is not limited to a personal computer and a portable telephone and PDA capable of communicating through a network, but a terminal dedicated to the victim rescue system, for example, may be used.

For utilizing an auction to select a rescue ship, it is not limited to select the most suitable ship as a rescue ship in consideration of the size of the ship, a rescue technical level and so on other than an arrival time to an accident spot, but the ship which can arrive at the accident spot soonest, for example, may be simply selected as a rescue ship.

Items assigned to the entry fields on the rescue request screen FF and the auction participation screen GG may be freely changed as appropriate. In essence, the respective screens FF, GG may be provided with entry fields for entering information with which the most suitable ship can be identified during a selection of a rescue ship. If an item other than a ship is to be rescued, the entry fields on the rescue request screen and the auction participation screen may be changed as appropriate in accordance with details on a particular disaster, accident, affair or the like.

Next, terms used in the eighth embodiment are defined as follows.

(1) A rescuer is not limited to a person, but includes a wide variety of persons, organizations, facilities and so on. Therefore, a rescuer includes a ship, a train, a helicopter, an airplane and so on in which a rescuer exists, and also includes an organization such as a rescue team, a rescue ranger, and so on. Also, the facilities include, for example, a rescue robot, a remotely controlled rescue device, and so on, irrespective of manned or unmanned.

(2) A disaster or the like only needs to be an item which requires a rescue (including a simple rescue such as a help), and includes a victim and a disaster caused by an accident, sudden attack of illness, wound, wreck, fire, inundation, earthquake, explosion, terrorism, injury case, stoker, confinement, bandit, and so on. Also, a victim includes a victim who has suffered from the foregoing disaster (fire, earthquake, inundation and so on), and also includes an animal and so on, not limited to a person.

The respective embodiments described above are not limited to the foregoing, and may be modified in the following manner.

Figure 75:
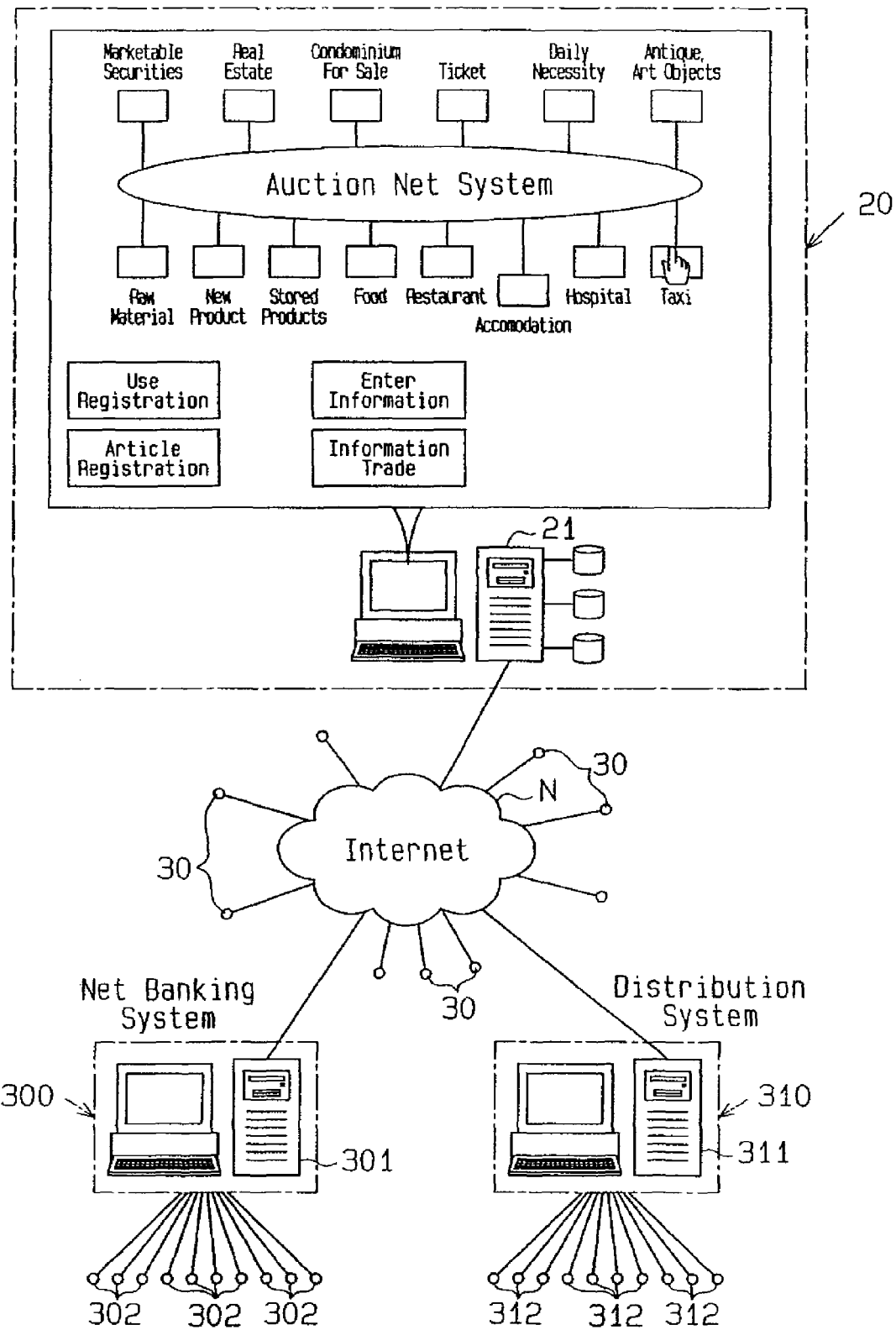
FIG. 75 is a schematic diagram illustrating the configuration of a trading system.

After the establishment of a trade, it is necessary to proceed with delivery of an article or provision of a service on the seller side, and settlement of payment on the buyer side, in which case the settlement may be made utilizing a net banking. FIG. 75 illustrates an example of a trading system of this type. The illustrated trading system comprises an auction management system 20, a banking system 300, and a distribution system 310, each of which possesses a server 21, 301, 311 interconnected through a network (the Internet, a dedicated channel, or the like) N for mutual communications. The banking system 300 places a net banking home page for settlement, such that a buyer can pay in from the net banking HP on a terminal 30 such as a personal computer installed in his house, a portable telephone, or the like. Of course, the net banking system 300 may be connected to a large number of stores (for example, convenience stores, banks, and their branch offices) 302 located in every regions all over the country for communications, such that a buyer can pay in at a nearby store. The distribution system 310 in turn places a collection/delivery home page, such that a buyer can request for delivery, such as delivery of an article, from the collection/delivery HP on the terminal 30 such as a personal computer installed in his house, a portable telephone, or the like. Of course, the distribution system 310 may be connected to a large number of stores (for example, convenience stores and delivery branch stores) 312 located in every regions all over the country for communications, such that a buyer can request for delivery to his house at a nearby store.

The auction management system 20 assigns a password to both parties upon the establishment of a trade, so that both parties which have established the trade can communicate with each other within a limited period by entering the password on the home page. Also, both parties are assigned a trade code number upon the establishment of the trade, so that the buyer specifies the trade code number to pay in to the net banking system 300, while the seller specifies the trade code number to request the distribution system 310 for delivery. After confirmation of the paying-in by the buyer to the net banking system 300 and confirmation of delivery of an article by the seller to the distribution system 310, the auction management system 20 proceeds to a fund transfer and delivery operation. According to this trading system, since the fund transfer and delivery operation are performed after the confirmation of the paying-in to the system and the delivery of the article, while the trading partners do not know their identities, a safe trade can be carried out.

Figure 76A:
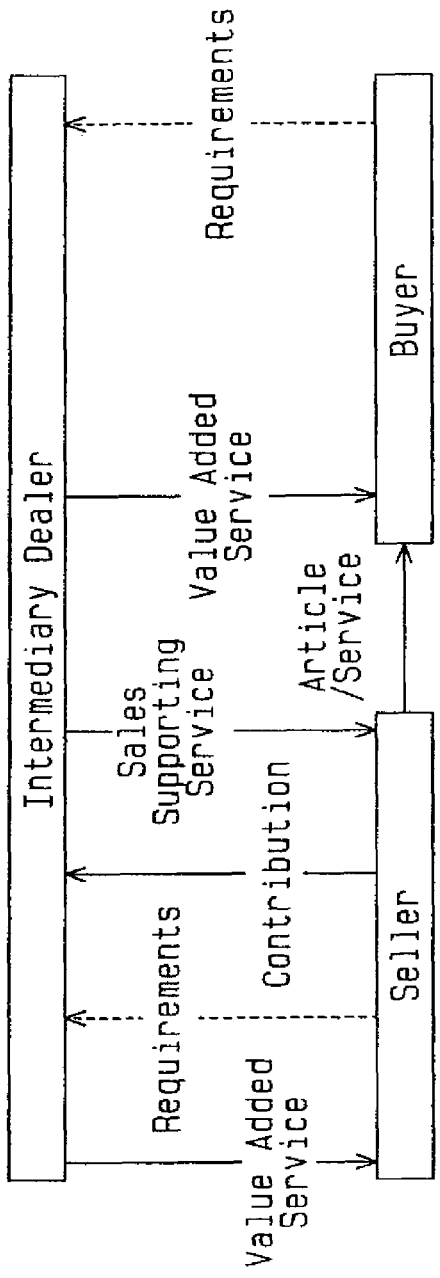
Figure 76B:
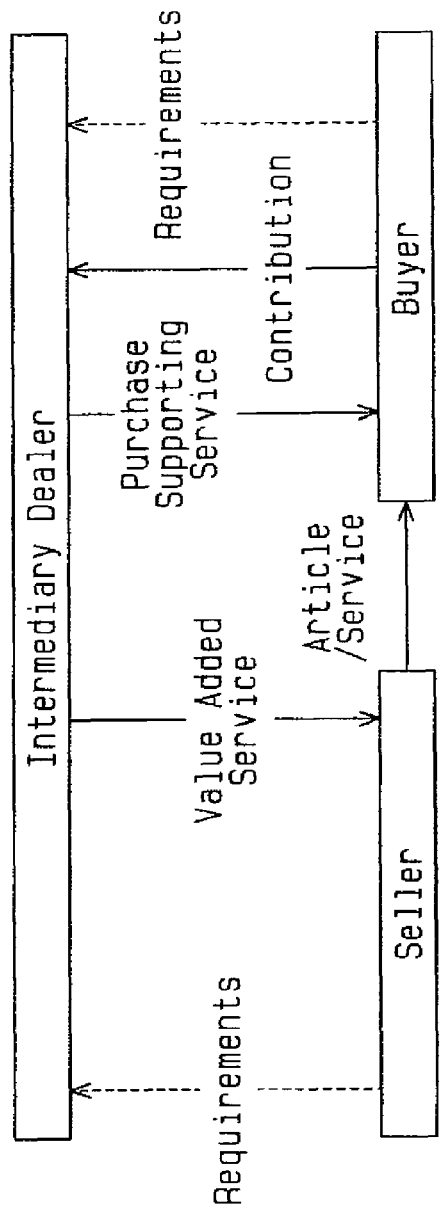

While there are three different types of auction forms as illustrated in FIG. 76, an auction may be conducted in any form. Specifically, FIG. 76A shows a sales supporting form, wherein an intermediary dealer offers free value added services to potential buyers to widely collect buyers, and obtains contributions from a seller by offering sales supporting services to the seller, such as introducing buyers to the seller, and so on. FIG. 76B shows a purchase supporting form, wherein an intermediary dealer offers free value added services to sellers to collect potential sellers, and obtains contributions from a buyer by offering purchase supporting services to the buyer, such as introducing sellers to the buyer, and so on. FIG. 76C shows a sales/purchase supporting type, wherein an intermediary dealer offers sales supporting services to potential sellers as well as offers purchase supporting services to potential buyers to obtain contributions from both sellers and buyers. Of course, the intermediary dealer may obtain advertisement fees or the like from third parties, without receiving contributions from buyers or sellers.

In the respective embodiments described above, an auction method as follows may be employed when a plurality of elements are set. In a bid acceptance procedure, an index is previously set to determine the ranking among the respective elements. Bids are simultaneously conducted in parallel for each of the plurality of elements, and a bidder who has offered the bid information with the highest index among the respective elements is determined as a successful bidder. For example, when position and time are specified, assuming that 1 km is specified as 50 points in distance and 10 minutes are specified as 50 points in time, a bidder who acquires 60 points, which are closest to 50 points in position, is determined as a successful bidder, rather than a bidder who acquires 40 points which are closest to 50 points in time.

In the respective embodiments described above, a plurality of terminals in a description "providing to a plurality of terminals" may be unspecific or specific.

In the respective embodiments described above, "bid" means participating in a bid, wherein a bid may be conducted with an element other than the price.

In the respective embodiments described above, instead of staring a bid to wait for bids after a request is made from a client, bid information previously acquired from bidders may be preserved in a database such that the person who has offered the bid information most suitable to requirements of the client is retrieved from the database upon receiving a request. In other words, while the respective embodiments have employed the method of staring a bid to wait for bids after a request is made from a client and a method of preserving bid information previously acquired from bidders in a database such that a bidder who has offered the bid information most suitable for requirements of the bidder is retrieved from the database when a request is made, only the former may be employed. In the former method, if a client can view, for example, a bidding situation on the screen, the client may respond a plurality of times by offering conditions satisfying requirements of a bidder after confirming tendencies of other bidders.

In the position auction in the second embodiment, for example, when a taxi company bids off a customer, the taxi company may preferentially bid off a customer who is going to the remotest destination if there are a plurality of customers within a certain range. More specifically, the distance between the position at which each customer takes a taxi and a destination is measured on map data to bid off the customer who offers a longer distance. In this event, if a plurality of taxi companies compete, a taxi company which has a taxi nearest from the taxi taking position or a taxi company which offers more favorable services to the customer will bid off the customer who offers a longer distance.

In the respective embodiment described above, an element other than the price may be limited not to mean to include a bid conducted with the element in the form of a mere conversion of a price, and substantially in the form of a mere price bid. For example, in the position auction, the element other than the price does not include those which are mere conversion from the price, and with which a bid is conducted with the price. For example, the element other than the price does not include those used in a bid in the form of a mere alternative of the price, such as a bid conducted with an element having a proportional relationship with the price. However, an auction method which has a meaning of using an element other than the price is included, such as that which cannot be said to be a mere alternative of the price, and produces inherent effects other than the price eventually by conducting a bid with the element other than the price. For example, a higher rate is burdened in accordance with a distance over which a taxi goes to receive a customer, it is out of the question to conclude that such a method is not included in the invention, ignoring the effect of reducing a waiting time of the customer on the basis of such a reason that bidding of the nearest taxi leads to a lower rate, and so on. With the employment of such a method, it is possible to more satisfy requirements other than the price.

In the respective embodiments described above, a trade by an auction may be either onerous or gratuitous. For example, a trade may not involve sale or purchase but may be made free of charge. For example, wastes and used articles may be given, free of charge, to a person who can come and take when the owner wants to dispose them but is in trouble how to treat them. In such a situation, an auction may be used to look for a partner who takes over such articles. In this event, while a relationship between a seller and a buyer is not virtually established because it is not a dealing, the present invention is intended to contemplate even such a case of trading form. For example, the owner may determines the person who is located nearest from him, or a person or a dealer who takes over the largest weight or the largest amount of articles as a successful bidder. Alternatively, the owner may determine a person or a dealer who takes over such articles at the lowest cost as a dealing. Otherwise, an article or a service offered by a manufacturer or the like free of charge may be treated at auction.

In the respective embodiments described above, bidding conditions may be set as appropriate, and may be such as to determine a value at a certain rank from a predetermined direction or a person who offers the value closest to an average value of bidden prices, by way of example, in accordance with a previously determined priority rule, from among a number of bidders (a number of participants) as a successful bidder.

In the respective embodiments described above, price information is not essential to information related to an article. For example, the information related to an article may be, for example, information only on the article or on the article and its quality, i.e., information other than the price. For example, as to art objects, antique objects and so on, a seller himself may not know the value of his article and want to identify the price through a bid. On the other hand, a buyer himself may want to obtain a certain article irrespective of its price. In this event, the price itself merely has a secondary value. If the price is included in bid conditions in this way as a matter of trading, a proper evaluation or trade may not always be expected due to variations resulting from the course of events depending on the funds of competitors. In such a case, the price would rather not be offered as bid conditions.

In the respective embodiments described above, when information related to an article includes information on a sales price or information on a purchase price, the information on a sales price or the information on a purchase price may be not only the sales price (or the purchase price) but also conditions on the sales price (or the purchase price), for example, the lowest price (or the highest price), a range of price (a price width), and moreover, a plurality of ranges of sales prices and purchase prices which are set in steps for each of conditions, and so on.

In the first embodiment, the trade due date condition is not limited to priority rules such as the due date slide scheme, but may be, for example, a specified trade due date (for example, a desired trading date) itself.

In the aforementioned first embodiment, the present invention is not limited to a method of offering both a trading due date and a price from a client as is the case of the price slide setting type. For example, a client may offer a plurality of trading due dates such that bidders select one of the plurality of trading due date and set a price together with the selected trading due date for participating in a bid. Alternatively, for example, a client may offer a plurality of prices such that bidders select one from the plurality of prices and set a trading due date together with the selected price for participating in a bid. In this event, the client offers an allowable period in which bidders can set a trading due date (for example, for a manufacturer, after a release day, after a period in which the manufacturer wants to leave articles at his hand, and so on), and this allowable period is used as the trading due date condition. For example, when a manufacturing company requests for a bid, for example, for purposes of sales prediction, the allowable period may be, for example, after the release day.

In the respective embodiments described above, when a method of using a list screen is employed, the trading due date condition may be an option only for selecting whether or not a bidder is requested to offer a trading due date (a trading date or the like) on a screen previously provided for entering details on a request of a client on a home page on the server side, in which case the client determines a successful bidder while viewing trading due dates offered by bidders on the screen of the terminal 30A. Further, the client need not always set the trading due date condition. Alternatively, a screen provided to bidders when the server collects bidders may be set to previously ask bidders to offer information on the trading due date, so that the offer of the trading due date is requested by the setting on the server side, instead of the client. Also, in this case, the client can determine a successful bidder by comparing trading due dates offered by bidders.

In the respective embodiments described above, an investigation made based on bid information of bidders is not limited to a sales prediction. The contents of investigation made on an article based on bid participation information offered by bidders may be an investigation on the rareness of the article, an investigation on a market price (value) of the article, an investigation on the distribution of the article, and so on.

In the aforementioned third embodiment, an auction may be conducted only with taxis which can be assigned immediately after a request is made from a customer, without consideration of information on conditions of a car and a driver, and road information such as a road situation.

In the aforementioned fifth embodiment, numerical values handled in an auction as an object of bid may be any units of physical amounts used as the unit of traded articles, for example, the number of sheets, thickness, hardness, and so on, in place of length, height, area, volume, bulk, weight, quantity, and so on.

In the respective embodiments described above, a trade by an auction may be either onerous or gratuitous. For example, the trade may not involve sale or purchase but may be made free of charge. For example, wastes and used articles may be given, free of charge, to a person who can come and take when the owner wants to dispose them but is in trouble how to treat them. In such a situation, an auction may be used to look for a partner who takes over such articles. In this event, while a relationship between a seller and a buyer is not virtually established because it is not a dealing, the present invention is intended to contemplate even such a case of trading form. For example, a free article or service evaluated as most suitable for requirements of a client, or a recipient who receives provision of the article or service bids off. Otherwise, an article or a service offered by a manufacturer or the like free of charge may be treated at auction.

In the respective embodiments described above, an article/service may be anything as long as it can be traded, irrespective of whether it is tangible or intangible. Exemplary categories may include, for example, (1) article/service field, (2) information/contents field, (3) idea/intellectual property field, and so on. In (1) the article/service field, the field may be divided into sub-categories such as ticket, passport, hotel, loan, finance, security, insurance, residence, real estate, car, bicycle, book, music, daily necessities, food, cosmetics, computer, game, auction, second hand article, telephone, business supply, bio, medicine, energy, resource, generator or evaluator of intangible article (heat, light, wave, color, hue, brightness, electromagnetic field, and so on), and so on. In (2) the information/contents field, the field may be divided into sub-categories such as recruiting, jump, outsourcing of works, inventory disposal, recycling, information contents, meeting, relation information, education, seminar, advertisement, introduction of trader, human network, claim transaction, risk management, and so on. In (3) the idea/intellectual property field, the field may be divided into sub-categories such as idea, business planning, literary work, intellectual property, and so on.

A server, a network and a terminal may be implemented by a digital television capable of bidirectionally communications. In this event, the server may be a computer in a television broadcasting station or the like which emits digital data, while the terminal may be a television capable of receiving digital broadcast programs.

The request procedure is not necessarily essential. For example, a request may be made by telephone or interview, and the server may execute the procedures subsequent to the collection procedure (collection procedure, bid procedure, bid acceptance procedure) at auction through a network.

Display on the screen of the terminal is not necessarily essential. The request screen and bid screen used in the request procedure, collection procedure and bid acceptance procedure may be eliminated. For example, request information may be received by the server through audio data from a terminal of a client, and bid information may be received by the server through audio data from terminals of bidders. Then, the server generates an artificial voice to the terminal of the client for guiding that the request information is audibly produced, and generates an artificial voice to the terminals of the bidders for guiding that bid information is audibly produced.

Terms used in respective claims in this specification are defined as follows:

An article is an item to be traded, irrespective of whether it is onerous or gratuitous.

A service is irrespective of whether it is onerous or gratuitous. The service includes a service offered free of charge by volunteer. The service also includes a service which does not use objects. The service further includes a rescue for saving a victim by a rescuer (onerous or gratuitous).

The variety of screens such as the request screen, bid screen and so on are not limited to single screens but may be comprised of a plurality of screens.

The request screen and the bid screen are not essentially provided by the same server (in a narrow sense) provided that they belong to a flow of sequential procedures by mutual linking or the like. In other words, each claim includes an implementation in which a server (in a narrow sense) for receiving data from a client in the request procedure is different from a server (in a narrow sense) for transmitting and receiving data in the collection procedure and the bid procedure. A group of such servers in a narrow sense also fall under a server (in a broad sense), so said in each claim.

The collection procedure refers to a transmission procedure for making a state in which collection information for collecting bids can be viewed on terminals. The collection procedure includes the case where the server unilaterally transmits the collection information to terminals, and the case where the server transmits the collection information to terminals while responding to requests such as accesses from the terminals. An example of the former is a bidirectional television used as a terminal, while an example of the latter is a personal computer, used as a terminal, capable of connection to the Internet for commutation.

In a bid of unit price, an element which is equivalent to the bid of unit price is a mere conversion of the price, so that such an element is excluded. When an article sold in quantitative units (for example, OO yen per 100 grams, OO yen/m, OO yen/unit, and so on) is competed with the unit (g, m, unit or the like) in the denominator within the unit indicative of the unit price (hereinafter simply referred to as the unit), the element is a mere conversion of the price if it is a fixed price. Since this is substantially equal to a bid with unit price, even if the bid is conducted with the element (g, m, unit or the like), such an element is excluded. Also, in an example of service, when massage offered at 3,000 yen per 30 minutes is bidden with "time" at a fixed price, the element "time" of the service "massage" is excluded as an element since the time bidding is substantially equal to the price bidding. However, for an element with which a bid is established wherein a unit price, not a fixed price, is not changed, an element "number" in a bid in which a person who buys the greatest number of apples at 100 yen even by one more is determined as a successful bidder, cannot be said to be a replacement of the unit price, so that this falls under an element.

The unit (g, m, number and so on) of a "unit price" convertible to a price (for example, OO yen/100 g, OO yen/m, OO yen/unit, and so on) is excluded from elements. In this case, a fixed price which substantially corresponds to a bid of a unit price is not of course included in elements, and a bid in which the unit price is not changed such as that in which a person who buys the largest number of apples at 100 yen even by one more is determined as a successful bidder, is excluded from elements since this is the unit of the unit price.

The attribute refers to information with which an article or a service can be identified, and the nature and contents which characterize the article or the service. The attribute of a service includes an attribute of a person who provides the service, an attribute of an object used for the provision of the service, an attribute of an object used in utilization of a person who receives the offered service. The attribute can help differentiate from other articles and services. The attribute includes, for example, design, contents of service, specification, model number, performance, effect, quality, material, strength, reliability, taste, smell, fragrance, color, brightness, illuminance, sound volume, sound quality, temperature, pressure, size, component, log, career, title, capability, speed, length, weight, volume, bulk, area, nature, point, shape, pattern, coloring, type, system, product name, article name, and so on. However, these are mere examples. While some of these attributes can be converted to a price depending on articles and services, the unit of a unit price of an applied article does not fall under the attribute. For example, the unit of the unit price of an article sold in quantitative units does not fall under the attribute. However, when a wire of a standard length is cut into 2-meter pieces for sales, this "2 m" is nothing but a choice of a buyer and does not at all characterize the wire itself, so that it does not fall under the attribute of the wire. However, with a wire of a length out of standard, for example, 1000 km, this "1000 km" sufficiently characterizes the wire, so that it falls under the attribute. Whether a numerical value is an attribute or not is determined from determination as to whether or not an associated article is characterized by the numerical value, i.e., a numerical value represented by an element (unit or the like) is not a standardized value, the article can be made, owned, or skilled only by a particular enterprise or craftsman, and so on. It should be noted that attribute information on an article or a service offered by a client in the request procedure is not an element, so that the price may be of course included.

Even if the length falls under the attribute with a wire of 1000 km, this element is excluded with respect to the article "wire" since the unit "km" is the unit of the unit price at which the wire is sold. For example, liter, which is the unit of the unit price for a gasoline that is traded at OO yen/liter, does not fall under the attribute, whereas the liter for specifying the volume of an refrigerator falls under the attribute because the liter in this case characterizes the refrigerator. In this way, even if a unit does not fall under the attribute for some article, it does not mean that the unit does not fall under the attribute for all articles.

An "element which does not directly affect the price" refers to an element in which a product of a unit price and the value of the element does not indicate the price, rather than an element in which a price per unit of the element (unit price) is not an element normally handled in a general commercial trading field. Whether it directly affects the price or not depends on a particular article. For example, the quantity (number), volume and weight, the difference in value of which directly affects the price, is excluded. A bid of an article at 100 yen with quantity, a bid of an article (for example, gasoline) at 100 yen per liter with volume, and a bid of an article at 100 yen per 1 kg with weight (the product of the unit price and the value of the element (quantity, liter, kg) is the price as it is) are excluded. Therefore, a bid with an element which does not directly affect the price, for example, a bid of an electric product with weight or volume, a bid of a television with scanning lines (quantity) (generally, the scanning lines do not directly affect the price) is included in this technical idea.

The position includes a position on a moving route. The length is limited to a length related to the nature of an object, and includes a width, a height, a thickness, and so on (a handling unit of an article itself (the length of a wire and so on) is excluded). The distance refers to the length between two points, and includes even a step and a level difference. The volume also includes bulk and so on (however, limited to the volume related to the nature of an object, and the volume of an article itself such as a gas, a liquid and so on belongs to "quantity"). The weight is limited to the weight related to the nature of an object, and the weight of an article itself belongs to "quantity". The quantity refers to the number (the number of articles and so on) or the amount (however, only limited to the quantity of an article itself (volume, weight, length (the length of a wire and so on), and the space and weight indicative of the nature of an object are excluded). The evaluation numerical value refers to a numerical value (including specification and so on) indicative of the performance and quality of an object used in an article or a service.

The positional relationship is a concept which includes the distance between a desired position and a bid position, a step on a moving route between both positions, a level difference between both positions, a positional relationship considering a time required for a travel between both positions, and so on.

What is claimed is:

1. A method for automatically facilitating an auction performed via a computer-implemented network wherein a plurality of bidders compete based on a time parameter to acquire a trade proposed by a requester, wherein each of a plurality of bidders is prompted to submit a time-based bid to be compared against a due date and a time slide preference to be most satisfied by a winning bid for the trade, the time slide preference representing a desired time-wise proximity of a trading event selectively preceding, or subsequent to, the due date, the method comprising:

in a request servicing procedure, responding, by a server-side system, to an access via a terminal of the requester which displays a request entry screen prompting the requester to enter request information including the due date and the time slide preference, by receiving the request information via the terminal of the requester;

in a bid procedure, responding, by the server-side system, to an access via a terminal of each of the plurality of bidders that displays a bid screen on the terminal of each of the plurality of bidders to prompt each bidder to enter bid information including a proposed time, by receiving the bid information via the terminal of each bidder; and in a bid acceptance procedure, executing, by the server-side system, bid processing for determining a winning bid using at least the proposed time offered by each of the bidders in the bid information, and in accordance with the due date and the time slide preference, wherein the winning bid is determined as a bid that meets the due date and most satisfies the time slide preference relative to other bids.

2. The auction method according to claim 1, wherein:
in the bid acceptance procedure, determining, by the server-side system, a priority order for qualifying bids that satisfy the due date, wherein the ordering is based on a degree to which each of the qualifying bids meets the time slide preference.

3. The auction method according to claim 1, wherein the due date relates to payment terms of the trade.

4. The auction method according to claim 1, wherein the due date relates to delivery terms of the trade.

5. The auction method according to claim 1, wherein:
the due date represents at least one of a duration and a deadline, wherein the duration has a starting point, and wherein the deadline is defined as a time at the conclusion of the duration.

6. The auction method according to claim 5, wherein:
the duration defines at least one of: a waiting duration imposed on the requester who is to receive provision of an article or a service until the requester receives the provision of the article or the service, a waiting time imposed on the requester who offers an article or a service until the requester receives a payment for the article or the service, and a transit time imposed on the requester who receives provision of another service required for a move to a place at which the requester is to receive the provision of the article or the service.

7. The auction method according to claim 5, wherein:
the duration is defined as a transit time corresponding to transporting an article from a source to a destination, the duration being selected from the group consisting of: a waiting time imposed on the requester who is to receive the article until delivery of the article, a moving time required for a transportation of the article to a location at which the requester is to receive the article, or any combination thereof.

8. The auction method according to claim 7, wherein:
in the bid procedure, the server-side system receives, via a terminal of each of the bidders, variation factor information representing factors potentially causing variations in the duration, and receives bid information that further includes the variation factor information via the terminal of the bidder; and
in the bid acceptance procedure, the server-side system corrects the duration using the variation factor information, and executes the bid processing based on correction of the duration.

9. The auction method according to claim 7, wherein:
in the bid acceptance procedure, the server-side system acquires variation factor information of the duration from an external source via a communication, corrects the duration using the time variation factor information, and executes the bid processing with a corrected duration.

10. The auction method according to claim 5, wherein the duration is a transit time necessary for a carrying out of a transportation service to transport a person or an object between a place specified by a person who is to receive the provision of the transportation service and a place specified by a person who offers the transportation service.

11. The auction method according to claim 10, wherein:
the duration is a waiting time imposed on the requester when the bidder goes to a position specified by the requester between a position specified by the requester who is to receive the provision of the service and a position offered by the bidder who offers the service;
in the request servicing procedure, the server-side system prompts the requester to offer a position to which the bidder should go, on the request entry screen, and receives the request information including the position via the terminal of the requester;
in the bid procedure, the server-side system prompts the bidder to offer, via the bid screen, at least one of (i) the waiting time and (ii) a position required to calculate the waiting time, and receives bid information including the at least one of (i) and (ii) via the terminal of the bidder; and
in the bid acceptance procedure, the server-side system executes the bid processing according to success criteria that assigns a highest priority to a shortest waiting time.

12. The auction method according to claim 10, wherein:
the duration is a moving time imposed on the requester when the requester goes to a position specified by the bidder between a position specified by the requester who offers a service and a position offered by the bidder who is to receive the provision of the service;
in the request servicing procedure, the server-side system prompts the requester to offer the position of the requester on the request entry screen, and receives the request information including the position, via the terminal of the requester;
in the bid procedure, the server-side system prompts the bidder to offer at least one of (i) the moving time and (ii) a position required to calculate the moving time on the bid screen, and receives bid information including the at least one of (i) and (ii) via the terminal of the bidder; and
in the bid acceptance procedure, the server-side system executes the bid processing with the moving time under a success criteria that assigns a highest priority to a shortest moving time.

13. The auction method according to claim 5, wherein:
the requester is a person who receives a service, the bidder is a person who offers the service and is en route for offering the service, and the duration represents a waiting time imposed on the requester when the bidder moves from a position on a scheduled route at a desired time of the requester to a position specified by the requester;
in the request servicing procedure, the server-side system prompts the requester to offer the position and the desired time via the request entry screen, and receives the request information including the position and the desired time via the terminal of the requester;
in the bid procedure, the server-side system prompts the bidder to offer bid information including a scheduled route required to calculate the waiting time on the bid screen, and receives the bid information including the scheduled route data via the terminal of the bidder; and
in the bid acceptance procedure, the server-side system uses received data including the position, the desired time and the scheduled route to calculate a waiting time imposed on the requester representing a duration of movement of the bidder from the position at the desired time on the scheduled route to a position specified by the requester for providing the service, and executes the bid processing based on the waiting time and applying a success criteria that assigns a highest priority to a shortest waiting time.

14. The auction method according to claim 5, wherein:
the requester is a person who provides a service and is en route for providing the service, the bidder is a person who receives the service, and the duration is a moving time imposed on the requester when the requester moves from a position on a scheduled route at a desired time of the bidder to a position specified by the bidder;
in the request servicing procedure, the server-side system prompts the requester to offer a scheduled route on the request entry screen, and receives the request information additionally including the scheduled route via the terminal of the requester;

in the bid procedure, the server-side system prompts the bidder to offer the position and the desired time on the bid screen, and receives the bid information including the position and the desired time via the terminal of the bidder; and in the bid acceptance procedure, the server-side system uses received information including the position, the desired time and the scheduled route to calculate a moving time imposed on the requester representing a duration when the requester moves from a position at the desired time on the scheduled route to the position specified by the bidder for providing the service, and executes the bid processing based on the moving time and applying a success criteria that assigns a highest priority to the shortest moving time.

15. The auction method according to claim 5, wherein:

a service to be traded uses a vehicle, the duration is a at least one of a waiting time and a moving time imposed on the requester when a provider of the service moves the vehicle to a position offered by the person who is to receive the service.

16. The auction method according to claim 5, wherein:

the duration is at least one of a waiting time and a moving time;

the bid information offered by the bidder includes position data of the bidder required for calculating the duration; and in the bid acceptance procedure, the server-side system uses position data specified by the requester and position data offered by the bidder to calculate the duration, and executes the bid processing based on the duration to which success criteria is applied that assigns a highest priority to a shortest duration.

17. The auction method according to claim 1, wherein:

the due date represents a trading deadline and the time slide preference indicates a preference for an earliest performance prior to the trading deadline.

18. The auction method according to claim 1, wherein:

the due date represents a trading deadline and the time slide preference indicates a preference for a latest performance prior to the trading deadline.

19. The auction method according to claim 1, wherein:

the due date represents a trading deadline and the time slide preference indicates a preference for a latest performance after the trading deadline.

20. The auction method according to claim 1, wherein:

the due date represents a trading deadline and the time slide preference indicates a preference for an earliest performance after the trading deadline.

* * * * *